US005619639A

United States Patent [19]

Mast

[11] Patent Number: 5,619,639

[45] Date of Patent: Apr. 8, 1997

[54] METHOD AND APPARATUS FOR ASSOCIATING AN IMAGE DISPLAY AREA WITH AN APPLICATION DISPLAY AREA

[76] Inventor: Michael B. Mast, 5158 Clareton Dr., Agoura Hills, Calif. 91301

[21] Appl. No.: 317,756

[22] Filed: Oct. 4, 1994

[51] Int. Cl.[6] .......... G06F 3/14

[52] U.S. Cl. .......... 395/326; 395/349

[58] Field of Search .......... 395/157, 155, 395/156, 160, 161, 600, 650, 153, 154, 158, 159, 700; 364/514 C; 358/456

[56] References Cited

U.S. PATENT DOCUMENTS

| | | | |
|---|---|---|---|
| 4,954,819 | 9/1990 | Watkins | 340/721 |
| 5,065,345 | 12/1991 | Knowles et al. | 395/154 |
| 5,101,283 | 3/1992 | Seki et al. | 358/456 |
| 5,109,482 | 4/1992 | Bohrman | 395/154 |
| 5,140,677 | 8/1992 | Fleming et al. | 395/159 |
| 5,140,678 | 8/1992 | Torres | 395/159 |
| 5,179,702 | 1/1993 | Spix et al. | 395/650 |
| 5,287,447 | 2/1994 | Miller et al. | 395/157 |
| 5,293,470 | 3/1994 | Birch et al. | 395/135 |
| 5,305,435 | 4/1994 | Bronson | 395/159 |
| 5,323,314 | 6/1994 | Baber et al. | 364/401 |
| 5,339,392 | 8/1994 | Risberg et al. | 395/161 |
| 5,428,782 | 6/1995 | White | 395/650 |

FOREIGN PATENT DOCUMENTS 5204795 8/1993 Japan .

*Primary Examiner*—Mark R. Powell
*Assistant Examiner*—Ruay Lian Ho
*Attorney, Agent, or Firm*—Hecker & Harriman

[57] ABSTRACT

A method for adding a photograph or other still or animated image to any application program running in its own window in a windowed computer operating environment such as Microsoft Windows 3.1 is presented. A bitmapped or other image is "attached" to any application program capable of running in a windowed environment, without any modification to such application program, such that when the application program is started and its window is opened, the image is displayed at a predetermined location with respect to the application window. The displayed image, though "attached" to the application program's window, does not interfere to any significant extent with the operation of the application. Application programs are thereby customized and personalized by associating particular images, such as scanned-in personal photographs, with each particular application program. The image "attached" to an application may be chosen from a gallery of images. The image displayed for a particular application may be periodically changed in a "slide-show" manner with a sequence of images chosen by the user. A company's logo can be displayed on the display screen while application programs are being demonstrated during a presentation. A "drawer" metaphor is further provided for displaying and removing images on a display.

43 Claims, 12 Drawing Sheets

METHOD AND APPARATUS FOR ASSOCIATING AN IMAGE DISPLAY AREA WITH AN APPLICATION DISPLAY AREA

BACKGROUND OF THE INVENTION

1. Field of the Invention

The present invention relates to the field of computer image display.

2. Background Art

Computer systems using multi-window operating systems are commonly used in business and personal settings. These multi-window operating systems permit more than one application to be running in a system at one time, dedicating one or more windows to each application. These applications can vary from simple text editors and spreadsheets to advanced graphics editors and other complex programs. No application running in a window need be related in any way to any application running in a separate window.

FIG. 14A shows a typical prior art display screen 1400 containing two windows 1410 and 1420. Window 1410 is associated with a word-processing program. It shows a portion 1415 of a written document depicting different printer fonts and sizes. Window 1420 is associated with a painting program. It shows a portion 1425 of a bitmapped image of a locomotive. Window 1410 has a vertical scroll bar 1430 with a scroll box 1435 along its right hand side, and a horizontal scroll bar 1440 with a scroll box 1445 along its bottom. Window 1420 has a vertical scroll bar 1450 with a scroll box 1455 along its right hand side, and a horizontal scroll bar 1460 with a scroll box 1465 along its bottom. The regions of the windows showing portion 1415 and portion 1425 are known as the client area. Those regions external to the client area, including the window borders, scroll bars, menus, etc., are designated as the non-client area.

To make the process of using a computer more enjoyable, a market has developed for software that personalizes the computer display. Prior art systems allow a user to select photographs or other images or sequences of images from a gallery to be displayed on a computer display screen. However, these systems use dedicated image editing, screen saver or presentation programs that display images only in their own windows. These programs do not allow a user to perform operations in other windows while the image display program is active. Furthermore, prior art systems do not allow images to be "attached" by a user to any application program without modification of the application program and without requiring any special capabilities of the application program.

In U.S. Pat. No. 4,954,819, Watkins discloses a control system for writing image data to a multiple-window dynamic display by use of a window frame buffer, an image frame buffer, and valid data buffers. Watkins does not address the issue of how it is determined what images to display in each window, nor how the relative sizes and positions are determined.

In U.S. Pat. No. 5,065,345, Knowles et al. disclose a control system for synchronizing images and audio clips provided by CD/ROM and Video Disk (VD) players and/or sounds and images generated by a computer's CPU, for interactive multimedia applications. The system disclosed includes a user interface called a "Control Bar" that presents a consistent set of controls to a user for use with a variety of applications. In order to use the control bar, an application program must be modified to access the control bar's controls.

In U.S. Pat. No. 5,109,482, Bohrman discloses a video control system that allows a user to play back video clips stored on a recording media such as a video disk. The user is able to manipulate segments from a video disk using icons.

In U.S. Pat. No. 5,140,677, Fleming et al. disclose a multi-window user interface that displays a manipulatable mini-icon in the caption or title bar of an application or object window that represents the application program or object. The purpose of this mini-icon is to allow a user to manipulate the mini-icon in the same manner that the original icon for the application or object displayed in the window can be manipulated where opening the window hides the original icon.

In U.S. Pat. No. 5,287,447, Miller et al. disclose a method for giving a "non-container object" (e.g. an application program) in an operating environment certain characteristics of a "container object" such as a file folder. The method disclosed consists of providing a "container pane" displayed in a window that includes a region in which objects contained in the "non-container object" are displayed as icons. These icons can be manipulated as if they were contained in a container object.

In U.S. Pat. No. 5,293,470, Birch et al. disclose a windowing operating environment that provides multiple display layers, each of which may display multiple windows. The order of windows within a layer may be changed, but the order of the layers themselves is fixed. Objects displayed in windows on one layer may be moved to a window in a different layer.

In U.S. Pat. No. 5,305,435, Bronson discloses a system for managing windows on a display screen in which inactive windows are reduced to tabs that are located around the periphery of the main desktop.

In U.S. Pat. No. 5,323,314, Baber et al. disclose an application program for scheduling meetings that provides a pop-up window in which a photograph of a desired meeting attendee may be displayed. The graphic display capability is a function of the application program and provides no ability to associate images with other arbitrary applications.

In Japanese reference JP 05-204795, Aoshima et al. disclose an electronic mail application program that uses photographs of users of the system to identify senders and receivers of mail and also to identify the sources of comments in a circulating document. This photograph association is a part of the mail application, providing no ability to attach images to other applications. Further, the user has no control over what image is assigned as it is determined by the sender of a mail message.

SUMMARY OF THE PRESENT INVENTION

The present invention relates to a method for adding a photograph or other still or animated image to any application program running in its own window in a windowed computer operating environment. The present invention allows any bitmapped or other image to be "attached" to any application program capable of running in a windowed environment, without any modification to such application program, such that when the application program is started and its window is opened, the image is displayed at a predetermined location with respect to the application window. In one embodiment, the image is attached extending from the "caption bar" (the uppermost bar of a typical window used in windowing environments that identifies the application running in that window). The displayed image, though "attached" to the application program's window, does not interfere to any significant extent with the operation of the application program.

The present invention allows a user to customize and personalize application programs by associating particular images, such as scanned-in personal photographs, with each particular application program. In one embodiment, the present invention provides a gallery of images from which the image "attached" to an application may be chosen. These images are selected by the user and do not necessarily have any relationship with the application itself. For example, a user can use the present invention to display photos of the user's family on windows of various application programs to personalize the screen. Alternatively, a company making a presentation utilizing arbitrary application software can use the present invention to attach an image of its company logo to an application window in order to identify the company with the information displayed by the application. The invention also allows the user to choose to display a sequence of images, such that the image displayed for a particular application is periodically changed in a "slide-show" manner. In another embodiment, the present invention can be used to display a video file concurrently with an application program in the application program's window. The user activates the brief motion video presentation at the user's personal convenience by such means as pressing a designated mouse button when the cursor (or pointer) is positioned over the image. The present invention also provides a "drawer" metaphor for displaying and removing images on a display.

DETAILED DESCRIPTION OF THE PRESENT INVENTION

Figure 1:
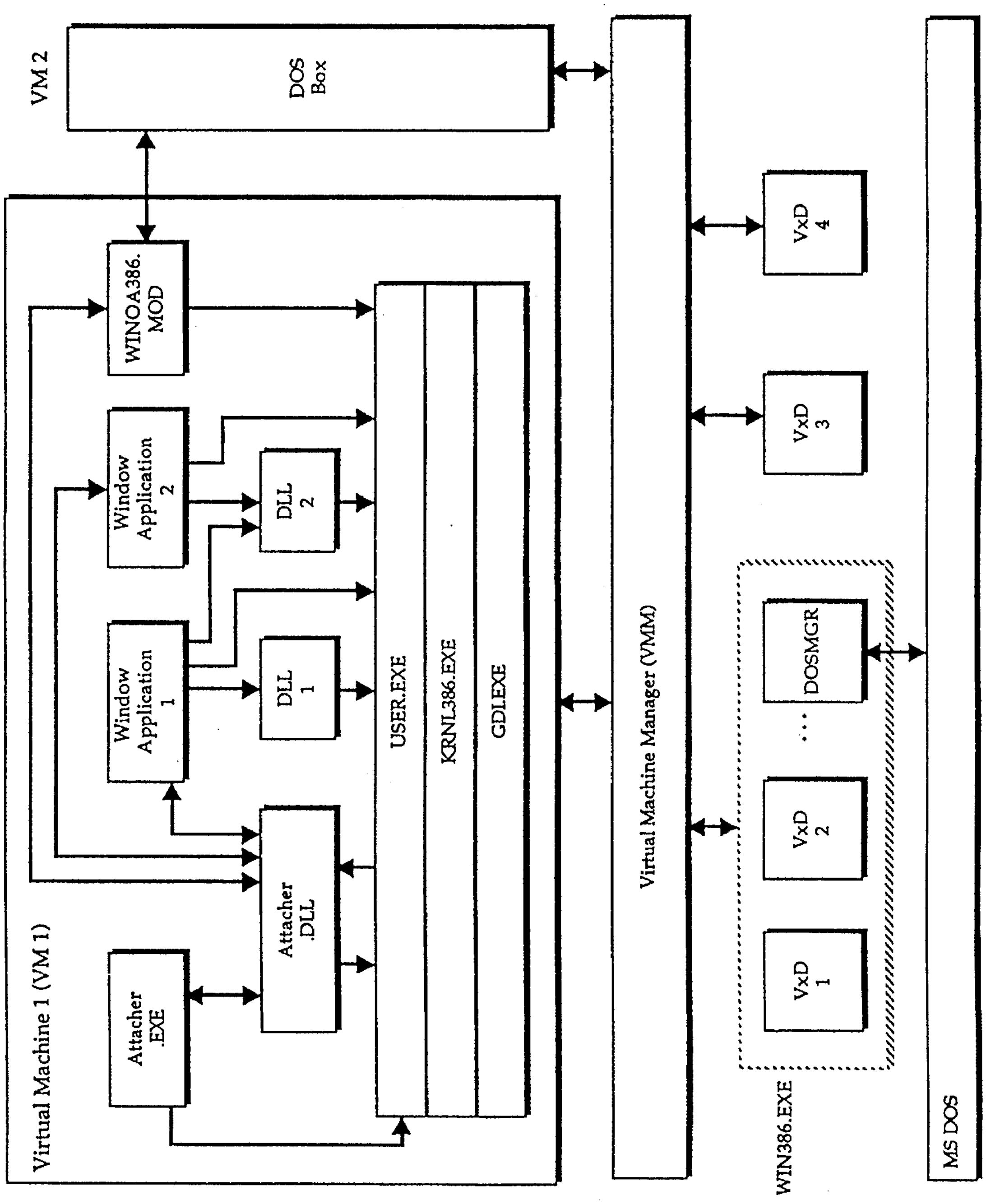
FIG. 1 is a block diagram of a sample windowing environment incorporating one embodiment of the present invention.

A method and apparatus for associating an image display area with an application display area in a computer system are described. In the following description, numerous specific details are described in order to provide a more thorough description of the present invention. It will be apparent, however, to one skilled in the art, that the present invention may be practiced without these specific details. In other instances, well-known features have not been described in detail in order to not obscure the present invention unnecessarily.

Although the particular implementation of the present invention will vary from one particular windowing environment to another, the methodology of the present invention is to create a floating window that contains the image to be displayed and to position this window in a predetermined manner with respect to the window for the application with which the floating window is associated. For example, in one embodiment of the invention, the floating window is positioned such that its upper boundary generally corresponds with the upper boundary of an application's window. When the window for the application is re-sized or moved, the position of the floating window is changed to correspond to the new size and/or position of the application program window, such that when the application program window is displayed in its new size and/or position, it appears that the floating window was fixed to the application program window and moved along with the application program window. In some windowing environments, the operating system that provides the windowing environment may allow the floating window containing the image to automatically move with the application program window such that it is automatically relocated as the window is moved. In other environments, the floating window's new coordinates must be calculated separately and the windowing environment must be given separate instructions to also move the floating window when the application window is repositioned and/or resized.

In one embodiment, the present invention also provides a method for a user to remove the image "attached" to an application from the display by positioning a cursor (also referred to as a pointer) over the attached image and "clicking." When this is done, this embodiment displays an animated sequence that creates the illusion of the portion of the caption bar to which the image is attached opening like a drawer. The image "rolls up" into the opened drawer, and the drawer closes. The portion of the caption bar that forms the drawer (which is slightly wider in width than the width of the image) is displayed in a different shading from the remainder of the caption bar to identify the position of the drawer. To re-display the image, the cursor is positioned over the shaded portion of the caption bar and "clicked," and the drawer opens and the image emerges.

In one embodiment, the image may be dragged by the user to any desired location horizontally along the caption bar, although it is restrained from moving vertically. Multiple images may also be displayed along a single application program's caption bar.

Figure 14A:
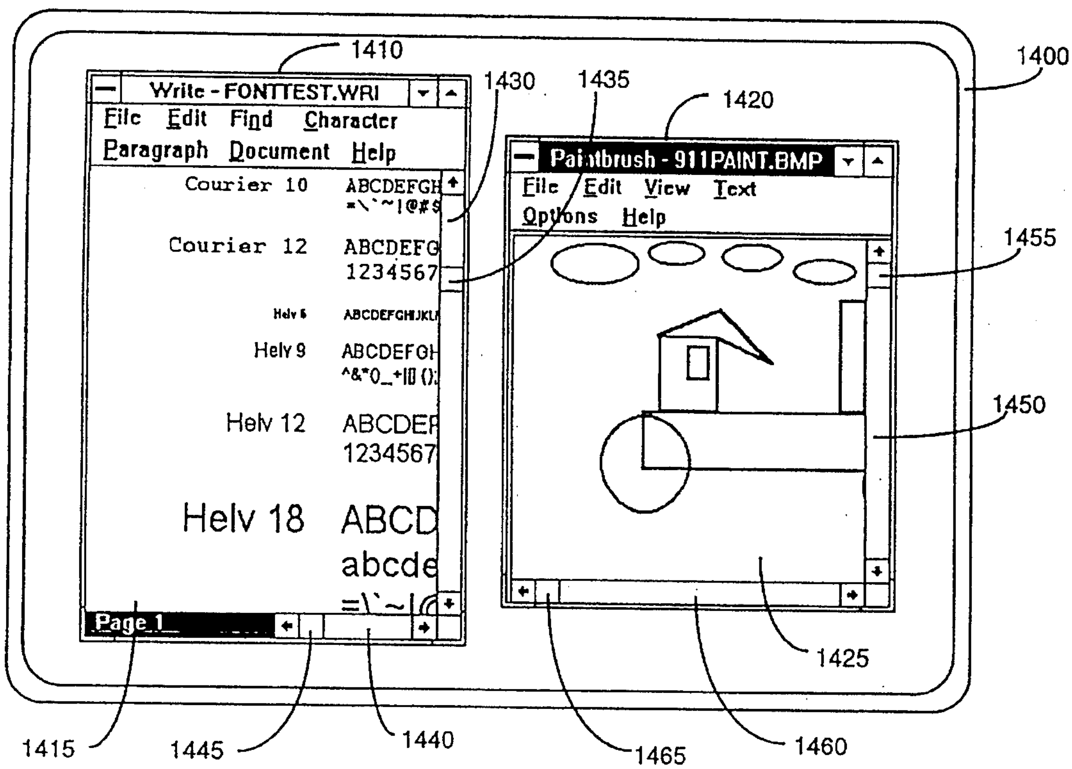
FIG. 14A is an illustration of a sample computer display with a windowing environment.
Figure 14B:
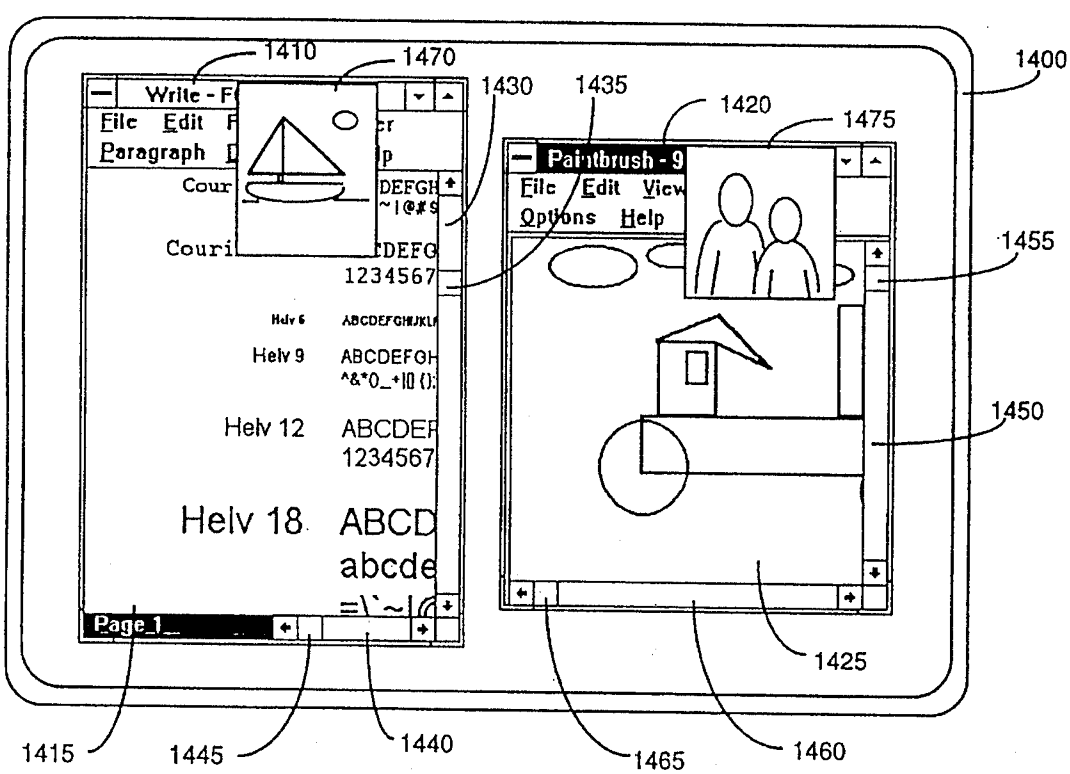
FIG. 14B is an illustration of a sample computer display with the present invention operating in a windowing environment.

FIG. 14B illustrates a sample windowed display of one embodiment of the present invention wherein each application window has an image attachment window attached to its caption bar. All elements of FIG. 14B are identical to those of FIG. 14A except for the addition of attachment window images 1470 and 1475. Image 1470 is attached to the caption bar of application window 1410. Image 1475 is attached to the caption bar of application 1420. Each image is movable in the horizontal direction for the width of the associated caption bar. As shown, each image extends partially into the client area of the application window. The amount of client area obscured by the image attachment window is dependent on the size of the picture and any menus, etc. between the caption bar and the client area.

FIG. 1 illustrates one possible embodiment of the present invention in a windowing environment such as Microsoft Windows™ ("Windows"). The system is comprised of Virtual Machines VM1 and VM2, Virtual Machine Manager VMM, Windows executable program WIN386.EXE, and the operating system MS-DOS. Virtual Device Drivers V×D3 and V×D4 represent other drivers present but nonintegral to the Windows system. This system is shown for purposes of example only, and presents only one possible environment.

Virtual Machine VM1 contains Window Applications 1–2 and associated Dynamic Link Libraries (DLLs) 1–2. An executable file and DLL, Attacher.EXE and Attacher.DLL, are also present to provide the capabilities of the present invention. A fourth application, WINOA386.MOD, does not generally call any associated DLL. Other components of Virtual Machine VM1 are the core Windows modules: USER.EXE, KRNL386.EXE and GDI.EXE. These core modules make calls to the standard drivers, e.g. display adapter, printer and scanner drivers. The GDI.EXE program or Graphics Device Interface, contains many functions for displaying graphic output.

WIN386.EXE contains many virtual device drivers (V×Ds), including the DOSMGR device driver which interfaces with the Virtual Machine Manager and the MS-DOS operating system. Virtual device drivers are device specific, converting general commands into the precise actions required to implement the command on a specific device. MS-DOS does not handle application address space above one megabyte inherently. Therefore, DOSMGR assigns window applications address space below one megabyte and copies data from this lower address space to the upper address space in a manner that is transparent to the application. Other V×Ds within WIN386.EXE are responsible for such items relative to Windows as a timer, math coprocessor, interrupt controller, etc.

In FIG. 1, Window Application 1 is able to make calls to DLL1 and DLL2. Window Application 2 is able to make calls into DLL2. Further, all window applications, including WINOA386.MOD, make calls into Attacher.DLL. Even the core Windows modules make calls into Attacher.DLL. In addition, all Windows-based applications and most DLLs make calls into USER.EXE, KRNL386.EXE, and GDI.EXE. When not in full screen mode, WINOA386.MOD provides Virtual Machine VM2, also commonly referred to as a "DOS box," with a captioned window from which various settings affecting the virtual machine may be set.

In enhanced mode, a major component of Windows is the Virtual Machine Manager. Two of the Virtual Machine Manager's more important roles are to provide the virtual machines necessary for running Windows and supporting any of Windows' virtual DOS sessions, and to coordinate the virtual device drivers which resolve resource contention issues among the various virtual machines.

Figure 2:
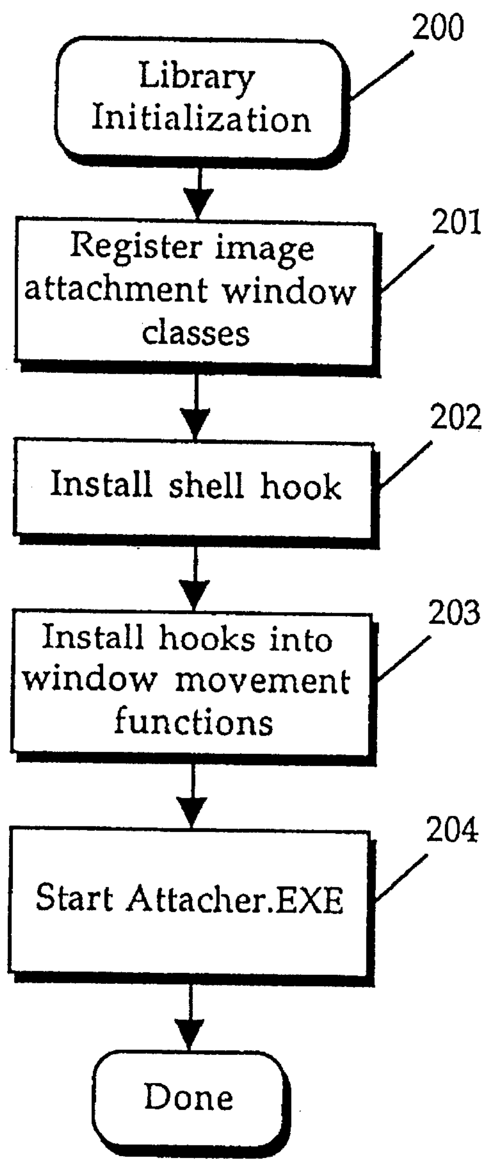
FIG. 2 is a flow chart of several initialization steps for one embodiment of the present invention.

Attacher.DLL is installed by Windows prior to Windows loading and running any Windows-based applications. A "LibMain" function is called when the DLL is loaded, then "LibInit1" (example shown in Appendix 1) is called when the driver procedure (drvproc.c) receives a DRV_LOAD message. Once loaded, the library performs an initialization procedure. An example initialization procedure is illustrated in FIG. 2. Library initialization, block 200, begins after the windowing environment has loaded Attacher.DLL during system startup. In block 201, the LibInit1 function registers the window classes that Attacher.DLL requires for operation with the Windows operating environment. Block 202 follows with the installation of a shell hook into the operating environment so that Attacher.DLL can be made aware of the creation of top level windows. In block 203, hooks are installed into the Windows operating environment so that any Windows API call that affects the state of a window may be intercepted. In block 204, the initialization function starts the image attachment application, Attacher.EXE. Attacher.EXE provides the user interface to Attacher.DLL and performs all image file processing on behalf of the Windows-based application with which an image attachment window is associated.

In order to assist in making the image attachment functionality as seamless as possible, a dummy window may be created during the initialization stage. This dummy window is used to precalculate window dimensions when application windows are resized. The dummy window itself is never visible to the user. The dummy window is discussed below in more detail with reference to window resizing.

Figure 3:
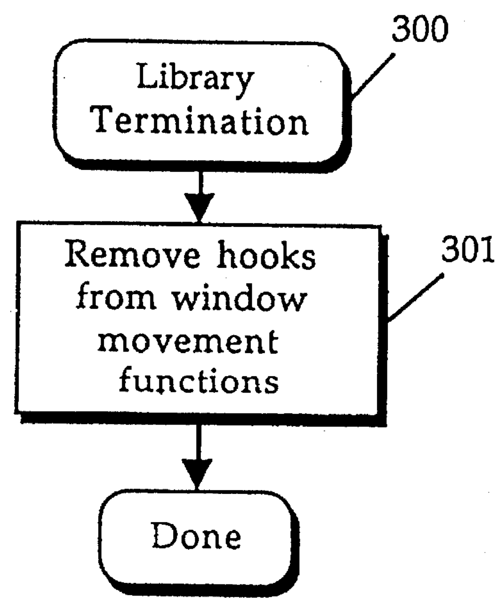
FIG. 3 is a flow chart of library termination steps for one embodiment of the present invention.

FIG. 3 illustrates the procedure for handling receipt of a termination message for one embodiment of the present invention. When the windowing environment is shutting down, an exit procedure within Attacher.DLL is called. The termination message is represented as block 300 in FIG. 3. In subsequent block 301, the exit procedure removes any installed hooks, and any allocated resources not already freed are freed.

The shell hook installed at step 202 in FIG. 2 allows tasks to be notified when top level windows are being created. "Hooks" are resources that install filter functions. These filter functions process "hooked" function calls before the functions that have been hooked are called. Attacher.DLL utilizes the shell hook to decide if an application should be subclassed by the Attacher.DLL subclass procedure. Subclassing allows Attacher.DLL to screen messages to a subclassed application before those messages are received by the subclassed application. Once Attacher.DLL has subclassed the application for which a top level window has just been created, an image attachment window is created if a gallery is associated with the application. If an attachment window is created, its dimensions are set to zero until a request to Attacher.EXE is made (via message posting) to open an image file. Once the image file is open and available, the image attachment window is positioned and sized to accommodate the image and the image is displayed in the window. Depending on the embodiment, the predetermined initial position of the image attachment window may be determined by the programmer or the user and/or the previous location of an image attachment window in an application window.

Figure 4:
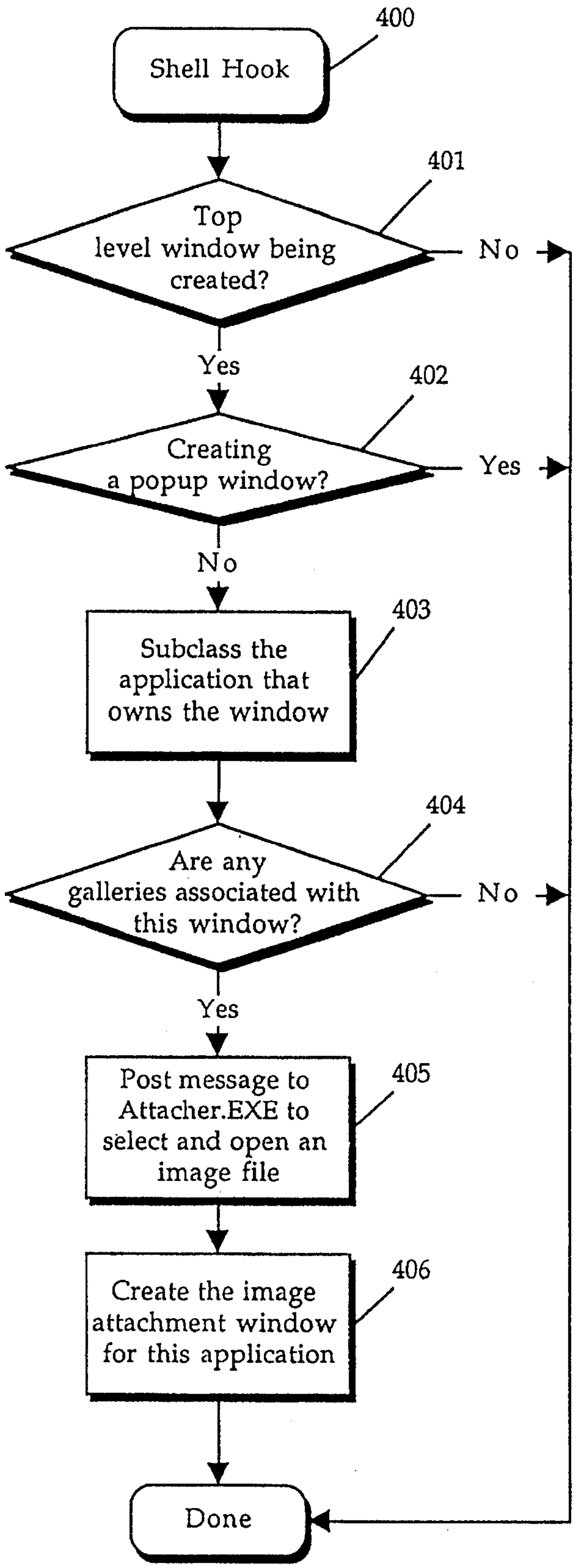
FIG. 4 is a flow chart of the shell hook functions of one embodiment of the present invention.

FIG. 4 is a flow diagram of the shell hook filter functions. Shell hook 400 notifies Attacher.DLL whenever an application is starting. In block 401, Attacher.DLL determines whether a top level window is being created for the starting application. If there is no top level window being created in response to the application startup, the hooked filter functions permit the application startup to resume. If a top level window is being created, in block 402, the filter functions check to see if the window is a popup window. In this embodiment of the present invention, no image is attached to popup windows, therefore, the filter functions permit the application startup to resume if the window being opened is a popup window. If the window being created is not a popup window, in block 403, the Attacher.DLL subclass procedure subclasses the application for which the window is being created (also commonly referred to as the application that "owns" the window).

Once the application has been subclassed, in block 404, the filter functions check to see if the user has previously specified a gallery to be associated with this window. The gallery is a set of references to one or more photographs or images and descriptions of the photographs or images. The gallery dictates the order and nature of the display. For example, the user may specify certain images to be displayed on specific applications or a selection of images to be displayed individually and exchanged at predetermined intervals in a "slide show" manner. Though the framework for utilizing a gallery is provided by the present invention, the gallery itself is typically provided and controlled by the user once the user has determined how the images and applications are to be arranged. This does not preclude other embodiments from utilizing pre-arranged galleries.

If there is no gallery associated with the window, the filter functions permit the application startup to resume. If there is a gallery associated with the window, in block 405, a message is posted to Attacher.EXE to select and open an appropriate image file. In block 406, the image attachment window is created for the starting application. The shell hook filter functions then allow the application startup to continue.

Figure 5:
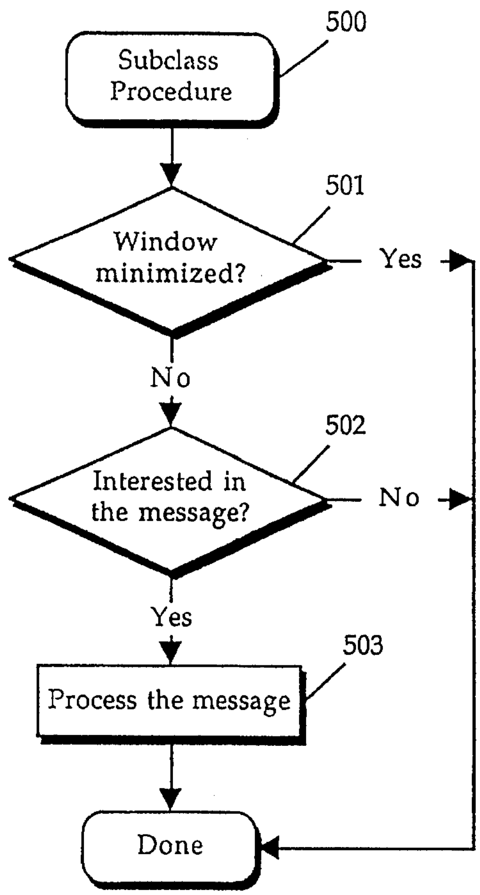
FIG. 5 is a flow chart of the subclass procedure of one embodiment of the present invention.

As described above, when a window application is opened, the application is subclassed by the shell hook filter functions. Therefore, messages sent to these applications are first sent to Attacher.DLL. The subclass procedure is then able to inspect the messages prior to their reaching the subclassed application. Messages that are not of interest to the subclass procedure are passed along to the subclassed application. Otherwise, the message is processed by the subclass procedure. In some cases, messages will not be passed to the subclassed application. For instance, Image File Loaded and Roll Up/Roll Down Timer messages are initially posted to the subclassed application with which the relevant attachment window is associated although they are really intended for Attacher.DLL. By posting them as messages to the subclassed application, however, Attacher.DLL is able to use the handle in the message indicating the subclassed application to identify the appropriate image attachment window to which the message relates. FIG. 5 is a flow diagram of the subclass procedure. FIGS. 6–11 are flow diagrams of procedures for handling messages of interest to the subclass procedure.

In FIG. 5, the subclass procedure is initiated by interception of a message directed to a subclassed application in block 500. In block 501, the subclass procedure passes the message on to the subclassed application if the relevant window is currently minimized. In such a case, no image attachment window would be visible on the minimized window and the subclass procedure would not be interested in the message. If the window is not currently minimized, in block 502, the subclass procedure examines the message to see if the message is of import to Attacher.DLL (e.g. window resizing or movement). If it is not, the message is passed to the subclassed application. If the message is of import to Attacher.DLL, the message is processed by Attacher.DLL in block 503. If the message was originally intended for the subclassed application, the message is then passed to the subclassed application.

Figure 6:
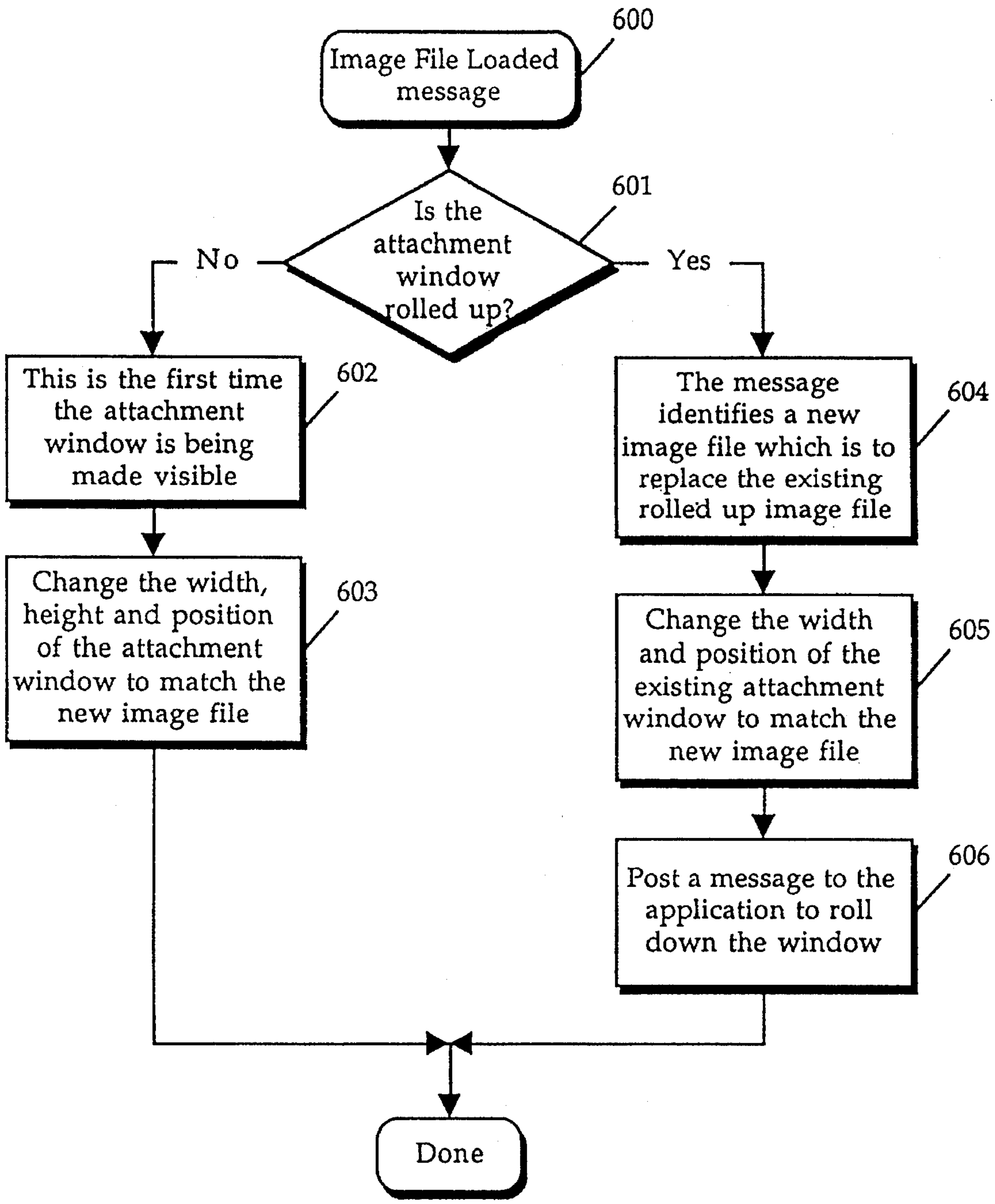
FIG. 6 is a flow chart of a procedure for responding to an Image File Loaded message in one embodiment of the present invention.

In FIG. 6, the procedure for handling an "Image File Loaded" message within the subclass procedure is illustrated. The Image File Loaded message notifies the subclassed application that Attacher.EXE has opened an image file and that the image file has been prepared to be displayed. If the image attachment window is not rolled up (i.e. the user has not requested that the image attachment window be temporarily removed), then the image attachment window is resized to fit the new image and the new image is displayed in the window. If the image attachment window is rolled up, then the image identified in the message is to replace the existing image.

In block 600, the Image File Loaded message is received by the subclass procedure and selected as a message of interest. In block 601, the roll up/down status of the image attachment window in the relevant application window is determined. In this embodiment, a new image can be displayed only if a previously displayed image has been "rolled up" or if no image for an application has yet been displayed in that application's image attachment window. If the image attachment window is not rolled up, then this is the first time the image attachment window is being made visible (block 602) (prior to this time, the image attachment window, not having an image displayed in it, has a height and width of zero). In subsequent block 603, the width, height and position of the image attachment window are changed to accommodate the new image file. If the image attachment window is rolled up in block 601, then in block 604, the image file identified in the message replaces the existing rolled up image file. In block 605, the width and position of the existing image attachment window are changed to match the new image file. Then, in block 606, a message is posted to the subclassed application to roll down the window.

In most embodiments, some form of image compression is utilized to reduce data storage and transmission requirements. In the preferred embodiment, an asymmetric compression technique is used. Asymmetric compression involves a compression/decompression method wherein the time required to compress data is disproportionate to the time required to decompress data. One such compression technique is known as "Fractal Technology" available through Iterated Systems, Inc. The fractal technique is very intensive and time consuming in the compression phase, but allows for very fast decompression of image data. The present invention is realizable using any image storage format, but for seamless functioning (i.e., to prevent "freezing" of the display while decompression and loading occurs), an asymmetric compression/decompression is appropriate.

Figure 7:
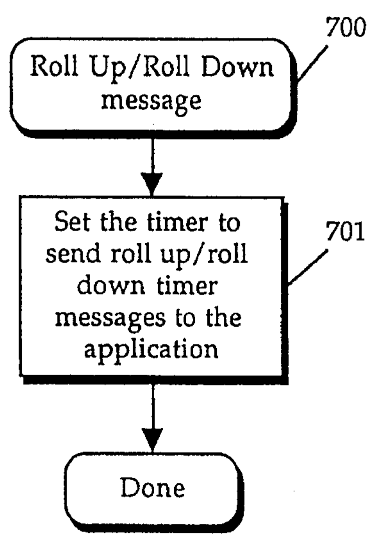
FIG. 7 is a flow chart for responding to a Roll Up/Roll Down message in one embodiment of the present invention.

FIG. 7 illustrates a procedure for responding when a message to either roll up or roll down the window has been received by Attacher.DLL. A timer is started such that timer messages can be sent and received. The timer messages drive the sequence of drawing events that cause the caption bar to appear to open or close and the image attachment window to roll up into or roll down from the caption bar. In block 700, a Roll Up or Roll Down message is received. Subsequently, in block 701, the timer is set to send Roll Up/Roll Down Timer messages to the subclassed application. At predetermined intervals, Attacher.DLL receives the Roll Up/Roll Down Timer messages and responds appropriately with respect to the specified subclassed application.

Figure 8:
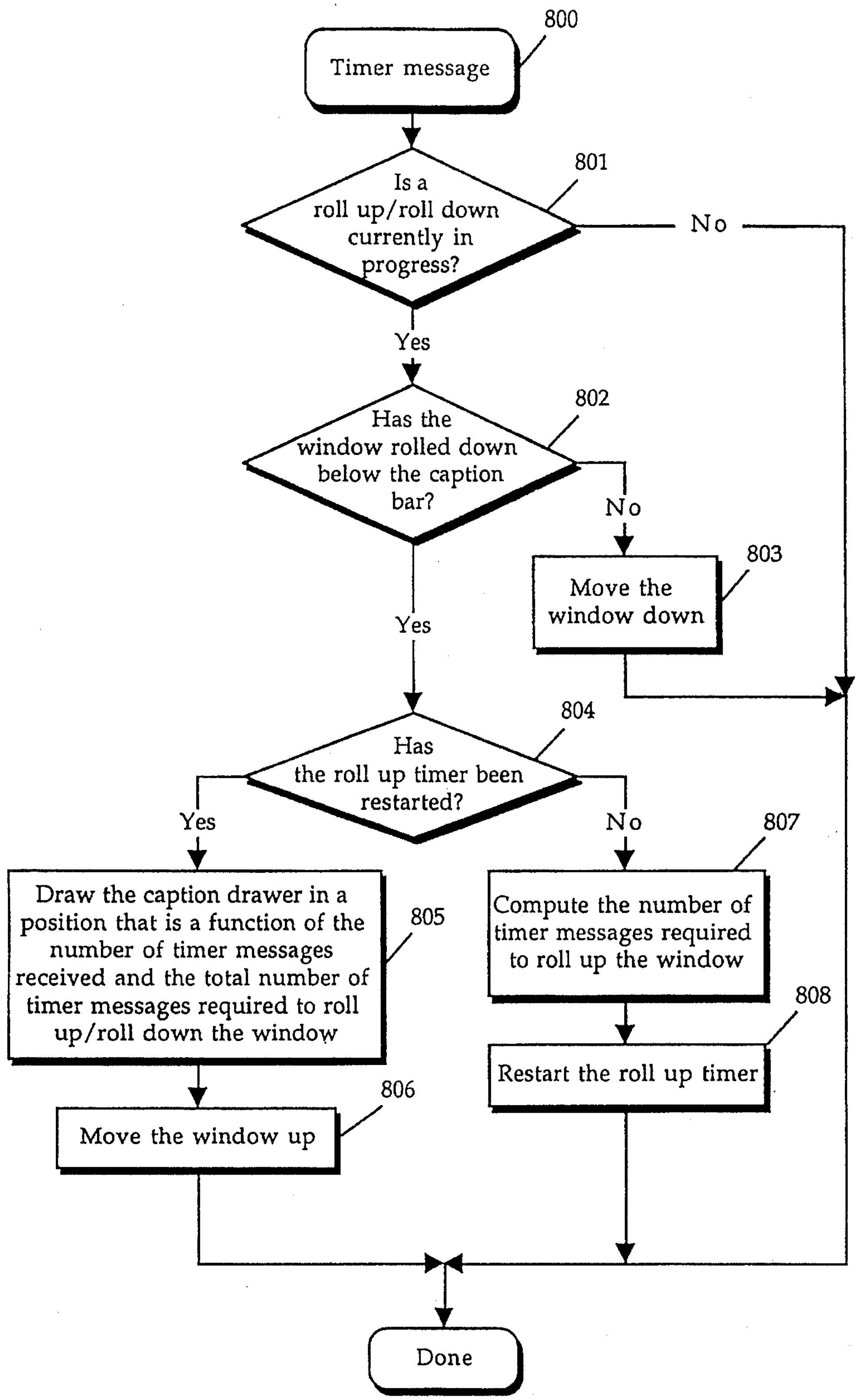
FIG. 8 is a flow chart of a procedure for responding to a Timer message in one embodiment of the present invention.

FIG. 8 illustrates a procedure for responding to a Timer message. In block 800, a Timer message is received by Attacher.DLL. In block 801, if no roll up or roll down is currently in progress then the timer message belongs to the subclassed application. In that case, the message is passed along to the subclassed application. If a roll up or roll down is in progress, then, in block 802, the position of the image attachment window is checked to see if the image attachment window has rolled down below the caption bar. If the window has not rolled down below the caption bar yet, the window position is moved downward one increment in block 803. In block 804, if the image attachment window has already rolled down below the caption bar, Attacher.DLL looks to see if the roll up timer has been restarted. If the roll up timer has been restarted, in block 805, the caption drawer is drawn in a position that is a function of the number of timer messages received and the total number of timer messages required to roll up/roll down the window. In subsequent block 806, the window is moved upward one increment. If the roll up timer was not restarted in block 804, the number of timer messages required to roll up the window is computed in block 807. In subsequent block 808, the roll up timer is restarted.

When rolling up a window, the first thing to be done in this embodiment is to roll down the image attachment window so that the top of the image attachment window is just below the caption bar. This leaves room for the caption bar to open in the region specified as the caption "drawer." Once the caption bar begins to open, the window is moved up until it is no longer visible. To roll down a window, the process is reversed. In either case, the window first moves down before it moves up. The timed movements of the image attachment window and caption drawer appear as animation wherein, in the case of a roll down operation, a drawer opens, an image slides out of the drawer, the drawer closes and the image slides upwards to conceal the closed drawer. In the case of a roll up operation, the window slides down to expose a drawer, the drawer opens, the window slides up into the drawer and the drawer closes. In one embodiment, the closed drawer is made evident in the caption bar by virtue of visually distinctive features such as a slight position offset or difference in color.

FIGS. 15A–F illustrate one embodiment of the caption drawer animation sequence as outlined above. Element 1500 represents the caption bar for an application window. Element 1501 represents the caption drawer in closed position, usually distinguished by color from the rest of the caption bar. Element 1502 represents the caption drawer in open position, offset both vertically and horizontally in order to provide a three dimensional appearance. Element 1503 represents a sample attached image in various stages of roll up/roll down operation.

Figure 15A:
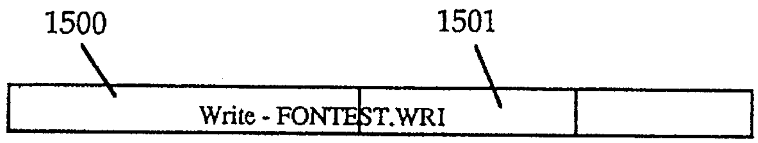
FIGS. 15A–F illustrate one embodiment of the caption drawer animation sequence.
Figure 15B:
Figure 15C:
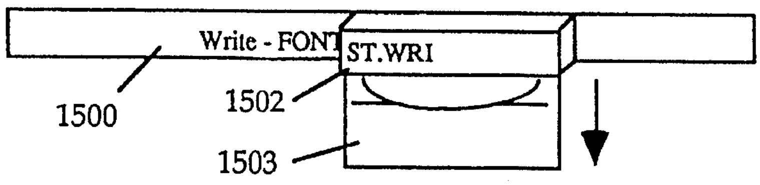

FIG. 15A shows the caption bar 1500 with caption drawer 1501 in closed position. The caption drawer can be opened by such means as the user placing the mouse pointer on the caption drawer and clicking the left mouse button. FIG. 15B shows the caption drawer 1502 in open position. To provide an animated display, the drawer 1502 extends from the caption bar 1501 in increments controlled by timer messages. In FIG. 15C, the caption drawer 1502 is fully open and image 1503 is in the process of "unrolling." This unrolling effect is produced by displaying only the portion of the image 1503 that extends below the caption drawer 1502 as the position of the image is incrementally lowered with respect to the caption drawer.

Figure 15D:
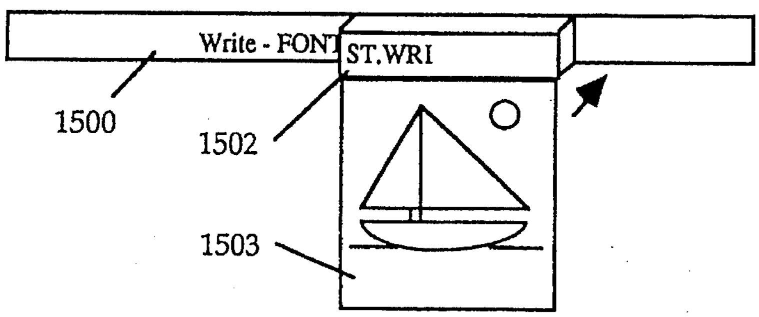
Figure 15E:
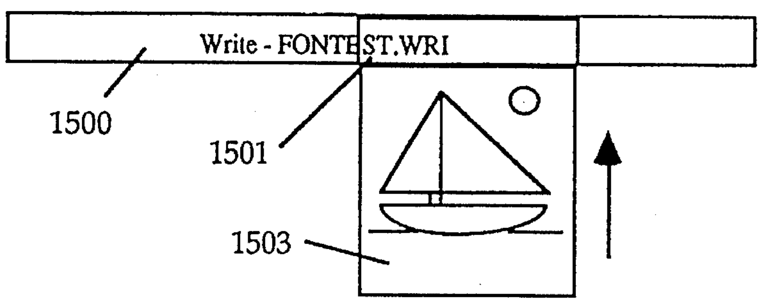
Figure 15F:
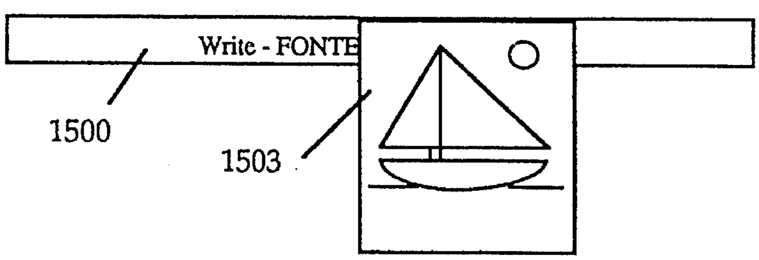

In FIG. 15D, image 1503 is fully visible below the open caption drawer. 1502. Now that the image 1503 is fully "unrolled," the caption drawer closes in a reverse of the drawer opening process. In FIG. 15E, the caption drawer 1501 is completely closed, leaving image 1503 flush with the bottom of caption bar 1500. The image 1503 is moved upwards in incremental steps until the top edge of the image 1503 is flush with the top edge of caption bar 1500 and caption drawer 1501. FIG. 15F shows the image attachment window 1503 in its final position, attached to the caption bar. All image movement in the above animation sequence is performed incrementally as timer messages are received by Attacher.DLL.

It will be evident to one skilled in the art that the image movement step of FIGS. 15E–F can be omitted such that the attached image 1503 is left flush with the bottom of the caption drawer 1501. However, in such an arrangement, a greater amount of client area is obscured by the image attachment window.

Figure 9:
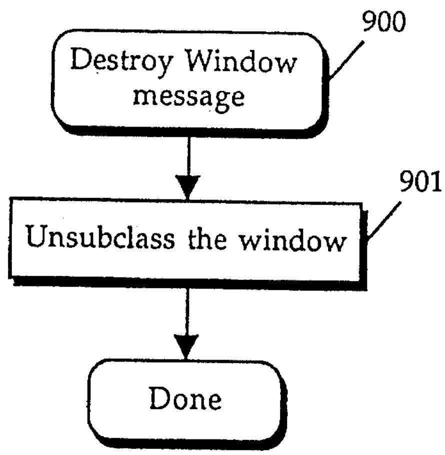
FIG. 9 is a flow chart of a procedure for responding to a Destroy Window message in one embodiment of the present invention.

When an application is being terminated, Attacher.DLL intercepts the Destroy Window message of the subclassed application. The library then releases the subclassed application as shown in FIG. 9. The Destroy Window message is received in block 900, indicating that the subclassed application is ending. In block 901, the subclassed application is un-subclassed.

Figure 10:
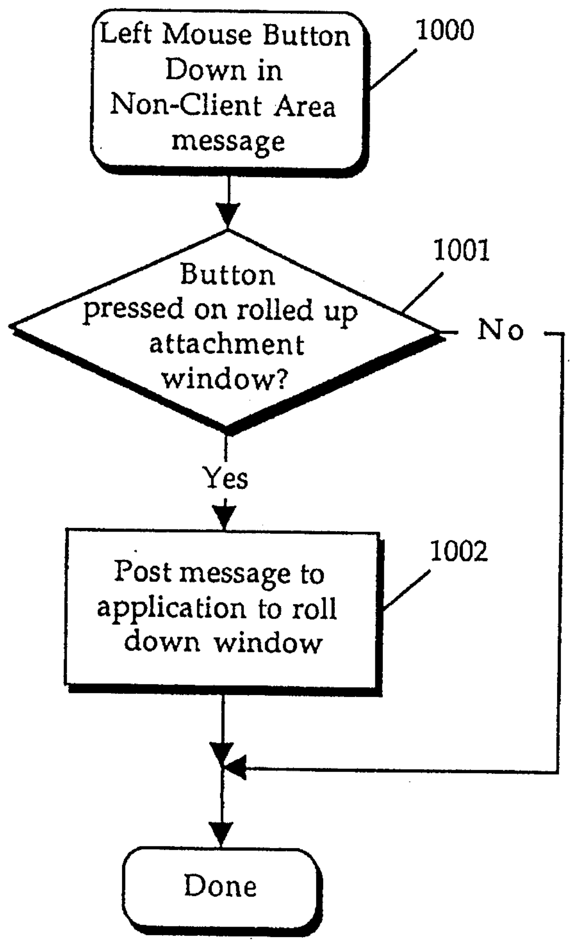
FIG. 10 is a flow chart of a procedure for responding to a Left Mouse Button Down in Non-Client Area message in one embodiment of the present invention.

FIG. 10 illustrates one manner in which the Roll Down command may be implemented using a mouse. In block 1000, Attacher.DLL receives the Left Mouse Button Down in Non-Client Area message intended for the subclassed application. In block 1001, if the mouse pointer is currently on the portion of the caption bar which indicates that a window has been rolled up (such as element 1501 in FIG. 15A), then, in block 1002, the subclassed application posts a message to itself (which the subclass procedure intercepts) to roll down the window. If the mouse pointer is not currently over the appropriate portion of the caption bar, Attacher.DLL assumes it is a message for the subclassed application window and permits the subclassed application to interpret the message.

Figure 11:
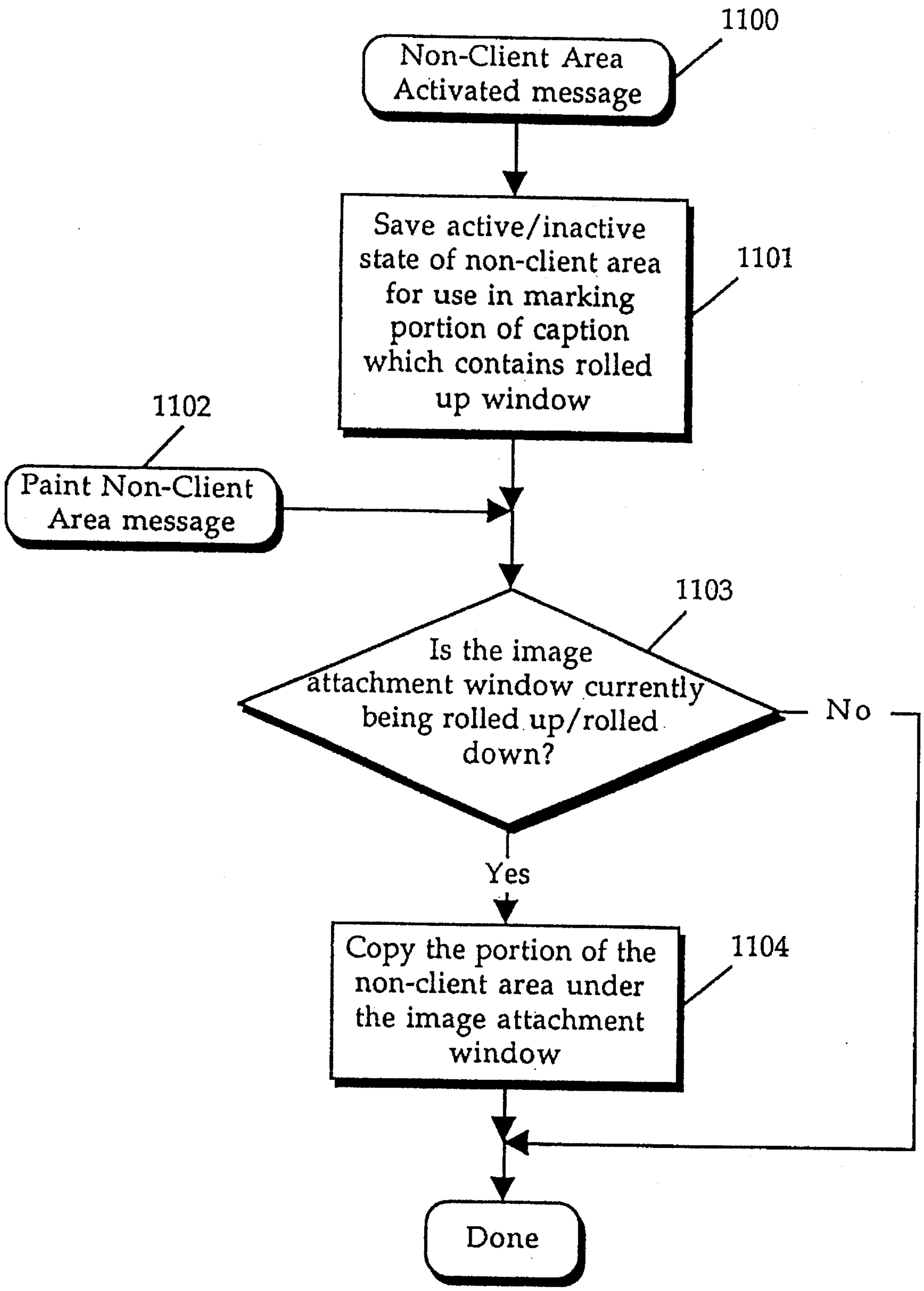
FIG. 11 is a flow chart of a procedure for responding to either a Non-Client Area Activated message or a Paint Non-Client Area message in one embodiment of the present invention.

FIG. 11 illustrates how the non-client area of the window is handled when either a Non-Client Area Activated message or a Paint Non-Client Area message is received in an embodiment that uses the drawer metaphor of FIG. 15. When a Non-Client Area Activated message is received as in block 1100, a parameter in the message indicates if the non-client area is being activated or deactivated (same message, different parameter). In block 1101, the state of the activation parameter is saved. In this embodiment, the color of the caption drawer depends on the saved state of the message parameter.

After block 1101, no distinction is made between the receipt of a Non-Client Area Activation message and a Paint Non-Client Area message (block 1102). In block 1103, if the image attachment window is being rolled up or rolled down, then, in block 1104, that portion of the caption bar which will be drawn displaced from the rest of the caption bar in order to simulate a drawer opening and closing is copied to a save area maintained by Attacher.DLL. The library uses this saved caption bar image to draw the components of the drawer (vertical, horizontal and diagonal lines) such that when the non client portion of the window is actually drawn, the animation appears smooth and flicker free.

Figure 12:
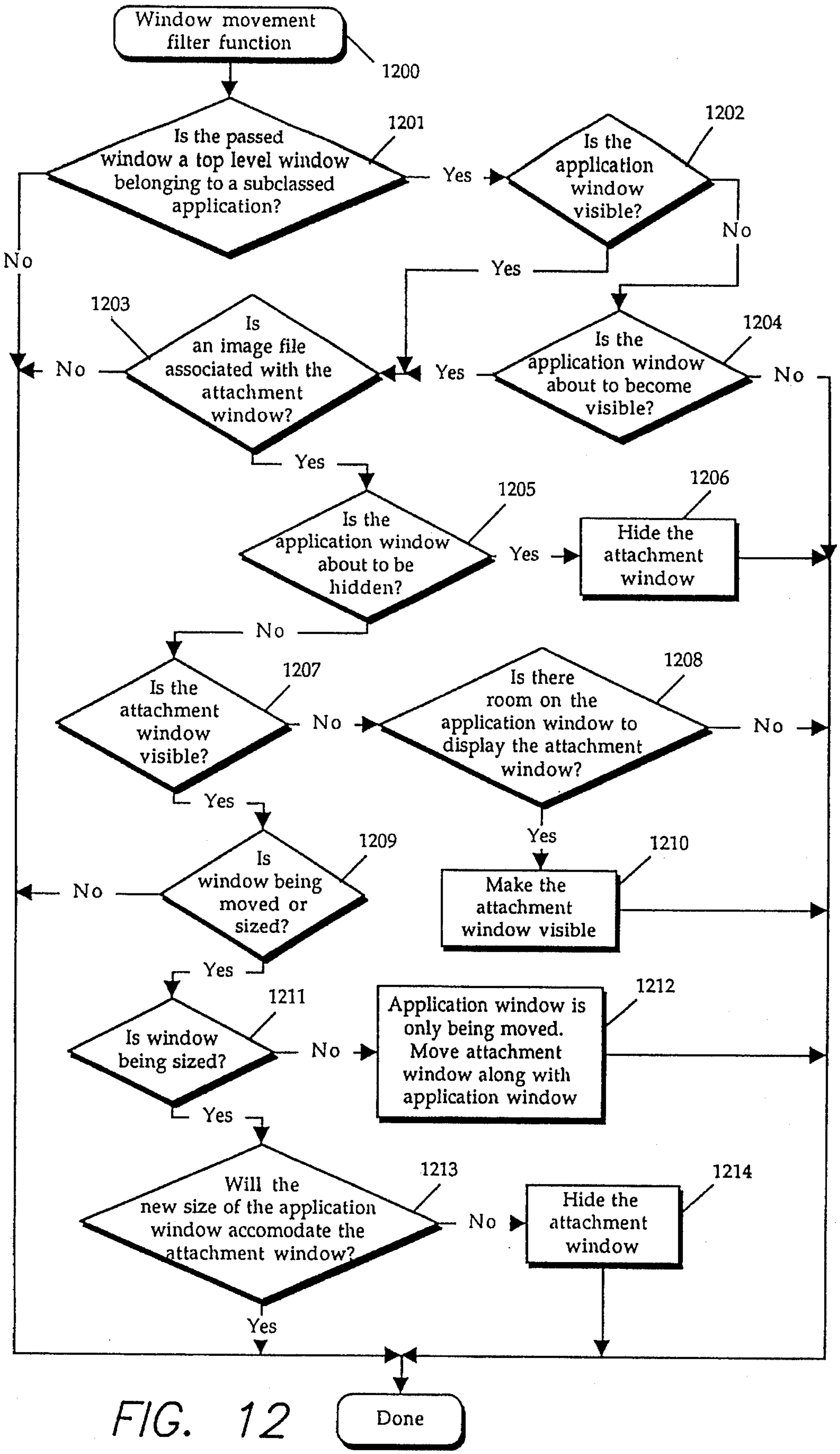
FIG. 12 is a flow chart of the filter functions associated with the hooks placed in the window movement functions in one embodiment of the present invention.

FIG. 12 describes the filter function that is installed by hooking the window movement functions. For example, the window movement functions may be structured such that a window may be moved, sized, activated, inactivated, made visible or made invisible (hidden) or any reasonable combination thereof. Whatever the case, this filter function is called. The purpose of the hook and therefore this function, is to ensure that the image attachment window moves along with the subclassed application window as it is moved, sized or both. Similarly, if the application window is hidden or made visible, so should the image attachment window. Also, if the application window is made too small to accommodate the image attachment window, the image attachment window should be hidden. Similarly, if the application window is made sufficiently large to accommodate the image attachment window, the image attachment window should be made visible if it was previously not visible. The flowchart in FIG. 12 describes the steps that are taken to ensure that the state of the image attachment window is reasonable given the state of the application window. It will be evident to one skilled in the art that the ordering of processes in FIG. 12 may be altered and still provide substantially equivalent functionality. Further, the filter function is not to be interpreted as being limited to only those processes described in FIG. 12.

The window movement filter function is initiated in block 1200. In block 1201, if the window in question is not a top level window belonging to a subclassed application, the filter function terminates. If the window in question is a top level window that does belong to a subclassed application, then, in block 1202, the filter function determines whether the application window is currently visible. If the application window is currently visible, the operation proceeds to decision block 1203. If the application window is not currently visible, then, in block 1204, the filter function determines whether the application window is about to become visible. If the application window is not about to become visible, the filter function terminates. If the application window is about to become visible, then, in block 1203, the filter function checks if there is an image file associated with the image attachment window for the application. If there is no image file associated with the image attachment window, the filter function terminates. Otherwise, in block 1205, the filter function determines if the application window is about to be hidden. If the application window is about to be hidden, in block 206, the image attachment window is hidden before terminating the filter function.

If, in block 1205, the application window is not about to be hidden, the filter function checks, in block 1207, whether the image attachment window is visible. If the image attachment window is not visible, in block 1208, the filter function checks whether there is room on the application window to display the image attachment window. If there is not sufficient room to display the image attachment window, the filter function terminates. Otherwise, the filter function makes the image attachment window visible in block 1210 before terminating.

If, in block 1207, the image attachment window is currently visible, then, in block 1209, the filter function determines whether the application window is being moved or sized. If the window is not being moved or sized, the filter function terminates. If the application window is being moved or sized, the filter function passes on to block 1211. In block 1211, if the window is not being sized, it is determined that the application window is only being moved. Therefore, in block 1212, the image attachment window is moved along with the application window. In block 1211, if the application window is being sized, then, in block 1213, if the new size of the window will accommodate the image attachment window, the filter function terminates. If, in block 1213, the new size of the application window will not accommodate the image attachment window, in block 1214, the image attachment window is hidden before the filter function terminates.

In one embodiment of the present invention, the image attachment window is configured as a "popup window" rather than a "child window" as those terms are used with respect to the Windows operating environment. Child windows extending outside of the client area are typically clipped. Using a popup window allows the full image to be seen unclipped. However, during a move, popup windows are moved separately from application windows. In order to provide more seamless operation, the image attachment window can be temporarily changed from a popup window to a child window during a move so that it is moved in the same operation that moves the application window. The image attachment window is then changed back into a popup window after the move. This can be done by changing window pointers and flags that are internal to the operating environment and that identify the window type and position to the operating environment to reflect the appropriate type of window at each point in the move operation.

As mentioned above with respect to the startup procedures in the embodiment of FIG. 2, a dummy window is created when Attacher.DLL is loaded and Attacher.EXE is started. This dummy window is used by Attacher.DLL when an application window is being resized. If the image attachment window is changed into a child window during moves and resizing, the image attachment window will be moved with respect to the client area of the application window as are all child windows. If the menu bar and other portions of the non-client area are modified, this can result in an offset of the image attachment window from the desired attachment location. The dummy window is used to predetermine the new dimensions of the non-client area using the move and resize parameters intercepted in the messages to the subclassed applications. In the case of a resizing operation in which an offset would occur, the popup window is not changed into a child window for the purposes of moving it. Instead, the popup window is not moved during the same process step that moves the application window, but is moved in a separate process step.

In order to obtain the best picture quality with Attacher.EXE, it is desired that the color palette used to display the image be one most suited to the image itself. For this reason, Palette Changed messages directed to a subclassed application may be used to set a palette flag in Attacher.DLL. If a "palette changed" flag is not set for a certain subclassed application, then it can be assumed that the color palette is not of primary importance to the application (e.g., spreadsheets and text editors do not require specific color palettes). In this case, the color palette suited to the images being displayed by Attacher.DLL can be used as the active palette when the associated application window is active. Otherwise, if the "palette changed" flag is set for an application, it can be assumed that the color palette is important to the application (e.g., photo editors may require their own special color palettes). In this case, the color palette used for the image attachment window may be set as a background palette to enable any available color values not used by the application window to be assigned the values given by the color palette most suited to the image attachment window, or the attached images may use the palette supplied by the application. If the application palette provides poor quality images in the image attachment window, the user has the option of assigning no image gallery to that application.

Additionally, more capable video hardware is becoming more common place in the market. Video hardware that is capable of displaying more than 256 simultaneous colors does not normally rely on a color palette. When such hardware is used on a computer implementing the present invention, palette contention issues do not ordinarily arise.

If, during the course of a user session, the cursor in the application window passes beneath the image attachment window (e.g., the cursor advances due to typing in a text editor), the application remains active though the active application cursor may be visually obscured by the image attachment window. To be as unobtrusive as possible, the present invention allows this visual obstruction of the underlying application window to be handled in a variety of ways. For example:

1. The image attachment window can be moved out of the way.
2. The user can left click on the image attachment window and make it roll up or snap up.
3. The user can place the mouse pointer over the image attachment window and not press any mouse buttons. Eventually, the window will roll up or snap up (e.g., the image attachment window can be configured to roll up or snap up after about three quarters of a second).

Figure 13:
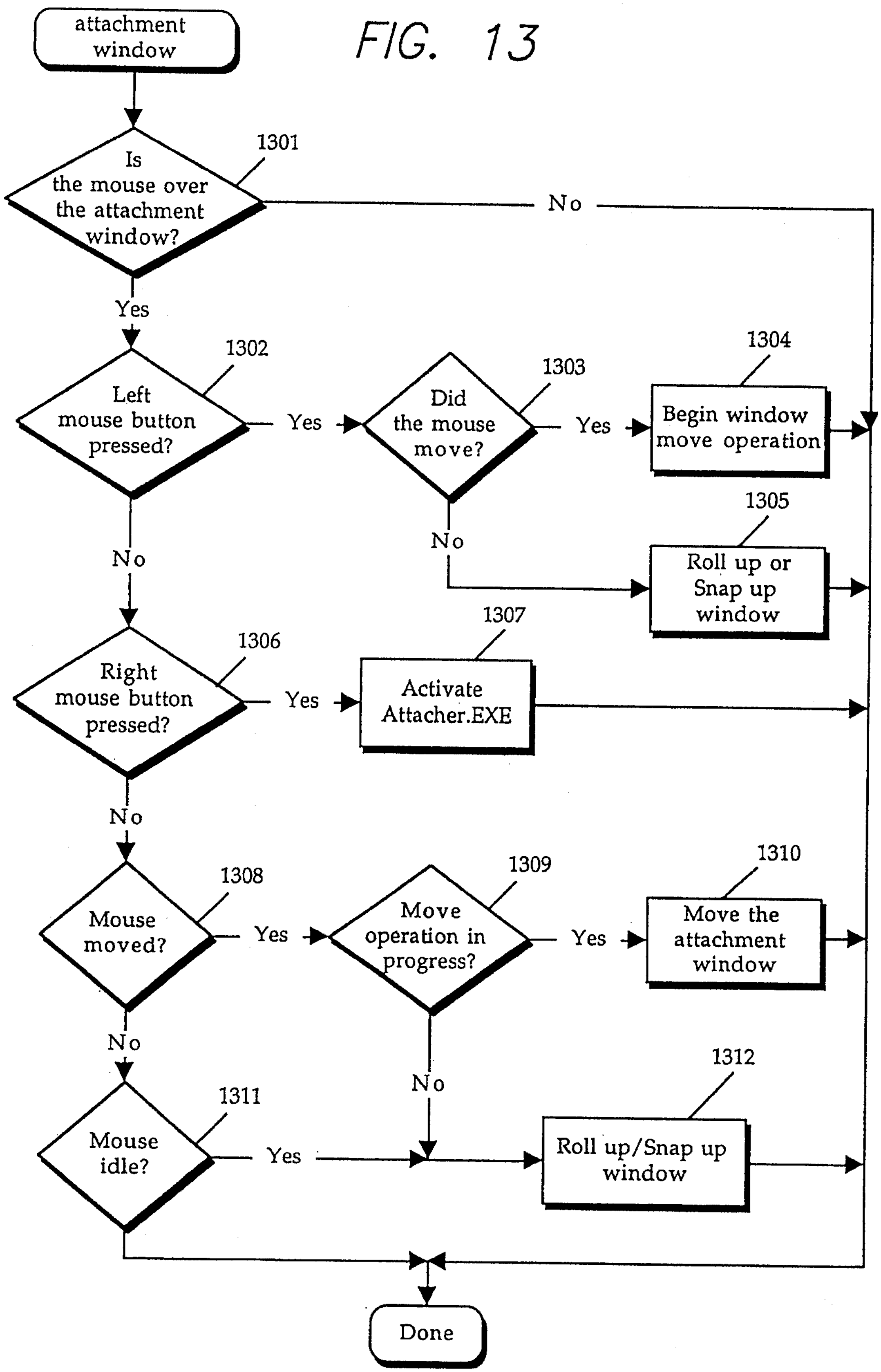
FIG. 13 is a flow chart for mouse-related operations when the image attachment window is open in one embodiment of the present invention.

The flowchart of FIG. 13 illustrates one possible procedure for implementing the three features above. The means for implementing a window move operation on the image attachment window (e.g., sliding along the caption bar) may depend on the particular operating environment. The actual details regarding the carrying out of these individual actions will be evident to one skilled in the art. In block 1301, if the mouse pointer is not over the image attachment window, Attacher.DLL does nothing. If the mouse pointer is over the image attachment window, then a check is made in block 1302 as to whether the left mouse button is depressed. If the left mouse button is depressed, a determination is made in block 1303 as to whether the mouse is currently moving. If the left mouse button is depressed and the mouse is moving, the procedure begins the image attachment window move operation in block 1304. If the left mouse button is depressed, but the mouse is not moving, the image attachment window is either rolled or snapped up in block 1305. "Snapping up" the window means to bypass the caption drawer animation, immediately progressing from a fully opened attached image to a closed caption drawer with no visible attached image.

If the left mouse button is not depressed, in block 1306, the procedure determines whether the right mouse button is depressed. In this embodiment, if the right mouse button is depressed while the mouse pointer is above the image attachment window, Attacher.EXE is activated as shown in block 1307. Attacher.EXE provides an interface for the user to assign galleries to applications, select "slide show" mode, etc.

In the case where no mouse button is depressed, block 1308 determines if the mouse pointer is moving. If there is a move in progress, as determined by block 1309, then, in block 1310, the image attachment window is moved. If there is no move in progress, the image attachment window rolls up or snaps up to be out of the user's way in block 1312. If block 1308 determines that the mouse pointer is not moving, in block 1311, the mouse's idle status is queried. If the mouse pointer is idle, block 1312 rolls or snaps up the image attachment window. If the mouse is not considered idle, no operation is required.

Thus, a method and apparatus for associating an image display area with an application display area have been provided. Although the present invention has been described with respect to certain specific embodiments, it will be clear to those skilled in the art that the inventive features of the present invention are applicable to other embodiments as well, all of which are intended to fall within the scope of the present invention.

Attached hereto as Appendix 1 is a C-code listing of an example embodiment of the present invention.

```
/* Copyright 1989-1994 FotoAttacher by Michael B. Mast, licensed
   to ProCentric Computer Service, Inc., all rights reserverd.
        Trade secret and patent pending. */

/////////////////////////////////////////////////////////////////////////////
// Object definition for the active applications

#include "stdafx.h"
#include "fotoatt.h"
#include "activegal.h"
#include "activapp.h"
#include <time.h>

extern int nDBNumber;


// Constructor definition

CActiveApp::CActiveApp (HWND hWnd, HWND hWndPopup, LPSTR lpszDesc, long lDisplayMin, long lDisplayMax)
{
    m_hwndAppWnd     = hWnd;
    m_hwndPopupWnd   = hWndPopup;
    m_CSName         = lpszDesc;
    m_lDisplayMin    = lDisplayMin;
    m_lDisplayMax    = lDisplayMax;
    SetUpGalleries();
}


// Destructor definition

CActiveApp::~CActiveApp()
{
    DeleteContents ();
}


// Delete the gallery list from the active application without destroying
// the active application object.

void CActiveApp::DeleteContents ()
{
    m_posCurGallery = NULL;
    m_posNextGallery = NULL;

    while (!m_Galleries.IsEmpty())
      delete m_Galleries.RemoveTail();
}


// Get the name of the photo to be displayed.  If there is no photo found,
// or the application is not to have photos attached, then return FALSE.

BOOL CActiveApp::GetNextPhoto (CString& csPhotoName)
{
    CActiveGal* pActiveGal;

    if (m_bIsDisplayed == FALSE)
      return FALSE;

    m_posCurGallery = m_posNextGallery;

    if (m_posCurGallery == NULL)
      {
        m_posCurGallery = m_Galleries.GetHeadPosition();
        m_posNextGallery = m_posCurGallery;
      }

    pActiveGal = (CActiveGal*) m_Galleries.GetAt(m_posCurGallery);

    if (!pActiveGal->GetPhoto (csPhotoName))
      {
        pActiveGal = (CActiveGal*) m_Galleries.GetNext(m_posNextGallery);

        if (!pActiveGal->GetPhoto (csPhotoName))
          return FALSE;
      }

    return TRUE;
}


// Reset the time that the next photo will be displayed.

void CActiveApp::ResetTime()
{
    long lMin = m_lDisplayMin;
    long lMax = m_lDisplayMax;

    if (!m_Galleries.IsEmpty())
      {
        CActiveGal* pActiveGal  = (CActiveGal*) m_Galleries.GetAt(m_posCurGallery);

        if (pActiveGal->GetMinTime() > 0)
          lMin = pActiveGal->GetMinTime();

        if (pActiveGal->GetMaxTime() > 0)
          lMax = pActiveGal->GetMaxTime();
      }

    time_t tNewTime;
    tNewTime = time(NULL);

    if (lMin != lMax)
      {
        unsigned long nStep = ((unsigned long) RAND_MAX) / (lMax - lMin + 1);
        tNewTime += rand() / nStep;
      }

    m_tNextTimeOut = tNewTime + lMin;
}


// Set the minimum and maximum display times.
// Note that these times are in seconds.  This function is intended to be
// used primarily when the display times have changed in the settings.

void CActiveApp::SetDisplayMinMax(long lMin, long lMax)
{
    m_lDisplayMin = lMin;
    m_lDisplayMax = lMax;
}


void CActiveApp::SetUpGalleries()
{
    m_bIsDisplayed   = BuildGalleryList();
    m_posCurGallery  = NULL;
    m_posNextGallery = NULL;

    if (!m_Galleries.IsEmpty())
      {
        m_posCurGallery = m_Galleries.GetHeadPosition();
        ResetTime();
      }
}


// Build the list of galleries for the application

BOOL CActiveApp::BuildGalleryList()
{
    int          nRetCode;
    UINT         uiFlags;
    CActiveGal* pActiveGal;
    DB_ADDR      dba;
    CString      CSGalRandomName;
    CString      CSGalName;

    CSGalRandomName.LoadString(IDS_GALLERY_NAME_RANDOM);

    if (d_keyfind(APPLICATION_SZTITLE, m_CSName, nDBNumber) == S_OKAY)
      {
        if (d_isowner (APPLICATIONGALLERYINTSET, nDBNumber) == S_OKAY)
          {
            // Find out if the random gallery selection is set.

            nRetCode = d_findfm(APPLICATIONGALLERYINTSET, nDBNumber);

            if (nRetCode == S_OKAY)
              {
                d_csoget (GALLERYAPPLICATIONINTSET, &dba, nDBNumber);
                d_csoread (GALLERYAPPLICATIONINTSET, GALLERY_SZDESC, CSGalName.GetBuffer(129), nDBNumber);
                CSGalName.ReleaseBuffer();

                if (CSGalName == CSGalRandomName)
                  {
                    LoadAllGalleries(CSGalRandomName);
                    return TRUE;
                  }
              }


            // Load the galleries associated with the application

            for (nRetCode = d_findfm(APPLICATIONGALLERYINTSET, nDBNumber);
                 nRetCode == S_OKAY;
                 nRetCode = d_findnm(APPLICATIONGALLERYINTSET, nDBNumber))
              {
                d_csoget(GALLERYAPPLICATIONINTSET, &dba, nDBNumber);
                pActiveGal = new CActiveGal (dba);
                m_Galleries.AddTail (pActiveGal);
              }

            return TRUE;
          }
        else
          {
            d_crread (APPLICATION_USFLAGS, &uiFlags, nDBNumber);

            if (uiFlags & ALL_EXCLUDED)
              return FALSE;
          }
      }
    else        // There is no application record, so build one.
      {
        struct Application stApp;

        memset (&stApp, '\0', sizeof (stApp));      // Init to zero
        strcpy (stApp.szTitle, m_CSName);
```

1C/14PRINT

```
            nRetCode = d_trbegin ("New Application");
            nRetCode = d_fillnew (APPLICATION, &stApp, nDBNumber);
            nRetCode = d_trend ();
         }


      // At this point we will need to build the list based on the defaults

      CString CSAppDefaultName;

      CSAppDefaultName.LoadString(IDS_APP_NAME_DEFAULT);

      if (d_keyfind(APPLICATION_SZTITLE, CSAppDefaultName, nDBNumber) == S_OKAY)
         {
            if (d_isowner (APPLICATIONGALLERYINTSET, nDBNumber) == S_OKAY)
               {
                  // Find out if the random gallery selection is set.

                  nRetCode = d_findfm(APPLICATIONGALLERYINTSET, nDBNumber);

                  if (nRetCode == S_OKAY)
                     {
                        d_csoget (GALLERYAPPLICATIONINTSET, &dba, nDBNumber);
                        d_csoread (GALLERYAPPLICATIONINTSET, GALLERY_SZDESC, CSGalName.GetBuffer(129), nDBNumber);
                        CSGalName.ReleaseBuffer();

                        if (CSGalName == CSGalRandomName)
                           {
                              LoadAllGalleries (CSGalRandomName);
                              return TRUE;
                           }
                     }


                  // Load the galleries associated with the application

                  for (nRetCode = d_findfm(APPLICATIONGALLERYINTSET, nDBNumber);
                        nRetCode == S_OKAY;
                        nRetCode = d_findnm(APPLICATIONGALLERYINTSET, nDBNumber))
                     {
                        d_csoget (APPLICATIONGALLERYINTSET, &dba, nDBNumber);
                        pActiveGal = new CActiveGal (dba);
                        m_Galleries.AddTail (pActiveGal);
                     }

                  return TRUE;
               }
            else
               {
                  LoadAllGalleries (CSGalRandomName);
                  return TRUE;
               }
         }

      return FALSE;
}


// Private routine to load all of the galleries in the system.  This routine
// is intended to be used only by the "random read" gallery function.

void CActiveApp::LoadAllGalleries (CString CSRandomName)
{
      DB_ADDR        dba;
      CActiveGal*    pActiveGal;
      CString        CSGalName;
      int            nRetCode;

      for (nRetCode = d_recfrst (GALLERY, nDBNumber);
            nRetCode == S_OKAY;
            nRetCode = d_recnext (nDBNumber))
         {
            d_crget (&dba, nDBNumber);
            d_crread (GALLERY_SZDESC, CSGalName.GetBuffer(129), nDBNumber);
            CSGalName.ReleaseBuffer();

            if (CSGalName != CSRandomName)
               {
                  pActiveGal = new CActiveGal (dba);
                  m_Galleries.AddTail (pActiveGal);
               }
         }
}
```

```
/* Copyright 1989-1994 FotoAttacher by Michael B. Mast, licensed
   to ProCentric Computer Service, Inc., all rights reserverd.
         Trade secret and patent pending. */

///////////////////////////////////////////////////////////////////////////////
// ActivGal - Class definition for Active Galleries (as part of active apps)

#include "stdafx.h"
#include "fotoatt.h"
#include "activgal.h"

extern int nDBNumber;

//////////////////////////////
// Construction / Destruction //
//////////////////////////////

CActiveGal::CActiveGal(DB_ADDR dba)
{
     m_dbaCurPhoto = 0;
     m_bShown = FALSE;
     m_dbaGallery = dba;
     d_crset(&dba, nDBNumber);
     d_crread(GALLERY_LMINDISPLAYTIME, &m_lDisplayGalMin, nDBNumber);
     d_crread(GALLERY_LMAXDISPLAYTIME, &m_lDisplayGalMax, nDBNumber);
     m_lDisplayPhotoMin = 0;
     m_lDisplayPhotoMax = 0;
}


//////////////////////
// Member Functions //
//////////////////////

// Set the shown flag.  Default is TRUE.

void CActiveGal::SetShownFlag (BOOL bShown)
{
     m_bShown = bShown;
}


// Return the next photo in the sequence.  Return
// FALSE.  TRUE means that the photo is OK.

BOOL CActiveGal::GetPhoto (CString& csPhotoName)
{
     CString csWork;
     int nRetCode = 0;

     if (m_dbaCurPhoto == NULL)
       {
         d_crset (&m_dbaGallery, nDBNumber);

         if (d_isowner (GALLERYPHOTOINTSET, nDBNumber) != S_OKAY)
           return FALSE;

         nRetCode = d_setor (GALLERYPHOTOINTSET, nDBNumber);
         nRetCode = d_findfm (GALLERYPHOTOINTSET, nDBNumber);
         nRetCode = d_csmget (GALLERYPHOTOINTSET, &m_dbaCurIntersect, nDBNumber);
         nRetCode = d_findco (PHOTOGALLERYINTSET, nDBNumber);
         nRetCode = d_csoget (PHOTOGALLERYINTSET, &m_dbaCurPhoto, nDBNumber);
       }
     else
       {
         d_csmset (GALLERYPHOTOINTSET, &m_dbaCurIntersect, nDBNumber);

         if (d_findnm (GALLERYPHOTOINTSET, nDBNumber) != S_OKAY)
           {
             m_dbaCurPhoto = NULL;
             m_dbaCurIntersect = NULL;
             return FALSE;
           }

         nRetCode = d_csmget (GALLERYPHOTOINTSET, &m_dbaCurIntersect, nDBNumber);
         nRetCode = d_findco (PHOTOGALLERYINTSET, nDBNumber);
         nRetCode = d_csoget (PHOTOGALLERYINTSET, &m_dbaCurPhoto, nDBNumber);
       }


     // At this point, m_dbaCurPhoto = dba of current photo to display

     nRetCode = d_crset (&m_dbaCurPhoto, nDBNumber);
     nRetCode = d_crread (PHOTO_LMINDISPLAYTIME, &m_lDisplayPhotoMin, nDBNumber);
     nRetCode = d_crread (PHOTO_LMAXDISPLAYTIME, &m_lDisplayPhotoMax, nDBNumber);

     nRetCode = d_crread (PHOTO_SZPHOTOPATH, csPhotoName.GetBuffer (129), nDBNumber);
     csPhotoName.ReleaseBuffer();

     if (csPhotoName.Right(1) != "\\")
       csPhotoName = csPhotoName + "\\";

     nRetCode = d_crread (PHOTO_SZPHOTOFILENAME, csWork.GetBuffer (129), nDBNumber);
     csWork.ReleaseBuffer();
     csPhotoName = csPhotoName + csWork;

     return TRUE;
}


long CActiveGal::GetMaxTime()
{
     long lTime;

     lTime = (m_lDisplayPhotoMax != 0) ? m_lDisplayPhotoMax : m_lDisplayGalMax;
     return lTime;
}


long CActiveGal::GetMinTime()
{
     long lTime;

     lTime = (m_lDisplayPhotoMin != 0) ? m_lDisplayPhotoMin: m_lDisplayGalMin;
     return lTime;
}
```

```
/* Copyright 1989-1994 FotoAttacher by Michael B. Mast, licensed
   to ProCentric Computer Service, Inc., all rights reserverd.
        Trade secret and patent pending. */

/////////////////////////////////////////////////////////////////////////////
//                                                                         //
//  Things to do                                                           //
//                                                                         //
//  1.  Add a "Default" gallery                                            //
//  2.  General clean up                                                   //
//  3.  Set up the "Application Item" class as its own module              //
//  4.  Internal documentation.                                            //
//  5.  Implement the "Delete" button for the applications.                //
//                                                                         //
/////////////////////////////////////////////////////////////////////////////

// appdlg.cpp : implementation file
//

#include "stdafx.h"
#include "fotoatt.h"
#include "appdlg.h"
#include "appitem.h"

extern int nDBNumber;

#ifdef _DEBUG
#undef THIS_FILE
static char BASED_CODE THIS_FILE[] = __FILE__;
#endif


/////////////////////////////////////////////////////////////////////////////
// CAppDlg dialog                                                          //
/////////////////////////////////////////////////////////////////////////////

CAppDlg::CAppDlg(CWnd* pParent /*=NULL*/)
    : CDialog(CAppDlg::IDD, pParent)
{
    //{{AFX_DATA_INIT(CAppDlg)
    m_listApplications = "";
    m_listGalleries = "";
    //}}AFX_DATA_INIT

    m_nRandomGalleryIndex = -1;
}


void CAppDlg::DoDataExchange(CDataExchange* pDX)
{
    CDialog::DoDataExchange(pDX);
    //{{AFX_DATA_MAP(CAppDlg)
    DDX_LBString(pDX, IDC_LIST_APPLICATIONS, m_listApplications);
    DDX_LBString(pDX, IDC_LIST_GALLERIES, m_listGalleries);
    //}}AFX_DATA_MAP
}


BEGIN_MESSAGE_MAP(CAppDlg, CDialog)
    //{{AFX_MSG_MAP(CAppDlg)
    ON_BN_CLICKED(IDC_DELETE, OnDelete)
    ON_BN_CLICKED(IDC_EXCLUDE_ALL, OnExcludeAll)
    ON_BN_CLICKED(IDC_INCLUDE_ALL, OnIncludeAll)
    ON_LBN_SELCHANGE(IDC_LIST_APPLICATIONS, OnSelchangeListApplications)
    ON_LBN_SELCHANGE(IDC_LIST_GALLERIES, OnSelchangeListGalleries)
    //}}AFX_MSG_MAP
END_MESSAGE_MAP()


/////////////////////////////////////////////////////////////////////////////
// CAppDlg message handlers

BOOL CAppDlg::OnInitDialog()
{
    int         nItem;
    int         nRetCode;
    UINT        usFlags;
    char        szFieldEntry[100];
    DB_ADDR     dba;
    CListBox*   pLB;
    CString     CSName;


    // This is to provide a valid database number for the entire object.

    CDialog::OnInitDialog();


    // Populate the Gallery list box entries

    // There will only be one "non-delete" gallery.  That will be the Random
    // selection gallery.  Because of this, we will save the index of the
    // random gallery so that it may be used in other routines.  This will
    // make the dialog box processing MUCH more efficient.

    // Note that we MUST do the galleries first since the application list
    // needs to be able to refer to this list to determine the indexes of the
    // items to select and deselect.

    pLB = (CListBox*) GetDlgItem(IDC_LIST_GALLERIES);
    nRetCode = d_recfrst(GALLERY, nDBNumber);
    d_crget(&dba, nDBNumber);
    CSName.LoadString(IDS_GALLERY_NAME_RANDOM);

    for (nItem = 0; nRetCode == S_OKAY; nRetCode = d_recnext(nDBNumber))
      {
        d_crread(GALLERY_SZDESC, szFieldEntry, nDBNumber);
        d_crread(GALLERY_USFLAGS, &usFlags, nDBNumber);

        if (CSName == szFieldEntry)
          m_nRandomGalleryIndex = nItem;

        d_crget(&dba, nDBNumber);
        m_Galleries.SetAtGrow(nItem, dba);
        pLB->InsertString(nItem, szFieldEntry);
        pLB->SetItemData(nItem, (DWORD) usFlags);
        nItem++;
      }


    // Populate the Application list box entries

    pLB = (CListBox*) GetDlgItem(IDC_LIST_APPLICATIONS);
    nRetCode = d_recfrst(APPLICATION, nDBNumber);
    d_crget(&dba, nDBNumber);

    for (nItem = 0; nRetCode == S_OKAY; nRetCode = d_recnext(nDBNumber))
      {
        d_crread(APPLICATION_SZTITLE, szFieldEntry, nDBNumber);
        d_crread(APPLICATION_USFLAGS, &usFlags,     nDBNumber);
        d_crget(&dba, nDBNumber);
        CAppItem* pNewApplication = new CAppItem(dba, usFlags, szFieldEntry);   // Create an Application Item
        pNewApplication->SetAllExcluded (usFlags & ALL_EXCLUDED);
        pNewApplication->SetLBIndex(nItem);          // Initialize index to list box
        m_Applications.AddTail(pNewApplication);     // Add the Application item to the list
        pLB->InsertString(nItem, szFieldEntry);
        pLB->SetItemData(nItem, (DWORD) usFlags);    // We use the item entry so
                                                     // that we can target this

        // Now that the application has been placed in the list, we need to
        // update it's information so that it reflects the set members on
        // the database.

        if (d_isowner(APPLICATIONGALLERYINTSET, nDBNumber) != S_OKAY)
          {
            nItem++;
            continue;
          }

        d_setor(APPLICATIONGALLERYINTSET, nDBNumber);

        while (d_findnm(APPLICATIONGALLERYINTSET, nDBNumber) == S_OKAY)
          {
            d_findco (GALLERYAPPLICATIONINTSET, nDBNumber);
            d_crget (&dba, nDBNumber);

            for (int i = 0; i < m_Galleries.GetSize(); i++)
              {
                if (dba == (DB_ADDR)m_Galleries.GetAt(i))
                  {
                    pNewApplication->NewGallery(i);
                    break;
                  }
              }
          }

        // Finally - bump the index counter.

        nItem++;
      }

    pLB->SetCurSel(0);                      // Select the default galleries
    OnSelchangeListApplications();          // This will set m_pCurApp
    return TRUE;        // call after rest of initialization
}


/**************************************************************************/
/*                                                                        */
/* Routines to handle the button that is available for the application  */
/* list box.                                                              */
/*                                                                        */
/**************************************************************************/

void CAppDlg::OnDelete()
{
    // TODO: Add your control notification handler code here

    int         nIndex;
    int         nCount;
    int         nDeletedIndex;
    CAppItem*   pCurApp;
    CAppItem*   pDeletedApp;

    CListBox* pLBApp = (CListBox*) GetDlgItem(IDC_LIST_APPLICATIONS);
    nIndex = pLBApp->GetCurSel();
    nDeletedIndex = nIndex;
    pDeletedApp = FindLBIndex(nIndex);
    pDeletedApp->DeleteApplication();           // Mark as delete
    nCount = pLBApp->DeleteString(nIndex);      // Update the list box
```

```
    pCurApp = FindLBIndex(++nIndex);


    while (pCurApp != NULL)
      {
        pCurApp->SetLBIndex(pCurApp->GetLBIndex() - 1);
        pCurApp = FindLBIndex(++nIndex);
      }

    while (pLBApp->SetCurSel(nDeletedIndex) == LB_ERR)
      nDeletedIndex--;

    pLBApp->SetCurSel(nDeletedIndex);
    OnSelchangeListApplications();
}


/*************************************************************************/
/*                                                                       */
/* Handler for changing the selected application.                        */
/*                                                                       */
/* This routine must select the appropriate galleries based on the list of */
/* galleries that are associated with the selected application.          */
/*                                                                       */
/*************************************************************************/

void CAppDlg::OnSelchangeListApplications()
{
    UINT    usFlags;
    int     nIndex;
    int     nLastGal;
    int     i;

    // Ensure that the delete button is enabled/disabled properly.

    CListBox* pLBApp = (CListBox*) GetDlgItem(IDC_LIST_APPLICATIONS);
    nIndex = pLBApp->GetCurSel();
    m_pCurApp = FindLBIndex(nIndex);
    usFlags = (UINT) pLBApp->GetItemData(nIndex);

    if (usFlags & NO_DELETE)
      GetDlgItem(IDC_DELETE)->EnableWindow(FALSE);
    else
      GetDlgItem(IDC_DELETE)->EnableWindow(TRUE);


    // Select the appropriate galleries based on the members in the application
    // that is now selected.  This is done by scanning the members of the list
    // that the application lives with.

    CListBox* pLBGal = (CListBox*) GetDlgItem(IDC_LIST_GALLERIES);
    nLastGal = pLBGal->GetCount() - 1;
    pLBGal->SelItemRange(FALSE, 0, nLastGal);
    i = m_pCurApp->GetFirstGallery();

    if (i == -1)
      {
        if (!m_pCurApp->AllExcluded())
          pLBGal->SetSel(m_nRandomGalleryIndex);

        return;
      }

    while (i != -1)
      {
        pLBGal->SetSel(i);
        i = m_pCurApp->GetNextGallery();
      }
}


/*************************************************************************/
/*                                                                       */
/* Handler for changing the selected Galleries for an application        */
/*                                                                       */
/* This routine must update the list of selected galleries that are      */
/* associated with the selected application.                             */
/*                                                                       */
/*************************************************************************/

void CAppDlg::OnSelchangeListGalleries()
{
    CListBox* pLBGal = (CListBox*) GetDlgItem(IDC_LIST_GALLERIES);

    // When the item selected is the random one, then all others must be
    // deselected.  When the item selected is not the random one, then the
    // random one must be selected.

    int nIndex = pLBGal->GetCurSel();
    int nCount = pLBGal->GetCount();
    m_pCurApp->SetModifiedFlag();
    m_pCurApp->SetAllExcluded(FALSE);

    if (nIndex == m_nRandomGalleryIndex)
      {
        m_pCurApp->DeleteContents();         // Remove all ==> random

        if (m_nRandomGalleryIndex == 0)
          pLBGal->SelItemRange(FALSE, 1, nCount);                  // Random is first, do rest of
              list
        else
          {
            pLBGal->SelItemRange(FALSE, 0, m_nRandomGalleryIndex - 1);         // Do first part of list

            if (m_nRandomGalleryIndex != nCount)
              pLBGal->SelItemRange(FALSE, m_nRandomGalleryIndex + 1, nCount);   // Do last part if random not
                  last
          }

        return;
      }

    if (m_nRandomGalleryIndex > -1)
      {
        pLBGal->SetSel(FALSE, m_nRandomGalleryIndex);    // Clear the random one.
        m_pCurApp->RemoveGallery(m_nRandomGalleryIndex);
      }

    if (pLBGal->GetSel(nIndex) == 0)
      m_pCurApp->RemoveGallery(nIndex);
    else
      m_pCurApp->NewGallery(nIndex);
}


/*************************************************************************/
/*                                                                       */
/* Routines to handle the buttons that are available for the gallery     */
/* list box.                                                             */
/*                                                                       */
/*************************************************************************/

void CAppDlg::OnExcludeAll()
{
    CListBox* pLBGal = (CListBox*) GetDlgItem(IDC_LIST_GALLERIES);
    int nCount = pLBGal->GetCount();
    pLBGal->SelItemRange(FALSE, 0, nCount - 1);
    m_pCurApp->SetModifiedFlag();
    m_pCurApp->DeleteContents();
    m_pCurApp->SetAllExcluded(TRUE);
}


void CAppDlg::OnIncludeAll()
{
    CListBox* pLBGal = (CListBox*) GetDlgItem(IDC_LIST_GALLERIES);
    int nCount = pLBGal->GetCount();
    pLBGal->SelItemRange(TRUE, 0, nCount - 1);

    if (m_nRandomGalleryIndex != -1)
      pLBGal->SetSel(m_nRandomGalleryIndex, FALSE);

    m_pCurApp->SetModifiedFlag();
    m_pCurApp->DeleteContents();
    m_pCurApp->SetAllExcluded(FALSE);

    for (int i = 0; i < nCount; i++)
      {
        if (m_nRandomGalleryIndex != i)
          m_pCurApp->NewGallery(i);
      }
}


/*************************************************************************/
/*                                                                       */
/* Routine to handle the normal shutdown after all changes have been     */
/* by the user.  This routine does all of the database updating at       */
/* one time so that there will be no need of worrying about record       */
/* locking or backing out a partial transaction.                         */
/*                                                                       */
/*************************************************************************/

void CAppDlg::OnOK()
{
    CAppItem*     pAppItem;
    POSITION      pos;
    int           nRetCode;
    int           nIndex;
    DB_ADDR       dbaApp;
    DB_ADDR       dbaGal;
    UINT          usFlags;

    d_trbegin("fotoatt.appdlg");

    // Delete and rebuild the changed APPLICATION GALLERY sets.

    for (pos = m_Applications.GetHeadPosition(); pos != NULL;)
      {
        pAppItem = (CAppItem*) m_Applications.GetNext(pos);

        if (pAppItem->IsModified())
          {
            dbaApp = pAppItem->GetDBA();
            nRetCode = d_crset(&dbaApp, nDBNumber);
            usFlags = pAppItem->GetFlags();

            if (pAppItem->AllExcluded())
              usFlags |= ALL_EXCLUDED;
            else
```

IC/14PRINT

```
            usFlags &= ~ALL_EXCLUDED;

        nRetCode = d_crwrite(APPLICATION_USFLAGS, &usFlags, nDBNumber);

        // Delete the set of intersect records for the application

        if ((nRetCode = d_isowner(APPLICATIONGALLERYINTSET, nDBNumber)) == S_OKAY)
          {
            nRetCode = d_setor (APPLICATIONGALLERYINTSET, nDBNumber);

            while ((nRetCode = d_findnm(APPLICATIONGALLERYINTSET, nDBNumber)) == S_OKAY)
              d_disdel(nDBNumber);
          }


        // Either delete a record and all of its sets or
        // Create a new set of intersect records for the application
        // depending on the value of the deletion flag.

        if (pAppItem->IsDeleted())
          {
            nRetCode = d_crset(&dbaApp, nDBNumber);
            nRetCode = d_disdel(nDBNumber);
          }
        else
          {
            nIndex = pAppItem->GetFirstGallery();

            while (nIndex != -1)
              {
                dbaGal = m_Galleries.GetAt(nIndex);
                nRetCode = d_csoset(APPLICATIONGALLERYINTSET, &dbaApp, nDBNumber);
                nRetCode = d_csoset(GALLERYAPPLICATIONINTSET, &dbaGal, nDBNumber);
                nRetCode = d_makenew(APPLICATIONGALLERYINT, nDBNumber);
                nRetCode = d_connect(APPLICATIONGALLERYINTSET, nDBNumber);
                nRetCode = d_connect(GALLERYAPPLICATIONINTSET, nDBNumber);
                nIndex = pAppItem->GetNextGallery();
              }
          }
      }
    }

    d_trend();

    CleanUp();
    CDialog::OnOK();
}


void CAppDlg::OnCancel()
{
    CleanUp();
    CDialog::OnCancel();
}


/*************************************************************************/
/*                                                                       */
/* Routine to make sure that there are no memory leaks.  It deletes all */
/* of the items in the m_Applications list.                              */
/*                                                                       */
/*************************************************************************/

void CAppDlg::CleanUp()
{
    CAppItem* pAppItem;

    while (!m_Applications.IsEmpty())
      {
        pAppItem = (CAppItem*) m_Applications.RemoveTail();
        delete pAppItem;
      }
}


/*************************************************************************/
/*                                                                       */
/* Find an object in the m_Applications list that has a particular index */
/* in the Applications dialog box.                                       */
/*                                                                       */
/* Return NULL if the item is not found in the list.                     */
/*                                                                       */
/*************************************************************************/

CAppItem* CAppDlg::FindLBIndex(int nSearchIndex)
{
    int         nIndex = -1;
    POSITION    pos;
    CAppItem*   pAppItem;

    pos = m_Applications.GetHeadPosition();

    while (pos != NULL && nIndex != nSearchIndex)
      {
        pAppItem = (CAppItem*) m_Applications.GetNext(pos);
        nIndex = pAppItem->GetLBIndex();
      }

    if (nIndex != nSearchIndex)
      return NULL;

    return pAppItem;
}
```

```
/* Copyright 1989-1994 FotoAttacher by Michael B. Mast, licensed
   to ProCentric Computer Service, Inc., all rights reserverd.
         Trade secret and patent pending. */

///////////////////////////////////////////////////////////////////////////
//  CAppItem class member function definitions                           //
///////////////////////////////////////////////////////////////////////////

#include "stdafx.h"
#include "fotoatt.h"
#include "appitem.h"

CAppItem::CAppItem(DB_ADDR dba, UINT usFlags, char* szName)
{
    m_dbaApp        = dba;
    m_bModified     = FALSE;
    m_bExcludeAll   = FALSE;
    m_bDeleted      = FALSE;
    m_usFlags       = usFlags;
    strcpy (m_CSAppName.GetBuffer(strlen(szName) + 1), szName);
    m_CSAppName.ReleaseBuffer();
}


void CAppItem::SetModifiedFlag()
{
    m_bModified = TRUE;
}


void CAppItem::NewGallery(int nIndex)
{
    m_GalleryList.Add(nIndex);
}


void CAppItem::DeleteContents()
{
    m_GalleryList.RemoveAll();
}


int CAppItem::GetFirstGallery()
{
    long    lValue = -1;
    int     nGalleries = m_GalleryList.GetSize();

    for (m_nCurrent = 0; m_nCurrent < nGalleries && lValue == -1; m_nCurrent++)
      lValue = m_GalleryList.GetAt(m_nCurrent);

    return (int) lValue;
}


int CAppItem::GetNextGallery()
{
    long lValue = -1;

    for (; m_nCurrent < m_GalleryList.GetSize() && lValue == -1; m_nCurrent++)
      lValue = m_GalleryList.GetAt(m_nCurrent);

    return (int) lValue;
}


void CAppItem::RemoveGallery(int nIndex)
{
    for (int i = 0; i < m_GalleryList.GetSize(); i++)
      {
        if (nIndex == (int) m_GalleryList.GetAt(i))
          {
            m_GalleryList.SetAt(i, -1);
            SetModifiedFlag();
            break;
          }
      }
}


void CAppItem::SetAllExcluded(BOOL nFlag)
{
    m_bExcludeAll = nFlag;
}


void CAppItem::SetLBIndex(int nIndex)
{
    m_nLBIndex = nIndex;
}


void CAppItem::DeleteApplication()
{
    m_bDeleted  = TRUE;
    m_nLBIndex  = -1;
    m_bModified = TRUE;
}
```

```
/* Copyright 1989-1994 FotoAttacher by Michael B. Mast, licensed
   to ProCentric Computer Service, Inc., all rights reserverd.
        Trade secret and patent pending. */

// chuzegal.cpp : implementation file
//

#include "stdafx.h"
#include "fotoatt.h"
#include "chuzegal.h"

#ifdef _DEBUG
#undef THIS_FILE
static char BASED_CODE THIS_FILE[] = __FILE__;
#endif

/////////////////////////////////////////////////////////////////////////////
// CChooseGallery dialog


CChooseGallery::CChooseGallery(CWnd* pParent /*=NULL*/)
     : CDialog(CChooseGallery::IDD, pParent)
{
     //{{AFX_DATA_INIT(CChooseGallery)
     m_CSGallery = "";
     //}}AFX_DATA_INIT
}

void CChooseGallery::DoDataExchange(CDataExchange* pDX)
{
     CDialog::DoDataExchange(pDX);
     //{{AFX_DATA_MAP(CChooseGallery)
     DDX_LBString(pDX, IDC_CH_GALLERY, m_CSGallery);
     //}}AFX_DATA_MAP
}

BEGIN_MESSAGE_MAP(CChooseGallery, CDialog)
     //{{AFX_MSG_MAP(CChooseGallery)
     ON_LBN_DBLCLK(IDC_CH_GALLERY, OnOK)
     //}}AFX_MSG_MAP
END_MESSAGE_MAP()


/////////////////////////////////////////////////////////////////////////////
// CChooseGallery message handlers

BOOL CChooseGallery::OnInitDialog()
{
     int             nDB = 0;
     int             nItem;
     int             nRetCode;
     unsigned short  usFlags;
     char            szFieldEntry[100];
     CListBox*       pLB;


     // Populate the Gallery list box entries.  Note that in this case we do not want to select the "random"
     // gallery since this selection will be displayed on the screen and updated.  The simple way to handle
        this
     // is to simply not load any "NO_DELETE" gallery into the list box.

     pLB = (CListBox*) GetDlgItem(IDC_CH_GALLERY);
     nRetCode = d_recfrst(GALLERY, nDB);

     for (nItem = 0; nRetCode == S_OKAY; nRetCode = d_recnext(nDB))
       {
         d_crread(GALLERY_SZDESC, szFieldEntry, nDB);
         d_crread(GALLERY_USFLAGS, &usFlags, nDB);

         if (!(usFlags & NO_DELETE))
           {
             pLB->InsertString(nItem, szFieldEntry);
             pLB->SetItemData(nItem, usFlags);
             nItem++;
           }

         if (pLB->GetCount() > 0)
           pLB->SetCurSel(0);
       }

     return CDialog::OnInitDialog();          // call after rest of initialization
}

void CChooseGallery::OnOK()
{
     CListBox* pLB = (CListBox*) GetDlgItem(IDC_CH_GALLERY);
     m_nCurSel = pLB->GetCurSel();    // to check for valid selection
     CDialog::OnOK();
}
```

```
/* Copyright 1989-1994 FotoAttacher by Michael B. Mast, licensed
   to ProCentric Computer Service, Inc., all rights reserverd.
        Trade secret and patent pending. */

/*****************************************************************************************************
    ******/
/*
    */
/* New class of object - The CCControl class.  This will govern all access to the Vista DB for the Control
    Objects */
/*
    */
/*****************************************************************************************************
    ******/

#include "stdafx.h"

extern int nDBNumber;

IMPLEMENT_SERIAL(CControl, CObject, 0);

CControl::CControl(int nDBn)
{
    unsigned short usShowSigRegionFlag;
    unsigned short usAutoRollFlag;

    m_usXacn = 0;
    d_recfrst(CONTROL, nDBNumber);
    d_crread(CONTROL_USVERSIONMAJOR,    &m_usVersionMajor,     nDBNumber);
    d_crread(CONTROL_USVERSIONMINOR,    &m_usVersionMinor,     nDBNumber);
    d_crread(CONTROL_USROLLRATE,        &m_usRollRate,         nDBNumber);
    d_crread(CONTROL_USROLLDELAY,       &m_usRollDelay,        nDBNumber);
    d_crread(CONTROL_USSHOWSIGREGION,   &usShowSigRegionFlag,  nDBNumber);
    d_crread(CONTROL_USAUTOROLL,        &usAutoRollFlag,       nDBNumber);
    d_crread(CONTROL_USCLICKACTION,     &m_usClickAction,      nDBNumber);
    d_crread(CONTROL_USIDLEACTION,      &m_usIdleAction,       nDBNumber);
    d_crread(CONTROL_LIDLEMOUSE,        &m_lIdleMouse,         nDBNumber);
    d_crread(CONTROL_LDISPLAYMIN,       &m_lDisplayMin,        nDBNumber);
    d_crread(CONTROL_LDISPLAYMAX,       &m_lDisplayMax,        nDBNumber);
    d_crread(CONTROL_LSCREENSAVERDELAY, &m_lScreenSaverDelay,  nDBNumber);
    d_crread(CONTROL_LSSDISPLAYMIN,     &m_lSSDisplayMin,      nDBNumber);
    d_crread(CONTROL_LSSDISPLAYMAX,     &m_lSSDisplayMax,      nDBNumber);
    d_crread(CONTROL_LTIMESLICE,        &m_lTimeSlice,         nDBNumber);
    d_crget(&m_dbaControlRecord, nDBNumber);

    m_bSigRegionFlag = usShowSigRegionFlag;
    m_bAutoRollFlag = usAutoRollFlag;
}


// Function to set the rollrate and store it on the database

void CControl::SetRollRate(unsigned short usRollRate)
{
    m_usRollRate = usRollRate;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_USROLLRATE, &m_usRollRate, nDBNumber);
    d_trend();
}


// Function to set the idle mouse action and store it on the database

void CControl::SetIdleMouseAction(unsigned short usIdleAction)
{
    m_usIdleAction = usIdleAction;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_USIDLEACTION, &m_usIdleAction, nDBNumber);
    d_trend();
}


// Function to set the clicked mouse action and store it on the database

void CControl::SetLeftButtonAction(unsigned short usClickAction)
{
    m_usClickAction = usClickAction;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_USCLICKACTION, &m_usClickAction, nDBNumber);
    d_trend();
}


// Function to set the screen saver delay and store it on the database

void CControl::SetScreenSaverDelay(long lScreenSaverDelay)
{
    m_lScreenSaverDelay = lScreenSaverDelay;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_LSCREENSAVERDELAY, &m_lScreenSaverDelay, nDBNumber);
    d_trend();
}


// Function to set the auto roll delay time and store it on the database

void CControl::SetRollDelay(unsigned short usRollDelay)
{
    m_usRollDelay = usRollDelay;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_USROLLDELAY, &m_usRollDelay, nDBNumber);
    d_trend();
}


// Function to set the idle mouse time and store it on the database

void CControl::SetIdleMouse(long lIdleMouse)
{
    m_lIdleMouse = lIdleMouse;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_LIDLEMOUSE, &m_lIdleMouse, nDBNumber);
    d_trend();
}


// Function to set the miniumum display time and store it on the database

void CControl::SetDisplayMin(long lDisplayMin)
{
    m_lDisplayMin = lDisplayMin;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_LDISPLAYMIN, &m_lDisplayMin, nDBNumber);
    d_trend();
}


// Function to set the maximum display time and store it on the database

void CControl::SetDisplayMax(long lDisplayMax)
{
    m_lDisplayMax = lDisplayMax;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_LDISPLAYMAX, &m_lDisplayMax, nDBNumber);
    d_trend();
}


// Function to set the miniumum display time and store it on the database

void CControl::SetSSDisplayMin(long lSSDisplayMin)
{
    m_lSSDisplayMin = lSSDisplayMin;

    if (m_dbaControlRecord == NULL)
      d_recfrst(CONTROL, nDBNumber);
    else
      d_crset(&m_dbaControlRecord, nDBNumber);

    StartXacn();
    d_crwrite(CONTROL_LSSDISPLAYMIN, &m_lSSDisplayMin, nDBNumber);
    d_trend();
```

```
}


// Function to set the maximum display time and store it on the database

void CControl::SetSSDisplayMax(long lSSDisplayMax)
{
     m_lSSDisplayMax = lSSDisplayMax;

     if (m_dbaControlRecord == NULL)
       d_recfrst(CONTROL, nDBNumber);
     else
       d_crset(&m_dbaControlRecord, nDBNumber);

     StartXacn();
     d_crwrite(CONTROL_LDISPLAYMAX, &m_lSSDisplayMax, nDBNumber);
     d_trend();
}


// Function to set the maximum display time and store it on the database

void CControl::SetTimeSlice(long lTimeSlice)
{
     m_lTimeSlice = lTimeSlice;

     if (m_dbaControlRecord == NULL)
       d_recfrst(CONTROL, nDBNumber);
     else
       d_crset(&m_dbaControlRecord, nDBNumber);

     StartXacn();
     d_crwrite(CONTROL_LTIMESLICE, &m_lTimeSlice, nDBNumber);
     d_trend();
}


// Function to set the sig region flag and store it on the database

void CControl::SetSigRegionFlag(BOOL bSetSigRegion)
{
     unsigned short usFlag;

     m_bSigRegionFlag = bSetSigRegion;
     usFlag = m_bSigRegionFlag;

     if (m_dbaControlRecord == NULL)
       d_recfrst(CONTROL, nDBNumber);
     else
       d_crset(&m_dbaControlRecord, nDBNumber);

     StartXacn();
     d_crwrite(CONTROL_USSHOWSIGREGION, &usFlag, nDBNumber);
     d_trend();
}


// Function to set the automatic rolldown flag and store it on the database

void CControl::SetAutoRollFlag(BOOL bSetAutoRoll)
{
     unsigned short usFlag;

     m_bAutoRollFlag = bSetAutoRoll;
     usFlag = m_bAutoRollFlag;

     if (m_dbaControlRecord == NULL)
       d_recfrst(CONTROL, nDBNumber);
     else
       d_crset(&m_dbaControlRecord, nDBNumber);

     StartXacn();
     d_crwrite(CONTROL_USAUTOROLL, &usFlag, nDBNumber);
     d_trend();
}


// Private function to start a new transaction with a specific name.

void CControl::StartXacn()
{
     char szXacnName[26];

     wsprintf (szXacnName, "FotoAtt.Control.%05d", m_usXacn++);
     d_trbegin(szXacnName);
}
```

```
/* Copyright 1989-1994 FotoAttacher by Michael B. Hast, licensed
   to ProCentric Computer Service, Inc., all rights reserverd.
        Trade secret and patent pending. */

// dlgpass.cpp : implementation file
//

#include "stdafx.h"
#include "fotoatt.h"
#include "dlgpass.h"

#ifdef _DEBUG
#undef THIS_FILE
static char BASED_CODE THIS_FILE[] = __FILE__;
#endif

/////////////////////////////////////////////////////////////////////////////
// CDlgPassword dialog


CDlgPassword::CDlgPassword(CWnd* pParent /*=NULL*/)
     : CDialog(CDlgPassword::IDD, pParent)
{
     //{{AFX_DATA_INIT(CDlgPassword)
     m_CSRetypePassword = "";
     m_CSNewPassword = "";
     m_CSOldPassword = "";
     //}}AFX_DATA_INIT
}

void CDlgPassword::DoDataExchange(CDataExchange* pDX)
{
     CDialog::DoDataExchange(pDX);
     //{{AFX_DATA_MAP(CDlgPassword)
     DDX_Text(pDX, IDC_ETAGAIN, m_CSRetypePassword);
     DDV_MaxChars(pDX, m_CSRetypePassword, 20);
     DDX_Text(pDX, IDC_ETNEW, m_CSNewPassword);
     DDV_MaxChars(pDX, m_CSNewPassword, 20);
     DDX_Text(pDX, IDC_ETOLD, m_CSOldPassword);
     DDV_MaxChars(pDX, m_CSOldPassword, 20);
     //}}AFX_DATA_MAP
}

BEGIN_MESSAGE_MAP(CDlgPassword, CDialog)
     //{{AFX_MSG_MAP(CDlgPassword)
          // NOTE: the ClassWizard will add message map macros here
     //}}AFX_MSG_MAP
END_MESSAGE_MAP()


/////////////////////////////////////////////////////////////////////////////
// CDlgPassword message handlers
```

```
/* Copyright 1989-1994 FotoAttacher by Michael B. Mast, licensed
   to ProCentric Computer Service, Inc., all rights reserverd.
        Trade secret and patent pending. */

// fotoatt.cpp : Defines the class behaviors for the application.
//

#include "stdafx.h"
#include "fotoatt.h"

#include "mainfrm.h"
#include "photo.h"
#include "photodoc.h"
#include "photovw.h"
#include "chusegal.h"
#include "galleryd.h"
#include "browse.h"

#include "palette.h"
#include "palctl.h"
#include "galvw.h"

#include <debug.h>

UINT    uiClipboardPhotoID;

#ifdef _DEBUG
#undef THIS_FILE
static char BASED_CODE THIS_FILE[] = __FILE__;
#endif

/////////////////////////////////////////////////////////////////////////////
// CFotoApp

BEGIN_MESSAGE_MAP(CFotoApp, CWinApp)
    //{{AFX_MSG_MAP(CFotoApp)
    ON_COMMAND(ID_APP_ABOUT, OnAppAbout)
    ON_COMMAND(ID_FILE_NEW_GALLERY, OnFileNewGallery)
    ON_COMMAND(ID_FILE_OPEN_GALLERY, OnFileOpenGallery)
    ON_COMMAND(ID_FILE_OPEN_PHOTO, OnFileOpenPhoto)
    ON_COMMAND(ID_FILE_SCAN_PHOTO, OnFileScanPhoto)
    ON_COMMAND(ID_APP_EXIT, OnAppExit)
    //}}AFX_MSG_MAP
    // Standard file based document commands
    ON_COMMAND(ID_FILE_NEW, CWinApp::OnFileNew)
    ON_COMMAND(ID_FILE_OPEN, CWinApp::OnFileOpen)
    ON_COMMAND_EX(ID_FILE_MRU_FILE1, OnOpenRecentFile)
    ON_COMMAND_EX(ID_FILE_MRU_FILE2, OnOpenRecentFile)
    ON_COMMAND_EX(ID_FILE_MRU_FILE3, OnOpenRecentFile)
    ON_COMMAND_EX(ID_FILE_MRU_FILE4, OnOpenRecentFile)
    // Standard print setup command
    ON_COMMAND(ID_FILE_PRINT_SETUP, CWinApp::OnFilePrintSetup)
END_MESSAGE_MAP()

/////////////////////////////////////////////////////////////////////////////
// CFotoApp construction

CFotoApp::CFotoApp()
{
    // TODO: add construction code here,
    // Place all significant initialization in InitInstance
}

/////////////////////////////////////////////////////////////////////////////
// The one and only CFotoApp object

CFotoApp NEAR theApp;

/////////////////////////////////////////////////////////////////////////////
// CFotoApp initialization

BOOL CFotoApp::InitInstance()
{
    CString CSPhotoClassName;

    // Standard initialization
    // If you are not using these features and wish to reduce the size
    //  of your final executable, you should remove from the following
    //  the specific initialization routines you do not need.

    SetDialogBkColor();        // Set dialog background color to gray
    LoadStdProfileSettings();  // Load standard INI file options (including MRU)
    EnableVBX();               // Initialize VBX support

    // Register the application's document templates.  Document templates
    //  serve as the connection between documents, frame windows and views.

    m_pDocTemplatePhoto = new CMultiDocTemplate(
        IDR_PHOTO,
        RUNTIME_CLASS(CPhotoDoc),
        RUNTIME_CLASS(CMDIChildWnd),        // standard MDI child frame
        RUNTIME_CLASS(CPhotovw));

    AddDocTemplate(m_pDocTemplatePhoto);

    m_pDocTemplateGallery = new CMultiDocTemplate(
        IDR_GALLERY,
        RUNTIME_CLASS(CGalleryDoc),
        RUNTIME_CLASS(CMDIChildWnd),        // standard MDI child frame
        RUNTIME_CLASS(CGalVw));

    AddDocTemplate(m_pDocTemplateGallery);

    // create main MDI Frame window
    CMainFrame* pMainFrame = new CMainFrame;

    if (!pMainFrame->LoadFrame(IDR_MAINFRAME))
        return FALSE;

    m_pMainWnd = pMainFrame;

    // Register the photo class with the clipboard.

    CSPhotoClassName.LoadString(IDS_PHOTO_CLASS_NAME);
    uiClipboardPhotoID = RegisterClipboardFormat(CSPhotoClassName);

    // The main window has been initialized, so show and update it.
    pMainFrame->ShowWindow(SW_HIDE);
    pMainFrame->UpdateWindow();

    return StartTimer();
}


BOOL CFotoApp::StartTimer()
{
    for (UINT i = 1; i < 33; i++)
      if ((m_nTimerID = ::SetTimer(m_pMainWnd->m_hWnd, i, 6000, NULL)) != 0)
        break;

    if (m_nTimerID == 0)
      return FALSE;

    return TRUE;
}


void CFotoApp::StopTimer()
{
    if (m_nTimerID != 0)
      {
        ::KillTimer(m_pMainWnd->m_hWnd, m_nTimerID) ;
        m_nTimerID = 0;
      }
}


/////////////////////////////////////////////////////////////////////////////
// MRU file list default implementation

BOOL CFotoApp::OnOpenRecentFile(UINT nID)
{
    ASSERT_VALID(this);

    ASSERT(nID >= ID_FILE_MRU_FILE1);
    ASSERT(nID < ID_FILE_MRU_FILE1 + _AFX_MRU_COUNT);
    ASSERT(m_strRecentFiles[nID - ID_FILE_MRU_FILE1].GetLength() != 0);

    TRACE2("MRU: open file (%d) %s\n", (nID - ID_FILE_MRU_FILE1) + 1,
            (const char*)m_strRecentFiles[nID - ID_FILE_MRU_FILE1]);

    m_pDocTemplateGallery->OpenDocumentFile(m_strRecentFiles[nID - ID_FILE_MRU_FILE1]);
    return TRUE;
}


void CFotoApp::AddToRecentFileList(const char* pszPathName)
{
    ASSERT_VALID(this);
    ASSERT(pszPathName != NULL);
    ASSERT(AfxIsValidString(pszPathName));

    // update the MRU list
    int iMRU;
    int iMRULast;
    CString strRecentFiles[4];

    for (iMRU = 0; iMRU < _AFX_MRU_COUNT; iMRU++)
      strRecentFiles[iMRU] = m_strRecentFiles[iMRU];

    // if an existing MRU string matches file name
    for (iMRU = 0; iMRU < _AFX_MRU_COUNT - 1; iMRU++)
    {
        if (strRecentFiles[iMRU] == pszPathName)
            break;       // iMRU will point to matching entry
    }

    // move MRU strings after this one down
    for (iMRULast = iMRU; iMRULast > 0; iMRULast--)
      strRecentFiles[iMRULast] = strRecentFiles[iMRULast - 1];

    // add our file name to the top
    strRecentFiles[0] = pszPathName;

    for (iMRU = 0; iMRU < _AFX_MRU_COUNT; iMRU++)
      m_strRecentFiles[iMRU] = strRecentFiles[iMRU];
}


int CFotoApp::ExitInstance()
```

```
{
    StopTimer();
    return CWinApp::ExitInstance();     // saves profile settings
}


/////////////////////////////////////////////////////////////////////////////
// CAboutDlg dialog used for App About

class CAboutDlg : public CDialog
{
public:
    CAboutDlg();

// Dialog Data
    //{{AFX_DATA(CAboutDlg)
    enum { IDD = IDD_ABOUTBOX };
    //}}AFX_DATA

// Implementation
protected:
    virtual void DoDataExchange(CDataExchange* pDX);    // DDX/DDV support
    //{{AFX_MSG(CAboutDlg)
        // No message handlers
    //}}AFX_MSG
    DECLARE_MESSAGE_MAP()
};

CAboutDlg::CAboutDlg() : CDialog(CAboutDlg::IDD)
{
    //{{AFX_DATA_INIT(CAboutDlg)
    //}}AFX_DATA_INIT
}

void CAboutDlg::DoDataExchange(CDataExchange* pDX)
{
    CDialog::DoDataExchange(pDX);
    //{{AFX_DATA_MAP(CAboutDlg)
    //}}AFX_DATA_MAP
}

BEGIN_MESSAGE_MAP(CAboutDlg, CDialog)
    //{{AFX_MSG_MAP(CAboutDlg)
        // No message handlers
    //}}AFX_MSG_MAP
END_MESSAGE_MAP()

// App command to run the dialog
void CFotoApp::OnAppAbout()
{
    CAboutDlg aboutDlg;
    aboutDlg.DoModal();
}

/////////////////////////////////////////////////////////////////////////////
// VB-Event registration
// (calls to AfxRegisterVBEvent will be placed here by ClassWizard)

//{{AFX_VBX_REGISTER_MAP()
//}}AFX_VBX_REGISTER_MAP

/////////////////////////////////////////////////////////////////////////////
// CFotoApp commands

void CFotoApp::OnFileNewGallery()
{
    // TODO: Add your command handler code here

    m_pDocTemplateGallery->OpenDocumentFile(NULL);
}


void CFotoApp::OnFileOpenGallery()
{
    CChooseGallery dlg;

    int nReturnCode = dlg.DoModal();

    if ((nReturnCode == IDOK) && (dlg.m_nCurSel != LB_ERR))
      {
        CGalleryDoc* pDoc;

        for (POSITION pos = m_pDocTemplateGallery->GetFirstDocPosition(); pos != NULL;)
          {
            pDoc = (CGalleryDoc*) m_pDocTemplateGallery->GetNextDoc(pos);

            if (dlg.m_CSGallery == pDoc->GetTitle())
              {
                pos = pDoc->GetFirstViewPosition();
                CGalVw* pFirstView = (CGalVw*) pDoc->GetNextView( pos );
                CMDIFrameWnd* pFrameWnd = (CMDIFrameWnd*) m_pMainWnd;
                pFrameWnd->MDIActivate(pFirstView);
                return;
              }
          }

        m_pDocTemplateGallery->OpenDocumentFile(dlg.m_CSGallery);
      }
}


void CFotoApp::OnFileOpenPhoto()
{
    BOOL bReturn = BrowseImageFiles(AfxGetApp()->m_pMainWnd->m_hWnd);
}


void CFotoApp::OnFileScanPhoto()
{
    // TODO: Add your command handler code here

}


void CFotoApp::OnAppExit()
{
}


BOOL CFotoApp::PreTranslateMessage(MSG* pMsg)
{
    DebugOutputMessage (pMsg);
    return (CWinApp::PreTranslateMessage(pMsg));
}
```

```
/* Copyright 1989-1994 FotoAttacher by Michael B. Mast, licensed
   to ProCentric Computer Service, Inc., all rights reserverd.
        Trade secret and patent pending. */

// galinfo.cpp : implementation file
//

#include "stdafx.h"
#include "fotoatt.h"
#include "galinfo.h"
#include "validddx.h"

extern int nDBNumber;

#ifdef _DEBUG
#undef THIS_FILE
static char BASED_CODE THIS_FILE[] = __FILE__;
#endif

/////////////////////////////////////////////////////////////////////////////
// CGalInfo dialog


CGalInfo::CGalInfo(CWnd* pParent /*=NULL*/)
    : CDialog(CGalInfo::IDD, pParent)
{
    //{{AFX_DATA_INIT(CGalInfo)
    m_CSGalleryName = "";
    //}}AFX_DATA_INIT
}

void CGalInfo::DoDataExchange(CDataExchange* pDX)
{
    CDialog::DoDataExchange(pDX);
    //{{AFX_DATA_MAP(CGalInfo)
    DDX_Text(pDX, IDC_GALLERY_NAME, m_CSGalleryName);
    DDV_MaxChars(pDX, m_CSGalleryName, 51);
    DDX_Text(pDX, IDC_GALLERY_DISPLAY_MIN, m_CSDisplayMin);
    DDV_MaxChars(pDX, m_CSDisplayMin, 12);
    DDX_Text(pDX, IDC_GALLERY_DISPLAY_MAX, m_CSDisplayMax);
    DDV_MaxChars(pDX, m_CSDisplayMax, 12);
    //}}AFX_DATA_MAP

    DDX_Time(pDX, IDC_GALLERY_DISPLAY_MIN, m_lDisplayMin);
    DDX_Time(pDX, IDC_GALLERY_DISPLAY_MAX, m_lDisplayMax);


    // Zero is an acceptable figure since it will be overridden by the
    // control information

    if (m_lDisplayMax == 0)
      m_lDisplayMax = m_lDisplayMin;

    if (m_lDisplayMax < m_lDisplayMin)
      {
        AfxMessageBox(IDS_TIME_MAX);
        pDX->Fail();
      }
}

BEGIN_MESSAGE_MAP(CGalInfo, CDialog)
    //{{AFX_MSG_MAP(CGalInfo)
    //}}AFX_MSG_MAP
END_MESSAGE_MAP()


/////////////////////////////////////////////////////////////////////////////
// CGalInfo message handlers

void CGalInfo::OnOK()
{
    CEdit* pEBName  = (CEdit*) GetDlgItem(IDC_GALLERY_NAME);
    CEdit* pEBLo    = (CEdit*) GetDlgItem(IDC_GALLERY_DISPLAY_MIN);
    CEdit* pEBHi    = (CEdit*) GetDlgItem(IDC_GALLERY_DISPLAY_MAX);

    m_bModified = pEBName->GetModify() | pEBLo->GetModify() | pEBHi->GetModify();
    CDialog::OnOK();
}
```

```
/* Copyright 1989-1994 FotoAttacher by Michael B. Mast, licensed
   to ProCentric Computer Service, Inc., all rights reserverd.
        Trade secret and patent pending. */

// galleryd.cpp : implementation file
//

#include "stdafx.h"
#include "fotoatt.h"
#include "photo.h"
#include "galleryd.h"
#include "palette.h"
#include "palctl.h"
#include "galvw.h"

extern int nDBNumber;

#ifdef _DEBUG
#undef THIS_FILE
static char BASED_CODE THIS_FILE[] = __FILE__;
#endif

/////////////////////////////////////////////////////////////////////////////
// CGalleryDoc

IMPLEMENT_SERIAL(CGalleryDoc, CDocument, 0 /* schema number*/ )

CGalleryDoc::CGalleryDoc()
{
    m_posPhoto      = NULL;
    m_CSGalleryDesc = "";
    SetModifiedFlag(FALSE);
    m_bChangedName  = FALSE;
    m_dba           = 0;
}


BOOL CGalleryDoc::OnNewDocument()
{

    if (!CDocument::OnNewDocument())
        return FALSE;

    m_posPhoto      = NULL;
    SetModifiedFlag(FALSE);
    m_bChangedName  = FALSE;
    m_bNewGallery   = TRUE;
    m_dba           = 0;
    memset (&m_Gallery, '\0', sizeof (m_Gallery));
    m_CSGalleryDesc = GetTitle();
    return TRUE;
}


BOOL CGalleryDoc::OnOpenDocument(const char* szDocumentName)
{
    DB_ADDR         dba;
    int             nRetCode;
    struct Photo    stPhoto;
    CPhoto*         pPhoto;


    // Search for the gallery that was selected.

    nRetCode = d_keyfind(GALLERY_SZDESC, szDocumentName, nDBNumber);

    if (nRetCode != S_OKAY)
      {
        AfxMessageBox(IDS_GALLERY_MISSING);
        return FALSE;
      }

    SetTitle(szDocumentName);
    d_crget(&dba, nDBNumber);
    SetDBA(dba);
    nRetCode = d_recread(&m_Gallery, nDBNumber);
    m_CSGalleryDesc = m_Gallery.szDesc;
    m_bNewGallery = FALSE;


    // Load the list of members from the database

    if (d_isowner(GALLERYPHOTOINTSET, nDBNumber) == S_OKAY)
      {
        d_setor(GALLERYPHOTOINTSET, nDBNumber);

        while (d_findnm(GALLERYPHOTOINTSET, nDBNumber) == S_OKAY)
          {
            d_findco (PHOTOGALLERYINTSET, nDBNumber);
            d_recread (&stPhoto, nDBNumber);
            d_crget(&dba, nDBNumber);
            pPhoto = new CPhoto(stPhoto, dba);
            m_PhotoList.AddTail(pPhoto);
          }
      }

   return TRUE;
}


CGalleryDoc::~CGalleryDoc()
{
    DeleteContents();
}


BEGIN_MESSAGE_MAP(CGalleryDoc, CDocument)
    //{{AFX_MSG_MAP(CGalleryDoc)
    //}}AFX_MSG_MAP
END_MESSAGE_MAP()


/////////////////////////////////////////////////////////////////////////////
// CGalleryDoc serialization

void CGalleryDoc::Serialize(CArchive& ar)
{
    if (ar.IsStoring())
    {
        // TODO: add storing code here
    }
    else
    {
        // TODO: add loading code here
    }
}

/////////////////////////////////////////////////////////////////////////////
// CGalleryDoc commands


/////////////////////////////////////////////////////////////////////////////
// Operations

CPhoto* CGalleryDoc::GetFirstPhoto()
{
    m_posPhoto = m_PhotoList.GetHeadPosition();
    return GetNextPhoto();
}


CPhoto* CGalleryDoc::GetNextPhoto()
{
    if (m_posPhoto != NULL)
      return (CPhoto*) m_PhotoList.GetNext(m_posPhoto);

    return NULL;
}


CString& CGalleryDoc::GetGalleryDesc()
{
    return m_CSGalleryDesc;
}


void CGalleryDoc::SetGalleryDesc(CString& CSGalleryDesc)
{
    m_CSGalleryDesc = CSGalleryDesc;
    SetTitle(m_CSGalleryDesc);
    SetModifiedFlag();
    SetNameChangeFlag();
}


void CGalleryDoc::SetDisplayMax(long lMax)
{
    m_Gallery.lMaxDisplayTime = lMax;
}


void CGalleryDoc::SetDisplayMin(long lMin)
{
    m_Gallery.lMinDisplayTime = lMin;
}


void CGalleryDoc::SetNameChangeFlag()
{
    m_bChangedName = TRUE;
    m_bNewGallery = FALSE;
}


void CGalleryDoc::SaveGallery()
{
    int             nRetCode;
    CPhoto*         pPhoto;
    struct Photo    stPhoto;
    DB_ADDR         dbaPhoto;
    char            szTitle[60];


    // If the gallery has never been saved before (either because it is new
    // or because it's old and the name changed) then it needs to check for
    // duplicate and ask to delete the old version before it is actually saved.

    if (((nRetCode = d_keyfind(GALLERY_SZDESC, m_CSGalleryDesc, nDBNumber)) == S_OKAY) && (HasNameChanged()))
      {
        CString CSTemp;
```

IC/14PRINT

```
        AfxFormatString1(CSTemp, IDS_GALLERY_DUPLICATE, m_CSGalleryDesc);

        if (AfxMessageBox(CSTemp, MB_OKCANCEL | MB_ICONQUESTION) == IDCANCEL)
          return;
      }


    // Now save the gallery on disk. If the old one exists (as determined
    // above), then delete the old one and all of its members before creating
    // a new one.

    d_trbegin("GalleryEdit");

    if (nRetCode == S_OKAY)      // The old gallery exists.
      {
        // Delete the set of intersect records for the gallery

        if ((nRetCode = d_isowner(GALLERYPHOTOINTSET, nDBNumber)) == S_OKAY)
          {
            nRetCode = d_setor (GALLERYPHOTOINTSET, nDBNumber);

            while ((nRetCode = d_findnm(GALLERYPHOTOINTSET, nDBNumber)) == S_OKAY)
              d_disdel(nDBNumber);
          }
      }
    else
      {
        // The gallery does not exist.  This may occur only if
        //    1:  The gallery is being saved under a new name
        //    2:  The gallery was deleted while it was open and the user now
        //          wishes to save it.

        // If it was deleted, then it must be saved as a new gallery, however
        // a name change is simply a key change.

        if (m_dba != 0)
          {
            d_crset (&m_dba, nDBNumber);
            nRetCode = d_crget (&m_dba, nDBNumber);

            if (nRetCode == S_NOCR)
              m_dba = 0;
          }
      }


    // Handle the problem of a key change and the equally perplexing problem
    // of new gallery saves.

    if (m_dba == 0)       // Handle a new gallery
      {
        strcpy (szTitle, (const char*) GetTitle());
        d_setkey(GALLERY_SZDESC, szTitle, nDBNumber);
        d_makenew(GALLERY, nDBNumber);
        UINT usFlags = 0;
        d_crwrite(GALLERY_LMINDISPLAYTIME,  &m_Gallery.lMinDisplayTime, nDBNumber);
        d_crwrite(GALLERY_LMAXDISPLAYTIME,  &m_Gallery.lMaxDisplayTime, nDBNumber);
        d_crwrite(GALLERY_USFLAGS,          &usFlags, nDBNumber);
        d_crwrite(GALLERY_USDISPLAYFLAGS,   &usFlags, nDBNumber);
        d_crget(&m_dba, nDBNumber);
      }
    else                    // Change in key occurred
      {
        d_crset(&m_dba, nDBNumber);
        d_crwrite(GALLERY_LMINDISPLAYTIME,  &m_Gallery.lMinDisplayTime, nDBNumber);
        d_crwrite(GALLERY_LMAXDISPLAYTIME,  &m_Gallery.lMaxDisplayTime, nDBNumber);

        if (HasNameChanged())
          {
            strcpy (szTitle, (const char*) GetTitle());
            d_crwrite(GALLERY_SZDESC, szTitle, nDBNumber);
          }
      }


    // Save the new gallery to disk

    // At this point, there are no intersect records for the gallery.  We must
    // scan the list of photo objects and create the appropriate intersect
    // records.  Note that we may need to create a new photo record in the
    // event of a DBA that is zero!  We must also consider that a new photo
    // record may actually be a duplicate of an existing one.  If it is, then
    // use the DBA of the record that was saved first.

    for (pPhoto = GetFirstPhoto(); pPhoto != NULL; pPhoto = GetNextPhoto())
      {
        stPhoto = pPhoto->GetStruct();
        dbaPhoto = pPhoto->GetDBA();

        if (dbaPhoto == 0)
          {
            if ((nRetCode = d_fillnew(PHOTO, &stPhoto, nDBNumber)) == S_DUPLICATE)
              {
                d_keyfind (PHOTO_SZPHOTOFILENAME, stPhoto.szPhotoFileName, nDBNumber);
                d_crget (&dbaPhoto, nDBNumber);
                ASSERT(dbaPhoto != 0);
              }
            else
              nRetCode = d_crget (&dbaPhoto, nDBNumber);
          }

        nRetCode = d_csoset (PHOTOGALLERYINTSET, &dbaPhoto, nDBNumber);
        nRetCode = d_csoset (GALLERYPHOTOINTSET, &m_dba, nDBNumber);
        nRetCode = d_makenew (GALLERYPHOTOINT, nDBNumber);
        nRetCode = d_connect (PHOTOGALLERYINTSET, nDBNumber);
        nRetCode = d_connect (GALLERYPHOTOINTSET, nDBNumber);
      }

    d_trend();
    SetModifiedFlag (FALSE);
    m_bChangedName = FALSE;


    // Add to the MRU list.  It won't hurt if the file is already on the list.

    AfxGetApp()->AddToRecentFileList(GetTitle());
}


void CGalleryDoc::DeleteContents()
{
    CPhoto* photo;

    while (!m_PhotoList.IsEmpty())
      {
        photo = (CPhoto*) m_PhotoList.RemoveTail();
        delete photo;
      }
}


void CGalleryDoc::SetDBA(DB_ADDR dba)
{
    m_dba = dba;
}


// This routine will delete a gallery from the database.  It starts by
// deleting all of the members of the gallery and finishes by deleting
// the gallery record entry itself.  Finally, it resets the m_dba to 0
// and all of the associated flags so that no further attempt may be
// made at saving it.

void CGalleryDoc::DeleteGallery()
{
    int nRetCode;

    if (m_dba == 0)
      return;

    d_trbegin("GalleryDelete");
    d_crset (&m_dba, nDBNumber);

    // Delete the set of intersect records for the gallery

    if ((nRetCode = d_isowner(GALLERYPHOTOINTSET, nDBNumber)) == S_OKAY)
      {
        nRetCode = d_setor (GALLERYPHOTOINTSET, nDBNumber);

        while ((nRetCode = d_findnm(GALLERYPHOTOINTSET, nDBNumber)) == S_OKAY)
          d_disdel(nDBNumber);
      }

    d_crset (&m_dba, nDBNumber);
    d_disdel (nDBNumber);
    d_trend();
    m_dba           = 0;
    SetModifiedFlag(FALSE);
    m_bChangedName  = FALSE;
}


BOOL CGalleryDoc::SaveModified()
{
    // Check to see if there is anything in the gallery to save

    if (IsModified())
      {
        CString CSTemp = "";
        POSITION pos = GetFirstViewPosition();
        CGalVw* pFirstView = (CGalVw*) GetNextView( pos );
        pFirstView->PrepDocumentForSave();

        if (m_PhotoList.IsEmpty())
          {
            AfxFormatString1(CSTemp, IDS_GALLERY_DELETE_OK, GetGalleryDesc());

            if (AfxMessageBox(CSTemp, MB_OKCANCEL | MB_ICONQUESTION) == IDCANCEL)
              return FALSE;

            DeleteGallery();
          }
        else
          {
            AfxFormatString1(CSTemp, IDS_GALLERY_NOT_SAVED, GetGalleryDesc());

            switch (AfxMessageBox(CSTemp, MB_YESNOCANCEL | MB_ICONQUESTION))
              {
                case IDYES:
```

```
                SaveGallery();
                break;

              case IDCANCEL;
                return FALSE;

              // default action falls through and closes the document.
            }
        }
    }

    return TRUE;
}


/////////////////////////////////////////////////////////////////////////////
// Add a photo to the list of photos.  Generally, this will be done only on //
// initialization and during the save process.  This is because the actual  //
// list handling will be done by the control handling the lists (during     //
// gallery modification).                                                   //
/////////////////////////////////////////////////////////////////////////////

void CGalleryDoc::AddPhoto(CPhoto* obPhoto)
{
    m_PhotoList.AddTail(obPhoto);
}
```

```
/* Copyright 1989-1994 FotoAttacher by Michael B. Mast, licensed
   to ProCentric Computer Service, Inc., all rights reserverd.
         Trade secret and patent pending. */

////////////////////////////////////////////////////////////////////////////
// Class CGalleryItem - Define a gallery item object.
//
// In this class we associate the actual index of the gallery item in the
// gallery list box.  This is because there is no way to delete the gallery

class CGalleryItem : public CObject
{
public:
//  CGalleryItem();                  // This should never be called
        CGalleryItem(int nIndex, DB_ADDR dba);

private:
    DB_ADDR m_dbaGallery;
    int     m_nIndex;
};

//===========================================end of header file==============

////////////////////////////////////////
// GalleryItem Object Definition

CGalleryItem::CGalleryItem(int nIndex, DB_ADDR dba)
{
    m_nIndex = nIndex;
    m_dbaGallery = dba;
}
```

```
/* Copyright 1989-1994 FotoAttacher by Michael B. Mast, licensed
   to ProCentric Computer Service, Inc., all rights reserverd.
        Trade secret and patent pending. */

// galvw.cpp : implementation file
//

#include "stdafx.h"
#include "fotoatt.h"
#include "photo.h"
#include "palette.h"
#include "palctl.h"
#include "galleryd.h"
#include "galinfo.h"
#include "galvw.h"

extern int nDBNumber;

#ifdef _DEBUG
#undef THIS_FILE
static char BASED_CODE THIS_FILE[] = __FILE__;
#endif

extern UINT uiClipboardPhotoID;

/////////////////////////////////////////////////////////////////////////////
// CGalVw

IMPLEMENT_DYNCREATE(CGalVw, CView)

CGalVw::CGalVw()
{
    m_bInitialized = FALSE;
}

CGalVw::~CGalVw()
{
}


BEGIN_MESSAGE_MAP(CGalVw, CView)
    //{{AFX_MSG_MAP(CGalVw)
    ON_WM_SIZE()
    ON_WM_CREATE()
    ON_COMMAND(ID_EDIT_COPY, OnEditCopy)
    ON_COMMAND(ID_EDIT_CUT, OnEditCut)
    ON_COMMAND(ID_EDIT_DELETE, OnEditDelete)
    ON_COMMAND(ID_EDIT_PASTE, OnEditPaste)
    ON_UPDATE_COMMAND_UI(ID_EDIT_PASTE, OnUpdateEditPaste)
    ON_UPDATE_COMMAND_UI(ID_EDIT_COPY, OnUpdateEditCopy)
    ON_UPDATE_COMMAND_UI(ID_EDIT_DELETE, OnUpdateEditDelete)
    ON_UPDATE_COMMAND_UI(ID_EDIT_CUT, OnUpdateEditCut)
    ON_COMMAND(ID_EDIT_GALLERY_INFO, OnEditGalleryInfo)
    ON_COMMAND(ID_FILE_SAVE, OnFileSaveGallery)
    ON_COMMAND(ID_EDIT_CLEAR_ALL, OnEditClearAll)
    ON_UPDATE_COMMAND_UI(ID_EDIT_CLEAR_ALL, OnUpdateEditClearAll)
    ON_COMMAND(ID_EDIT_SELECTALL, OnEditSelectall)
    ON_UPDATE_COMMAND_UI(ID_EDIT_SELECTALL, OnUpdateEditSelectall)
    ON_COMMAND(ID_EDIT_RECREATE_THUMBNAILS, OnEditRecreateThumbnails)
    ON_COMMAND(ID_EDIT_DESELECTALL, OnEditDeselectall)
    ON_UPDATE_COMMAND_UI(ID_EDIT_DESELECTALL, OnUpdateEditDeselectall)
    ON_UPDATE_COMMAND_UI(ID_FILE_SAVE, OnUpdateFileSaveGallery)
    ON_COMMAND(ID_FILE_SAVE_AS, OnFileSaveGalleryAs)
    ON_UPDATE_COMMAND_UI(ID_FILE_SAVE_AS, OnUpdateFileSaveGalleryAs)
    ON_COMMAND(ID_FILE_ADD_PHOTO, OnFileAddPhoto)
    ON_UPDATE_COMMAND_UI(ID_FILE_EXPORT_GALLERY, OnUpdateFileExportGallery)
    ON_UPDATE_COMMAND_UI(ID_FILE_IMPORT_GALLERY, OnUpdateFileImportGallery)
    //}}AFX_MSG_MAP
    ON_CONTROL(PLN_CREATE, IDR_GALLERY_LB, OnPaletteCreate)
    ON_CONTROL(PLN_PALETTECHANGED, IDR_GALLERY_LB, OnPaletteChange)
    ON_MESSAGE(WM_ITEMCHANGED, OnItemChange)
END_MESSAGE_MAP()


/////////////////////////////////////////////////////////////////////////////
// CGalVw drawing

void CGalVw::OnDraw(CDC* pDC)
{
    // TODO: add draw code here
}


//////////////////////////////////////////////////
//                                              //
// CGalVw message handlers - General Commands   //
//                                              //
//////////////////////////////////////////////////

void CGalVw::OnSize(UINT nType, int cx, int cy)
{
    CRect rect;
    CView::OnSize(nType, cx, cy);

    // makes the edit control size track the main window size

    GetClientRect(rect);

    m_wndPB.SetWindowPos(&wndTop,
                         0, 0, rect.Width(), rect.Height(),
                         SWP_SHOWWINDOW);
}


int CGalVw::OnCreate(LPCREATESTRUCT lpCreateStruct)
{
    CRect   rect;

    if (CView::OnCreate(lpCreateStruct) == -1)
        return -1;


    // Create a list box that fills the entire window

    GetClientRect(rect);
    rect.InflateRect(GetSystemMetrics(SM_CXBORDER), GetSystemMetrics(SM_CYBORDER));

    m_wndPB.Create (WS_CHILD | WS_VISIBLE |
                    PLS_NOTIFY | PLS_DRAGSOURCE | PLS_DROPTARGET | PLS_EXTENDEDSEL | PLS_DELETE |
                        PLS_DESCRIPTION,
                    rect,
                    this,
                    IDR_GALLERY_LB);

    return 0;
}


void CGalVw::OnUpdate(CView* pSender, LPARAM lHint, CObject* pHint)
{
    CPhoto* pPhoto;

    // refreshes list box from array in document
    // when the application starts, this function is called
    // before the window is shown

    // Get the document and load the list box with the document data

    if (!m_bInitialized)
      {
        m_wndPB.ResetContent();
        CGalleryDoc* pDoc = (CGalleryDoc*) GetDocument();
        pDoc->SetTitle(pDoc->GetGalleryDesc());
        m_bInitialized = TRUE;

        for (pPhoto = pDoc->GetFirstPhoto();
             pPhoto != NULL;
             pPhoto = pDoc->GetNextPhoto())
          {
            m_wndPB.AddItem(pPhoto);
          }

        pDoc->SetModifiedFlag(FALSE);
      }
}


//////////////////////////////////////////////////
//                                              //
// CGalVw message handlers - Edit Menu Commands //
//                                              //
//////////////////////////////////////////////////

void CGalVw::OnEditClearAll()
{
    m_wndPB.ResetContent();
}


void CGalVw::OnEditCopy()
{
    CopyPhotosToClipboard();
}


void CGalVw::OnEditCut()
{
    if (CopyPhotosToClipboard() == 0)
      DeletePhotosFromGallery();
}


void CGalVw::OnEditDelete()
{
    DeletePhotosFromGallery();
}


void CGalVw::OnEditDeselectall()
{
    m_wndPB.DeselectAll();
}


void CGalVw::OnEditGalleryInfo()
{
    CGalInfo    dlg;

    CGalleryDoc* pDoc   = (CGalleryDoc*) GetDocument();
    dlg.m_CSGalleryName = pDoc->GetGalleryDesc();
```

1C/14PRINT

```
    dlg.m_lDisplayMin    = pDoc->GetDisplayMin();
    dlg.m_lDisplayMax    = pDoc->GetDisplayMax();
    int nReturnCode      = dlg.DoModal();

    if ((nReturnCode == IDCANCEL) || (!dlg.m_bModified))
      return;

    pDoc->SetGalleryDesc(dlg.m_CSGalleryName);
    pDoc->SetTitle(pDoc->GetGalleryDesc());
    pDoc->SetDisplayMin(dlg.m_lDisplayMin);
    pDoc->SetDisplayMax(dlg.m_lDisplayMax);
}


void CGalVw::OnEditPaste()
{
    int           i;
    LPSTR         lpGlobalMemory;
    HANDLE        hData;
    CPhoto        PhotoItem;
    int           nPhotos;
    PALPARM       PalParm;
    LPPALPARM     fpPalParm;

    if(!OpenClipboard())
      {
        AfxMessageBox(IDS_NO_CLIPBOARD, MB_ICONEXCLAMATION, 0);
        return;
      }

    hData = GetClipboardData(uiClipboardPhotoID);

    if (hData == NULL)
      return;

    lpGlobalMemory = (LPSTR) GlobalLock(hData);
    _fmemcpy (&nPhotos, lpGlobalMemory, sizeof (nPhotos));
    fpPalParm = (LPPALPARM) &lpGlobalMemory[sizeof (nPhotos)];

    for (i = 0; i < nPhotos; i++)
      {
        _fmemcpy (&PalParm, fpPalParm, sizeof (PalParm));
        PhotoItem.PopulatePhoto(PalParm.photo, PalParm.db_addr);
        m_wndPB.PasteItem(&PhotoItem);
        fpPalParm++;
      }

    GlobalUnlock(hData);
    CloseClipboard();
    CGalleryDoc* pDoc = (CGalleryDoc*) GetDocument();
}


void CGalVw::OnEditRecreateThumbnails()
{
    m_wndPB.RecreateThumbnails();
}


void CGalVw::OnEditSelectall()
{
    m_wndPB.SelectAll();
}


///////////////////////////////////////////////////
//                                               //
// CGalVw message handlers - File Menu Commands //
//                                               //
///////////////////////////////////////////////////

void CGalVw::OnFileSaveGallery()
{
    CGalleryDoc* pDoc = (CGalleryDoc*) GetDocument();

    if (pDoc->IsNew())
      OnFileSaveGalleryAs();
    else
      {
        PrepDocumentForSave();
        pDoc->SaveGallery();
      }
}


void CGalVw::OnFileSaveGalleryAs()
{
    CGalInfo    dlg;

    CGalleryDoc* pDoc = (CGalleryDoc*) GetDocument();
    dlg.m_CSGalleryName = pDoc->GetGalleryDesc();
    int nReturnCode = dlg.DoModal();

    if ((nReturnCode == IDCANCEL) || (!dlg.m_bModified))
      return;

    pDoc->SetGalleryDesc(dlg.m_CSGalleryName);
    pDoc->SetTitle(pDoc->GetGalleryDesc());
    PrepDocumentForSave();
    pDoc->SaveGallery();
```

```
}


///////////////////////////////////////////////////
//                                               //
// Make sure that the menus are properly updated. //
//                                               //
///////////////////////////////////////////////////

void CGalVw::OnUpdateEditCopy(CCmdUI* pCmdUI)
{
    pCmdUI->Enable(m_wndPB.GetSelCount() > 0);
}


void CGalVw::OnUpdateEditClearAll(CCmdUI* pCmdUI)
{
    pCmdUI->Enable(m_wndPB.GetCount() > 0);
}


void CGalVw::OnUpdateEditCut(CCmdUI* pCmdUI)
{
    pCmdUI->Enable(m_wndPB.GetSelCount() > 0);
}


void CGalVw::OnUpdateEditDelete(CCmdUI* pCmdUI)
{
    pCmdUI->Enable(m_wndPB.GetSelCount() > 0);
}


void CGalVw::OnUpdateEditDeselectall(CCmdUI* pCmdUI)
{
    pCmdUI->Enable(m_wndPB.GetSelCount() > 0);
}


void CGalVw::OnUpdateEditPaste(CCmdUI* pCmdUI)
{
    pCmdUI->Enable(IsClipboardFormatAvailable(uiClipboardPhotoID));
}


void CGalVw::OnUpdateEditSelectall(CCmdUI* pCmdUI)
{
    pCmdUI->Enable(m_wndPB.GetCount() != m_wndPB.GetSelCount());
}


void CGalVw::OnUpdateFileSaveGallery(CCmdUI* pCmdUI)
{
    CGalleryDoc* pDoc = (CGalleryDoc*) GetDocument();
    pCmdUI->Enable((pDoc->IsModified()) && (m_wndPB.GetCount() > 0));
}


void CGalVw::OnUpdateFileSaveGalleryAs(CCmdUI* pCmdUI)
{
    pCmdUI->Enable(m_wndPB.GetCount() > 0);
}


void CGalVw::OnUpdateFileExportGallery(CCmdUI* pCmdUI)
{
    pCmdUI->Enable(FALSE);
}


void CGalVw::OnUpdateFileImportGallery(CCmdUI* pCmdUI)
{
    pCmdUI->Enable(FALSE);
}


//****************************************************************************
//*                                                                          *
//* Private functions - Globally used within the class, but not to be used *
//* from outside.                                                            *
//*                                                                          *
//****************************************************************************

//////////////////////////////////////////////////////////////////////////////
// Copy a photo to the clipboard.  This is being done with the name of the //
// photo (since we ultimately really deal with names and not rendered      //
// bitmaps.)                                                                //
//                                                                          //
// Returns: -1 if the clipboard is not or another problem occurs           //
//           0 if everything is ok                                          //
//////////////////////////////////////////////////////////////////////////////

int CGalVw::CopyPhotosToClipboard()
{
    LPSTR         lpGlobalMemory;
    HANDLE        hData;
    HGLOBAL       hItemList;
    int           nItems;
    int far*      fpnItems;
    CPhoto        PhotoObj;
```

ISCT4PRINT

```
    PALPARM     PalParm;
    LPPALPARM   fpPalParm;


    // Since we don't know how many or which items are set in advance, we
    // have to do it dynamically.  Get the size of the list, allocate enough
    // memory to hold it and populate the list.

    nItems = m_wndPB.GetSelCount();
    hItemList = GlobalAlloc(GHND, nItems * sizeof (int));
    fpnItems = (int far*) GlobalLock(hItemList);
    m_wndPB.GetSelItems(nItems, fpnItems);


    // Now take the list and use it to select the actual items and stuff them
    // into a memory area that will go to the clipboard.

    hData = GlobalAlloc(GHND, sizeof (PalParm) * nItems  + sizeof (nItems));
    lpGlobalMemory = (LPSTR) GlobalLock(hData);
    _fmemcpy (lpGlobalMemory, &nItems, sizeof (nItems));
    fpPalParm = (LPPALPARM) &lpGlobalMemory[sizeof (nItems)];

    for (int i = 0; i < nItems; i++)
      {
        m_wndPB.GetItem(fpnItems[i], &PhotoObj);
        PalParm.photo = PhotoObj.GetStruct();
        PalParm.db_addr = PhotoObj.GetDBA();
        _fmemcpy (fpPalParm, &PalParm, sizeof(PalParm));
        fpPalParm++;
      }

    GlobalUnlock(hItemList);          // Dump the list that is no longer needed
    GlobalFree(hItemList);


    // Place the data area onto the clipboard.

    GlobalUnlock(hData);

    if(!OpenClipboard())
      {
        AfxMessageBox(IDS_NO_CLIPBOARD, MB_ICONEXCLAMATION, 0);
        return -1;
      }

    EmptyClipboard();
    SetClipboardData(uiClipboardPhotoID, hData);
    CloseClipboard();
    return 0;
}


////////////////////////////////////////////////////////////////////////////
// Delete the photos from a gallery.  This will actively delete one or more //
// photos from a gallery.  The deleted photos will be those that are        //
// currently selected.                                                      //
////////////////////////////////////////////////////////////////////////////

void CGalVw::DeletePhotosFromGallery()
{
    HGLOBAL     hData;
    int far*    fpnItems;


    // Since we don't know how many or which items are set in advance, we
    // have to do it dynamically.  Get the size of the list, allocate enough
    // memory to hold it and populate the list.

    int nItems = m_wndPB.GetSelCount();
    hData = GlobalAlloc(GHND, nItems * sizeof (int));
    fpnItems = (int far*) GlobalLock(hData);
    m_wndPB.GetSelItems(nItems, fpnItems);
    m_wndPB.DeleteSelectedItems();
    GlobalUnlock(hData);
    GlobalFree(hData);
}


// Rebuild the photo list prior to saving the document

void CGalVw::PrepDocumentForSave()
{
    int     i;
    int     j;
    CPhoto  *pPhoto;

    CGalleryDoc* pDoc = (CGalleryDoc*) GetDocument();
    pDoc->DeleteContents();
    j = m_wndPB.GetCount();

    for (i = 0; i < j; i++)
      {
        pPhoto = new CPhoto;
        m_wndPB.GetItem(i, pPhoto);
        pDoc->AddPhoto(pPhoto);
      }
}


////////////////////////////////////////////////////////////////////////////
//
// Handle the notification messages that are sent by the palette control.   //
//                                                                          //
////////////////////////////////////////////////////////////////////////////


// Notification that the palette is being created, respond with the parameters
// that designate the formatting of the palette.

void CGalVw::OnPaletteCreate()
{
    PALCREATEPARMS PalCreateParms;

    PalCreateParms.nPanelSize          =  100;  /* 3 panels per column */
    PalCreateParms.nInterPanelSpacing  =    5;  /* five one hudreths (one tenth) on an inch */

    SendDlgItemMessage (IDR_GALLERY_LB,
                        PM_INITIALIZE,
                        0,
                        (LPARAM) (LPPALCREATEPARMS) &PalCreateParms);
}


//  Notification that a change has occurred to the palette.

void CGalVw::OnPaletteChange()
{
    CGalleryDoc* pDoc = (CGalleryDoc*) GetDocument();
    pDoc->SetModifiedFlag();
}


// Notification that a change has occurred to an item.

LRESULT CGalVw::OnItemChange(WPARAM wParam, LPARAM lParam)
{
    return 0;
}


void CGalVw::OnFileAddPhoto()
{
    // TODO: Add your command handler code here

//  CFotoApp::OnFileOpenPhoto();
}
```

IC/14PRINT

```
/* Copyright 1989-1994 FotoAttacher by Michael B. Mast, licensed
   to ProCentric Computer Service, Inc., all rights reserverd.
        Trade secret and patent pending. */

// impexp.cpp : implementation file
//

#include "stdafx.h"
#include "fotoatt.h"
#include "impexp.h"

#ifdef _DEBUG
#undef THIS_FILE
static char BASED_CODE THIS_FILE[] = __FILE__;
#endif

/////////////////////////////////////////////////////////////////////////////
// CImportExport dialog


CImportExport::CImportExport(CWnd* pParent /*=NULL*/)
    : CDialog(CImportExport::IDD, pParent)
{
    //{{AFX_DATA_INIT(CImportExport)
        // NOTE: the ClassWizard will add member initialization here
    //}}AFX_DATA_INIT
}

void CImportExport::DoDataExchange(CDataExchange* pDX)
{
    CDialog::DoDataExchange(pDX);
    //{{AFX_DATA_MAP(CImportExport)
        // NOTE: the ClassWizard will add DDX and DDV calls here
    //}}AFX_DATA_MAP
}

BEGIN_MESSAGE_MAP(CImportExport, CDialog)
    //{{AFX_MSG_MAP(CImportExport)
    ON_BN_CLICKED(IDC_EXCLUDE_ALL, OnExcludeAll)
    ON_BN_CLICKED(IDC_INCLUDE_ALL, OnIncludeAll)
    ON_LBN_DBLCLK(IDC_LIST_GALLERIES, OnDblclkListGalleries)
    //}}AFX_MSG_MAP
END_MESSAGE_MAP()


/////////////////////////////////////////////////////////////////////////////
// CImportExport message handlers

void CImportExport::OnExcludeAll()
{
    // TODO: Add your control notification handler code here

}

void CImportExport::OnIncludeAll()
{
    // TODO: Add your control notification handler code here

}

void CImportExport::OnDblclkListGalleries()
{
    // TODO: Add your control notification handler code here

}
```

IMPEXP.CPP 10-3-94 2:26p printed Oct 03, 1994 at 14:26

Page 1 of 1

```
/* Copyright 1989-1994 FotoAttacher by Michael B. Mast, licensed
   to ProCentric Computer Service, Inc., all rights reserverd.
        Trade secret and patent pending. */

// mainfrm.cpp : implementation of the CMainFrame class
//
#include "stdafx.h"
#include "fotoatt.h"

#include "mainfrm.h"
#include "appdlg.h"
#include "settings.h"
#include "remove.h"
#include "chuzegal.h"
#include "photo.h"
#include "galleryd.h"
#include "scrnsvr.h"
#include "activape.h"
#include "browse.h"
#include <dos.h>
#include <direct.h>
#include <debug.h>
#include "palette.h"

/* Defines used by 1_bitmap.h */

#define WIN31
#define FOR_DLL    // Must define this before including 1_bitmap.h

#include <1_bitmap.h>
#include <1_error.h>
#include "fadll.h"

#include <inittab.h>          // DB Vista definitions
DB_TASK Currtask;
int     nDBNumber;

#ifdef _DEBUG
#undef THIS_FILE
static char BASED_CODE THIS_FILE[] = __FILE__;
#endif

/////////////////////////////////////////////////////////////////////////////
// CMainFrame

IMPLEMENT_DYNAMIC(CMainFrame, CMDIFrameWnd)

BEGIN_MESSAGE_MAP(CMainFrame, CMDIFrameWnd)
    //{{AFX_MSG_MAP(CMainFrame)
    ON_WM_CREATE()
    ON_COMMAND(ID_CONFIGURE_APPLICATIONS, OnConfigureApplications)
    ON_COMMAND(ID_OPTIONS_SETTINGS, OnOptionsSettings)
    ON_COMMAND(ID_FILE_DELETE_GALLERY, OnFileDeleteGallery)
    ON_COMMAND(ID_FILE_DELETE_PHOTO, OnFileDeletePhoto)
    ON_COMMAND(ID_SCREEN_SAVER, OnScreenSaver)
    ON_WM_TIMER()
    ON_COMMAND(IDM_TOOLS_REMOVE_THUMBS, OnToolsRemoveThumbs)
    ON_COMMAND(IDM_TOOLS_INIT_DB, OnToolsInitDb)
    ON_WM_CLOSE()
    ON_COMMAND(ID_FILE_EXPORT_GALLERY, OnFileExportGallery)
    ON_COMMAND(ID_FILE_IMPORT_GALLERY, OnFileImportGallery)
    //}}AFX_MSG_MAP
    // Global help commands
    ON_COMMAND(ID_HELP_INDEX, CMDIFrameWnd::OnHelpIndex)
    ON_COMMAND(ID_HELP_USING, CMDIFrameWnd::OnHelpUsing)
    ON_COMMAND(ID_HELP, CMDIFrameWnd::OnHelp)
    ON_COMMAND(ID_CONTEXT_HELP, CMDIFrameWnd::OnContextHelp)
    ON_COMMAND(ID_DEFAULT_HELP, CMDIFrameWnd::OnHelpIndex)
    ON_MESSAGE(BROWSE_FILENAME, OnBrowseFileOpen)
    ON_MESSAGE(FA_UIUNHIDE, OnUIUnhide)
    ON_MESSAGE(FA_OPENBITMAPFILE, OnOpenBitmapFile)
    ON_MESSAGE(FA_SCREENSAVECONFIG, OnScreenSaveConfig)
END_MESSAGE_MAP()

/////////////////////////////////////////////////////////////////////////////
// arrays of IDs used to initialize control bars

// toolbar buttons - IDs are command buttons
static UINT BASED_CODE buttons[] =
{
    // same order as in the bitmap 'toolbar.bmp'
    ID_FILE_NEW_GALLERY,
    ID_FILE_OPEN_GALLERY,
    ID_FILE_SAVE,
        ID_SEPARATOR,
    ID_EDIT_CUT,
    ID_EDIT_COPY,
    ID_EDIT_PASTE,
        ID_SEPARATOR,
    ID_FILE_PRINT,
    ID_APP_ABOUT,
    ID_CONTEXT_HELP,
        ID_SEPARATOR,
    ID_EDIT_SELECT_REGION,
    ID_FILE_SCAN_PHOTO,
};

static UINT BASED_CODE indicators[] =
{
    ID_SEPARATOR,           // status line indicator
    ID_INDICATOR_CAPS,
    ID_INDICATOR_NUM,
    ID_INDICATOR_SCRL,
};

/////////////////////////////////////////////////////////////////////////////
// CMainFrame construction/destruction

CMainFrame::CMainFrame()
{
    int nRetCode;


    // Set up the database so that it can be used by the application.

    dt_opentask(&Currtask);
    nRetCode = d_open ("attacher", "o");
    nDBNumber = 0;

    if (nRetCode != S_OKAY)
      {
        AfxMessageBox ("Cannot Open Database");
        return;
      }

    d_setdb (nDBNumber);
    CControl Control(nDBNumber);            // Must be after database is set up
    m_lMinDisplay = Control.GetDisplayMin();
    m_lMaxDisplay = Control.GetDisplayMax();

    // Other member data initialization

    m_bShowing = FALSE;     // This is set to true when FA_UIUNHIDE is recvd
    m_sAction = 0;
}


CMainFrame::~CMainFrame()
{
    int nRetCode;

    // Scan the database looking for orphaned photos

    d_trbegin("Mainframe:Shutdown");

    for (nRetCode = d_recfrst(PHOTO, nDBNumber);
         nRetCode == S_OKAY;
         nRetCode = d_recnext(nDBNumber))
      {
        if ((d_isowner (PHOTOGALLERYINTSET, nDBNumber) != S_OKAY))
          d_delete(nDBNumber);
      }

    d_trend();


    // Shutdown the database

    d_close ();
    dt_closetask(&Currtask);


    // Clean out the clipboard

    if (!OpenClipboard())
      return;

    EmptyClipboard();
    CloseClipboard();
}


int CMainFrame::OnCreate(LPCREATESTRUCT lpCreateStruct)
{
    if (CMDIFrameWnd::OnCreate(lpCreateStruct) == -1)
      return -1;

    if (!m_wndToolBar.Create(this) ||
        !m_wndToolBar.LoadBitmap(IDR_MAINFRAME) ||
        !m_wndToolBar.SetButtons(buttons,
          sizeof(buttons)/sizeof(UINT)))
      {
        TRACE("Failed to create toolbar\n");
        return -1;      // fail to create
      }

    if (!m_wndStatusBar.Create(this) ||
        !m_wndStatusBar.SetIndicators(indicators,
          sizeof(indicators)/sizeof(UINT)))
      {
        TRACE("Failed to create status bar\n");
        return -1;      // fail to create
      }

    LIBINIT2PARMS LibInit2Parms;

    LibInit2 (this->GetSafeHwnd(), &LibInit2Parms);
    m_unBitmapLoadedMessage = LibInit2Parms.unBitmapLoadedMessage;
    m_unRollupMessage       = LibInit2Parms.unRollupMessage;
    return 0;
```

```
}

//////////////////////////////////////////////////////////////////////////////
// CMainFrame diagnostics

#ifdef _DEBUG
void CMainFrame::AssertValid() const
{
    CMDIFrameWnd::AssertValid();
}

void CMainFrame::Dump(CDumpContext& dc) const
{
    CMDIFrameWnd::Dump(dc);
}

#endif //_DEBUG

//////////////////////////////////////////////////////////////////////////////
// CMainFrame message handlers


///////////////////////////////////////////////////////////////////////////////
//
// "Close" the application.  Actually, we do not close down unless a "quit"  //
// message is posted to us.  What we do is to hide the window and reset the //
// galleries that are being displayed.  (This is done to eliminate the fact  //
// that galleries that are currently being displayed may have been modified  //
// and/or deleted from the database.                                          //
//                                                                            //
///////////////////////////////////////////////////////////////////////////////

void CMainFrame::OnClose()
{
    CActiveApp* pCurApp;

    for (POSITION pos = m_ActiveApps.GetHeadPosition(); pos != NULL; )
      {
        pCurApp = (CActiveApp*) m_ActiveApps.GetNext(pos);
        pCurApp->DeleteContents();
        pCurApp->SetUpGalleries();
      }

    this->ShowWindow(SW_HIDE);
    m_bShowing = FALSE;
    EnablePopupRButton ();
}


//////////////////////////////////////////////////////////////////////////////
//
// Configure the applications.  Invoke the Applications dialog box.         //
//                                                                          //
//////////////////////////////////////////////////////////////////////////////

void CMainFrame::OnConfigureApplications()
{
    CAppDlg dlg;

    int nReturnCode = dlg.DoModal();
}


//////////////////////////////////////////////////////////////////////////////
//
// Set the system settings.  Invoke the dialog box, but populate it with    //
// data so that it will display the current settings.  Also, rebuild the    //
// control record so that the settings will be saved when user selects OK   //
//                                                                          //
//////////////////////////////////////////////////////////////////////////////

void CMainFrame::OnOptionsSettings()
{
    CSettings dlg;
    CControl Control(nDBNumber);

    dlg.m_nAutoRollDelay      = Control.GetRollDelay();
    dlg.m_nRollRate           = Control.GetRollRate();
    dlg.m_lDisplayMin         = Control.GetDisplayMin();
    dlg.m_lDisplayMax         = Control.GetDisplayMax();
    dlg.m_lMouseIdleTime      = Control.GetIdleMouse();
    dlg.m_nLeftMouseFunction  = Control.GetLeftButtonAction();
    dlg.m_nIdleMouseFunction  = Control.GetIdleMouseAction();
    dlg.m_lScreenSaverDelay   = Control.GetScreenSaverDelay();
    dlg.m_lTimeSlice          = Control.GetTimeSlice();

    int nReturnCode = dlg.DoModal();

    if (nReturnCode == IDOK)
      {
        Control.SetRollRate           (dlg.m_nRollRate);
        Control.SetRollDelay          (dlg.m_nAutoRollDelay);
        Control.SetDisplayMin         (dlg.m_lDisplayMin);
        Control.SetDisplayMax         (dlg.m_lDisplayMax);
        Control.SetIdleMouse          (dlg.m_lMouseIdleTime);
        Control.SetIdleMouseAction    (dlg.m_nIdleMouseFunction);
        Control.SetLeftButtonAction   (dlg.m_nLeftMouseFunction);
        Control.SetScreenSaverDelay   (dlg.m_lScreenSaverDelay);
        Control.SetTimeSlice          (dlg.m_lTimeSlice);
```

MAINFRM.CPP 10-3-94 2:26p printed Oct 03, 1994 at 14:26

```

        // Assume that the display minimums and maximums are changing

        m_lMinDisplay = Control.GetDisplayMin();
        m_lMaxDisplay = Control.GetDisplayMax();

        CActiveApp* pCurApp = NULL;

        for (POSITION pos = m_ActiveApps.GetHeadPosition(); pos != NULL;)
          {
            pCurApp = (CActiveApp*) m_ActiveApps.GetNext(pos);
            pCurApp->SetDisplayMinMax(m_lMinDisplay, m_lMaxDisplay);
          }
      }
}


/////////////////////
//                 //
// Delete a gallery //
//                 //
/////////////////////

void CMainFrame::OnFileDeleteGallery()
{
    CChooseGallery dlg;

    int nReturnCode = dlg.DoModal();

    if ((nReturnCode == IDOK) && (dlg.m_nCurSel != LB_ERR))
      {
        CGalleryDoc* GalleryDoc = new CGalleryDoc;
        GalleryDoc->OnOpenDocument(dlg.m_CSGallery);
        GalleryDoc->DeleteGallery();
        delete GalleryDoc;
      }
}


////////////////////////
//                    //
// Delete a photograph //
//                    //
////////////////////////

void CMainFrame::OnFileDeletePhoto()
{
    m_sAction = ACTION_DELETE;
    BOOL bReturn = BrowseImageFiles(AfxGetApp()->m_pMainWnd->m_hWnd);
}


/////////////////////
//                 //
// Export a gallery //
//                 //
/////////////////////

void CMainFrame::OnFileExportGallery()
{
    // Get the name of the file to write the backup to.

    int             nRecType;
    int             nRetCode;
    DB_ADDR         dba;
    CFile           File;
    CFileException  Exception;
    CString         csTemp;


    csTemp.LoadString (IDS_BACKUP_FILTER);
    CFileDialog dlg (FALSE, "fab", "*.fab", OFN_HIDEREADONLY | OFN_OVERWRITEPROMPT, csTemp);

    if (dlg.DoModal () != IDOK)
      return;

    if (!File.Open (dlg.GetPathName (), CFile::modeCreate | CFile::modeWrite | CFile::typeBinary, &Exception))
      {
        CString csErrorMessage;

        AfxFormatString1 (csErrorMessage, IDS_BACKUP_OPEN, dlg.GetPathName ());
        AfxMessageBox (csErrorMessage);
        return;
      }


    // In the following code sections, blocking is used to minimize the
    // stack usage.

    // Write out the control record

    {
        struct Control stControl;

        nRecType = 1;
        File.Write (&nRecType, sizeof( int ));

        d_recfrst (CONTROL, nDBNumber);
        d_recread (&stControl, nDBNumber);
        File.Write (&stControl.usVersionMajor,      sizeof( int ));
```

Page 2 of 8

ICT4PRINT

```
        File.Write (&stControl.usVersionMinor,      sizeof( int ));
        File.Write (&stControl.usRollRate,          sizeof( int ));
        File.Write (&stControl.usRollDelay,         sizeof( int ));
        File.Write (&stControl.usShowBigRegion,     sizeof( int ));
        File.Write (&stControl.usAutoRoll,          sizeof( int ));
        File.Write (&stControl.usClickAction,       sizeof( int ));
        File.Write (&stControl.usIdleAction,        sizeof( int ));
        File.Write (&stControl.lIdleMouse,          sizeof( long ));
        File.Write (&stControl.lDisplayMin,         sizeof( long ));
        File.Write (&stControl.lDisplayMax,         sizeof( long ));
        File.Write (&stControl.lScreenSaverDelay,   sizeof( long ));
        File.Write (&stControl.lSSDisplayMin,       sizeof( long ));
        File.Write (&stControl.lSSDisplayMax,       sizeof( long ));
        File.Write (&stControl.lTimeSlice,          sizeof( long ));
    }


    // Write out the Application Records

    {
        struct Application stApp;

        nRecType = 2;

        for (nRetCode = d_recfrst(APPLICATION, nDBNumber);
             nRetCode == S_OKAY;
             nRetCode = d_recnext(nDBNumber))
          {
            nRetCode = d_recread(&stApp, nDBNumber);
            File.Write (&nRecType, sizeof( int ));
            d_crget(&dba, nDBNumber);
            File.Write (&dba, sizeof( long ));
            StringWrite (File, stApp.szTitle);
            File.Write (&stApp.usFlags, sizeof( int ));
          }
    }


    // Write out the Gallery Records

    {
        struct Gallery stGal;

        nRecType = 3;

        for (nRetCode = d_recfrst(GALLERY, nDBNumber);
             nRetCode == S_OKAY;
             nRetCode = d_recnext(nDBNumber))
          {
            nRetCode = d_recread(&stGal, nDBNumber);
            File.Write (&nRecType, sizeof( int ));
            d_crget(&dba, nDBNumber);
            File.Write (&dba, sizeof( long ));
            StringWrite (File, stGal.szDesc);
            File.Write (&stGal.usFlags,          sizeof( int ));
            File.Write (&stGal.usDisplayFlags,   sizeof( int ));
            File.Write (&stGal.lMinDisplayTime,  sizeof( long ));
            File.Write (&stGal.lMaxDisplayTime,  sizeof( long ));
          }
    }


    // Write out the Photo Records

    {
        struct Photo stPhoto;

        nRecType = 4;

        for (nRetCode = d_recfrst(PHOTO, nDBNumber);
             nRetCode == S_OKAY;
             nRetCode = d_recnext(nDBNumber))
          {
            File.Write (&nRecType, sizeof( int ));
            nRetCode = d_recread(&stPhoto, nDBNumber);
            d_crget(&dba, nDBNumber);
            File.Write (&dba, sizeof( long ));
            StringWrite (File, stPhoto.szTitle);
            StringWrite (File, stPhoto.szPhotoPath);
            StringWrite (File, stPhoto.szPhotoFileName);
            StringWrite (File, stPhoto.szThumbPath);
            StringWrite (File, stPhoto.szThumbFileName);
            StringWrite (File, stPhoto.szFastLoadPath);
            StringWrite (File, stPhoto.szFastLoadFileName);
            File.Write (&stPhoto.usFlags,            sizeof( int ));
            File.Write (&stPhoto.lMinDisplayTime,    sizeof( long ));
            File.Write (&stPhoto.lMaxDisplayTime,    sizeof( long ));
            File.Write (&stPhoto.sPhotoLeft,         sizeof( int ));
            File.Write (&stPhoto.sPhotoTop,          sizeof( int ));
            File.Write (&stPhoto.sPhotoRight,        sizeof( int ));
            File.Write (&stPhoto.sPhotoBottom,       sizeof( int ));
            File.Write (&stPhoto.sThumbLeft,         sizeof( int ));
            File.Write (&stPhoto.sThumbTop,          sizeof( int ));
            File.Write (&stPhoto.sThumbRight,        sizeof( int ));
            File.Write (&stPhoto.sThumbBottom,       sizeof( int ));
            File.Write (&stPhoto.sCropLeft,          sizeof( int ));
            File.Write (&stPhoto.sCropTop,           sizeof( int ));
            File.Write (&stPhoto.sCropRight,         sizeof( int ));
            File.Write (&stPhoto.sCropBottom,        sizeof( int ));
            File.Write (&stPhoto.sDisplayScale,      sizeof( int ));
```

```
          }
    }


    // Write out the Application-Gallery intersect records
    // Do not write out the DBA of these records, only write out the
    // DBAs of the owner records.

    nRecType = 5;

    for (nRetCode = d_recfrst(APPLICATIONGALLERYINT, nDBNumber);
         nRetCode == S_OKAY;
         nRetCode = d_recnext(nDBNumber))
      {
        File.Write (&nRecType, sizeof( int ));
        nRetCode = d_setor (APPLICATIONGALLERYINTSET, nDBNumber);
        nRetCode = d_csoget (APPLICATIONGALLERYINTSET, &dba, nDBNumber);
        File.Write (&dba, sizeof( long ));

        nRetCode = d_setor (GALLERYAPPLICATIONINTSET, nDBNumber);
        nRetCode = d_csoget (GALLERYAPPLICATIONINTSET, &dba, nDBNumber);
        File.Write (&dba, sizeof( long ));
      }


    // Write out the Gallery-Photov Intersect records
    // Do not write out the DBA of these records, only write out the
    // DBAs of the owner records.

    nRecType = 6;

    for (nRetCode = d_recfrst(GALLERYPHOTOINT, nDBNumber);
         nRetCode == S_OKAY;
         nRetCode = d_recnext(nDBNumber))
      {
        File.Write (&nRecType, sizeof( int ));
        nRetCode = d_setor (GALLERYPHOTOINTSET, nDBNumber);
        nRetCode = d_csoget (GALLERYPHOTOINTSET, &dba, nDBNumber);
        File.Write (&dba, sizeof( long ));

        nRetCode = d_setor (PHOTOGALLERYINTSET, nDBNumber);
        nRetCode = d_csoget (PHOTOGALLERYINTSET, &dba, nDBNumber);
        File.Write (&dba, sizeof( long ));
      }


    // This is in effect the writing of an EOF mark.  RecType 99 is not
    // really a record, but is the EOF indicator.  This is done this way
    // to simplify the reading back, and to allow the read back to verify
    // that the data was completely and correctly read.

    nRecType = 99;
    File.Write (&nRecType, sizeof( int ));
}


//////////////////////
//                  //
// Import a gallery //
//                  //
//////////////////////

void CMainFrame::OnFileImportGallery()
{
    // Get the name of the file to read the backup from.

    CString         csTemp;
    int             nRecType;
    int             nRetCode;
    DB_ADDR         dba;
    DB_ADDR         dba2;
    CObList         listApp;
    CObList         listGal;
    CObList         listPhoto;
    CSchemaRec*     pcsr;
    CFile           File;
    CFileException  Exception;


    csTemp.LoadString (IDS_BACKUP_FILTER);
    CFileDialog dlg (TRUE, "fab", "*.fab", OFN_HIDEREADONLY | OFN_OVERWRITEPROMPT, csTemp);

    if (dlg.DoModal () != IDOK)
      return;

    if (!File.Open (dlg.GetPathName (), CFile::modeRead | CFile::typeBinary, &Exception))
      {
        CString csErrorMessage;

        AfxFormatString1 (csErrorMessage, IDS_BACKUP_OPEN, dlg.GetPathName ());
        AfxMessageBox (csErrorMessage);
        return;
      }


    // Make darn sure that the user knows what they are doing!

    if (AfxMessageBox (IDS_RESTORE_DB, MB_YESNO) == IDNO)
      return;
```

```
    // How to initialize the database and load the minimum default values
    // Note that the following chunks of code are blocked to minimize
    // the use of the stack.

    d_initialize(nDBNumber);
    d_trbegin ("RestoreGallery");

    // Read in the control record

    {
        struct Control stControl;

        File.Read (&nRecType, sizeof( int ));

        if (nRecType != 1)
          {
            AfxMessageBox (IDS_RESTORE_ERROR01, MB_ICONEXCLAMATION);
            d_trabort();
            return;
          }

        File.Read (&stControl.usVersionMajor,       sizeof( int ));
        File.Read (&stControl.usVersionMinor,       sizeof( int ));

        if (stControl.usVersionMajor != 1)
          {
            AfxMessageBox (IDS_RESTORE_ERROR02, MB_ICONEXCLAMATION);
            d_trabort();
            return;
          }

        File.Read (&stControl.usRollRate,           sizeof( int ));
        File.Read (&stControl.usRollDelay,          sizeof( int ));
        File.Read (&stControl.usShowSigRegion,      sizeof( int ));
        File.Read (&stControl.usAutoRoll,           sizeof( int ));
        File.Read (&stControl.usClickAction,        sizeof( int ));
        File.Read (&stControl.usIdleAction,         sizeof( int ));
        File.Read (&stControl.lIdleMouse,           sizeof( long ));
        File.Read (&stControl.lDisplayMin,          sizeof( long ));
        File.Read (&stControl.lDisplayMax,          sizeof( long ));
        File.Read (&stControl.lScreenSaverDelay,    sizeof( long ));
        File.Read (&stControl.lSSDisplayMin,        sizeof( long ));
        File.Read (&stControl.lSSDisplayMax,        sizeof( long ));
        File.Read (&stControl.lTimeSlice,           sizeof( long ));
        nRetCode = d_fillnew (CONTROL, &stControl, nDBNumber);
    }


    // Read the Application records

    {
        struct Application  stApp;

        File.Read (&nRecType, sizeof( int ));

        while (nRecType == 2 && nRetCode == S_OKAY)
          {
            File.Read (&dba, sizeof( long ));
            StringRead (File, stApp.szTitle);
            File.Read (&stApp.usFlags, sizeof( int ));
            nRetCode = d_fillnew (APPLICATION, &stApp, nDBNumber);
            d_crget (&dba2, nDBNumber);

            listApp.AddTail (new CSchemaRec (nRecType, dba, dba2));

            nRecType == -1;
            File.Read (&nRecType, sizeof( int ));
          }
    }


    // Read the Gallery records

    {
        struct Gallery stGal;

        while (nRecType == 3 && nRetCode == S_OKAY)
          {
            File.Read (&dba, sizeof( long ));
            StringRead (File, stGal.szDesc);
            File.Read (&stGal.usFlags, sizeof( int ));
            File.Read (&stGal.usDisplayFlags,   sizeof( int ));
            File.Read (&stGal.lMinDisplayTime,  sizeof( long ));
            File.Read (&stGal.lMaxDisplayTime,  sizeof( long ));
            nRetCode = d_fillnew (GALLERY, &stGal, nDBNumber);
            d_crget (&dba2, nDBNumber);

            listGal.AddTail (new CSchemaRec (nRecType, dba, dba2));

            nRecType == -1;
            File.Read (&nRecType, sizeof( int ));
          }
    }


    // Read the Photo records

    {
        struct Photo stPhoto;

        while (nRecType == 4 && nRetCode == S_OKAY)
          {
            File.Read (&dba, sizeof( long ));
            StringRead (File, stPhoto.szTitle);
            StringRead (File, stPhoto.szPhotoPath);
            StringRead (File, stPhoto.szPhotoFileName);
            StringRead (File, stPhoto.szThumbPath);
            StringRead (File, stPhoto.szThumbFileName);
            StringRead (File, stPhoto.szFastLoadPath);
            StringRead (File, stPhoto.szFastLoadFileName);
            File.Read (&stPhoto.usFlags,            sizeof( int ));
            File.Read (&stPhoto.lMinDisplayTime,    sizeof( long ));
            File.Read (&stPhoto.lMaxDisplayTime,    sizeof( long ));
            File.Read (&stPhoto.sPhotoLeft,         sizeof( int ));
            File.Read (&stPhoto.sPhotoTop,          sizeof( int ));
            File.Read (&stPhoto.sPhotoRight,        sizeof( int ));
            File.Read (&stPhoto.sPhotoBottom,       sizeof( int ));
            File.Read (&stPhoto.sThumbLeft,         sizeof( int ));
            File.Read (&stPhoto.sThumbTop,          sizeof( int ));
            File.Read (&stPhoto.sThumbRight,        sizeof( int ));
            File.Read (&stPhoto.sThumbBottom,       sizeof( int ));
            File.Read (&stPhoto.sCropLeft,          sizeof( int ));
            File.Read (&stPhoto.sCropTop,           sizeof( int ));
            File.Read (&stPhoto.sCropRight,         sizeof( int ));
            File.Read (&stPhoto.sCropBottom,        sizeof( int ));
            File.Read (&stPhoto.sDisplayScale,      sizeof( int ));
            nRetCode = d_fillnew (PHOTO, &stPhoto, nDBNumber);
            d_crget (&dba2, nDBNumber);

            listPhoto.AddTail (new CSchemaRec (nRecType, dba, dba2));

            nRecType == -1;
            File.Read (&nRecType, sizeof( int ));
          }
    }


    // Process the Application - Gallery Intersect Records

    while (nRecType == 5 && nRetCode == S_OKAY)
      {
        File.Read (&dba, sizeof( long ));    // ApplicationGalleryIntSet
        pcsr = FindDBAOld (listApp, dba);
        ASSERT (pcsr != NULL);
        nRetCode = d_csoset (APPLICATIONGALLERYINTSET, &pcsr->m_dbaNew, nDBNumber);

        File.Read (&dba, sizeof( long ));    // GalleryApplicationIntSet
        pcsr = FindDBAOld (listGal, dba);
        ASSERT (pcsr != NULL);
        nRetCode = d_csoset (GALLERYAPPLICATIONINTSET, &pcsr->m_dbaNew, nDBNumber);

        nRetCode = d_makenew (APPLICATIONGALLERYINT, nDBNumber);
        nRetCode = d_connect (APPLICATIONGALLERYINTSET, nDBNumber);
        nRetCode = d_connect (GALLERYAPPLICATIONINTSET, nDBNumber);

        nRecType == -1;
        File.Read (&nRecType, sizeof( int ));
      }


    // Process the Gallery - Photo Intersect Records

    while (nRecType == 6 && nRetCode == S_OKAY)
      {
        File.Read (&dba, sizeof( long ));    // GalleryPhotoIntSet

        pcsr = FindDBAOld (listGal, dba);
        ASSERT (pcsr != NULL);
        nRetCode = d_csoset (GALLERYPHOTOINTSET, &pcsr->m_dbaNew, nDBNumber);

        File.Read (&dba, sizeof( long ));    // PhotoGalleryIntSet
        pcsr = FindDBAOld (listPhoto, dba);
        ASSERT (pcsr != NULL);
        nRetCode = d_csoset (PHOTOGALLERYINTSET, &pcsr->m_dbaNew, nDBNumber);

        nRetCode = d_makenew (GALLERYPHOTOINT, nDBNumber);
        nRetCode = d_connect (PHOTOGALLERYINTSET, nDBNumber);
        nRetCode = d_connect (GALLERYPHOTOINTSET, nDBNumber);

        nRecType == -1;
        File.Read (&nRecType, sizeof( int ));
      }


    d_trend();
    ASSERT (nRecType == 99);          // Verify that read is correct.

    // Delete the lists of objects used for the import

    while (!listApp.IsEmpty())
      delete listApp.RemoveTail();

    while (!listGal.IsEmpty())
      delete listGal.RemoveTail();

    while (!listPhoto.IsEmpty())
      delete listPhoto.RemoveTail();
}
```

ICI 4PRINT

```
///////////////////////////////////////////////////////////////////
//                                                               //
// Configure the screen saver.  This could be called directly or via //
// the message that is sent from the screen saver application itself //
//                                                               //
///////////////////////////////////////////////////////////////////

LRESULT CMainFrame::OnScreenSaveConfig (WPARAM wParam, LPARAM lParam)
{
    OnScreenSaver();
    return 0;
}


//////////////////////////////////////
//                                  //
// Handle the Screen Saver dialog box //
//                                  //
//////////////////////////////////////

void CMainFrame::OnScreenSaver()
{
    CScreenSaver dlg;
    CControl Control(nDBNumber);

    dlg.m_lDisplayMin   = Control.GetSSDisplayMin();
    dlg.m_lDisplayMax   = Control.GetSSDisplayMax();
    int nReturnCode     = dlg.DoModal();
    Control.SetSSDisplayMin(dlg.m_lDisplayMin);
    Control.SetSSDisplayMax(dlg.m_lDisplayMax);
}

///////////////////////////////////////////////////////////////////
//                                                               //
// Handle Timer Messages                                         //
//                                                               //
// Two conditions are handled here:                              //
//                                                               //
//    1.  When the minute has changed, then update the captions  //
//                                                               //
//    2.  When any applications's timer has expired, then show the //
//        next photograph in the sequence.                       //
//                                                               //
///////////////////////////////////////////////////////////////////

void CMainFrame::OnTimer(UINT nIDEvent)
{
    CActiveApp* pCurApp;
    struct tm   ptmTime;
    time_t      tmTime;
    CString     csPhotoName;


    // Look for a change in the minute and update the apps as necessary.

    time (&tmTime);
    ptmTime = localtime (&tmTime);

    if (m_nMinute != ptmTime->tm_min)
      {
        m_nMinute = ptmTime->tm_min;
        UpdateCaptions();
      }


    // If the user interface is currently active, don't change photos.

    if (m_bShowing)
      {
        CMDIFrameWnd::OnTimer(nIDEvent);
        return;
      }

    // Scan the list of active applications and handle time outs.

    for (POSITION pos = m_ActiveApps.GetHeadPosition(); pos != NULL; )
      {
        pCurApp = (CActiveApp*) m_ActiveApps.GetNext(pos);

        if (pCurApp->TimedOut())
          {
            if (pCurApp->GetNextPhoto(csPhotoName))
              {
                HANDLE          hFABitmapInfo;
                LPFABITMAPINFO  lpFABitmapInfo;

                pCurApp->ResetTime();
                hFABitmapInfo  = GlobalAlloc (GHND, sizeof (FABITMAPINFO));
                lpFABitmapInfo = (LPFABITMAPINFO) GlobalLock (hFABitmapInfo);
                lpFABitmapInfo->wFlags          = FAB_REPLACE;
                lpFABitmapInfo->hWnd            = pCurApp->GetAppWnd();
                lpFABitmapInfo->hWndPopup       = pCurApp->GetPopupWnd();
                lpFABitmapInfo->nPopupWndWidth  = 0;     /* Use default width */
                lpFABitmapInfo->nPopupWndHeight = 0;     /* Use default height */
                lpFABitmapInfo->nPopupWndPosSU  = 0;     /* Return pos of 0 to DLL */
                lstrcpy (lpFABitmapInfo->szBuffer, csPhotoName);

                ::PostMessage (lpFABitmapInfo->hWnd,
                               m_unRollupMessage,
                               ROLLUP,                 /* Rollup the existing window */
                               MAKELPARAM (hFABitmapInfo, 0));

                GlobalUnlock (hFABitmapInfo);
              }
          }
      }

    CMDIFrameWnd::OnTimer(nIDEvent);
}


///////////////////////////////////////////////////
//                                               //
// Initialize the Database at the user's request. //
//                                               //
///////////////////////////////////////////////////

void CMainFrame::OnToolsInitDb()
{
    if (AfxMessageBox (IDS_INIT_DB, MB_YESNO) == IDNO)
      return;

    // Now to initialize the database and load the minimum default values
    // Note that the following chunks of code are blocked to minimize
    // the use of the stack.

    CString CSTemp;

    d_initialize(nDBNumber);

    // Build the Default Control Record

    {
        struct Control stControl;

        memset (&stControl, '\0', sizeof (stControl));
        stControl.usVersionMajor    = 1;
        stControl.usVersionMinor    = 23;
        stControl.usRollRate        = 3;
        stControl.usRollDelay       = 12;
        stControl.usShowSigRegion   = 1;
        stControl.lIdleMouse        = 750;
        stControl.lDisplayMin       = 30;
        stControl.lDisplayMax       = 90;
        stControl.lTimeSlice        = 5000;
        d_fillnew (CONTROL, &stControl, nDBNumber);
    }


    // Build the Default Application Record

    {
        struct Application stApp;

        memset (&stApp, '\0', sizeof (stApp));
        stApp.usFlags |= NO_DELETE;
        CSTemp.LoadString (IDS_APP_NAME_DEFAULT);
        strcpy (stApp.szTitle, CSTemp);
        d_fillnew (APPLICATION, &stApp, nDBNumber);
    }


    // Build the Default Gallery Record

    {
        struct Gallery stGal;

        memset (&stGal, '\0', sizeof (stGal));
        stGal.usFlags |= NO_DELETE;
        CSTemp.LoadString (IDS_GALLERY_NAME_RANDOM);
        strcpy (stGal.szDesc, CSTemp);
        d_fillnew (GALLERY, &stGal, nDBNumber);
    }
}


//////////////////////////////////////////////////
//                                              //
// Remove the thumbnails from the specified disk //
//                                              //
//////////////////////////////////////////////////

void CMainFrame::OnToolsRemoveThumbs()
{
    CRemoveDlg dlg;

    int nReturnCode = dlg.DoModal();

    if (nReturnCode == IDCANCEL)
      return;

    CString csMessage;

    AfxFormatString1 (csMessage, IDS_REMOVE_THUMBS, dlg.m_csDrive);

    if (AfxMessageBox (csMessage, MB_YESNO) == IDNO)
```

```
        return;

    // Recurse down thru the system on all disk drives.

    csMessage = dlg.m_csDrive + ":";
    FindThumbs (csMessage);
}


/*****************************************************************************/
/*                                                                           */
/*  Internal Functions.  These are local to the CMainFrame class             */
/*                                                                           */
/*****************************************************************************/

//////////////////////////////////////////////////////////////////////////////
// Routine to recurse through the directory on a disk and find all of the   //
// thumbnail sketch directories.  As it finds each one, then call a routine //
// to blast all of the contents of those directories.                       //
//////////////////////////////////////////////////////////////////////////////

void CMainFrame::FindThumbs
        (
            CString csPath
        )
{
    struct find_t ft;

    CString csNewPath = csPath + "\\*.*";
    int nRetCode = _dos_findfirst (csNewPath, _A_SUBDIR, &ft);

    while (nRetCode == 0)
      {
        if ((ft.attrib & _A_SUBDIR) && strcmp (ft.name, ".") && strcmp (ft.name, ".."))
          {
            FindThumbs (csPath + "\\" + ft.name);

            if (strcmpi (ft.name, "THMBNAIL") == 0)      // Found one!
              BlastThumbs (csPath + "\\" + ft.name);
          }

        nRetCode = _dos_findnext (&ft);
      }
}


//////////////////////////////////////////////////////////////////////////////
// Routine to delete the contents of the given directory and then delete the //
// directory itself.                                                         //
//////////////////////////////////////////////////////////////////////////////

void CMainFrame::BlastThumbs
        (
            CString csPath
        )
{
    struct find_t ft;

    CString csNewPath = csPath + "\\*.ddb";
    int nRetCode = _dos_findfirst (csNewPath, _A_NORMAL, &ft);

    while (nRetCode == 0)
      {
        remove (csPath + "\\" + ft.name);
        nRetCode = _dos_findnext (&ft);
      }

    rmdir (csPath);
}


//////////////////////////////////////////////////////////////////////////////
//                                                                          //
// Routine to search a list of objects for an old DBA and return a pointer //
// to a CSchemaRec object that contains the correct result.                //
//                                                                          //
//////////////////////////////////////////////////////////////////////////////

CSchemaRec* CMainFrame::FindDBAOld
        (
            CObList& list,
            DB_ADDR dba
        )
{
    POSITION    pos;
    CSchemaRec* pcsr;

    for (pos = list.GetHeadPosition(); pos != NULL;)
      {
        pcsr = (CSchemaRec*) list.GetNext (pos);

        if (pcsr->m_dbaOld == dba)
          return pcsr;;
      }

    return NULL;
}


////////////////////////////////////////////////
//                                            //
// Routine to read a string from the input file //
//                                            //
////////////////////////////////////////////////

void CMainFrame::StringRead
        (
            CFile& File,
            char *szString
        )
{
    int nStringLen;

    File.Read (&nStringLen, sizeof( int ));
    File.Read (szString, nStringLen);
    szString[nStringLen] = '\0';
}


////////////////////////////////////////////////
//                                            //
// Routine to write a string to the output file //
//                                            //
////////////////////////////////////////////////

void CMainFrame::StringWrite
        (
            CFile& File,
            char *szString
        )
{
    int nStringLen = strlen (szString);
    File.Write (&nStringLen, sizeof( int ));
    File.Write (szString, nStringLen);
}


/*****************************************************************************/
/*                                                                           */
/*          E X T E R N A L   M E S S A G E   P R O C E S S I N G            */
/*                                                                           */
/*****************************************************************************/


//////////////////////////////////////////////////////////////////////////////
//                                                                          //
// Handle the message from Browse when a photo is selected for processing //
//                                                                          //
//////////////////////////////////////////////////////////////////////////////

LRESULT CMainFrame::OnBrowseFileOpen
        (
            WPARAM wParam,
            LPARAM lParam
        )
{
    CString CSFileMessage;

    AfxFormatString1 (CSFileMessage, IDS_FILE_MESSAGE, (LPSTR) lParam);

    switch (m_sAction)
      {
        case ACTION_DELETE:
          CSFileMessage = CSFileMessage + " Action is DELETE";
          break;

        case ACTION_ADD_TO_GALLERY:
          CSFileMessage = CSFileMessage + " Action is ADD_TO_GALLERY";
          break;

        case ACTION_OPEN:
          CSFileMessage = CSFileMessage + " Action is OPEN";
          break;
      }


    AfxMessageBox (CSFileMessage);
    return 1;
}


//////////////////////////////////////////////////////////////////////////////
//                                                                          //
// This is where the actual work gets done.  This is the guy that receives  //
// the next photo, renders it, and notifies the DLL that the photo is ready. //
//                                                                          //
//////////////////////////////////////////////////////////////////////////////

LRESULT CMainFrame::OnOpenBitmapFile
        (
            WPARAM wParam,  //  wParam - handle to FABITMAPINFO structure
            LPARAM lParam   //  lParam - not used
        )
{
    int             nRet;
    HDC             hDC;
    FILEINFO        FileInfo;
    PROCESSSTRUCT   ProcessImageData;
    HPALETTE        hPictPalette;
    HBITMAP         hDDBPictBitmap;
```

```
    HDIB              hDIPictBitmap;
    LONG              lScaleFactor;
    BITMAPHANDLE      BitmapHandle;
    LPFABITMAPINFO    lpFABitmapInfo;
    CActiveApp*       pCurApp;

    int nScale = 13;
    lpFABitmapInfo = (LPFABITMAPINFO) GlobalLock ((HANDLE) wParam);

    if (lpFABitmapInfo->szBuffer[0] == '\0')
      {
        GlobalUnlock ((HANDLE) wParam);
        return 0;
      }

    hDC = ::GetDC (NULL);  /* Don't forget to release this! */


    // If the application is a new one, then set it up.  Otherwise, find it
    // in the list of active applications.  This *should* never fail.

    if (lpFABitmapInfo->wFlags & FAB_INITIALLOAD)
      {
        CActiveApp* pActiveApp = new CActiveApp (lpFABitmapInfo->hWnd,
                                                 lpFABitmapInfo->hWndPopup,
                                                 lpFABitmapInfo->szBuffer,
                                                 m_lMinDisplay,
                                                 m_lMaxDisplay);

        m_ActiveApps.AddTail (pActiveApp);
        pCurApp = pActiveApp;


        // Get the name of the next photo.

        CString csPhotoName = lpFABitmapInfo->szBuffer;
        pCurApp->GetNextPhoto (csPhotoName);
        lstrcpy (lpFABitmapInfo->szBuffer, csPhotoName);
        pCurApp->ResetTime();
      }


    // At this point, lpFABitmapInfo->szBuffer has name of photo.
    // Render the photo and pass it back to FADLL.

    if ((nRet = L_FileInfo (lpFABitmapInfo->szBuffer, &FileInfo)) != SUCCESS)
      {
        /* May not be a file format this library recognizes.  See if it's a .fif file. */

        ::ReleaseDC (NULL, hDC);
        GlobalUnlock ((HANDLE) wParam);
        return 0;
      }

    nRet = L_LoadBitmap (lpFABitmapInfo->szBuffer, &BitmapHandle, FileInfo.BitsPerPixel, TRUE);

    if (nRet != SUCCESS)
      {
        ::ReleaseDC (NULL, hDC);
        GlobalUnlock ((HANDLE) wParam);
        return 0;
      }

    /* Save the dimensions of the non scalled bitmap. */

    lpFABitmapInfo->nBitmapWidth  = FileInfo.Width;
    lpFABitmapInfo->nBitmapHeight = FileInfo.Height;

    if (lpFABitmapInfo->nPopupWndWidth  != -1 ||
        lpFABitmapInfo->nPopupWndHeight != -1)
      {
        /* If the DLL didn't specify a width or height, compute a default width and height. */

        if (!lpFABitmapInfo->nPopupWndWidth ||
            !lpFABitmapInfo->nPopupWndHeight)
          {
            /* Compute a scalling factor so that the loaded bitmap will be resized to
              to fit on the caption bar. */

            if (FileInfo.Width > FileInfo.Height)
              /* Image is landscape.  Scale such that new width is 13% of screen width. */

              lScaleFactor = ((long) FileInfo.Width * 10000) / (GetSystemMetrics (SM_CXSCREEN) * nScale);
            else
              /* Image is portrait.  Scale such that new height is 13% of screen height. */

              lScaleFactor = ((long) FileInfo.Height * 10000) / (GetSystemMetrics (SM_CYSCREEN) * nScale);

            if (!lScaleFactor)
              lScaleFactor = 100;

            /* Set up for resize. */

            ProcessImageData.nNewWidth  = (short) ( ((long) FileInfo.Width  * 100) / lScaleFactor );
            ProcessImageData.nNewHeight = (short) ( ((long) FileInfo.Height * 100) / lScaleFactor );
          }
        else
          {
            /* Compute a scalling factor so that the loaded bitmap will be resized to
              to fit on the caption bar. */

            if (FileInfo.Width > FileInfo.Height)
               /* Image is landscape.  Scale such that new width equals the specified width. */

              lScaleFactor = ((long) FileInfo.Width * 1000) / lpFABitmapInfo->nPopupWndWidth;
            else
              /* Image is portrait.  Scale such that new height equals the specified height. */

              lScaleFactor = ((long) FileInfo.Height * 1000) / lpFABitmapInfo->nPopupWndHeight;

            /* Set up for resize. */

            ProcessImageData.nNewWidth  = (short) ( ((long) FileInfo.Width  * 1000) / lScaleFactor );
            ProcessImageData.nNewHeight = (short) ( ((long) FileInfo.Height * 1000) / lScaleFactor );
          }

        /* Resize the bitmap */

        if ((nRet = L_ProcessBitmap (&BitmapHandle, RESIZE, &ProcessImageData)) != SUCCESS)
          {
            ::ReleaseDC (NULL, hDC);
            //DebugPrintf ("L_ProcessBitmap (RESIZE) returned %d for file %s", nRet, lpFABitmapInfo->szBuffer)
              ;
            L_FreeBitmap (&BitmapHandle);
            GlobalUnlock ((HANDLE) wParam);
            return 0;
          }
      }

#if 1
        if (TRUE /* fOptimizePalettes */)
          {
            /* Optimize the palette */

            BitmapHandle.DitheringMethod = NO_DITHERING;

            DebugPrintf ("L_ColorResolution");

            nRet = L_ColorResolution (&BitmapHandle, 8, CRF_NEARESTCOLOR | CRF_IDENTITYPALETTE, NULL, NULL);

            if (nRet != SUCCESS)
              {
                ::ReleaseDC (NULL, hDC);
//                DebugPrintf ("L_CopyBitmap returned %d for file %s", nRet, lpFABitmapInfo->szBuffer);
                L_FreeBitmap (&BitmapHandle);
                GlobalUnlock ((HANDLE) wParam);
                return 0;
              }

            /* Create a copy of the palette. */

            DebugPrintf ("L_DupPalette");

            hPictPalette = L_DupPalette (BitmapHandle.hPalette);
          }
        else
#endif
          {
            DebugPrintf ("L_DupPalette");
            hPictPalette = L_DupPalette (BitmapHandle.hFixedPalette);
          }
#if 0
      /* Set up for switch from LEAD bitmap to DDB */

      hpalOld = SelectPalette (hDC, hPictPalette, FALSE);
      RealizePalette (hDC);

      DebugPrintf ("L_ChangeToDDB");

      if (!(hDDPictBitmap = L_ChangeToDDB (hDC, &BitmapHandle)))
        {
          ::ReleaseDC (NULL, hDC);
//          DebugPrintf ("L_ChangeToDDB returned %d for file %s", nRet, lpFABitmapInfo->szBuffer);
          L_FreeBitmap (&BitmapHandle);
          GlobalUnlock ((HANDLE) wParam);
          return 0;
        }

      DebugPrintf ("L_ChangeToDDB done.");

      SelectPalette (hDC, hpalOld, FALSE);
      RealizePalette (hDC);
#endif
      ::ReleaseDC (NULL, hDC);

      DebugPrintf ("L_ChangeToDIB");
      hDIPictBitmap = L_ChangeToDIB (&BitmapHandle);
      DebugPrintf ("DIBToBitmap (in palette.dll)");
      hDDPictBitmap = DIBToBitmap (hDIPictBitmap, hPictPalette);  /* In palette.dll */
      DebugPrintf ("DIBitmap done");
      GlobalFree (hDIPictBitmap);

      /* At this point, hDDPictBitmap contains the handle to a device dependent bitmap and
         hPictPalette is its optimized palette. */

      /* Give to the subclassed application the handles to the
         bitmap and palette. The nPopupWndPosSU field is not
         modified, so the DLL gets back whatever is set that
         field to. */
```

```
    lpFABitmapInfo->hDDPictBitmap    = hDDPictBitmap;
    lpFABitmapInfo->hPictPalette     = hPictPalette;
    lpFABitmapInfo->nPopupWndWidth   = BitmapHandle.Width;
    lpFABitmapInfo->nPopupWndHeight  = BitmapHandle.Height;

    /* Tell the subclassed application that the bitmap is
       ready to display.  The subclassed application can
       get to the FABITMAPINFO structure via the
       hFABitmapInfo field of the instance table. */

    ::PostMessage (lpFABitmapInfo->hWnd,
                   m_uBitmapLoadedMessage,
                   NULL,
                   NULL);

    GlobalUnlock ((HANDLE) wParam);
    return 0;
}


///////////////////////////////////////////////////////////////////////////////
//                                                                           //
// This routine is used to "activate" the application.  Actually, the        //
// application is active all the time.  This merely shows it to the user.    //
// wParam is handle to subclassed application                                //
//                                                                           //
///////////////////////////////////////////////////////////////////////////////

LRESULT CMainFrame::OnUIUnhide
        (
            WPARAM wParam,      // wParam -- Not used
            LPARAM lParam       // lParam -- Not used
        )
{
    this->ShowWindow(SW_SHOW);
    m_bShowing = TRUE;
    return 0;
}
```

1C/14PRINT

```
/* Copyright 1989-1994 FotoAttacher by Michael W. Mast, licensed
   to ProCentric Computer Service, Inc., all rights reserverd.
        Trade secret and patent pending. */

////////////////////////////////////////////////////////////////////////////////
// CPaletteBox class definition

#include "stdafx.h"
#include "photo.h"
#include "palette.h"
#include "palctl.h"

IMPLEMENT_DYNAMIC(CPaletteBox, CListBox)

CPaletteBox::CPaletteBox()
{
    PaletteInit();
}


void CPaletteBox::AddItem(CPhoto* pPhoto)
{
    SendMessage(PM_ADDITEM, 0, (LPARAM) BuildParam(pPhoto));
}


BOOL CPaletteBox::Create(DWORD dwStyle, const RECT& rect, CWnd* pParentWnd, UINT nID)
{
    return CWnd::Create("palette", NULL, dwStyle, rect, pParentWnd, nID);
}


void CPaletteBox::DeleteItem(int nIndex)
{
    SendMessage(PM_DELETEITEM, nIndex, 0);
}


void CPaletteBox::DeleteSelectedItems()
{
    SendMessage(PM_DELETESELECTEDITEMS, 0, 0);
}


void CPaletteBox::DeselectAll()
{
    SendMessage(PM_DESELECTALL, 0, 0);
}


void CPaletteBox::GetItem(int nIndex, CPhoto* pPhoto)
{
    PALPARM PaletteParm;

    SendMessage(PM_GETITEM, nIndex, (LPARAM) (void far*) &PaletteParm);
    pPhoto->PopulatePhoto(PaletteParm.photo, PaletteParm.db_addr);
}


void CPaletteBox::InsertItem(int nIndex, CPhoto* pPhoto)
{
    SendMessage(PM_INSERTITEM, nIndex, (LPARAM) BuildParam(pPhoto));
}


void CPaletteBox::PasteItem(CPhoto* pPhoto)
{
//  SendMessage(PM_PASTEITEM, 0, (LPARAM) BuildParam(pPhoto));
    SendMessage(PM_ADDITEM, 0, (LPARAM) BuildParam(pPhoto));
}


void CPaletteBox::RecreateThumbnails()
{
    SendMessage(PM_RECREATETHUMBNAILS, 0, 0);
}


void CPaletteBox::SelectAll()
{
    SendMessage(PM_SELECTALL, 0, 0);
}


////////////////////////////////////////////////////////////////////////
// Build the parameter for the list

LPPALPARM CPaletteBox::BuildParam(CPhoto* pPhoto)
{
    PALPARM PaletteParm;

    m_PaletteParm.db_addr = pPhoto->GetDBA();
    m_PaletteParm.photo = pPhoto->GetStruct();
    PaletteParm = m_PaletteParm;
    return &m_PaletteParm;
}
```

PALCTL.CPP 10-3-94 2:26p printed Oct 03, 1994 at 14:26

```
/* Copyright 1989-1994 FotoAttacher by Michael B. Mast, licensed
   to ProCentric Computer Service, Inc., all rights reserverd.
         Trade secret and patent pending. */

///////////////////////////////////////////////////////////////////////////////
// Class CPhoto

#include "stdafx.h"
#include "photo.h"

IMPLEMENT_SERIAL(CPhoto, CObject, 0);

CPhoto::CPhoto()
{
}


CPhoto::CPhoto(struct Photo& stPhoto, DB_ADDR dba)
{
    PopulatePhoto (stPhoto, dba);
}


void CPhoto::PopulatePhoto (struct Photo& stPhoto, DB_ADDR dba)
{
    CRect rect;

    SetTitle            (stPhoto.szTitle);
    SetFileName         (stPhoto.szPhotoFileName);
    SetFilePath         (stPhoto.szPhotoPath);
    SetThumbFileName    (stPhoto.szThumbFileName);
    SetThumbFilePath    (stPhoto.szThumbPath);
    SetFlags            (stPhoto.usFlags);

    rect.SetRect(stPhoto.sPhotoLeft, stPhoto.sPhotoTop, stPhoto.sPhotoRight, stPhoto.sPhotoBottom);
    SetPosition (rect);

    rect.SetRect(stPhoto.sThumbLeft, stPhoto.sThumbTop, stPhoto.sThumbRight, stPhoto.sThumbBottom);
    SetThumb (rect);

    rect.SetRect(stPhoto.sCropLeft, stPhoto.sCropTop, stPhoto.sCropRight, stPhoto.sCropBottom);
    SetCrop (rect);

    SetDisplayScale (stPhoto.sDisplayScale);
    SetDBA(dba);
}


void CPhoto::SetTitle (char* szTitle)
{
    m_CSTitle = szTitle;
}


void CPhoto::SetFileName (char* szPhotoFileName)
{
    m_CSPhotoFileName = szPhotoFileName;
}


void CPhoto::SetFilePath (char* szPhotoPath)
{
    m_CSPhotoPath = szPhotoPath;
}


void CPhoto::SetThumbFileName (char* szThumbFileName)
{
    m_CSThumbFileName = szThumbFileName;
}


void CPhoto::SetThumbFilePath (char* szThumbPath)
{
    m_CSThumbPath = szThumbPath;
}


void CPhoto::SetFlags (UINT usFlags)
{
    m_usFlags = usFlags;
}


void CPhoto::SetPosition (CRect rect)
{
    m_rectPosition = rect;
}


void CPhoto::SetThumb (CRect rect)
{
    m_rectThumb = rect;
}


void CPhoto::SetCrop (CRect rect)
{
    m_rectCrop = rect;
}



void CPhoto::SetDisplayScale (short sDisplayScale)
{
    m_sDisplayScale = sDisplayScale;
}


struct Photo CPhoto::GetStruct()
{
    struct Photo stPhoto;

    strcpy (stPhoto.szTitle,            m_CSTitle);
    strcpy (stPhoto.szPhotoFileName,    m_CSPhotoFileName);
    strcpy (stPhoto.szPhotoPath,        m_CSPhotoPath);
    strcpy (stPhoto.szThumbFileName,    m_CSThumbFileName);
    strcpy (stPhoto.szThumbPath,        m_CSThumbPath);
    stPhoto.usFlags = m_usFlags;

    stPhoto.sPhotoLeft      = m_rectPosition.left;
    stPhoto.sPhotoTop       = m_rectPosition.top;
    stPhoto.sPhotoRight     = m_rectPosition.right;
    stPhoto.sPhotoBottom    = m_rectPosition.bottom;

    stPhoto.sThumbLeft      = m_rectThumb.left;
    stPhoto.sThumbTop       = m_rectThumb.top;
    stPhoto.sThumbRight     = m_rectThumb.right;
    stPhoto.sThumbBottom    = m_rectThumb.bottom;

    stPhoto.sCropLeft       = m_rectCrop.left;
    stPhoto.sCropTop        = m_rectCrop.top;
    stPhoto.sCropRight      = m_rectCrop.right;
    stPhoto.sCropBottom     = m_rectCrop.bottom;

    stPhoto.sDisplayScale = m_sDisplayScale;
    return stPhoto;
}


void CPhoto::SetDBA(DB_ADDR dba)
{
    m_dba = dba;
}
```

```
/* Copyright 1989-1994 FotoAttacher by Michael B. Mast, licensed
   to ProCentric Computer Service, Inc., all rights reserverd.
        Trade secret and patent pending. */

// photodoc.cpp : implementation file
//

#include "stdafx.h"
#include "fotoatt.h"
#include "photo.h"
#include "photodoc.h"

extern int nDBNumber;

#ifdef _DEBUG
#undef THIS_FILE
static char BASED_CODE THIS_FILE[] = __FILE__;
#endif

/////////////////////////////////////////////////////////////////////////////
// CPhotoDoc

IMPLEMENT_SERIAL(CPhotoDoc, CDocument, 0 /* schema number*/ )


CPhotoDoc::CPhotoDoc()
{
    SetChangedName(FALSE);
    m_dba = 0;
}


BOOL CPhotoDoc::OnNewDocument()
{
    if (!CDocument::OnNewDocument())
      return FALSE;

    SetChangedName(FALSE);
    m_dba = 0;
    return TRUE;
}


BOOL CPhotoDoc::OnOpenDocument(const char* szPhotoName)
{
    DB_ADDR          dba;
    struct Photo     stPhoto;
    int              nRetCode;
//  CPhoto*          pPhoto;


    // Search for the gallery that was selected.

    nRetCode = d_keyfind(PHOTO_SZTITLE, szPhotoName, nDBNumber);

    if (nRetCode != S_OKAY)
      {
        AfxMessageBox(IDS_PHOTO_MISSING);
        return FALSE;
      }

    SetTitle(szPhotoName);
    d_crget(&dba, nDBNumber);
    SetDBA(dba);
    nRetCode = d_recread(&stPhoto, nDBNumber);
    m_pPhoto = new CPhoto (stPhoto);
    return TRUE;
}


CPhotoDoc::~CPhotoDoc()
{
    delete m_pPhoto;          // ensure that the object is destroyed
}


/////////////////////////////////////////////////////////////////////////////
// File/Path commands

// Lifted from DocCore.cpp, but drops ability to add to MRU list.

void CPhotoDoc::SetPathName(const char* pszPathName, BOOL bAddToMRU)
{
    m_strPathName = pszPathName;
    ASSERT(!m_strPathName.IsEmpty());        // must be set to something

    // Set the document title based on path name

    char szTitle[_MAX_FNAME];

    if (::GetFileTitle(m_strPathName, szTitle, _MAX_FNAME) == 0)
      {
        ::AnsiUpper(szTitle);        // always upper case
        SetTitle(szTitle);
      }
}


/////////////////////////////////////////////////////////////////////////////
// New Functions

void CPhotoDoc::SetChangedName(BOOL bSet)
{
    m_bChangedName = bSet;
}


void CPhotoDoc::SetDBA(DB_ADDR dba)
{
    m_dba = dba;
}


/////////////////////////////////////////////////////////////////////////////
// Function Overrides


BOOL CPhotoDoc::SaveModified()
{
    CString CSTemp = "";

    // Check to see if there is anything in the gallery to save

    if (IsModified())
      {
        AfxFormatString1(CSTemp, IDS_PHOTO_NOT_SAVED, GetTitle());

        switch (AfxMessageBox(CSTemp, MB_YESNOCANCEL))
          {
            case IDYES:
              SavePhoto();
              break;

            case IDCANCEL:
              return FALSE;

            // default action falls through and closes the document.
          }
      }

    return TRUE;
}


BEGIN_MESSAGE_MAP(CPhotoDoc, CDocument)
    //{{AFX_MSG_MAP(CPhotoDoc)
        // NOTE - the ClassWizard will add and remove mapping macros here.
    //}}AFX_MSG_MAP
END_MESSAGE_MAP()


/////////////////////////////////////////////////////////////////////////////
// CPhotoDoc serialization

void CPhotoDoc::Serialize(CArchive& ar)
{
    if (ar.IsStoring())
      {
        // TODO: add storing code here
      }
    else
      {
        // TODO: add loading code here
      }
}

/////////////////////////////////////////////////////////////////////////////
// CPhotoDoc commands

void CPhotoDoc::SavePhoto()
{
}
```

```
/* Copyright 1989-1994 FotoAttacher by Michael B. Mast, licensed
   to ProCentric Computer Service, Inc., all rights reserverd.
         Trade secret and patent pending. */

// photovw.cpp : implementation file
//

#include "stdafx.h"
#include "fotoatt.h"
#include "photo.h"
#include "photodoc.h"
#include "photovw.h"

#ifdef _DEBUG
#undef THIS_FILE
static char BASED_CODE THIS_FILE[] = __FILE__;
#endif

/////////////////////////////////////////////////////////////////////////////
// CPhotovw

IMPLEMENT_DYNCREATE(CPhotovw, CView)

CPhotovw::CPhotovw()
{
}

CPhotovw::~CPhotovw()
{
}


BEGIN_MESSAGE_MAP(CPhotovw, CView)
    //{{AFX_MSG_MAP(CPhotovw)
        // NOTE - the ClassWizard will add and remove mapping macros here.
    //}}AFX_MSG_MAP
END_MESSAGE_MAP()


/////////////////////////////////////////////////////////////////////////////
// CPhotovw drawing

void CPhotovw::OnDraw(CDC* pDC)
{
    CDocument* pDoc = GetDocument();
    // TODO: add draw code here
}

/////////////////////////////////////////////////////////////////////////////
// CPhotovw message handlers
```

```
/* Copyright 1989-1994 FotoAttacher by Michael B. Mast, licensed
   to ProCentric Computer Service, Inc., all rights reserverd.
        Trade secret and patent pending. */

// remove.cpp : implementation file
//

#include "stdafx.h"
#include "fotoatt.h"
#include "remove.h"

#ifdef _DEBUG
#undef THIS_FILE
static char BASED_CODE THIS_FILE[] = __FILE__;
#endif

/////////////////////////////////////////////////////////////////////////////
// CRemoveDlg dialog


CRemoveDlg::CRemoveDlg(CWnd* pParent /*=NULL*/)
    : CDialog(CRemoveDlg::IDD, pParent)
{
    //{{AFX_DATA_INIT(CRemoveDlg)
    m_csDrive = "C";
    //}}AFX_DATA_INIT
}

void CRemoveDlg::DoDataExchange(CDataExchange* pDX)
{
    CDialog::DoDataExchange(pDX);
    //{{AFX_DATA_MAP(CRemoveDlg)
    DDX_Text(pDX, IDC_REMOVE_THUMBS_DRIVE, m_csDrive);
    DDV_MaxChars(pDX, m_csDrive, 1);
    //}}AFX_DATA_MAP
}

BEGIN_MESSAGE_MAP(CRemoveDlg, CDialog)
    //{{AFX_MSG_MAP(CRemoveDlg)
        // NOTE: the ClassWizard will add message map macros here
    //}}AFX_MSG_MAP
END_MESSAGE_MAP()


/////////////////////////////////////////////////////////////////////////////
// CRemoveDlg message handlers
```

```
/* Copyright 1989-1994 FotoAttacher by Michael D. Mast, licensed
   to ProCentric Computer Service, Inc., all rights reserverd.
        Trade secret and patent pending. */

// scrnsvr.cpp : implementation file
//

#include "stdafx.h"
#include "fotoatt.h"
#include "scrnsvr.h"
#include "appitem.h"
#include "validddx.h"
#include <scrnsave.h>

extern int nDBNumber;

#ifdef _DEBUG
#undef THIS_FILE
static char BASED_CODE THIS_FILE[] = __FILE__;
#endif

HINSTANCE _cdecl hMainInstance;
HWND _cdecl hMainWindow;
char _cdecl szName[TITLEBARNAMELEN];
char _cdecl szIsPassword[22];
char _cdecl szIniFile[MAXFILELEN];
char _cdecl szScreenSaver[22];
char _cdecl szPassword[16];
char _cdecl szDifferentPW[BUFFLEN];
char _cdecl szChangePW[30];
char _cdecl szBadOldPW[BUFFLEN];
char _cdecl szHelpFile[MAXFILELEN];
char _cdecl szNoHelpMemory[BUFFLEN];
UINT _cdecl MyHelpMessage;
HOOKPROC _cdecl fpMessageFilter;

/////////////////////////////////////////////////////////////////////////////
// CScreenSaver dialog


CScreenSaver::CScreenSaver(CWnd* pParent /*=NULL*/)
     : CDialog(CScreenSaver::IDD, pParent)
{
     //{{AFX_DATA_INIT(CScreenSaver)
     m_bPasswordProtected = FALSE;
     m_CSMinDisplay = "";
     m_CSMaxDisplay = "";
     m_listGalleries = "";
     GetDlgItem(IDC_SS_SET_PASSWORD)->EnableWindow(m_bPasswordProtected);
     //}}AFX_DATA_INIT
}

void CScreenSaver::DoDataExchange(CDataExchange* pDX)
{
     CDialog::DoDataExchange(pDX);
     //{{AFX_DATA_MAP(CScreenSaver)
     DDX_Check(pDX, IDC_SS_PASSWORD_ACTIVE, m_bPasswordProtected);
     DDX_Text(pDX, IDC_SS_MIN_DISPLAY, m_CSMinDisplay);
     DDV_MaxChars(pDX, m_CSMinDisplay, 12);
     DDX_Text(pDX, IDC_SS_MAX_DISPLAY, m_CSMaxDisplay);
     DDV_MaxChars(pDX, m_CSMaxDisplay, 12);
     DDX_LBString(pDX, IDC_SS_GALLERY_LIST, m_listGalleries);
     //}}AFX_DATA_MAP

     DDX_Time(pDX, IDC_SS_MIN_DISPLAY, m_lDisplayMin);
     DDX_Time(pDX, IDC_SS_MAX_DISPLAY, m_lDisplayMax);

     if (m_lDisplayMin < 1)
       {
         AfxMessageBox(IDS_TIME_MIN);
         pDX->Fail();
       }

     if (m_lDisplayMax == 0)
       m_lDisplayMax = m_lDisplayMin;

     if (m_lDisplayMax < m_lDisplayMin)
       {
         AfxMessageBox(IDS_TIME_MAX);
         pDX->Fail();
       }
}

BEGIN_MESSAGE_MAP(CScreenSaver, CDialog)
     //{{AFX_MSG_MAP(CScreenSaver)
     ON_BN_CLICKED(IDC_EXCLUDE_ALL, OnExcludeAll)
     ON_BN_CLICKED(IDC_INCLUDE_ALL, OnIncludeAll)
     ON_LBN_SELCHANGE(IDC_SS_GALLERY_LIST, OnSelchangeGalleryList)
     ON_BN_CLICKED(IDC_SS_SET_PASSWORD, OnSetPassword)
     ON_BN_CLICKED(IDC_SS_PASSWORD_ACTIVE, OnPasswordActive)
     //}}AFX_MSG_MAP
END_MESSAGE_MAP()


/////////////////////////////////////////////////////////////////////////////
// CScreenSaver message handlers

void CScreenSaver::OnExcludeAll()
{
     CListBox* pLBGal = (CListBox*) GetDlgItem(IDC_SS_GALLERY_LIST);
     int nCount = pLBGal->GetCount();
     pLBGal->SelItemRange(FALSE, 0, nCount - 1);
     m_pScreenSaver->SetModifiedFlag();
     m_pScreenSaver->DeleteContents();
     m_pScreenSaver->SetAllExcluded(TRUE);
}


void CScreenSaver::OnIncludeAll()
{
     CListBox* pLBGal = (CListBox*) GetDlgItem(IDC_SS_GALLERY_LIST);
     int nCount = pLBGal->GetCount();
     pLBGal->SelItemRange(TRUE, 0, nCount - 1);

     if (m_nRandomGalleryIndex != -1)
       pLBGal->SetSel(m_nRandomGalleryIndex, FALSE);

     m_pScreenSaver->SetModifiedFlag();
     m_pScreenSaver->DeleteContents();
     m_pScreenSaver->SetAllExcluded(FALSE);

     for (int i = 0; i < nCount; i++)
       {
         if (m_nRandomGalleryIndex != i)
           m_pScreenSaver->NewGallery(i);
       }
}


void CScreenSaver::OnSelchangeGalleryList()
{
     CListBox* pLBGal = (CListBox*) GetDlgItem(IDC_SS_GALLERY_LIST);

     // When the item selected is the random one, then all others must be
     // deselected.  When the item selected is not the random one, then the
     // random one must be selected.

     int nIndex = pLBGal->GetCurSel();
     int nCount = pLBGal->GetCount();
     m_pScreenSaver->SetModifiedFlag();
     m_pScreenSaver->SetAllExcluded(FALSE);

     if (nIndex == m_nRandomGalleryIndex)
       {
         m_pScreenSaver->DeleteContents();        // Remove all ==> random

         if (m_nRandomGalleryIndex == 0)
           pLBGal->SelItemRange(FALSE, 1, nCount);                      // Random is first, do rest of
               list
         else
           {
             pLBGal->SelItemRange(FALSE, 0, m_nRandomGalleryIndex - 1);         // Do first part of list

             if (m_nRandomGalleryIndex != nCount)
               pLBGal->SelItemRange(FALSE, m_nRandomGalleryIndex + 1, nCount);   // Do last part if random not
                   last
           }

         return;
       }

     if (m_nRandomGalleryIndex > -1)
       {
         pLBGal->SetSel(FALSE, m_nRandomGalleryIndex);    // Clear the random one.
         m_pScreenSaver->RemoveGallery(m_nRandomGalleryIndex);
       }

     if (pLBGal->GetSel(nIndex) == 0)
       m_pScreenSaver->RemoveGallery(nIndex);
     else
       m_pScreenSaver->NewGallery(nIndex);
}


BOOL CScreenSaver::OnInitDialog()
{
     CDialog::OnInitDialog();

     int           nItem;
     int           nRetCode;
     int           nLastGal;
     int           i;
     UINT          uwFlags;
     char          szFieldEntry[100];
     DB_ADDR       dba;
     CListBox*     pLB;
     CString       CSScreenSaverName;


     // This is to provide a valid database number for the entire object.

     CDialog::OnInitDialog();


     // Populate the Gallery list box entries

     // There will only be one "non-delete" gallery.  That will be the Random
     // selection gallery.  Because of this, we will save the index of the
     // random gallery so that it may be used in other routines.  This will
     // make the dialog box processing MUCH more efficient.
```

SCRNSVR.CPP 10-3-94 2:26p printed Oct 03, 1994 at 14:26

Page 1 of 2

1C/14PRINT

```
    // Note that we MUST do the galleries first since the application list
    // needs to be able to refer to this list to determine the indexes of the
    // items to select and deselect.

    CSScreenSaverName.LoadString(IDS_GALLERY_NAME_RANDOM);
    pLB = (CListBox*) GetDlgItem(IDC_SS_GALLERY_LIST);
    nRetCode = d_recfrst(GALLERY, nDBNumber);
    d_crget(&dba, nDBNumber);
    m_nRandomGalleryIndex = -1;

    for (nItem = 0; nRetCode == S_OKAY; nRetCode = d_recnext(nDBNumber))
      {
        d_crread(GALLERY_SZDESC, szFieldEntry, nDBNumber);
        d_crread(GALLERY_USFLAGS, &usFlags, nDBNumber);

        if (CSScreenSaverName == szFieldEntry)
          m_nRandomGalleryIndex = nItem;

        d_crget(&dba, nDBNumber);
        m_Galleries.SetAtGrow(nItem, dba);
        pLB->InsertString(nItem, szFieldEntry);
        pLB->SetItemData(nItem, (DWORD) usFlags);
        nItem++;
      }


    // Populate the Application list box entries

    CSScreenSaverName.LoadString(IDS_APP_NAME_SCREEN_SAVER);
    nRetCode = d_keyfind(APPLICATION_SZTITLE, CSScreenSaverName, nDBNumber);
    d_crget(&dba, nDBNumber);
    d_crread(APPLICATION_SZTITLE, szFieldEntry, nDBNumber);
    d_crread(APPLICATION_USFLAGS, &usFlags,     nDBNumber);
    d_crget(&dba, nDBNumber);
    m_pScreenSaver = new CAppItem(dba, usFlags, szFieldEntry);  // Create an Application Item
    m_pScreenSaver->SetAllExcluded (usFlags & ALL_EXCLUDED);
    m_pScreenSaver->SetLBIndex(nItem);              // Initialize index to list box

    // Now that the application has been found, we need to
    // update it's information so that it reflects the set members on
    // the database.

    if (d_isowner(APPLICATIONGALLERYINTSET, nDBNumber) == S_OKAY)
      {
        d_setor(APPLICATIONGALLERYINTSET, nDBNumber);

        while (d_findnm(APPLICATIONGALLERYINTSET, nDBNumber) == S_OKAY)
          {
            d_findco (GALLERYAPPLICATIONINTSET, nDBNumber);
            d_crget (&dba, nDBNumber);

            for (int i = 0; i < m_Galleries.GetSize(); i++)
              {
                if (dba == (DB_ADDR)m_Galleries.GetAt(i))
                  {
                    m_pScreenSaver->NewGallery(i);
                    break;
                  }
              }
          }
      }


    // Select the appropriate galleries based on the members in the screen
    // saver application.  This is done by scanning the members of the list
    // that the application lives with.

    nLastGal = pLB->GetCount() - 1;
    pLB->SelItemRange(FALSE, 0, nLastGal);
    i = m_pScreenSaver->GetFirstGallery();

    if (i == -1)
      {
        if (!m_pScreenSaver->AllExcluded())
          pLB->SetSel(m_nRandomGalleryIndex);

        return TRUE;
      }

    while (i != -1)
      {
        pLB->SetSel(i);
        i = m_pScreenSaver->GetNextGallery();
      }

    return TRUE;  // return TRUE  unless you set the focus to a control
}


void CScreenSaver::OnCancel()
{
    delete m_pScreenSaver;
    CDialog::OnCancel();
}


void CScreenSaver::OnOK()
{
    int      nRetCode;
    int      nIndex;
    DB_ADDR dbaApp;
    DB_ADDR dbaGal;
    UINT     usFlags;

    if (m_pScreenSaver->IsModified())
      {
        dbaApp = m_pScreenSaver->GetDBA();
        nRetCode = d_crset(&dbaApp, nDBNumber);
        usFlags = m_pScreenSaver->GetFlags();

        if (m_pScreenSaver->AllExcluded())
          usFlags |= ALL_EXCLUDED;
        else
          usFlags &= ~ALL_EXCLUDED;

        nRetCode = d_crwrite(APPLICATION_USFLAGS, &usFlags, nDBNumber);

        // Delete the set of intersect records for the application

        if ((nRetCode = d_isowner(APPLICATIONGALLERYINTSET, nDBNumber)) == S_OKAY)
          {
            nRetCode = d_setor (APPLICATIONGALLERYINTSET, nDBNumber);

            while ((nRetCode = d_findnm(APPLICATIONGALLERYINTSET, nDBNumber)) == S_OKAY)
              d_disdel(nDBNumber);
          }


        // Either delete a record and all of its sets or
        // Create a new set of intersect records for the application
        // depending on the value of the deletion flag.

        if (m_pScreenSaver->IsDeleted())
          {
            nRetCode = d_crset(&dbaApp, nDBNumber);
            nRetCode = d_disdel(nDBNumber);
          }
        else
          {
            nIndex = m_pScreenSaver->GetFirstGallery();

            while (nIndex != -1)
              {
                dbaGal = m_Galleries.GetAt(nIndex);
                nRetCode = d_csoset(APPLICATIONGALLERYINTSET, &dbaApp, nDBNumber);
                nRetCode = d_csoset(GALLERYAPPLICATIONINTSET, &dbaGal, nDBNumber);
                nRetCode = d_makenew(APPLICATIONGALLERYINT, nDBNumber);
                nRetCode = d_connect(APPLICATIONGALLERYINTSET, nDBNumber);
                nRetCode = d_connect(GALLERYAPPLICATIONINTSET, nDBNumber);
                nIndex = m_pScreenSaver->GetNextGallery();
              }
          }
      }

    delete m_pScreenSaver;
    CDialog::OnOK();
}

                //case ID_PASSWORDPROTECTED:
                //    bPassword ^= 1;
                //    CheckDlgButton(hDlg, wParam, bPassword);
                //    EnableWindow(hSetPassword, bPassword);
                //    break;


void CScreenSaver::OnSetPassword()
{
    FARPROC fpDialog;

    if ((fpDialog = ::MakeProcInstance ((FARPROC) DlgChangePassword, AfxGetApp()->m_hInstance)) == NULL)
      return;

    DialogBox (AfxGetApp()->m_hInstance,
               MAKEINTRESOURCE (DLG_CHANGEPASSWORD),
               this->m_hWnd,
               (DLGPROC) fpDialog);

    FreeProcInstance(fpDialog);
}


void CScreenSaver::OnPasswordActive()
{
    GetDlgItem(IDC_SS_SET_PASSWORD)->EnableWindow(m_bPasswordProtected);
}
```

```
/* Copyright 1989-1994 FotoAttacher by Michael B. Mast, licensed
   to ProCentric Computer Service, Inc., all rights reserverd.
        Trade secret and patent pending. */

// settings.cpp : implementation file
//

#include "stdafx.h"
#include "fotoatt.h"
#include "settings.h"
#include "validddx.h"

#ifdef _DEBUG
#undef THIS_FILE
static char BASED_CODE THIS_FILE[] = __FILE__;
#endif

/////////////////////////////////////////////////////////////////////////////
// CSettings dialog


CSettings::CSettings(CWnd* pParent /*=NULL*/)
    : CDialog(CSettings::IDD, pParent)
{
    //{{AFX_DATA_INIT(CSettings)
    //}}AFX_DATA_INIT
}

void CSettings::DoDataExchange(CDataExchange* pDX)
{
    CDialog::DoDataExchange(pDX);
    //{{AFX_DATA_MAP(CSettings)
    DDX_Text(pDX, IDC_AUTO_ROLL_DELAY, m_nAutoRollDelay);
    DDV_MinMaxInt(pDX, m_nAutoRollDelay, 1, 32767);
    DDX_Text(pDX, IDC_ROLL_RATE, m_nRollRate);
    DDV_MinMaxInt(pDX, m_nRollRate, 1, 10);
    DDX_Radio(pDX, IDC_SETTINGS_LM_ROLL, m_nLeftMouseFunction);
    DDX_Radio(pDX, IDC_SETTINGS_IDLE_ROLL, m_nIdleMouseFunction);
    DDX_Text(pDX, IDC_SETTINGS_DISPLAY_MAX, m_CSDisplayMax);
    DDV_MaxChars(pDX, m_CSDisplayMax, 11);
    DDX_Text(pDX, IDC_SETTINGS_DISPLAY_MIN, m_CSDisplayMin);
    DDV_MaxChars(pDX, m_CSDisplayMin, 11);
    DDX_Text(pDX, IDC_SETTINGS_MOUSE_IDLE, m_CSMouseIdleTime);
    DDV_MaxChars(pDX, m_CSMouseIdleTime, 11);
    DDX_Text(pDX, IDC_SETTINGS_TIME_SLICE, m_CSTimeSlice);
    DDV_MaxChars(pDX, m_CSTimeSlice, 11);
    //}}AFX_DATA_MAP

    DDX_MSec(pDX, IDC_SETTINGS_MOUSE_IDLE, m_lMouseIdleTime);
    DDX_MSec(pDX, IDC_SETTINGS_TIME_SLICE, m_lTimeSlice);
    DDX_Time(pDX, IDC_SETTINGS_DISPLAY_MIN, m_lDisplayMin);
    DDX_Time(pDX, IDC_SETTINGS_DISPLAY_MAX, m_lDisplayMax);

    if (m_lDisplayMin < 1)
      {
        AfxMessageBox(IDS_TIME_MIN);
        pDX->Fail();
      }

    if (m_lDisplayMax == 0)
      m_lDisplayMax = m_lDisplayMin;

    if (m_lDisplayMax < m_lDisplayMin)
      {
        AfxMessageBox(IDS_TIME_MAX);
        pDX->Fail();
      }
}

BEGIN_MESSAGE_MAP(CSettings, CDialog)
    //{{AFX_MSG_MAP(CSettings)
    //}}AFX_MSG_MAP
END_MESSAGE_MAP()


/////////////////////////////////////////////////////////////////////////////
// CSettings message handlers
```

```
/* Copyright 1989-1994 FotoAttacher by Michael B. Mast, licensed
   to ProCentric Computer Service, Inc., all rights reserverd,
        Trade secret and patent pending. */

// stdafx.cpp : source file that includes just the standard includes
//  stdafx.pch will be the pre-compiled header
//  stdafx.obj will contain the pre-compiled type information

#include "stdafx.h"
```

```
/* Copyright 1989-1994 FotoAttacher by Michael B. Mast, licensed
   to ProCentric Computer Service, Inc., all rights reserverd.
        Trade secret and patent pending. */

// DDX routines for Fotoattacher

#include "stdafx.h"
#include "validddx.h"
#include "resource.h"

BOOL GetTime(HWND hWnd, long& lSeconds);
void SetTime(HWND hWnd, long lSeconds);
BOOL GetMSec(HWND hWnd, long& lMSec);
void SetMSec(HWND hWnd, long lMSec);


/*****************************************************************************************/
/*                                                                                       */
/* Routine to exchange a long number of seconds into the form H:M:S for display purposes */
/*                                                                                       */
/*****************************************************************************************/

void AFXAPI DDX_Time (CDataExchange* pDX, int nIDC, long& lSeconds)
{
    HWND hWndCtrl = pDX->PrepareEditCtrl(nIDC);

    if (pDX->m_bSaveAndValidate)
      {
        if (!GetTime (hWndCtrl, lSeconds))
          {
            AfxMessageBox(IDS_TIME_INV);
            pDX->Fail();
          }
      }
    else
      {
        SetTime(hWndCtrl, lSeconds);
      }
}


// Extract the time from the window, parse it and convert to seconds

BOOL GetTime (HWND hWnd, long& lSeconds)
{
    char szWindowText[12];

    ::GetWindowText(hWnd, szWindowText, 11);        // Extract text from the window

    char* szHMS[3];
    char* szTime;
    char* pch;
    int   i;

    // If the string is empty, that is ok so accept and go back (value is zero)

    for (szTime = szWindowText; *szTime == ' '; szTime++)
      {
        if (*szTime == 0)
          {
            lSeconds = 0;
            return TRUE;
          }
      }


    // Parse the string - backwards from the right

    szHMS[0] = NULL;
    szHMS[1] = NULL;
    szHMS[2] = NULL;

    for (i = 0; i < 3; i++)
      {
        szHMS[i] = strrchr(szTime, ':');

        if (szHMS[i] == NULL)
          {
            szHMS[i] = szTime;
            break;
          }
        else
          {
            *szHMS[i] = '\0';
            szHMS[i]++;
          }
      }


    // Validate the substrings

    for (i = 0; i < 3; i++)
      {
        for (pch = szHMS[i]; *pch; pch++)
          {
            if ((*pch < '0') || (*pch > '9'))
              {
                lSeconds = 0;
                return FALSE;
              }
          }
      }


    // Calculate the number of seconds and send it back.

    lSeconds = atol(szHMS[0]) + atol(szHMS[1]) * 60 + atol(szHMS[2]) * 3600;
    return TRUE;
}


// Take the seconds and format it into a time that can be placed in the window.

void SetTime(HWND hWnd, long lSeconds)
{
    long lHH;
    long lMM;
    long lSS;
    char szTime[12];

    lHH = lSeconds / 3600;
    lMM = (lSeconds - lHH * 3600) / 60;
    lSS = lSeconds % 60;
    szTime[0] = '\0';

    if (lHH > 0)
      wsprintf(szTime, "%ld:%02ld:%02ld", lHH, lMM, lSS);
    else
      if (lMM > 0)
        wsprintf(szTime, "%ld:%02ld", lMM, lSS);
      else
        ltoa(lSS, szTime, 10);

    ::SetWindowText(hWnd, szTime);
}


/*************************************************************************************/
/*                                                                                   */
/* Routine to exchange a long number of milliseconds from/to decimal seconds form */
/*                                                                                   */
/*************************************************************************************/

void AFXAPI DDX_MSec(CDataExchange* pDX, int nIDC, long& lMSec)
{
    HWND hWndCtrl = pDX->PrepareEditCtrl(nIDC);

    if (pDX->m_bSaveAndValidate)
      {
        if (!GetMSec (hWndCtrl, lMSec))
          {
            AfxMessageBox(IDS_IDLE_INV);
            pDX->Fail();
          }
      }
    else
      {
        SetMSec(hWndCtrl, lMSec);
      }
}


BOOL GetMSec(HWND hWnd, long& lMSec)
{
    char szWindowText[12];

    ::GetWindowText(hWnd, szWindowText, 11);        // Extract text from the window

    char* szTime;
    char* pch;
    long  lSeconds = 0;
    long  lMSeconds = 0;


    // If the string is empty, that is ok so accept and go back (value is zero)

    for (szTime = szWindowText; *szTime == ' '; szTime++)
      {
        if (*szTime == 0)
          {
            lMSec = 0;
            return TRUE;
          }
      }


    // Parse the string

    for (pch = szTime; (*pch != '.') && (*pch != ' ') && (*pch != '\0'); pch++)
      {
        if ((*pch < '0') || (*pch > '9'))
          return FALSE;

        lSeconds *= 10;
        lSeconds += *pch - '0';
      }

    if (*pch == '.')
      {
        *pch = '\0';
```

```
            szTime = ++pch;

            for (pch = szTime; (*pch != ' ') && (*pch != '\0'); pch++)
              {
                if ((*pch < '0') || (*pch > '9'))
                  return FALSE;

                lMSeconds *= 10;
                lMSeconds += *pch - '0';
              }
          }

      lMSec = lSeconds * 1000 + lMSeconds;
      return TRUE;
}

void SetMSec(HWND hWnd, long lMSec)
{
      char szMSec[12];
      long lSeconds;
      long lMillSec;

      lSeconds = lMSec / 1000;
      lMillSec = lMSec % 1000;

      wsprintf(szMSec, "%ld.%03d", lSeconds, lMillSec);

      ::SetWindowText(hWnd, szMSec);
}
```

```
/* Copyright 1989-1994 FotoAttacher by Michael B. Mast, licensed
   to ProCentric Computer Service, Inc., all rights reserverd.
        Trade secret and patent pending. */

/**************************************************************************
*
*      File:   BROWSE.C                                                   *
*                                                                         *
*   Purpose:   Contains the dialog hook function for the File Open        *
*              common dialog box.  Also includes support function.        *
*                                                                         *
*              void  NEAR InitializeStruct(WORD, LPSTR);                  *
*              LPSTR NEAR AllocAndLockMem(HANDLE *, WORD);                *
*        BOOL  FAR PASCAL FileOpenHook(HWND, UINT, WPARAM, LPARAM);       *
*                                                                         *
*                                                                         *
*   History:   Date       Reason                                          *
*              --------   ----------------------------------              *
*                                                                         *
*              06/22/94   Created                                         *
*                                                                         *
**************************************************************************/


#include <windows.h>
#include <commdlg.h>
#include <memory.h>
#include <dlgs.h>
#include "palette.h"
#include <debug.h>
#include "browse.h"
#include "resource.h"

#define MAXFILENAMELEN         256
#define MAXFILETITLELEN        256


/**************************************************************************
*
*                          FILE OPEN STRUCTURE                            *
*                                                                         *
**************************************************************************/

typedef struct tagFOCHUNK
   {
      OPENFILENAME  of;
      char          szFile[MAXFILENAMELEN];
      char          szFileTitle[MAXFILETITLELEN];
   }
FOCHUNK;

typedef FOCHUNK FAR *LPFOCHUNK;
typedef FOCHUNK FAR *LPFSCHUNK;

typedef WORD (CALLBACK* FARHOOK)(HWND,UINT,WPARAM, LPARAM);



BOOL FAR PASCAL FileOpenHook        (HWND hDlg, UINT message, WPARAM wParam, LPARAM lParam);
BOOL NEAR       FormatFilterString  (HWND hWnd, HANDLE hFilterString);
LPSTR NEAR      AllocAndLockMem     (HANDLE *hChunk, WORD wSize);

BOOL WINAPI BrowseImageFiles
  (
    HWND hWnd
  )
{
  char          szBuffer[255];
  WORD          wSize;
  LPFOCHUNK     lpFOChunk;
  HANDLE        hfoChunk;      //Handle to File Open block of memory
  HANDLE        hFilterString;
  FARHOOK       lpfnFileOpenHook;
  BOOL          fReturn;

  lpfnFileOpenHook = (FARPROC) MakeProcInstance ((FARPROC) FileOpenHook, (HINSTANCE) GetWindowWord (hWnd,
      GWW_HINSTANCE));

  wSize = sizeof(FOCHUNK);

  if (!(lpFOChunk = (LPFOCHUNK) AllocAndLockMem (&hfoChunk, wSize)))
    return (FALSE);

  GetWindowsDirectory (szBuffer, sizeof (szBuffer));

  hFilterString = GlobalAlloc (GHND, 2000);

  FormatFilterString (hWnd, hFilterString);

  *(lpFOChunk->szFile)              = 0;
  *(lpFOChunk->szFileTitle)         = 0;
  lpFOChunk->of.lStructSize         = sizeof (OPENFILENAME);

  lpFOChunk->of.hwndOwner           = hWnd;

  lpFOChunk->of.hInstance           = GetWindowWord (hWnd, GWW_HINSTANCE);
  lpFOChunk->of.lpstrFilter         = GlobalLock (hFilterString);
  lpFOChunk->of.lpstrCustomFilter   = (LPSTR) NULL;
  lpFOChunk->of.nMaxCustFilter      = 0L;
  lpFOChunk->of.nFilterIndex        = 1L;
  lpFOChunk->of.lpstrFile           = lpFOChunk->szFile;
  lpFOChunk->of.nMaxFile            = (DWORD) sizeof (lpFOChunk->szFile);
  lpFOChunk->of.lpstrFileTitle      = lpFOChunk->szFileTitle;
  lpFOChunk->of.nMaxFileTitle       = MAXFILETITLELEN;
  lpFOChunk->of.lpstrInitialDir     = szBuffer;
  lpFOChunk->of.lpstrTitle          = (LPSTR)NULL;
  lpFOChunk->of.Flags               = OFN_HIDEREADONLY | OFN_ENABLETEMPLATE |
                                      OFN_PATHMUSTEXIST |
                                      OFN_FILEMUSTEXIST |
                                      OFN_SHOWHELP | OFN_ENABLEHOOK;
  lpFOChunk->of.nFileOffset         = 0;
  lpFOChunk->of.nFileExtension      = 0;
  lpFOChunk->of.lpstrDefExt         = (LPSTR)NULL;
  lpFOChunk->of.lCustData           = 0L;
  lpFOChunk->of.lpfnHook            = (FARHOOK) lpfnFileOpenHook;
  lpFOChunk->of.lpTemplateName      = (LPSTR) MAKEINTRESOURCE (FILEOPENORD);

  /* Make sure the palette class exists */

  PaletteInit ();

//NOTE!!!  On a closed system (ie, not running on a network) this OpenFile
//         call should NEVER fail.  This because we passed in the
//         OFN_FILEMUSTEXIST flag to CD.  However, on a network system,
//         there is a *very* small chance that between the time CD's checked
//         for existance of the file and the time the call to OpenFile
//         was made here, someone else on the network has deleted the file.
//         MORAL: ALWAYS, ALWAYS, ALWAYS check the return code from your
//         call to OpenFile() or _lopen.

  if ( GetOpenFileName( &(lpFOChunk->of) ) )
    {
      SendMessage (hWnd,
                   BROWSE_FILENAME,
                   0,
                   (LPARAM) lpFOChunk->of.lpstrFile);

      fReturn = TRUE;
    }
  else
    fReturn = FALSE;

  FreeProcInstance ((FARPROC) lpfnFileOpenHook);
  GlobalUnlock ( hFilterString);
  GlobalUnlock ( hfoChunk );
  GlobalFree   ( hfoChunk );
  return (fReturn);
}

/**************************************************************************
*
* Function:  FormatFilterString(hWnd, HANDLE)                             *
*                                                                         *
*  Purpose:  To initialize the gszFilter variable with strings from       *
*            the string table.  This method of initializing gszBuffer     *
*            is necessary to ensure that the strings are contiguous       *
*            in memory--which is what COMMDLG.DLL requires.               *
*                                                                         *
*  Returns:  BOOL  TRUE if successful, FALSE if failure loading string    *
*                                                                         *
* Comments:  The string loaded from the string table has some wild        *
*            character in it.  This wild character is then replaced       *
*            with NULL.  Note that the wild char can be any unique        *
*            character the developer chooses, and must be included        *
*            as the last character of the string.  A typical string       *
*            might look like "Write Files(*.WRI)|*.WRI|" where | is       *
*            the wild character in this case.  Implementing it this      *
*            way also ensures the string is doubly NULL terminated,       *
*            which is also a requirement of this lovely string.           *
*                                                                         *
*  History:  Date       Reason                                            *
*            --------   ----------------------------------                *
*                                                                         *
*            11/19/91   Created                                           *
*            06/21/94   Modified to allocate global memory for string     *
*                       and load string from successive strings stored    *
*                       in the resource file.                             *
*                                                                         *
**************************************************************************/

BOOL NEAR FormatFilterString
   (
     HWND   hWnd,
     HANDLE hFilterString
   )
{
   WORD  wCtr, wStringLen;
   char  chWildChar;
   LPSTR lpszFilterString;
   int   i, j;

   lpszFilterString = GlobalLock (hFilterString);

   wStringLen = 0;

   for (i = IDS_FILTERSTRING1; i <= IDS_FILTERSTRING6; i++)
     {
       if ((j = LoadString (GetWindowWord (hWnd, GWW_HINSTANCE), i, &lpszFilterString[wStringLen], 2000 -
           wStringLen)))
         {
```

1C/1.4PRINT

```
         return(FALSE);
       }

     wStringLen += j;
   }

  chWildChar = lpszFilterString[wStringLen-1];    //Grab the wild character

  wCtr = 0;

  while (lpszFilterString[wCtr])
    {
      if (lpszFilterString[wCtr] == chWildChar)
        lpszFilterString[wCtr]=0;

      wCtr++;
    }

  GlobalUnlock (hFilterString);
  return (TRUE);
}


/*****************************************************************************
 *
 *  Function:  AllocAndLockMem(HANDLE *, WORD)
 *
 *   Purpose:  To allocate and lock a chunk of memory for the CD
 *             structure.
 *
 *   Returns:  LPSTR
 *
 *  Comments:
 *
 *   History:  Date      Reason
 *             --------  -----------------------------------
 *
 *             10/01/91  Created
 *
 ****************************************************************************/

LPSTR NEAR AllocAndLockMem (HANDLE *hChunk, WORD wSize)
{
   LPSTR lpChunk;

   *hChunk = GlobalAlloc(GMEM_FIXED, wSize);

   if (*hChunk)
      {
         lpChunk = GlobalLock(*hChunk);
         if (!lpChunk)
            {
               GlobalFree(*hChunk);
               lpChunk=NULL;
            }
      }
   else
      {
         lpChunk=NULL;
      }

   return(lpChunk);
}


/*****************************************************************************
 *
 *  Function:  FileOpenHook(HWND, UINT, WPARAM, LPARAM)
 *
 *   Purpose:  This function "hooks" the CD GetOpenFileName() procedure
 *             and allows you to process any messages you want.  In this
 *             example, the WM_CTLCOLOR message is being processed to
 *             give the background of the CD a cool color.
 *
 *   Returns:  BOOL
 *
 *  Comments:  This function must be exported and must have an instance
 *             thunk created for it (ie, call MakeProcInstance; see
 *             WM_CREATE processing in the main window procedure above)
 *
 *   History:  Date      Reason
 *             --------  -----------------------------------
 *
 *             10/01/91  Created
 *
 ****************************************************************************/

BOOL FAR PASCAL FileOpenHook(HWND hDlg, UINT message, WPARAM wParam, LPARAM lParam)
{
  static HICON      hODIcon;
  static DWORD      rgbHighlight, rgbWindowText, rgbColorWindow, rgbHighlightText;
  static short int iCenteringFactor;
  PALCREATEPARMS    PalCreateParms;

  switch (message)
    {
          case WM_INITDIALOG:
               /* The OK button is disabled until something is selected, and then only when
                   one item is selected. */

                   EnableWindow (GetDlgItem (hDlg, IDOK), FALSE);
                   break;

        case WM_COMMAND:
          switch (wParam)
            {
              case lst1:
                switch (HIWORD (lParam))
                  {
                    case PLN_CREATE:
                      PalCreateParms.nPanelSize          =  100;  /* not less than 1 inch */
                      PalCreateParms.nInterPanelSpacing =    5;  /* five one hudreths (one tenth) on an inch */

                      SendDlgItemMessage (hDlg,
                                          lst1,
                                          PM_INITIALIZE,
                                          0,
                                          (LPARAM) (LPPALCREATEPARMS) &PalCreateParms);
                      break;

                              case PLN_SELCHANGE:
                                EnableWindow (GetDlgItem (hDlg, IDOK),
                                              SendDlgItemMessage (hDlg, lst1, PM_GETSELCOUNT, 0,
                                                 0L) == 1);

                              return (TRUE);  /* Let the common dlg box see the PLN_SELCHANGE msg. */
                }

            case psh16:
              switch (HIWORD (lParam))
                {
                  case BN_CLICKED:
                    SendDlgItemMessage (hDlg,
                                        lst1,
                                        PM_RECREATETHUMBNAILS,
                                        0,
                                        0L);

                    break;
                }

              break;
          }

        break;

      default:
        break;
    }

  return (FALSE);
}
```

```
/* Copyright 1989-1994 FotoAttacher by Michael B. Mast, licensed
   to ProCentric Computer Service, Inc., all rights reserverd.
        Trade secret and patent pending. */

////////////////////////////////////////////////////////////////////////////
//  Object to define the active applications that are running

class CActiveApp : public CObject
{
public:
// Constructors

    CActiveApp (HWND hWnd, HWND hWndPopup, LPSTR szDesc, long DisplayMin, long DisplayMax);
    ~CActiveApp ();


// Member functions

    CString&    GetAppName()        { return m_CSName;                      };
    HWND        GetAppWnd()         { return m_hwndAppWnd;                  };
    HWND        GetPopupWnd()       { return m_hwndPopupWnd;                };
    BOOL        IsDisplayed()       { return m_bIsDisplayed;                };
    BOOL        TimedOut()          { return (time(NULL) >= m_tNextTimeOut); };

    BOOL        GetNextPhoto        (CString& csPhotoName);
    void        ResetTime           ();
    void        SetDisplayMinMax    (long lDisplayMin, long lDisplayMax);
    void        SetUpGalleries      ();
    void        DeleteContents      ();


// Internal functions

private:
    BOOL        BuildGalleryList    ();
    void        LoadAllGalleries    (CString CSRandomName);

// Member data

private:
    CString     m_CSName;
    time_t      m_tNextTimeOut;
    CObList     m_Galleries;
    UINT        m_usFlags;
    POSITION    m_posCurGallery;
    POSITION    m_posNextGallery;
    HWND        m_hwndAppWnd;
    HWND        m_hwndPopupWnd;
    long        m_lDisplayMin;
    long        m_lDisplayMax;
    BOOL        m_bIsDisplayed;
};
```

```
/* Copyright 1989-1994 FotoAttacher by Michael B. Mast, licensed
   to ProCentric Computer Service, Inc., all rights reserverd.
        Trade secret and patent pending. */

////////////////////////////////////////////////////////////////////////////
// ActivGal - Class definition for Active Galleries (as part of active apps)

class CActiveGal : public CObject
{
public:

// Construction / Destruction

    CActiveGal (DB_ADDR dba);


// Data extraction functions

    BOOL IsShown ()       { return m_bShown; };
    long GetMaxTime ();
    long GetMinTime ();

// Member functions

    BOOL     GetPhoto (CString& csPhotoName);
    void     SetShownFlag (BOOL bShown = TRUE);


protected:

// Data Members

    DB_ADDR m_dbaGallery;
    DB_ADDR m_dbaCurPhoto;
    DB_ADDR m_dbaCurIntersect;
    BOOL     m_bShown;
    long     m_lDisplayGalMin;
    long     m_lDisplayGalMax;
    long     m_lDisplayPhotoMin;
    long     m_lDisplayPhotoMax;
};
```

```
/* Copyright 1989-1994 FotoAttacher by Michael B. Mast, licensed
   to ProCentric Computer Service, Inc., all rights reserverd.
        Trade secret and patent pending. */

// appdlg.h : header file
//

/////////////////////////////////////////////////////////////////////////////
// CAppDlg dialog

class CAppItem;
class CAppDlg : public CDialog
{
// Construction
public:
    CAppDlg(CWnd* pParent = NULL);  // standard constructor

// Dialog Data
    //{{AFX_DATA(CAppDlg)
    enum { IDD = IDD_APPLICATIONS };
    CString m_listApplications;
    CString m_listGalleries;
    //}}AFX_DATA

private:
    int         m_nRandomGalleryIndex;
    CObList     m_Applications;
    CDWordArray m_Galleries;
    CAppItem*   m_pCurApp;      // Current app when one selected

private:
    void        CleanUp();
    CAppItem*   FindLBIndex(int nIndex);
    void        ValidateGallery(CAppItem* pAppItem);

// Implementation
protected:
    virtual void DoDataExchange(CDataExchange* pDX);    // DDX/DDV support

    // Generated message map functions
    //{{AFX_MSG(CAppDlg)
    afx_msg void OnDelete();
    afx_msg void OnExcludeAll();
    afx_msg void OnIncludeAll();
    virtual BOOL OnInitDialog();
    afx_msg void OnSelchangeListApplications();
    afx_msg void OnSelchangeListGalleries();
    virtual void OnOK();
    virtual void OnCancel();
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

// appitem.h : header file
//

/////////////////////////////////////////////////////////////////////////////
// Class CAppItem - Define the members of a set galleries in memory for
//                  an application
//
// We cannot associate an index in the list of applications since it is
// possible that the application may be deleted.  Either the DBA will have
// suffice or some other method will be used to determine the appropriate
// pointers. -- maybe placing the index in the listbox will work.

class CAppItem : public CObject
{
public:

    // constructors

    CAppItem(DB_ADDR dba, UINT usFlags, char* szName);

    // Read member data

    BOOL        AllExcluded()       {return m_bExcludeAll;};
    DB_ADDR     GetDBA()            {return m_dbaApp;};
    int         GetFirstGallery();
    UINT        GetFlags()          {return m_usFlags;};
    int         GetGalleryCount()   {return m_GalleryList.GetSize();};
    int         GetLBIndex()        {return m_nLBIndex;};
    CString*    GetName()           {return &m_CSAppName;};
    int         GetNextGallery();
    BOOL        IsDeleted()         {return m_bDeleted;};
    BOOL        IsModified()        {return m_bModified;};


    // Set member data

    void    SetModifiedFlag ();
    void    NewGallery      (int nIndex);
    void    RemoveGallery   (int nIndex);
    void    SetAllExcluded  (BOOL nFlag);
    void    SetLBIndex      (int nIndex);


    // Implementation

    void    DeleteContents();
    void    DeleteApplication();


// Data definitions

private:
    DB_ADDR     m_dbaApp;
    CDWordArray m_GalleryList;
    BOOL        m_bModified;
    BOOL        m_bExcludeAll;
    BOOL        m_bDeleted;
    int         m_nCurrent;
    int         m_nLBIndex;
    UINT        m_usFlags;
    CString     m_CSAppName;
};
```

```
/* Copyright 1989-1994 FotoAttacher by Michael B. Mast, licensed
   to ProCentric Computer Service, Inc., all rights reserverd.
        Trade secret and patent pending. */

/* Raima Data Manager Version: 3.21 */

/* database attacher record/key structure declarations */

struct Control {
   unsigned short  usVersionMajor;
   unsigned short  usVersionMinor;
   unsigned short  usRollRate;
   unsigned short  usRollDelay;
   unsigned short  usShowSigRegion;
   unsigned short  usAutoRoll;
   unsigned short  usClickAction;
   unsigned short  usIdleAction;
   long  lIdleMouse;
   long  lDisplayMin;
   long  lDisplayMax;
   long  lScreenSaverDelay;
   long  lSSDisplayMin;
   long  lSSDisplayMax;
   long  lTimeSlice;
};
struct Application {
   char  szTitle[52];
   unsigned short  usFlags;
};
struct Gallery {
   char  szDesc[52];
   unsigned short  usFlags;
   unsigned short  usDisplayFlags;
   long  lMinDisplayTime;
   long  lMaxDisplayTime;
};
struct Photo {
   char  szTitle[52];
   char  szPhotoPath[129];
   char  szPhotoFileName[115];
   char  szThumbPath[129];
   char  szThumbFileName[129];
   char  szFastLoadPath[129];
   char  szFastLoadFileName[129];
   unsigned short  usFlags;
   long  lMinDisplayTime;
   long  lMaxDisplayTime;
   short  sPhotoLeft;
   short  sPhotoTop;
   short  sPhotoRight;
   short  sPhotoBottom;
   short  sThumbLeft;
   short  sThumbTop;
   short  sThumbRight;
   short  sThumbBottom;
   short  sCropLeft;
   short  sCropTop;
   short  sCropRight;
   short  sCropBottom;
   short  sDisplayScale;
};
struct PhotoKey {
   char  szPhotoPath[129];
   char  szPhotoFileName[115];
};

/* record, field and set table entry definitions */

/* File Id Constants */
#define ATTACHER_D1 0
#define ATTACHER_D2 1
#define ATTACHER_D3 2
#define ATTACHER_K1 3
#define ATTACHER_K2 4

/* Record Name Constants */
#define CONTROL 10000
#define APPLICATION 10001
#define GALLERY 10002
#define PHOTO 10003
#define GALLERYPHOTOINT 10004
#define APPLICATIONGALLERYINT 10005

/* Field Name Constants */
#define CONTROL_USVERSIONMAJOR 0L
#define CONTROL_USVERSIONMINOR 1L
#define CONTROL_USROLLRATE 2L
#define CONTROL_USROLLDELAY 3L
#define CONTROL_USSHOWSIGREGION 4L
#define CONTROL_USAUTOROLL 5L
#define CONTROL_USCLICKACTION 6L
#define CONTROL_USIDLEACTION 7L
#define CONTROL_LIDLEMOUSE 8L
#define CONTROL_LDISPLAYMIN 9L
#define CONTROL_LDISPLAYMAX 10L
#define CONTROL_LSCREENSAVERDELAY 11L
#define CONTROL_LSSDISPLAYMIN 12L
#define CONTROL_LSSDISPLAYMAX 13L
#define CONTROL_LTIMESLICE 14L
#define APPLICATION_SZTITLE 1000L
#define APPLICATION_USFLAGS 1001L
#define GALLERY_SZDESC 2000L
#define GALLERY_USFLAGS 2001L
#define GALLERY_USDISPLAYFLAGS 2002L
#define GALLERY_LMINDISPLAYTIME 2003L
#define GALLERY_LMAXDISPLAYTIME 2004L
#define PHOTO_SZTITLE 3000L
#define PHOTO_SZPHOTOPATH 3001L
#define PHOTO_SZPHOTOFILENAME 3002L
#define PHOTO_SZTHUMBPATH 3003L
#define PHOTO_SZTHUMBFILENAME 3004L
#define PHOTO_SZFASTLOADPATH 3005L
#define PHOTO_SZFASTLOADFILENAME 3006L
#define PHOTO_USFLAGS 3007L
#define PHOTO_LMINDISPLAYTIME 3008L
#define PHOTO_LMAXDISPLAYTIME 3009L
#define PHOTO_SPHOTOLEFT 3010L
#define PHOTO_SPHOTOTOP 3011L
#define PHOTO_SPHOTORIGHT 3012L
#define PHOTO_SPHOTOBOTTOM 3013L
#define PHOTO_STHUMBLEFT 3014L
#define PHOTO_STHUMBTOP 3015L
#define PHOTO_STHUMBRIGHT 3016L
#define PHOTO_STHUMBBOTTOM 3017L
#define PHOTO_SCROPLEFT 3018L
#define PHOTO_SCROPTOP 3019L
#define PHOTO_SCROPRIGHT 3020L
#define PHOTO_SCROPBOTTOM 3021L
#define PHOTO_SDISPLAYSCALE 3022L
#define PHOTO_PHOTOKEY 3023L

/* Set Name Constants */
#define CONTROLGALLERYSET 20000
#define GALLERYPHOTOINTSET 20001
#define PHOTOGALLERYINTSET 20002
#define APPLICATIONGALLERYINTSET 20003
#define GALLERYAPPLICATIONINTSET 20004
```

ATTACHER.H 10-3-94 2:26p printed Oct 03, 1994 at 14:27

Page 1 of 1

```
/* Copyright 1989-1994 FotoAttacher by Michael B. Mast, licensed
   to ProCentric Computer Service, Inc., all rights reserverd.
        Trade secret and patent pending. */

/////////////////////////////////////////////////////////////////////////////
//  Header for Browse.  Needs to include the message to send when selection
//                      is complete.

#define BROWSE_FILENAME (WM_USER)

#ifdef __cplusplus
extern "C" {
#endif

BOOL WINAPI BrowseImageFiles (HWND hWnd);

#ifdef __cplusplus
}
#endif
```

```
/* Copyright 1989-1994 FotoAttacher by Michael B. Mast, licensed
   to ProCentric Computer Service, Inc., all rights reserverd.
        Trade secret and patent pending. */

// chuzegal.h : header file
//

/////////////////////////////////////////////////////////////////////////////
// CChooseGallery dialog

class CChooseGallery : public CDialog
{
// Construction
public:
    CChooseGallery(CWnd* pParent = NULL);   // standard constructor

// Dialog Data
    int m_nCurSel;
    //{{AFX_DATA(CChooseGallery)
    enum { IDD = IDD_CHOOSE_GALLERY };
    CString m_CSGallery;
    //}}AFX_DATA

// Implementation
protected:
    virtual void DoDataExchange(CDataExchange* pDX);    // DDX/DDV support

    // Generated message map functions
    //{{AFX_MSG(CChooseGallery)
    virtual void OnOK();
    //}}AFX_MSG
    virtual BOOL OnInitDialog();
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

/**************************************************************************************************
    ******/
/*
    */
/* New class of object - The CDControl class.  This will govern all access to the Vista DB for the Control
    Objects */
/*
    */
/**************************************************************************************************
    ******/

class CControl : public CObject
{
    DECLARE_SERIAL(CControl);

#ifndef DB_ADDR
#define DB_ADDR long
#endif

public:
                    CControl(int);          // Constructor -- Takes the DBN for the database
                    CControl()                 {CControl (0);};        // Default constructor: Assumes dbn =
                        0

    void            SetAutoRollFlag(BOOL);
    void            SetDisplayMin(long);
    void            SetDisplayMax(long);
    void            SetSSDisplayMin(long);
    void            SetSSDisplayMax(long);
    void            SetIdleMouse(long);
    void            SetIdleMouseAction(unsigned short);
    void            SetLeftButtonAction(unsigned short);
    void            SetRollRate(unsigned short);
    void            SetRollDelay(unsigned short);
    void            SetScreenSaverDelay(long);
    void            SetSigRegionFlag(BOOL);
    void            SetTimeSlice(long);

    BOOL            GetAutoRollFlag()           { return m_bAutoRollFlag;       };
    long            GetDisplayMin()             { return m_lDisplayMin;         };
    long            GetDisplayMax()             { return m_lDisplayMax;         };
    long            GetSSDisplayMin()           { return m_lSSDisplayMin;       };
    long            GetSSDisplayMax()           { return m_lSSDisplayMax;       };
    long            GetIdleMouse()              { return m_lIdleMouse;          };
    unsigned short  GetIdleMouseAction()        { return m_usIdleAction;        };
    unsigned short  GetLeftButtonAction()       { return m_usClickAction;       };
    unsigned short  GetRollRate()               { return m_usRollRate;          };
    unsigned short  GetRollDelay()              { return m_usRollDelay;         };
    long            GetScreenSaverDelay()       { return m_lScreenSaverDelay;   };
    BOOL            GetSigRegionFlag()          { return m_bSigRegionFlag;      };
    long            GetTimeSlice()              { return m_lTimeSlice;          };

// Private function declarations

private:
    void            StartXacn();

// Private data member declarations

private:
    unsigned short  m_usXacn;
    DB_ADDR         m_dbaControlRecord;
    CString         m_CSApplicationDefaultGallery;
    CString         m_CSScreenSaverDefaultGallery;
    unsigned short  m_usVersionMajor;
    unsigned short  m_usVersionMinor;
    unsigned short  m_usRollRate;
    unsigned short  m_usRollDelay;
    BOOL            m_bSigRegionFlag;
    BOOL            m_bAutoRollFlag;
    unsigned short  m_usClickAction;
    unsigned short  m_usIdleAction;
    long            m_lIdleMouse;
    long            m_lDisplayMin;
    long            m_lDisplayMax;
    long            m_lSSDisplayMin;
    long            m_lSSDisplayMax;
    long            m_lScreenSaverDelay;
    long            m_lTimeSlice;

protected:
};
```

```
/* Copyright 1989-1994 FotoAttacher by Michael B. Mast, licensed
   to ProCentric Computer Service, Inc., all rights reserverd.
        Trade secret and patent pending. */

// dlgpass.h : header file
//

/////////////////////////////////////////////////////////////////////////////
// CDlgPassword dialog

class CDlgPassword : public CDialog
{
// Construction
public:
    CDlgPassword(CWnd* pParent = NULL); // standard constructor

// Dialog Data
    //{{AFX_DATA(CDlgPassword)
    enum { IDD = DLG_CHANGEPASSWORD };
    CString m_CSRetypePassword;
    CString m_CSNewPassword;
    CString m_CSOldPassword;
    //}}AFX_DATA

// Implementation
protected:
    virtual void DoDataExchange(CDataExchange* pDX);    // DDX/DDV support

    // Generated message map functions
    //{{AFX_MSG(CDlgPassword)
        // NOTE: the ClassWizard will add member functions here
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

#ifdef __cplusplus
extern "C" {
#endif

#define FA_OPENBITMAPFILE    (WM_USER + 4)
#define FA_UIUNHIDE          (WM_USER + 5)
#define FA_SCREENSAVECONFIG  (WM_USER + 6)

// If wParam = TRUE then screen saver is activated and LOWORD(lParam) = hWnd
// If wParam = FALSE then screen saver is deactivated.

#define FA_SCREENSAVEACTIVE (WM_USER + 7)

/* This scructure is used to communicate requests and
   responses between both FADLL AND the FotoAttacher application.


   Field              EXE->DLL  DLL->EXE
   -------------------------------------
   hWnd                 No        Yes
   hDDPictBitmap        Yes       No
   hPictPalette         Yes       No
   nPopupWndWidth       Yes       Yes(1)
   nPopupWndHeight      Yes       Yes(1)
   nPopupWndPosSU       Yes(2)    Yes(2)
   szBuffer             No        Yes

   1.  The DLL sets these fields to zero if it wants the EXE to
       size the bitmap to the default size (which is determined
       by the EXE).  If the DLL wants a specific size, which is
       the case when a user sizes an already displayed photo,
       then the DLL sets these fields to the desired size.

   2.  The EXE simply echoes back whatever the DLL specifies in
       this field.  If the DLL sees a zero in this field, it
       positions the picture in the default location (determined
       by the DLL).  If not zero, the DLL places the image
       as the specified horizontal location.  The field is in
       screen units.

*****************************************************************/


typedef struct _FABITMAPINFO
  {
    WORD      wFlags;
    HWND      hWnd;
    HWND      hWndPopup;
    HBITMAP   hDDPictBitmap;
    HPALETTE  hPictPalette;
    int       nPopupWndWidth;
    int       nPopupWndHeight;
    int       nPopupWndPosSU;
    int       nBitmapWidth;        /* Width on non scalled bitmat. */
    int       nBitmapHeight;       /* Height of non scalled bitmap. */
    char      szBuffer[128];
  } FABITMAPINFO;

typedef FABITMAPINFO FAR * LPFABITMAPINFO;

/* FABITMAPINFO wFlags */

#define FAB_INITIALLOAD    0x0001    /* Initial load of bitmap  */
#define FAB_REPLACE        0x0002    /* Replace with new bitmap */
#define FAB_RESIZE         0x0004    /* Resize existing bitmap  */

#define ROLLUP          0
#define ROLLDOWN        1

typedef struct _LIBINIT2PARMS
  {
    UINT                    unBitmapLoadedMessage;
    UINT                    unRollupMessage;
  } LIBINIT2PARMS;

typedef LIBINIT2PARMS FAR * LPLIBINIT2PARMS;

void /* __loadds */ WINAPI UpdateCaptions (void);
void WINAPI EnablePopupRButton (void);
VOID WINAPI LibInit2 (HWND, LPLIBINIT2PARMS);
HWND WINAPI GetFotoAttWnd(void);

#ifdef __cplusplus
}
#endif
```

```
/* Copyright 1989-1994 FotoAttacher by Michael B. Mast, licensed
   to ProCentric Computer Service, Inc., all rights reserverd,
        Trade secret and patent pending. */

// fotoatt.h : main header file for the FOTOATT application
//

#ifndef __AFXWIN_H__
    #error include 'stdafx.h' before including this file for PCH
#endif

#include "resource.h"       // main symbols

/************************************/
/* Definitions global to the system */
/************************************/

#define NO_DELETE        0x0001
#define RANDOM_GALLERY   0x0001
#define ALL_EXCLUDED     0x0002


/////////////////////////////////////////////////////////////////////////////
// CFotoApp:
// See fotoatt.cpp for the implementation of this class
//

class CFotoApp : public CWinApp
{
private:
    CMultiDocTemplate*  m_pDocTemplatePhoto;
    CMultiDocTemplate*  m_pDocTemplateGallery;
    int                 m_nTimerID;
    int                 ExitInstance();

public:
    CFotoApp();
    BOOL        StartTimer();
    void        StopTimer();

// Overrides
    virtual BOOL    InitInstance ();
    BOOL            OnOpenRecentFile    (UINT);
    void            AddToRecentFileList (const char* pszPathName);
    virtual BOOL    PreTranslateMessage (MSG* pMsg);


// Implementation

    //{{AFX_MSG(CFotoApp)
    afx_msg void OnAppAbout();
    afx_msg void OnFileNewGallery();
    afx_msg void OnFileOpenGallery();
    afx_msg void OnFileOpenPhoto();
    afx_msg void OnFileScanPhoto();
    afx_msg void OnAppExit();
    //}}AFX_MSG
    DECLARE_MESSAGE_MAP()
};

/////////////////////////////////////////////////////////////////////////////
// VB-Event extern declarations

//{{AFX_VBX_REGISTER()
//}}AFX_VBX_REGISTER

/////////////////////////////////////////////////////////////////////////////
```

```
/* Copyright 1989-1994 FotoAttacher by Michael B. Mast, licensed
   to ProCentric Computer Service, Inc., all rights reserverd.
        Trade secret and patent pending. */

// galinfo.h : header file
//

/////////////////////////////////////////////////////////////////////////////
// CGalInfo dialog

class CGalInfo : public CDialog
{
// Construction
public:
    CGalInfo(CWnd* pParent = NULL); // standard constructor

public:
// Dialog Data
    BOOL m_bModified;
    long m_lDisplayMax;
    long m_lDisplayMin;

    //{{AFX_DATA(CGalInfo)
    enum { IDD = IDD_GALLERY_INFO };
    CString m_CSGalleryName;
    CString m_CSDisplayMin;
    CString m_CSDisplayMax;
    //}}AFX_DATA

// Implementation
protected:
    virtual void DoDataExchange(CDataExchange* pDX);    // DDX/DDV support

    // Generated message map functions
    //{{AFX_MSG(CGalInfo)
    virtual void OnOK();
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
         Trade secret and patent pending. */

// galleryd.h : header file
//

////////////////////////////////////////////////////////////////////////////
// CGalleryDoc document

class CGalleryDoc : public CDocument
{
    DECLARE_SERIAL(CGalleryDoc)

// Attributes
protected:
    CString        m_CSGalleryDesc;
    POSITION       m_posPhoto;
    BOOL           m_bChangedName;
    BOOL           m_bNewGallery;
    struct Gallery m_Gallery;
    DB_ADDR        m_dba;

public:
    CObList        m_PhotoList;

// Operations
public:
    void        AddPhoto(CPhoto* Photo);
    void        DeleteContents();
    void        DeleteGallery();
    DB_ADDR     GetDBA()            { return m_dba; };
    long        GetDisplayMax()     { return m_Gallery.lMaxDisplayTime; };
    long        GetDisplayMin()     { return m_Gallery.lMinDisplayTime; };
    CPhoto*     GetFirstPhoto();
    CString&    GetGalleryDesc();
    CPhoto*     GetNextPhoto();
    BOOL        HasNameChanged()    { return m_bChangedName; };
    BOOL        IsNew()             { return m_bNewGallery; };
    void        SaveGallery();
    void        SetGalleryDesc(CString& CSGalleryDesc);
    void        SetDBA(DB_ADDR dba);
    void        SetDisplayMax(long lMax);
    void        SetDisplayMin(long lMin);
    void        SetNameChangeFlag();

public:
    CGalleryDoc();
    virtual ~CGalleryDoc();
    virtual BOOL OnOpenDocument(const char *szDocumentName);
    virtual BOOL SaveModified();


// Implementation
protected:
    virtual void Serialize(CArchive& ar);   // overridden for document i/o
    virtual BOOL OnNewDocument();

    // Generated message map functions
protected:
    //{{AFX_MSG(CGalleryDoc)
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

// galvw.h : header file
//

/////////////////////////////////////////////////////////////////////////////
// CGalVw view

class CGalVw : public CView
{
    DECLARE_DYNCREATE(CGalVw)
protected:
    CGalVw();           // protected constructor used by dynamic creation

// Attributes
public:
    CPaletteBox m_wndPB;
    BOOL        m_bInitialized;

// Operations
public:
    void    PrepDocumentForSave();

// Implementation
protected:
    virtual ~CGalVw();
    virtual void OnDraw(CDC* pDC);      // overridden to draw this view
    virtual void OnUpdate(CView* pSender, LPARAM lHint, CObject* pHint);

private:
    int     CopyPhotosToClipboard();
    void    DeletePhotosFromGallery();

    // Generated message map functions
protected:
    //{{AFX_MSG(CGalVw)
    afx_msg void OnSize(UINT nType, int cx, int cy);
    afx_msg int OnCreate(LPCREATESTRUCT lpCreateStruct);
    afx_msg void OnEditCopy();
    afx_msg void OnEditCut();
    afx_msg void OnEditDelete();
    afx_msg void OnEditPaste();
    afx_msg void OnUpdateEditPaste(CCmdUI* pCmdUI);
    afx_msg void OnUpdateEditCopy(CCmdUI* pCmdUI);
    afx_msg void OnUpdateEditDelete(CCmdUI* pCmdUI);
    afx_msg void OnUpdateEditCut(CCmdUI* pCmdUI);
    afx_msg void OnEditGalleryInfo();
    afx_msg void OnFileSaveGallery();
    afx_msg void OnEditClearAll();
    afx_msg void OnUpdateEditClearAll(CCmdUI* pCmdUI);
    afx_msg void OnEditSelectall();
    afx_msg void OnUpdateEditSelectall(CCmdUI* pCmdUI);
    afx_msg void OnEditRecreateThumbnails();
    afx_msg void OnEditDeselectall();
    afx_msg void OnUpdateEditDeselectall(CCmdUI* pCmdUI);
    afx_msg void OnUpdateFileSaveGallery(CCmdUI* pCmdUI);
    afx_msg void OnFileSaveGalleryAs();
    afx_msg void OnUpdateFileSaveGalleryAs(CCmdUI* pCmdUI);
    afx_msg void OnFileAddPhoto();
    afx_msg void OnUpdateFileExportGallery(CCmdUI* pCmdUI);
    afx_msg void OnUpdateFileImportGallery(CCmdUI* pCmdUI);
    //}}AFX_MSG
    afx_msg void OnPaletteCreate();
    afx_msg void OnPaletteChange();
    afx_msg LRESULT OnItemChange(WPARAM wParam, LPARAM lParam);
    DECLARE_MESSAGE_MAP()
};

/////////////////////////////////////////////////////////////////////////////
```

```
/* Copyright 1989-1994 FotoAttacher by Michael B. Mast, licensed
   to ProCentric Computer Service, Inc., all rights reserverd.
        Trade secret and patent pending. */

// impexp.h : header file
//

/////////////////////////////////////////////////////////////////////////////
// CImportExport dialog

class CImportExport : public CDialog
{
// Construction
public:
    CImportExport(CWnd* pParent = NULL);    // standard constructor

// Dialog Data
    //{{AFX_DATA(CImportExport)
    enum { IDD = IDD_IMPEXP_GAL };
        // NOTE: the ClassWizard will add data members here
    //}}AFX_DATA

// Implementation
protected:
    virtual void DoDataExchange(CDataExchange* pDX);    // DDX/DDV support

    // Generated message map functions
    //{{AFX_MSG(CImportExport)
    afx_msg void OnExcludeAll();
    afx_msg void OnIncludeAll();
    afx_msg void OnDblclkListGalleries();
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

// mainfrm.h : interface of the CMainFrame class
//
/////////////////////////////////////////////////////////////////////////////

#define ACTION_OPEN              1
#define ACTION_DELETE            2
#define ACTION_ADD_TO_GALLERY    3


class CSchemaRec : public CObject
{
public:
    int     m_nRecType;
    DB_ADDR m_dbaOld;
    DB_ADDR m_dbaNew;

    CSchemaRec (int nRecType, DB_ADDR dbaOld, DB_ADDR dbaNew)
        {
            m_nRecType = nRecType;
            m_dbaOld = dbaOld;
            m_dbaNew = dbaNew;
        };
};


class CMainFrame : public CMDIFrameWnd
{
    DECLARE_DYNAMIC(CMainFrame)
public:
    CMainFrame();

// Attributes
public:
    int     m_sAction;
    UINT    m_unBitmapLoadedMessage;
    UINT    m_unRollupMessage;

// Operations
public:

// Implementation
public:
    virtual ~CMainFrame();
#ifdef _DEBUG
    virtual void AssertValid() const;
    virtual void Dump(CDumpContext& dc) const;
#endif

private:
    void        BlastThumbs (CString csPath);
    void        FindThumbs  (CString csPath);
    void        StringRead  (CFile& File, char *szString);
    void        StringWrite (CFile& File, char *szString);
    CSchemaRec* FindDBAOld  (CObList& list, DB_ADDR dba);


protected:  // control bar embedded members
    CStatusBar  m_wndStatusBar;
    CToolBar    m_wndToolBar;
    BOOL        m_bShowing;
    CObList     m_ActiveApps;
    long        m_lMaxDisplay;
    long        m_lMinDisplay;
    int         m_nMinute;

// Generated message map functions
protected:
    //{{AFX_MSG(CMainFrame)
    afx_msg int OnCreate(LPCREATESTRUCT lpCreateStruct);
    afx_msg void OnConfigureApplications();
    afx_msg void OnOptionsSettings();
    afx_msg void OnFileDeleteGallery();
    afx_msg void OnFileDeletePhoto();
    afx_msg void OnScreenSaver();
    afx_msg void OnTimer(UINT nIDEvent);
    afx_msg LRESULT OnBrowseFileOpen (WPARAM WParam, LPARAM LParam);
    afx_msg void OnToolsRemoveThumbs();
    afx_msg void OnToolsInitDb();
    afx_msg LRESULT OnUIUnhide (WPARAM wParam, LPARAM lParam);
    afx_msg LRESULT OnOpenBitmapFile (WPARAM wParam, LPARAM lParam);
    afx_msg LRESULT OnScreenSaveConfig (WPARAM wParam, LPARAM lParam);
    afx_msg void OnClose();
    afx_msg void OnFileExportGallery();
    afx_msg void OnFileImportGallery();
    //}}AFX_MSG
    DECLARE_MESSAGE_MAP()
};

/////////////////////////////////////////////////////////////////////////////
```

```
/* Copyright 1989-1994 FotoAttacher by Michael B. Mast, licensed
   to ProCentric Computer Service, Inc., all rights reserverd.
        Trade secret and patent pending. */

//////////////////////////////////////////////////////////////////////
// CPaletteBox is derived from CListBox

class CPaletteBox : public CListBox
{
    DECLARE_DYNAMIC(CPaletteBox)

// Constructors
public:
    CPaletteBox();
    void AddItem(CPhoto* pPhoto);
    BOOL Create(DWORD dwStyle, const RECT& rect, CWnd* pParentWnd, UINT nID);
    void DeleteItem(int nIndex);
    void DeleteSelectedItems();
    void DeselectAll();
    void GetItem(int nIndex, CPhoto* pPhoto);
    void InsertItem(int nIndex, CPhoto* pPhoto);
    void PasteItem(CPhoto* pPhoto);
    void RecreateThumbnails();
    void SelectAll();

private:
    LPPALPARM   BuildParam(CPhoto* pPhoto);
    PALPARM     m_PaletteParm;
};
```

```
/* Copyright 1989-1994 FotoAttacher by Michael B. Mast, licensed
   to ProCentric Computer Service, Inc., all rights reserverd.
        Trade secret and patent pending. */

#ifdef __cplusplus
extern "C" {
#endif

/* Handle to a DIB */
#define HDIB HANDLE
#define IS_WIN30_DIB(lpbi)   ((*(LPDWORD)(lpbi)) == sizeof(BITMAPINFOHEADER))

/*************************************************************************
   Palette window sytles.

   PLS_NOTIFY           Parent receives notification messages.
   PLS_SORT             Items are sorted as they are added.
   PLS_DELETE           Delete key deletes selected item(s).
   PLS_MULTIPLESEL      Mulitple selections allowed.
   PLS_DESCRIPTION      Creates item description field on palette.
   PLS_DRAGSOURCE       Panel may be drag source.
   PLS_DROPTARGET       Palette may be drop target.
   PLS_NOMOVESOURCE     Panel may not be moved when it is a drag source.
                        It may only be copied.  Forces the user to drag
                        with the control key help down.
   PLS_EXTENDEDSEL      Same as PLS_MULTIPLESEL.
*************************************************************************/

#define PLS_NOTIFY         LBS_NOTIFY         /* 0x0001L */
#define PLS_SORT           LBS_SORT           /* 0x0002L */
#define PLS_DELETE                               0x0004L
#define PLS_MULTIPLESEL    LBS_MULTIPLESEL    /* 0x0008L */
#define PLS_DESCRIPTION                          0x0010L
#define PLS_DRAGSOURCE                           0x0020L
#define PLS_DROPTARGET                           0x0040L
#define PLS_NOMOVESOURCE                         0X00801
#define PLS_EXTENDEDSEL    LBS_EXTENDEDSEL    /* 0x0800L */

/* Palette messages */

#define PM_ADDSTRING                  LB_ADDSTRING       /* lParam = (LPSTR) &szString */
#define PM_INSERTSTRING               LB_INSERTSTRING
#define PM_RESETCONTENT               LB_RESETCONTENT
#define PM_GETSEL                     LB_GETSEL
#define PM_GETCURSEL                  LB_GETCURSEL
#define PM_GETTEXT                    LB_GETTEXT
#define PM_GETCOUNT                   LB_GETCOUNT
#define PM_GETSELITEMS                LB_GETSELITEMS
#define PM_GETSELCOUNT                LB_GETSELCOUNT
#define PM_GETCARETINDEX              LB_GETCARETINDEX
#define PM_FINDSTRING                 LB_FINDSTRING
#define PM_GETTOPINDEX                LB_GETTOPINDEX
#define PM_DELETESELECTEDITEMS        (WM_USER + 100)
#define PM_QUERYDRAGICON              (WM_USER + 101)
#define PM_ADDITEM                    (WM_USER + 102)    /* lParam = (LPPALPARM) &PalParm */
#define PM_INITIALIZE                 (WM_USER + 103)
#define PM_INSERTITEM                 (WM_USER + 104)
#define PM_GETPANELSEL                (WM_USER + 105)
#define PM_GETITEM                    (WM_USER + 106)
#define PM_SELECTALL                  (WM_USER + 107)
#define PM_DESELECTALL                (WM_USER + 108)
#define PM_RECREATETHUMBNAILS         (WM_USER + 109)
#define PM_DELETEITEM                 (WM_USER + 110)
#define PM_PASTEITEM                  (WM_USER + 111)
#define WM_ITEMCHANGED                (WM_USER + 112)

/* Palette notification codes */

#define PLN_DBLCLK           LBN_DBLCLK
#define PLN_KILLFOCUS        LBN_KILLFOCUS
#define PLN_SELCHANGE        LBN_SELCHANGE
#define PLN_CREATE           100
#define PLN_PALETTECHANGED   101

typedef struct _PALCREATEPARMS
  {
    int   nPanelSize;            /* Width and height of panel in hundreths of an inch.
                                    or number of panels/column if < 0 */
    int   nInterPanelSpacing;    /* Hundreths of an inch. */
  } PALCREATEPARMS;

#ifndef FORWARDREF
typedef PALCREATEPARMS FAR * LPPALCREATEPARMS;
#endif

#ifndef PHOTO
struct Photo {
   char  szTitle[52];
   char  szPhotoPath[129];
   char  szPhotoFileName[115];
   char  szThumbPath[129];
   char  szThumbFileName[129];
   char  szFastLoadPath[129];
   char  szFastLoadFileName[129];
   unsigned short  usFlags;
   long  lMinDisplayTime;
   long  lMaxDisplayTime;
   short  sPhotoLeft;
   short  sPhotoTop;
   short  sPhotoRight;
   short  sPhotoBottom;
   short  sThumbLeft;
   short  sThumbTop;
   short  sThumbRight;
   short  sThumbBottom;
   short  sCropLeft;
   short  sCropTop;
   short  sCropRight;
   short  sCropBottom;
   short  sDisplayScale;
};

#define PHOTO
#endif

typedef struct _PALPARM
  {
    struct Photo photo;
    unsigned long db_addr;
  } PALPARM;

#ifndef FORWARDREF
typedef PALPARM FAR * LPPALPARM;
#endif

void    WINAPI  PaletteInit (void);
HBITMAP WINAPI  DIBToBitmap (HDIB hDIB, HPALETTE hPal /* , LPBITMAP lpBitmap */);

#ifdef __cplusplus
}
#endif
```

PALETTE.H 10-3-94 2:26p printed Oct 03, 1994 at 14:27

```
/* Copyright 1989-1994 FotoAttacher by Michael B. Mast, licensed
   to ProCentric Computer Service, Inc., all rights reserverd.
        Trade secret and patent pending. */

// photo.h : header file
//

/////////////////////////////////////////////////////////////////////////////
// CPhoto object
class CPhoto : public CObject
{
    DECLARE_SERIAL(CPhoto);

public:
    CPhoto();       // Create a "dummy" with default constructor
    CPhoto(struct Photo& stPhoto, DB_ADDR dba = 0);     // Public constructor
    void PopulatePhoto (struct Photo& stPhoto, DB_ADDR dba = 0);

    void SetCrop            (CRect rectPhotoPosn);
    void SetDBA             (long  dba);
    void SetDisplayScale    (short sDisplayScale);
    void SetFileName        (char* szPhotoFileName);
    void SetFilePath        (char* szPhotoPath);
    void SetFlags           (UINT  usFlags);
    void SetPosition        (CRect rectPhotoPosn);
    void SetThumb           (CRect rectPhotoPosn);
    void SetThumbFileName   (char* szThumbFileName);
    void SetThumbFilePath   (char* szThumbPath);
    void SetTitle           (char* szTitle);

    CRect&          GetCrop             ()  { return m_rectCrop; };
    DB_ADDR         GetDBA              ()  { return m_dba; };
    short           GetDisplayScale     ()  { return m_sDisplayScale; };
    CString&        GetFileName         ()  { return m_CSPhotoFileName; };
    CString&        GetFilePath         ()  { return m_CSPhotoPath; };
    UINT            GetFlags            ()  { return m_usFlags; } ;
    CRect&          GetPosition         ()  { return m_rectPosition; };
    struct Photo    GetStruct           ();
    CRect&          GetThumb            ()  { return m_rectThumb; };
    CString&        GetThumbFileName    ()  { return m_CSThumbFileName; };
    CString&        GetThumbFilePath    ()  { return m_CSThumbPath; };
    CString&        GetTitle            ()  { return m_CSTitle; };

private:
    CString m_CSTitle;
    CString m_CSPhotoFileName;
    CString m_CSPhotoPath;
    CString m_CSThumbFileName;
    CString m_CSThumbPath;
    UINT    m_usFlags;
    CRect   m_rectPosition;
    CRect   m_rectThumb;
    CRect   m_rectCrop;
    short   m_sDisplayScale;
    DB_ADDR m_dba;
};
```

```
/* Copyright 1989-1994 FotoAttacher by Michael B. Mast, licensed
   to ProCentric Computer Service, Inc., all rights reserverd.
        Trade secret and patent pending. */

// photodoc.h : header file
//

/////////////////////////////////////////////////////////////////////////////
// CPhotoDoc document

class CPhotoDoc : public CDocument
{
    DECLARE_SERIAL(CPhotoDoc)
protected:
    CPhotoDoc();            // protected constructor used by dynamic creation
    BOOL            m_bChangedName;
    DB_ADDR         m_dba;
    CPhoto*         m_pPhoto;

// Attributes
public:
    BOOL            NameIsChanged() {return m_bChangedName; };
    virtual BOOL    SaveModified();
    void            SavePhoto();
    void            SetChangedName(BOOL bSet = TRUE);
    void            SetDBA(DB_ADDR dba);
    void            SetPathName(const char* pszPathName, BOOL bAddToMRU);

// Operations
public:

// Implementation
protected:
    virtual ~CPhotoDoc();
    virtual void Serialize(CArchive& ar);   // overridden for document i/o
    virtual BOOL OnNewDocument();
    virtual BOOL OnOpenDocument(const char *szDocumentName);


    // Generated message map functions
protected:
    //{{AFX_MSG(CPhotoDoc)
        // NOTE - the ClassWizard will add and remove member functions here.
    //}}AFX_MSG
    DECLARE_MESSAGE_MAP()
};
```

```
/* Copyright 1989-1994 FotoAttacher by Michael B. Hast, licensed
   to ProCentric Computer Service, Inc., all rights reserverd.
        Trade secret and patent pending. */

// photovw.h : header file
//

/////////////////////////////////////////////////////////////////////////////
// CPhotovw view

class CPhotovw : public CView
{
    DECLARE_DYNCREATE(CPhotovw)
protected:
    CPhotovw();         // protected constructor used by dynamic creation

// Attributes
public:

// Operations
public:

// Implementation
protected:
    virtual ~CPhotovw();
    virtual void OnDraw(CDC* pDC);      // overridden to draw this view

    // Generated message map functions
protected:
    //{{AFX_MSG(CPhotovw)
        // NOTE - the ClassWizard will add and remove member functions here.
    //}}AFX_MSG
    DECLARE_MESSAGE_MAP()
};

/////////////////////////////////////////////////////////////////////////////
```

```
/* Copyright 1989-1994 FotoAttacher by Michael B. Mast, licensed
   to ProCentric Computer Service, Inc., all rights reserverd.
         Trade secret and patent pending. */

// remove.h : header file
//

/////////////////////////////////////////////////////////////////////////////
// CRemoveDlg dialog

class CRemoveDlg : public CDialog
{
// Construction
public:
    CRemoveDlg(CWnd* pParent = NULL);   // standard constructor

// Dialog Data
    //{{AFX_DATA(CRemoveDlg)
    enum { IDD = IDD_REMOVE_THUMBS };
    CString m_csDrive;
    //}}AFX_DATA

// Implementation
protected:
    virtual void DoDataExchange(CDataExchange* pDX);    // DDX/DDV support

    // Generated message map functions
    //{{AFX_MSG(CRemoveDlg)
        // NOTE: the ClassWizard will add member functions here
    //}}AFX_MSG
    DECLARE_MESSAGE_MAP()
};
```

```
/* Copyright 1989-1994 FotoAttacher by Michael B. Mast. licensed
   to ProCentric Computer Service, Inc., all rights reserverd.
        Trade secret and patent pending. */

//{{NO_DEPENDENCIES}}
// App Studio generated include file.
// Used by FOTOATT.RC
//
#define IDR_MAINFRAME                   2
#define IDR_FOTOATTYPE                  3
#define IDS_TIME_MIN                    4
#define IDS_TIME_MAX                    5
#define IDS_IDLE_INV                    6
#define IDS_TIME_INV                    7
#define IDS_NO_CLIPBOARD                9
#define IDS_PHOTO_CLASS_NAME            10
#define IDS_GALLERY_MISSING             11
#define IDS_GALLERY_DUPLICATE           12
#define IDS_GALLERY_NOT_SAVED           13
#define IDS_APP_NAME_SCREEN_SAVER       14
#define IDS_APP_NAME_DEFAULT            15
#define IDS_GALLERY_NAME_RANDOM         16
#define IDS_GALLERY_DELETE_OK           17
#define IDS_PHOTO_MISSING               18
#define IDS_PHOTO_NOT_SAVED             19
#define IDS_FILE_MESSAGE                20
#define IDS_REMOVE_THUMBS               21
#define IDS_INIT_DB                     22
#define IDS_BACKUP_OPEN                 23
#define IDS_RESTORE_DB                  24
#define IDS_RESTORE_ERROR01             25
#define IDS_RESTORE_ERROR02             26
#define IDS_BACKUP_FILTER               27
#define IDS_FILTERSTRING1               34
#define IDS_FILTERSTRING2               35
#define IDS_FILTERSTRING3               36
#define IDS_FILTERSTRING4               37
#define IDS_FILTERSTRING5               38
#define IDS_FILTERSTRING6               39
#define IDD_ABOUTBOX                    100
#define IDD_GALLERY                     103
#define IDD_APPLICATIONS                105
#define IDD_CHOOSE_GALLERY              106
#define IDR_PHOTO                       107
#define IDR_GALLERY                     108
#define IDI_ICON1                       109
#define IDR_GALLERY_LB                  109
#define IDC_CURSOR1                     111
#define IDC_CURSOR2                     112
#define IDD_SETTINGS                    114
#define IDI_ICON2                       114
#define IDB_BITMAP1                     115
#define IDD_GALLERY_INFO                116
#define IDD_SCREEN_SAVER                117
#define IDD_REMOVE_THUMBS               119
#define IDD_IMPEXP_GAL                  120
#define IDC_CLOSE                       1000
#define IDC_NEW_GALLERY                 1001
#define IDC_EDIT_GALLERY                1002
#define IDC_DELETE_GALLERY              1003
#define IDC_GALLERY_LIST                1004
#define IDC_AUTO_ROLL_DELAY             1005
#define IDC_ROLL_RATE                   1006
#define IDC_INCLUDE_ALL                 1009
#define IDC_EXCLUDE_ALL                 1010
#define IDC_DELETE                      1011
#define IDC_CH_GALLERY                  1012
#define IDC_SS_GALLERY_LIST             1012
#define IDC_LIST_GALLERIES              1013
#define IDC_LIST_APPLICATIONS           1014
#define IDC_SETTINGS_DISPLAY_MIN        1015
#define IDC_SETTINGS_DISPLAY_MAX        1016
#define IDC_SETTINGS_MOUSE_IDLE         1017
#define IDC_SETTINGS_LM_ROLL            1018
#define IDC_SETTINGS_LM_SNAP            1019
#define IDC_SETTINGS_IDLE_ROLL          1020
#define IDC_SETTINGS_IDLE_SNAP          1021
#define IDC_SETTINGS_IDLE_CUE           1022
#define IDC_SETTINGS_IDLE_NOTHING       1023
#define IDC_GALLERY_NAME                1025
#define IDC_SS_MIN_DISPLAY              1026
#define IDC_SS_MAX_DISPLAY              1027
#define IDC_SS_PASSWORD_ACTIVE          1032
#define IDC_SS_SET_PASSWORD             1033
#define IDC_ETOLD                       1034
#define IDC_ETNEW                       1035
#define IDC_ETAGAIN                     1036
#define ID_PASSWORDHELP                 1037
#define IDC_FOO_HELP                    1038
#define IDC_SETTINGS_TIME_SLICE         1039
#define psh16                           0x040f
#define IDC_FOO_READONLY                0x0410
#define IDC_GALLERY_DISPLAY_MIN         1042
#define IDC_GALLERY_DISPLAY_MAX         1043
#define IDC_REMOVE_THUMBS_DRIVE         1044
#define IDC_IMP_EXP_DESCRIPTION         1045
#define stc1                            0x0440
#define stc2                            0x0441
#define stc3                            0x0442
#define stc4                            0x0443
#define IDC_FOO_PALETTE                 0x0460
#define IDC_FOO_DIRECTORIES             0x0461
#define IDC_FOO_TYPES                   0x0470
#define IDC_FOO_DRIVES                  0x0471
#define IDC_FOO_FILE_NAME               0x0480
#define FILEOPENORD                     1536
#define IDD_FILEOPENORD                 1536
#define DLG_CHANGEPASSWORD              2000
#define ID_APPLICATIONS                 32771
#define ID_SCREEN_SAVER                 32772
#define ID_OPEN_PHOTO                   32773
#define ID_SCAN_PHOTO                   32774
#define ID_OPEN_GALLERY                 32775
#define ID_EXPORT_GALLERY               32776
#define ID_NEW_GALLERY                  32777
#define ID_IMPORT_GALLERY               32778
#define ID_SHOW_SIG_REGION              32779
#define ID_AUTO_ROLLDOWN                32780
#define ID_ROLL_RATES                   32781
#define ID_PALETTE                      32782
#define ID_OPTIONS_SHOW_SIG_REGION      32783
#define ID_OPTIONS_AUTO_ROLLDOWN        32784
#define ID_OPTIONS_ROLL_RATES           32785
#define ID_CONFIGURE_APPLICATIONS       32786
#define ID_CONFIGURE_SCREEN_SAVER       32787
#define ID_OPTIONS_PALETTES             32788
#define ID_FILE_OPEN_PHOTO              32789
#define ID_FILE_SCAN_PHOTO              32790
#define ID_FILE_NEW_GALLERY             32791
#define ID_FILE_OPEN_GALLERY            32792
#define ID_FILE_EXPORT_GALLERY          32793
#define ID_FILE_IMPORT_GALLERY          32794
#define ID_OPTIONS_SET_DEFAULTS         32796
#define ID_FILE_EDIT_GALLERY            32801
#define ID_EDIT_SELECT_REGION           32802
#define ID_EDIT_REMOVE_SELECTION        32803
#define ID_EDIT_CROP_REGION             32804
#define ID_EDIT_DESIGNATION_REGION      32805
#define ID_FILE_SELECT_SOURCE           32806
#define ID_OPTIONS_SETTINGS             32807
#define ID_EDIT_DELETE                  32810
#define ID_EDIT_GALLERY_INFO            32813
#define ID_FILE_DELETE                  32814
#define ID_FILE_DELETE_GALLERY          32815
#define ID_FILE_DELETE_PHOTO            32816
#define ID_EDIT_SELECTALL               32819
#define ID_EDIT_DESELECTALL             32820
#define ID_EDIT_RECREATE_THUMBNAILS     32821
#define ID_GALLERY_ADD_PHOTO            32822
#define ID_FILE_ADD_PHOTO               32823
#define IDM_TOOLS_REMOVE_THUMBS         32824
#define IDM_TOOLS_INIT_DB               32825

// Next default values for new objects
//
#ifdef APSTUDIO_INVOKED
#ifndef APSTUDIO_READONLY_SYMBOLS

#define _APS_NEXT_RESOURCE_VALUE        121
#define _APS_NEXT_COMMAND_VALUE         32826
#define _APS_NEXT_CONTROL_VALUE         1046
#define _APS_NEXT_SYMED_VALUE           101
#endif
#endif
```

```
/* Copyright 1989-1994 FotoAttacher by Michael B. Mast, licensed
   to ProCentric Computer Service, Inc., all rights reserverd.
        Trade secret and patent pending. */

// scrnsvr.h : header file
//

/////////////////////////////////////////////////////////////////////////////
// CScreenSaver dialog

class CAppItem;
class CScreenSaver : public CDialog
{
// Construction
public:
    CScreenSaver(CWnd* pParent = NULL); // standard constructor

// Dialog Data
    //{{AFX_DATA(CScreenSaver)
    enum { IDD = IDD_SCREEN_SAVER };
    BOOL    m_bPasswordProtected;
    CString m_CSMinDisplay;
    CString m_CSMaxDisplay;
    CString m_listGalleries;
    //}}AFX_DATA

    long        m_lDisplayMin;
    long        m_lDisplayMax;
    CAppItem*   m_pScreenSaver;
    CDWordArray m_Galleries;
    int         m_nRandomGalleryIndex;

// Implementation
protected:
    virtual void DoDataExchange(CDataExchange* pDX);    // DDX/DDV support

    // Generated message map functions
    //{{AFX_MSG(CScreenSaver)
    afx_msg void OnExcludeAll();
    afx_msg void OnIncludeAll();
    afx_msg void OnSelchangeGalleryList();
    virtual BOOL OnInitDialog();
    virtual void OnCancel();
    virtual void OnOK();
    afx_msg void OnSetPassword();
    afx_msg void OnPasswordActive();
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

// settings.h : header file
//

/////////////////////////////////////////////////////////////////////////////
// CSettings dialog

class CSettings : public CDialog
{
// Construction
public:
    CSettings(CWnd* pParent = NULL);    // standard constructor

// Dialog Data
    //{{AFX_DATA(CSettings)
    enum { IDD = IDD_SETTINGS };
    int     m_nAutoRollDelay;
    int     m_nRollRate;
    int     m_nLeftMouseFunction;
    int     m_nIdleMouseFunction;
    CString m_CSDisplayMax;
    CString m_CSDisplayMin;
    CString m_CSMouseIdleTime;
    CString m_CSTimeSlice;
    //}}AFX_DATA

    long    m_lDisplayMin;
    long    m_lDisplayMax;
    long    m_lScreenSaverDelay;
    long    m_lMouseIdleTime;
    long    m_lTimeSlice;

// Implementation
protected:
    virtual void DoDataExchange(CDataExchange* pDX);    // DDX/DDV support

    // Generated message map functions
    //{{AFX_MSG(CSettings)
    //}}AFX_MSG
    DECLARE_MESSAGE_MAP()
};
```

```
/* Copyright 1989-1994 FotoAttacher by Michael B. Mast, licensed
   to ProCentric Computer Service, Inc., all rights reserverd.
        Trade secret and patent pending. */

// stdafx.h : include file for standard system include files,
//  or project specific include files that are used frequently, but
//      are changed infrequently
//

#include <afxwin.h>          // MFC core and standard components
#include <afxext.h>          // MFC extensions (including VB)

#include <vista.h>           // DB Vista definitions
#include <dbtype.h>          // DB Vista definitions

#include "attacher.h"        // Foto Attacher DB Vista Structures and definitions

#include "control.h"         // Local definition of the control object
```

```
/* Copyright 1989-1994 FotoAttacher by Michael R. Mast, licensed
    to ProCentric Computer Service, Inc., all rights reserverd.
        Trade secret and patent pending. */

// DDV routines for FotoAttacher

void AFXAPI DDX_Time (CDataExchange* pDX, int nIDC, long& lSeconds);
void AFXAPI DDX_MSec (CDataExchange* pDX, int nIDC, long& lMSec);
```

```
/* Copyright 1989-1994 FotoAttacher by Michael B. Mast, licensed
   to ProCentric Computer Service, Inc., all rights reserverd.
         Trade secret and patent pending. */

#include <windows.h>
#include <toolhelp.h>
#include "memory.h"
#include <string.h>
#include "stdio.h"
#include "stdlib.h"
#include "dos.h"
#include "direct.h"
#include "forward.h"      /* forward references */
#include "palette.h"
#include "palintrn.h"
#include "taviltree.h"
#include "subseg.h"
#include <debug.h>
#include "deco.h"

#define _WINDLL

/* Defines used by l_bitmap.h */

#define WIN31
#define FOR_DLL     // Must define this before including l_bitmap.h

#include <l_bitmap.h>
#include <l_error.h>

/* Things to do:

1.   When scrolling left (right?) after we reach the first col, the
     timer is killed (see WM_TIMER message).  The cursor is not
     reset to the non scrolling cursor (IDC_ARROW, CURMOVE, or
     CURCOPY).

2.   While moving/copying, if the ctl key is pressed or released,
     the move/copy cursor is not updated until the next mouse
     move.

3.   Right click on panel displays the items description. (No,
     instead I added a FILEDESC control.  To get it, specify
     the LBS_DESCRIPTION style.)

4.   Add keyboard navigation to palette

5.   PLS_EXTENDEDSEL acts the same as PLS_MULTIPLESEL

6.   PM_DELETEITEM calls RepaintShiftedItems evertime one
     item is deleted.  It's much better to send
     PM_DELETESELECTEDOBJECTS.  This unlinks all the
     selected items and then calls RepaintShiftedItems
     once, passing the item number of the first
     deleted item.

7.   The words Item and Object are used somewhat interchangeably.
     Pick one.

8.   Make everything zero based (panels and items).

9.   Drag and drop.  Instead of starting at the application level, it may
     be ok to start at the desktop level.  This didn't work before because
     there were wierd invisible windows lying around which
     ChildWindowFromPoint was returning.  I think all we need to do is
     something like this:

     if (hPanelWnd  && hPanelWnd != hWnd && IsWindowVisible (hPanelWnd))
       break;

10.  Keep a count of the number of selected items as opposed to looping
     thru them all and counting them.

11.  Treating PM_GETCARETINDEX exactly like PM_GETCURSEL.  This is
     wrong.  After keyboard support has been installed, fix this
     so that it works the way it's supposed to.

12.  There's some unecessary painting going on.  If you move panel 2 to panel
     1's position (i.e. swap panels 1 and 2), all panels starting with
     panel 1 are repainted.

13.  Any common dialog box that uses the palette should specifiy a panel
     size that is equal to the panel sizes used in the application
     (the galleries in the case of FotoAttacher).  This (currently) is
     becuase you want the thumbnails created in one window (like the
     common dialog box) to be the same size as the thumbnails created
     in another window (like the gallary).  So, don't specify something
     like -3, because you don't know how big the panel will be and it
     may not match the panels in an app.

*/

#define MAXPALETTES 100
#define MAXTASKS     20

typedef  LPVOID (WINAPI * TAVLALLOC)   (HANDLE, WORD, WORD);
typedef  LPVOID (WINAPI * TAVLDEALLOC) (LPVOID);

long          WINAPI  PaletteWndProc             (HWND, UINT, WPARAM, LPARAM);
long          WINAPI  PanelWndProc               (HWND, UINT, WPARAM, LPARAM);
long          WINAPI  TextWndProc                (HWND, UINT, WPARAM, LPARAM);
void          WINAPI  SetScrollBarArrows         (HWND);
LPVOID        WINAPI  GetObjectKey               (LPPALITEM);                     /* Returns ptr to string
     given object */
LPPALITEM     WINAPI  AllocObject                (LPPALINSTANCEDATA, LPPALITEM);  /* Gets first object on
     free list */
void          WINAPI  FreeObject                 (LPPALINSTANCEDATA, LPPALITEM);  /* Places the object on the
     free list */
LPPALITEM     WINAPI  CopyObject                 (LPPALITEM, LPPALITEM);          /* Copies object */
int           WINAPI  CompareObject              (LPPALITEM, LPPALITEM);          /* Compares two objects */
BOOL          WINAPI  AddPanel                   (HWND,  TAVL_nodeptr);
int           WINAPI  PanelToItem                (LPPALINSTANCEDATA, int);
int           WINAPI  ItemToPanel                (LPPALINSTANCEDATA, int);
int           WINAPI  HackOutPath                (LPSTR, LPSTR);
void          WINAPI  GetPalParm                 (LPPALPARM, LPPALITEM);
void          WINAPI  UnlinkPalItem              (LPPALINSTANCEDATA, LPPALITEM);
void          WINAPI  RepaintShiftedItems        (LPPALINSTANCEDATA, HWND, int);
HWND          WINAPI  GetDropableWindowFromPoint (HWND, POINT);

LPSTR         WINAPI   FindDIBBits (LPSTR lpDIB);
WORD          WINAPI   PaletteSize (LPSTR lpDIB);
WORD          WINAPI   DIBNumColors (LPSTR lpDIB);
BOOL          WINAPI   SaveDDB (HBITMAP, LPSTR);
HBITMAP       WINAPI   LoadDDB (LPSTR);
HBITMAP       WINAPI   CreateThumbnailDDB (LPSTR, LPSTR, int, int);
HBITMAP       WINAPI   CreateThumbnail (LPPALITEM);
void          WINAPI   GetThumbnailBits (HBITMAP, LPPALITEM);
LRESULT       CALLBACK MessageHook (int, WPARAM, LPARAM);

HANDLE hLibInstance;

HWND       ahWnd[MAXPALETTES];
TASKTABLE TaskTable[MAXTASKS];

int   nPalettes = 0;
int   nTasks    = 0;
BOOL  fItemFieldChanged;
int   tmAveCharWidth;
int   tmHeight;

LPSTR lpszFont          = "Arial";
LPSTR lpszPaletteClass  = "palette";
LPSTR lpszPanelClass    = "panel";
LPSTR lpszTextClass     = "text";

HFONT  hFont;

static LOGPANELPALETTE FixedPalette =
   {
      0x300,
      256,
      0x00, 0x00, 0x00, 0x00,
      0xBF, 0x00, 0x00, 0x00,
      0x00, 0xBE, 0x00, 0x00,
      0xBF, 0xBF, 0x01, 0x00,
      0x00, 0x00, 0xC0, 0x00,
      0xBF, 0x00, 0xBF, 0x00,
      0x00, 0xBF, 0xBE, 0x00,
      0xC1, 0xC0, 0xBF, 0x00,
      0xC0, 0xDC, 0xC1, 0x00,
      0xA5, 0xC9, 0xF0, 0x00,
      0x81, 0x00, 0x00, 0x00,
      0x00, 0x80, 0x01, 0x00,
      0x81, 0x80, 0x01, 0x00,
      0x00, 0x00, 0x80, 0x00,
      0x80, 0x00, 0x80, 0x00,
      0x01, 0x81, 0x80, 0x00,
      0x08, 0x07, 0x07, 0x00,
      0x00, 0x00, 0x40, 0x00,
      0x18, 0x17, 0x18, 0x00,
      0x39, 0x03, 0x18, 0x00,
      0x10, 0x10, 0x4F, 0x00,
      0x0C, 0x08, 0x88, 0x00,
      0x08, 0x3C, 0x03, 0x00,
      0x27, 0x28, 0x03, 0x00,
      0x53, 0x14, 0x04, 0x00,
      0x08, 0x34, 0x28, 0x00,
      0x29, 0x29, 0x29, 0x00,
      0x55, 0x11, 0x27, 0x00,
      0x20, 0x20, 0x60, 0x00,
      0x40, 0x09, 0x60, 0x00,
      0x20, 0x13, 0x98, 0x00,
      0x20, 0x07, 0x01, 0x00,
      0x09, 0x53, 0x00, 0x00,
      0x38, 0x3C, 0x08, 0x00,
      0x65, 0x28, 0x00, 0x00,
      0x94, 0x00, 0x0C, 0x00,
      0x07, 0x48, 0x37, 0x00,
      0x39, 0x38, 0x38, 0x00,
      0x64, 0x21, 0x38, 0x00,
      0x8F, 0x08, 0x38, 0x00,
      0x09, 0x45, 0x71, 0x00,
      0x38, 0x20, 0x70, 0x00,
      0x69, 0x10, 0x70, 0x00,
      0x07, 0x38, 0xA8, 0x00,
      0x38, 0x21, 0xA7, 0x00,
      0x64, 0x00, 0xA8, 0x00,
      0x08, 0x28, 0xE0, 0x00,
      0x3F, 0x0F, 0xE1, 0x00,
      0x19, 0x68, 0x13, 0x00,
```

```
0x48, 0x50, 0x13, 0x00,
0x75, 0x38, 0x13, 0x00,
0xA1, 0x20, 0x14, 0x00,
0xCD, 0x08, 0x14, 0x00,
0x17, 0x58, 0x49, 0x00,
0x47, 0x48, 0x49, 0x00,
0x74, 0x30, 0x49, 0x00,
0xA1, 0x19, 0x47, 0x00,
0xC7, 0x04, 0x49, 0x00,
0x18, 0x54, 0x80, 0x00,
0x48, 0x3C, 0x7F, 0x00,
0x74, 0x24, 0x81, 0x00,
0xA1, 0x0C, 0x80, 0x00,
0x17, 0x49, 0x88, 0x00,
0x48, 0x2F, 0x89, 0x00,
0x81, 0x14, 0x88, 0x00,
0x18, 0x41, 0xE8, 0x00,
0x47, 0x29, 0xE8, 0x00,
0x78, 0x0D, 0xE8, 0x00,
0x23, 0x78, 0x18, 0x00,
0x58, 0x60, 0x18, 0x00,
0x84, 0x47, 0x18, 0x00,
0xB0, 0x34, 0x1C, 0x00,
0xE4, 0x18, 0x1C, 0x00,
0x23, 0x70, 0x59, 0x00,
0x58, 0x58, 0x58, 0x00,
0x83, 0x40, 0x58, 0x00,
0xB0, 0x29, 0x58, 0x00,
0xE4, 0x10, 0x59, 0x00,
0x24, 0x65, 0x91, 0x00,
0x59, 0x4C, 0x91, 0x00,
0x84, 0x33, 0x90, 0x00,
0xAF, 0x1C, 0x90, 0x00,
0xDC, 0x08, 0x8F, 0x00,
0x23, 0x58, 0xD0, 0x00,
0x58, 0x3F, 0xCF, 0x00,
0x84, 0x28, 0xD1, 0x00,
0xB5, 0x11, 0xD1, 0x00,
0x0C, 0x9F, 0x28, 0x00,
0x39, 0x88, 0x28, 0x00,
0x68, 0x6F, 0x28, 0x00,
0x94, 0x5C, 0x28, 0x00,
0xC0, 0x44, 0x28, 0x00,
0xE8, 0x2C, 0x29, 0x00,
0x0D, 0x93, 0x67, 0x00,
0x38, 0x7C, 0x68, 0x00,
0x67, 0x67, 0x67, 0x00,
0x94, 0x51, 0x68, 0x00,
0xC0, 0x38, 0x67, 0x00,
0xED, 0x1F, 0x67, 0x00,
0x0C, 0x88, 0xA0, 0x00,
0x39, 0x73, 0x9F, 0x00,
0x68, 0x5C, 0x9F, 0x00,
0x94, 0x43, 0xA0, 0x00,
0xC0, 0x2D, 0xA1, 0x00,
0xEC, 0x18, 0x9F, 0x00,
0x08, 0x80, 0xD7, 0x00,
0x38, 0x69, 0xD9, 0x00,
0x69, 0x50, 0xD8, 0x00,
0x94, 0x38, 0xD7, 0x00,
0xC0, 0x24, 0xD7, 0x00,
0xED, 0x0C, 0xD8, 0x00,
0x1C, 0x87, 0x0D, 0x00,
0x49, 0x9F, 0x0C, 0x00,
0x79, 0x88, 0x08, 0x00,
0xA3, 0x74, 0x0C, 0x00,
0xD3, 0x57, 0x0C, 0x00,
0x1D, 0x81, 0x3C, 0x00,
0x48, 0x98, 0x3C, 0x00,
0x77, 0x81, 0x38, 0x00,
0xA5, 0x69, 0x3C, 0x00,
0xD4, 0x4F, 0x3C, 0x00,
0x1C, 0xA5, 0x77, 0x00,
0x48, 0x88, 0x78, 0x00,
0x78, 0x77, 0x78, 0x00,
0xA4, 0x60, 0x77, 0x00,
0xD4, 0x44, 0x78, 0x00,
0x1C, 0x97, 0x80, 0x00,
0x49, 0x86, 0xAF, 0x00,
0x77, 0x68, 0xAF, 0x00,
0xA6, 0x54, 0xAF, 0x00,
0xD3, 0x38, 0xB0, 0x00,
0x1C, 0x90, 0xE8, 0x00,
0x48, 0x77, 0xE8, 0x00,
0x79, 0x61, 0xE8, 0x00,
0xA4, 0x48, 0xE8, 0x00,
0xD3, 0x30, 0xE9, 0x00,
0x2C, 0xCF, 0x17, 0x00,
0x8C, 0x89, 0x18, 0x00,
0x88, 0xA0, 0x18, 0x00,
0x88, 0x87, 0x19, 0x00,
0xE4, 0x6F, 0x18, 0x00,
0x28, 0xC4, 0x50, 0x00,
0x5C, 0xA0, 0x4F, 0x00,
0x80, 0x93, 0x50, 0x00,
0x88, 0x7C, 0x4F, 0x00,
0xE4, 0x68, 0x50, 0x00,
0x2C, 0x8C, 0x8C, 0x00,
0x58, 0xA0, 0x8C, 0x00,
0x8C, 0x80, 0x8C, 0x00,
```

```
0x88, 0x73, 0x80, 0x00,
0xE4, 0x50, 0xBC, 0x00,
0x20, 0xAF, 0xC5, 0x00,
0x58, 0x97, 0xC3, 0x00,
0x8C, 0x7F, 0xC5, 0x00,
0x88, 0x68, 0xC4, 0x00,
0xE5, 0x4F, 0xC3, 0x00,
0x28, 0xA8, 0xF4, 0x00,
0x58, 0x88, 0xF5, 0x00,
0x8C, 0x78, 0xF4, 0x00,
0x88, 0x61, 0xF3, 0x00,
0xE3, 0x48, 0xF4, 0x00,
0x44, 0xE9, 0x28, 0x00,
0x74, 0xCF, 0x28, 0x00,
0xA4, 0xB7, 0x29, 0x00,
0xD3, 0x9F, 0x29, 0x00,
0x1D, 0xF0, 0x67, 0x00,
0x48, 0xD0, 0x68, 0x00,
0x74, 0xC3, 0x68, 0x00,
0xA4, 0xA0, 0x68, 0x00,
0xD4, 0x94, 0x68, 0x00,
0x13, 0xE9, 0xA5, 0x00,
0x48, 0xCF, 0xA4, 0x00,
0x74, 0xB7, 0xA4, 0x00,
0xA4, 0xA5, 0xA4, 0x00,
0xD5, 0x88, 0xA5, 0x00,
0x14, 0xE0, 0xDC, 0x00,
0x48, 0xC4, 0xDC, 0x00,
0x73, 0xB1, 0xDC, 0x00,
0xA4, 0x98, 0xDB, 0x00,
0xD4, 0x7C, 0xD8, 0x00,
0x88, 0xF5, 0x18, 0x00,
0xBC, 0xD9, 0x18, 0x00,
0xE8, 0xBF, 0x19, 0x00,
0x81, 0xE0, 0x49, 0x00,
0x8C, 0xCF, 0x49, 0x00,
0xE8, 0xB9, 0x49, 0x00,
0x60, 0xF4, 0x80, 0x00,
0x8C, 0xD0, 0x81, 0x00,
0x88, 0xC3, 0x80, 0x00,
0xE8, 0xAC, 0x80, 0x00,
0x38, 0xF8, 0xB0, 0x00,
0x61, 0xE8, 0xBC, 0x00,
0x8C, 0xD0, 0xBC, 0x00,
0x88, 0x88, 0xBC, 0x00,
0xE7, 0xA4, 0xBC, 0x00,
0x33, 0xF5, 0xEC, 0x00,
0x60, 0xE0, 0xEC, 0x00,
0x80, 0xC7, 0xE8, 0x00,
0x88, 0xAF, 0xEC, 0x00,
0xE7, 0x98, 0xEC, 0x00,
0xD8, 0xEF, 0x27, 0x00,
0xD8, 0xE5, 0x60, 0x00,
0xAC, 0xF1, 0x98, 0x00,
0xD9, 0xD8, 0x98, 0x00,
0xA6, 0xE8, 0xD5, 0x00,
0xD5, 0xD3, 0xD3, 0x00,
0xF0, 0xC4, 0xD4, 0x00,
0xA6, 0xE4, 0xF5, 0x00,
0xD5, 0xC8, 0xF4, 0x00,
0xF0, 0x8C, 0xF4, 0x00,
0xF8, 0xFC, 0x7C, 0x00,
0xF4, 0xF3, 0xB4, 0x00,
0xCC, 0xFC, 0xF0, 0x00,
0xF0, 0xF1, 0xF0, 0x00,
0x80, 0x5F, 0xBE, 0x00,
0x9F, 0x5F, 0xC0, 0x00,
0xC0, 0x60, 0xC0, 0x00,
0xDF, 0x5E, 0xC0, 0x00,
0xFF, 0x60, 0xBE, 0x00,
0x3F, 0x80, 0xC0, 0x00,
0x5F, 0x7E, 0xBE, 0x00,
0x7E, 0x7F, 0xBF, 0x00,
0x9F, 0x7E, 0xBF, 0x00,
0xC0, 0x80, 0xBE, 0x00,
0xDE, 0x7E, 0xBF, 0x00,
0xFF, 0x80, 0xBF, 0x00,
0x3F, 0x9F, 0xBF, 0x00,
0x5F, 0x9F, 0xC0, 0x00,
0x80, 0x9E, 0xC0, 0x00,
0x9F, 0x9F, 0xC0, 0x00,
0xBF, 0x9F, 0xBE, 0x00,
0xDE, 0x9F, 0xBF, 0x00,
0xFF, 0x9F, 0xBF, 0x00,
0x40, 0xC0, 0xBF, 0x00,
0x5F, 0xC0, 0xBF, 0x00,
0x7F, 0xBF, 0xBF, 0x00,
0xA0, 0xBE, 0xBE, 0x00,
0xBF, 0xBF, 0xBE, 0x00,
0xE0, 0xBF, 0xBF, 0x00,
0xFE, 0xBF, 0xBF, 0x00,
0x40, 0xBE, 0xBF, 0x00,
0x60, 0xE0, 0xBF, 0x00,
0x80, 0xBE, 0xC0, 0x00,
0x9F, 0xE0, 0xC0, 0x00,
0xBE, 0xDE, 0xC0, 0x00,
0xDF, 0xDF, 0xC0, 0x00,
0xFF, 0xFA, 0xF0, 0x00,
0xA0, 0xA0, 0xA3, 0x00,
0x81, 0x80, 0x81, 0x00,
```

IC14PRINT

```
    0xFE, 0x00, 0x00, 0x00,
    0x00, 0xFF, 0x01, 0x00,
    0xFF, 0xFF, 0x01, 0x00,
    0x00, 0x00, 0xFF, 0x00,
    0xFF, 0x00, 0xFF, 0x00,
    0x00, 0xFF, 0xFE, 0x00,
    0x16, 0x00, 0x00, 0x00,
  );

void WINAPI PaletteInit (void)
{
}

int WINAPI LibMain
  (
    HANDLE  hInstance,
    WORD    wDataSeg,
    WORD    wHeapSize,
    LPSTR   lpCmdLine
  )

{
  WNDCLASS  wc;
  int       i;
  HDC       hDC;
  TEXTMETRIC tm;

  hLibInstance = hInstance;

  /* Register the palette class. */

  wc.style           = CS_DBLCLKS | CS_GLOBALCLASS;
  wc.lpfnWndProc     = PaletteWndProc;
  wc.cbClsExtra      = 0;
  wc.cbWndExtra      = PALETTECBWNDEXTRA;
  wc.hInstance       = hLibInstance;
  wc.hIcon           = NULL;
  wc.hCursor         = LoadCursor (NULL, IDC_ARROW);
  wc.hbrBackground   = GetStockObject (LTGRAY_BRUSH);
  wc.lpszMenuName    = 0;
  wc.lpszClassName   = lpszPaletteClass;

  if (!RegisterClass (&wc))
    return FALSE;

  /* Register the panel class. */

  wc.style           = NULL;
  wc.lpfnWndProc     = PanelWndProc;
  wc.cbClsExtra      = 0;
  wc.cbWndExtra      = PANELCBWNDEXTRA;
  wc.hInstance       = hLibInstance;
  wc.hIcon           = NULL;
  wc.hCursor         = LoadCursor (NULL, IDC_ARROW);
  wc.hbrBackground   = 0;
  wc.lpszMenuName    = 0;
  wc.lpszClassName   = lpszPanelClass;

  if (!RegisterClass (&wc))
    return FALSE;

  /* Register the text class. */

  wc.style           = NULL;
  wc.lpfnWndProc     = TextWndProc;
  wc.cbClsExtra      = 0;
  wc.cbWndExtra      = sizeof (WORD);     /* For storing the color value */
  wc.hInstance       = hLibInstance;
  wc.hIcon           = NULL;
  wc.hCursor         = LoadCursor (NULL, IDC_ARROW);
  wc.hbrBackground   = GetStockObject (WHITE_BRUSH);
  wc.lpszMenuName    = 0;
  wc.lpszClassName   = lpszTextClass;

  if (!RegisterClass (&wc))
    return FALSE;

  hFont = GetStockObject (ANSI_VAR_FONT);

  hDC = GetDC (NULL);
  SaveDC (hDC);
  SelectObject (hDC, hFont);
  GetTextMetrics (hDC, &tm);
  RestoreDC (hDC, -1);
  ReleaseDC (NULL, hDC);
  tmAveCharWidth = tm.tmAveCharWidth;
  tmHeight       = tm.tmHeight;

  /* Initialize the Iterated Systems decompression library. */

  InitFIFDecompress ();

  for (i = 0; i < MAXPALETTES; i++)
    ahWnd[i] = 0;

  for (i = 0; i < MAXTASKS; i++)
    {
      TaskTable[i].hTask  = 0;
      TaskTable[i].nCount = 0;
    }

  return (TRUE);
}

int WINAPI WEP
  (
    int nExitType
  )

{
  DeleteObject (hFont);

  UnregisterClass (lpszPaletteClass,  hLibInstance);
  UnregisterClass (lpszPanelClass,    hLibInstance);
  UnregisterClass (lpszTextClass,     hLibInstance);

  CloseFIFDecompress ();
  return (1);
}

long WINAPI PaletteWndProc
  (
    HWND    hWnd,
    UINT    message,
    WPARAM  wParam,
    LPARAM  lParam
  )

{
  int                  i, j, nNonPanelAreaHeight;
  HDC                  hDC;
  HANDLE               hPalInstanceData;
  LPPALINSTANCEDATA    lpPalInstanceData;
  LPPALITEM            lpPalItem, lpPalItem2, lpPalItemNext;
  LPPALCREATEPARMS     lpPalCreateParms;
  LPPALPARM            lpPalParm;
  PALITEM              PalItem;
  PALPARM              PalParm;
  RECT                 rect;
  HWND                 hWndPanel, hWndChild;
  LPSTR                lpString;
  TAVL_nodeptr         new_node, node;
  TEXTMETRIC           tm;
  POINT                pt;
  int                  nInsertAfterPanel, nInsertBeforePanel;
  char                 c, szBuffer[100], szBuffer2[100];
  BOOL                 fSelected;
  PAINTSTRUCT          ps;
  HBITMAP              hBitmap;
  HCURSOR              hOldCursor;
  DWORD                dWord;

  static HWND hWndDBLCLKPanel = 0;
  static HWND hWndDisplayAsSelected = NULL;
  static int  nTimer = 0;
  static BOOL fDragEnabled, fDrag;
  static POINT ptLast;
  static RECT rectFocus;
  static BOOL fDragCanceled = FALSE;
  static HWND hWndInsertAfter = NULL, hWndInsertBefore = NULL;
  static HWND hWndTargetPalette;
  static int  nInsertAfterItem, nInsertBeforeItem;
  static BOOL fIgnoreLButtonUp = FALSE;

#if 1
  MSG              msg;
  msg.hwnd      = hWnd;
  msg.message   = message;
  msg.wParam    = wParam;
  msg.lParam    = lParam;

  DebugOutputMessage (&msg);
#endif

  switch (message)
    {
      case WM_CREATE:
        hPalInstanceData = GlobalAlloc (GHND, sizeof (PALINSTANCEDATA));
        SetWindowWord (hWnd, HPALINSTANCEDATA, hPalInstanceData);
        lpPalInstanceData = (LPPALINSTANCEDATA) GlobalLock (hPalInstanceData);

        if (nPalettes < MAXPALETTES && nTasks < MAXTASKS)
          {
            /* Add the window handle to the table. */

            ahWnd[nPalettes++] = hWnd;

            /* Find the window handle's corresponding task in
               the task table and increment the count (the
               count represents the number of palette windows
               owned by the task).  If the task isn't in the
               task table, add it. */

            for (i = 0; i < nTasks; i++)
              if (TaskTable[i].hTask == GetCurrentTask ())
                break;

            if (i == nTasks)
              {
//                DebugPrintf ("Installing hook for task %.4X", GetCurrentTask ());
```

```
                TaskTable[i].hkMsgHook = SetWindowsHookEx (WH_GETMESSAGE, (HOOKPROC) MessageHook,
                    GetModuleHandle ("PALETTE.DLL"), GetCurrentTask ());
                TaskTable[i].hTask     = GetCurrentTask ();
                nTasks++;
              }

            TaskTable[i].nCount++;
          }


        /* Tell the parent that it's time to send the
           PM_INITIALIZE message. */

        SendMessage (GetParent (hWnd),
                     WM_COMMAND,
                     GetWindowWord (hWnd, GWW_ID),
                     MAKELPARAM (hWnd, PLN_CREATE));

        GlobalUnlock (hPalInstanceData);
        break;

      case PM_INITIALIZE:
        hPalInstanceData = GetWindowWord (hWnd, HPALINSTANCEDATA);
        lpPalInstanceData = (LPPALINSTANCEDATA) GlobalLock (hPalInstanceData);

        lpPalCreateParms = (LPPALCREATEPARMS) lParam;

        PID.nPanelSize          = lpPalCreateParms->nPanelSize;
        PID.nInterPanelSpacing = lpPalCreateParms->nInterPanelSpacing;

        hDC = GetDC (NULL);
        SaveDC (hDC);

        SelectObject (hDC, hFont);

        GetTextMetrics (hDC, &tm);

        //PID.tmAveCharWidth = tm.tmAveCharWidth;

        lstrcpy (szBuffer, " wwwwwwww.www ");
        dWord = GetTextExtent (hDC, szBuffer, lstrlen (szBuffer));
        DebugPrintf ("MM_TEXT tmAveCharWidth = %d, LOWORD (dWord) = %d", tmAveCharWidth, LOWORD (dWord));

        SetMapMode (hDC, MM_LOENGLISH);

        if (PID.nPanelSize > 0)
          {
            lstrcpy (szBuffer, " wwwwwwww.www ");
            dWord = GetTextExtent (hDC, szBuffer, lstrlen (szBuffer));
            DebugPrintf ("MM_LOENGLISH tmAveCharWidth = %d, LOWORD (dWord) = %d", tmAveCharWidth, LOWORD
                (dWord));
            //LPtoDP (hDC, (LPPOINT) &dWord, 1);

            i = max (PID.nPanelSize, (int) LOWORD (dWord));

            SetRect (&rect, 0, 0, i, i);
            LPtoDP (hDC, (LPPOINT) &rect, 2);

            PID.nXPanel =  rect.right;
            PID.nYPanel = -rect.bottom;
          }
        else
          {
            PID.nXPanel = 0;
            PID.nYPanel = 0;
          }

        i = PID.nInterPanelSpacing;
        SetRect (&rect, 0, 0, i, i);
        LPtoDP (hDC, (LPPOINT) &rect, 2);

        RestoreDC (hDC, -1);
        ReleaseDC (NULL, hDC);

        PID.nXInterPanelSpacing =  rect.right;
        PID.nYInterPanelSpacing = -rect.bottom;

        //DebugPrintf ("inter-panel spacing x=%d, y=%d", rect.right, -rect.bottom);

        PID.nItemCount   = 0;
        PID.nItemGen     = 0;
        PID.nPanelCount  = 0;
        PID.nFirstVisCol = 1;

        /* Build the heap which will contain the threaded AVL height-balanced tree. */

        PID.hTAVL = SubInitialize (0xffff);

        /* Build the heap which will contain the strings. */

        PID.hStringHeap = SubInitialize (0xffff);

        /* Allocate space for the objects. */

        PID.hObjects = GlobalAlloc (GHND, 0xffff);

        /* Initialize the threaded AVL tree */

        PID.tree = tavl_init (lpPalInstanceData,
                              CompareObject,
```

```
                              GetObjectKey,
                              AllocObject,
                              FreeObject,
                              CopyObject,
                              PID.hTAVL,
                              (TAVLALLOC)   SubAlloc,
                              (TAVLDEALLOC) SubFree);

        PID.nppalItemHead   = (NPPALITEM) -1; /* No object is on palette */
        PID.nppalFreeHead   = (NPPALITEM)  0; /* First object in segment is free (zero isn't
                                                 some special indicator; it actually is the
                                                 displacement to the first object) */

        /* Place all objects on free list */

        lpPalItem = (LPPALITEM) MAKEP (PID.hObjects, 0);

        for (i = 0; i < (int) (GlobalSize (PID.hObjects) / sizeof (PALITEM)) - 1; i++)
          {
            lpPalItem->nppalItemNext = (NPPALITEM) OFFSETOF (&lpPalItem[1]);
            lpPalItem++;
          }

        lpPalItem->nppalItemNext = (NPPALITEM) -1;     /* Last object does not point to another object */

        CreateWindow
          (
            "scrollbar",                          /* See RegisterClass() call.          */
            NULL,                                 /* Text for window title bar.         */
            WS_TABSTOP | WS_GROUP | WS_CHILD | WS_VISIBLE | SBS_HORZ,
            0,                                    /* Default horizontal position.       */
            0,                                    /* Default vertical position.         */
            0,                                    /* Default width.                     */
            0,                                    /* Default height.                    */
            hWnd,
            ID_SCROLLBAR,
            hLibInstance,                                 /* Window ID                          */
            NULL
          );

        CreateWindow
          (
            lpszTextClass,
            NULL,                                 /* Text for window title bar.         */
            WS_CHILD | WS_VISIBLE | WS_BORDER,
            0,                                    /* Default horizontal position.       */
            0,                                    /* Default vertical position.         */
            0,                                    /* Default width.                     */
            0,                                    /* Default height.                    */
            hWnd,
            ID_FILENAME,                          /* Window ID                          */
            hLibInstance,
            NULL
          );

        if (GetWindowLong (hWnd, GWL_STYLE) & PLS_DESCRIPTION)
          {
            CreateWindow
              (
                "edit",
                NULL,                                 /* Text for window title bar.         */
                WS_TABSTOP | WS_CHILD | WS_VISIBLE | WS_BORDER | ES_AUTOHSCROLL,
                0,                                    /* Default horizontal position.       */
                0,                                    /* Default vertical position.         */
                0,                                    /* Default width.                     */
                0,                                    /* Default height.                    */
                hWnd,
                ID_FILEDESC,                          /* Window ID                          */
                hLibInstance,
                NULL
              );

            CreateWindow
              (
                lpszTextClass,
                NULL,                                 /* Text for window title bar.         */
                WS_CHILD | WS_VISIBLE | WS_BORDER,
                0,                                    /* Default horizontal position.       */
                0,                                    /* Default vertical position.         */
                0,                                    /* Default width.                     */
                0,                                    /* Default height.                    */
                hWnd,
                ID_STATIC1,                           /* Window ID                          */
                hLibInstance,
                NULL
              );

            CreateWindow
              (
                "edit",
                NULL,                                 /* Text for window title bar.         */
                WS_TABSTOP | WS_CHILD | WS_VISIBLE | WS_BORDER,
                0,                                    /* Default horizontal position.       */
                0,                                    /* Default vertical position.         */
                0,                                    /* Default width.                     */
                0,                                    /* Default height.                    */
                hWnd,
                ID_FROM,                              /* Window ID                          */
                hLibInstance,
                NULL
```

```
            );

          CreateWindow
            (
              lpszTextClass,
              NULL,
              WS_CHILD | WS_VISIBLE | WS_BORDER, /* Text for window title bar.          */
              0,                                 /* Default horizontal position.        */
              0,                                 /* Default vertical position.          */
              0,                                 /* Default width.                      */
              0,                                 /* Default height.                     */
              hWnd,
              ID_STATIC2,                        /* Window ID                           */
              hLibInstance,
              NULL
            );

          CreateWindow
            (
              "edit",
              NULL,                              /* Text for window title bar.          */
              WS_TABSTOP | WS_CHILD | WS_VISIBLE | WS_BORDER,
              0,                                 /* Default horizontal position.        */
              0,                                 /* Default vertical position.          */
              0,                                 /* Default width.                      */
              0,                                 /* Default height.                     */
              hWnd,
              ID_TO,                             /* Window ID                           */
              hLibInstance,
              NULL
            );

          CreateWindow
            (
              lpszTextClass,
              NULL,
              WS_CHILD | WS_VISIBLE | WS_BORDER, /* Text for window title bar.          */
              0,                                 /* Default horizontal position.        */
              0,                                 /* Default vertical position.          */
              0,                                 /* Default width.                      */
              0,                                 /* Default height.                     */
              hWnd,
              ID_STATIC3,                        /* Window ID                           */
              hLibInstance,
              NULL
            );
        }

      SendDlgItemMessage (hWnd, ID_FILEDESC, WM_SETFONT, hFont, 0L);
      SendDlgItemMessage (hWnd, ID_FROM,     WM_SETFONT, hFont, 0L);
      SendDlgItemMessage (hWnd, ID_TO,       WM_SETFONT, hFont, 0L);
      GlobalUnlock (hPalInstanceData);
      break;

    case WM_SIZE:
      hPalInstanceData = GetWindowWord (hWnd, HPALINSTANCEDATA);
      lpPalInstanceData = (LPPALINSTANCEDATA) GlobalLock (hPalInstanceData);

      hDC = GetDC (NULL);
      SaveDC (hDC);
      SelectObject (hDC, hFont);

      {    /* Begin local block */
      DWORD    dWord;
      int      nFILENAME, nSTATIC1, nFROM, nSTATIC2, nTO, nSTATIC3;
      char     szSTATIC1[20], szSTATIC2[20], szSTATIC3[20];

      lstrcpy (szBuffer, "WWWWWWWW.WWW");
      dWord = GetTextExtent (hDC, szBuffer, lstrlen (szBuffer));
      nFILENAME = (int) LOWORD (dWord) + 2 * tmAveCharWidth;

      lstrcpy (szSTATIC1, "From");
      dWord = GetTextExtent (hDC, szSTATIC1, lstrlen (szSTATIC1));
      nSTATIC1 = (int) LOWORD (dWord) + 2 * tmAveCharWidth;

      lstrcpy (szBuffer, "99:99:99");
      dWord = GetTextExtent (hDC, szBuffer, lstrlen (szBuffer));
      nFROM = (int) LOWORD (dWord) + 2 * tmAveCharWidth;

      lstrcpy (szSTATIC2, "to");
      dWord = GetTextExtent (hDC, szSTATIC2, lstrlen (szSTATIC2));
      nSTATIC2 = (int) LOWORD (dWord) + 2 * tmAveCharWidth;

      lstrcpy (szBuffer, "99:99:99");
      dWord = GetTextExtent (hDC, szBuffer, lstrlen (szBuffer));
      nTO = (int) LOWORD (dWord) + 2 * tmAveCharWidth;

      lstrcpy (szSTATIC3, "seconds");
      dWord = GetTextExtent (hDC, szSTATIC3, lstrlen (szSTATIC3));
      nSTATIC3 = (int) LOWORD (dWord) + 2 * tmAveCharWidth;

      RestoreDC (hDC, -1);
      ReleaseDC (NULL, hDC);

      MoveWindow (GetDlgItem (hWnd, ID_SCROLLBAR),
                  0,
                  HIWORD (lParam) - ((tmHeight * 3) / 2),
                  LOWORD (lParam) - nFILENAME,
                  ((tmHeight * 3) / 2),
                  TRUE);
```

```

      MoveWindow (GetDlgItem (hWnd, ID_FILENAME),
                  LOWORD (lParam) - nFILENAME,
                  HIWORD (lParam) - ((tmHeight * 3) / 2),
                  nFILENAME,
                  ((tmHeight * 3) / 2),
                  TRUE);

      if (GetWindowLong (hWnd, GWL_STYLE) & PLS_DESCRIPTION)
        {
          nNonPanelAreaHeight = 2 * ((tmHeight * 3) / 2);

          MoveWindow (GetDlgItem (hWnd, ID_FILEDESC),
                      0,
                      HIWORD (lParam) - nNonPanelAreaHeight,
                      i + LOWORD (lParam) - nSTATIC1 - nFROM - nSTATIC2 - nTO -  nSTATIC3,
                      ((tmHeight * 3) / 2),
                      TRUE);

          MoveWindow (GetDlgItem (hWnd, ID_STATIC1),
                      i,
                      HIWORD (lParam) - nNonPanelAreaHeight,
                      nSTATIC1,
                      ((tmHeight * 3) / 2),
                      TRUE);

          MoveWindow (GetDlgItem (hWnd, ID_FROM),
                      i + nSTATIC1,
                      HIWORD (lParam) - nNonPanelAreaHeight,
                      nFROM,
                      ((tmHeight * 3) / 2),
                      TRUE);

          MoveWindow (GetDlgItem (hWnd, ID_STATIC2),
                      i + nSTATIC1 + nFROM,
                      HIWORD (lParam) - nNonPanelAreaHeight,
                      nSTATIC2,
                      ((tmHeight * 3) / 2),
                      TRUE);

          MoveWindow (GetDlgItem (hWnd, ID_TO),
                      i + nSTATIC1 + nFROM + nSTATIC2,
                      HIWORD (lParam) - nNonPanelAreaHeight,
                      nTO,
                      ((tmHeight * 3) / 2),
                      TRUE);

          MoveWindow (GetDlgItem (hWnd, ID_STATIC3),
                      i + nSTATIC1 + nFROM + nSTATIC2 + nTO,
                      HIWORD (lParam) - nNonPanelAreaHeight,
                      nSTATIC3,
                      ((tmHeight * 3) / 2),
                      TRUE);

          SendDlgItemMessage (hWnd, ID_STATIC1, WM_USER, BLACK, (LPARAM) (LPSTR) szSTATIC1);
          SendDlgItemMessage (hWnd, ID_STATIC2, WM_USER, BLACK, (LPARAM) (LPSTR) szSTATIC2);
          SendDlgItemMessage (hWnd, ID_STATIC3, WM_USER, BLACK, (LPARAM) (LPSTR) szSTATIC3);
        }
      else
        nNonPanelAreaHeight = ((tmHeight * 3) / 2);

      if (!LOWORD (lParam) || !HIWORD (lParam))
        {
          GlobalUnlock (hPalInstanceData);
          break;
        }

      if ((i = PID.nPanelSize) > 0)
        {
          /* Set i equal to the number of panels that will fit in a column with NO inter-
             panel spacing. */

          i = (HIWORD (lParam) - nNonPanelAreaHeight) / PID.nYPanel;

          while (PID.nYPanel * i + PID.nInterPanelSpacing * (i + 1) > (int) HIWORD (lParam) -
              nNonPanelAreaHeight)
            i--;

          /* i now equal to the number of panels that will fit in a colum with inter-
             panel spacing. */

          //PID.nPanelsPerCol = i;
          PID.nPanelsPerCol = max (1, i);

        }
      else
        {
          i = - i;

          PID.nPanelsPerCol = i;

          PID.nYPanel = (HIWORD (lParam) - nNonPanelAreaHeight - (i + 1) * PID.nYInterPanelSpacing) / i;

          hDC = GetDC (NULL);
          PID.nXPanel = (int) (((long) PID.nYPanel * GetDeviceCaps (hDC, LOGPIXELSX)) / GetDeviceCaps (hDC,
              LOGPIXELSY));
          ReleaseDC (NULL, hDC);
        }

      /* Compute the number of panels per row.  This includes fractional
```

ICV14PRINT

```
        panels.  For example, if each row can display 3 1/2 panels,
        then nPanelsPerRow is set to 4. */

      PID.nPanelsPerRow = (LOWORD (lParam) + PID.nXPanel + PID.nInterPanelSpacing - 1) / (PID.nXPanel +
          PID.nInterPanelSpacing);

      PID.nWholePanelsPerRow = LOWORD (lParam) / (PID.nXPanel + PID.nInterPanelSpacing);

      //DebugPrintf ("nXPanel = %d, nYPanel = %d", PID.nXPanel, PID.nYPanel);

      /* Since resizing the client area may change the number of panel that can be displayed, destroy
         all of the existing panels and recreate the panels.  This also ensures that the panels are
         positioned correctly in the resized client area. */

      for (i = 1; i <= PID.nPanelCount; i++)
        DestroyWindow (GetDlgItem (hWnd, i));

      PID.nPanelCount         = 0;
      PID.nHiddenPanelCount   = 0;
      PID.nFirstVisCol        = 1;

      SetScrollBarArrows (hWnd);

      /* For each successive item in the tree, create a panel.  Quit if we've created the
         maximum number of panels. */

      node = tavl_reset (PID.tree);     /* Get the head node (no data) */

      while (node = tavl_succ (node))
        if (!AddPanel (hWnd, node))
          break;

      GlobalUnlock (hPalInstanceData);
      }    /* End local block */
      break;

    case WM_GETDLGCODE:
      return (DLGC_WANTMESSAGE);

    case WM_KILLFOCUS:
      if (fSelected && (GetWindowLong (hWnd, GWL_STYLE) & PLS_NOTIFY) )
        SendMessage (GetParent (hWnd),
                     WM_COMMAND,
                     GetWindowWord (hWnd, GWW_ID),
                     MAKELPARAM (hWnd, PLN_KILLFOCUS));

      break;

    case WM_LBUTTONDBLCLK:
      fIgnoreLButtonUp = TRUE;

      /* We're only interested in WM_LBUTTONDBLCLK messages if the
         event occured on top of a panel window.  We get mouse
         events that occur over panel windows because the panel
         windows reflect WM_LBUTTONDOWN messages that they
         receive.  The panel windows modify the lParam field so
         that they are relative to the palette window instead
         of the panel windows. */

      hWndPanel = ChildWindowFromPoint (hWnd, MAKEPOINT (lParam));

      if (!hWndPanel || hWndPanel == hWnd)
        break;

      hPalInstanceData = GetWindowWord (hWnd, HPALINSTANCEDATA);
      lpPalInstanceData = (LPPALINSTANCEDATA) GlobalLock (hPalInstanceData);

      fSelected = (BOOL) SendMessage (hWnd, PM_GETPANELSEL, GetWindowWord (hWndPanel, GWW_ID), 0L);

      if (fSelected && (GetWindowLong (hWnd, GWL_STYLE) & PLS_NOTIFY) )
        SendMessage (GetParent (hWnd),
                     WM_COMMAND,
                     GetWindowWord (hWnd, GWW_ID),
                     MAKELPARAM (hWnd, PLN_DBLCLK));

      GlobalUnlock (hPalInstanceData);
      break;

    case WM_LBUTTONDOWN:
      /* We're only interested in WM_LBUTTONDOWN messages if the
         event occured on top of a panel window.  We get mouse
         events that occur over panel windows because the panel
         windows reflect WM_LBUTTONDOWN messages that they
         receive.  The panel windows modify the lParam field so
         that they are relative to the palette window instead
         of the panel windows. */

      hWndPanel = ChildWindowFromPoint (hWnd, MAKEPOINT (lParam));

      if (!hWndPanel || hWndPanel == hWnd)
        break;

      SetCapture (hWnd);
      SetFocus (hWnd);

      /* Enable drag if the panel is qualifies.  Once enabled, the drag indicator (fDrag) remains
         FALSE until the first mouse movement. */

      fSelected = (BOOL) SendMessage (hWnd, PM_GETPANELSEL, GetWindowWord (hWndPanel, GWW_ID), 0L);
```

```
      fDrag = FALSE;
      fDragCanceled = FALSE;

      if (fSelected)
        {
          if (GetWindowLong (hWnd, GWL_STYLE) & PLS_DRAGSOURCE)
            {
              if (GetWindowLong (hWnd, GWL_STYLE) & PLS_NOMOVESOURCE)
                fDragEnabled = GetKeyState (VK_CONTROL) & 0x8000;
              else
                fDragEnabled = TRUE;
            }

          ptLast = MAKEPOINT (lParam);
          ClientToScreen (hWnd, &ptLast);
          return (TRUE);
        }
      else
        fDragEnabled = FALSE;

      if (GetWindowLong (hWnd, GWL_STYLE) & PLS_DESCRIPTION)
        {
          hPalInstanceData = GetWindowWord (hWnd, HPALINSTANCEDATA);
          lpPalInstanceData = (LPPALINSTANCEDATA) GlobalLock (hPalInstanceData);

          i = PanelToItem (lpPalInstanceData, GetWindowWord (hWndPanel, GWW_ID)) - 1;

          PID.nCurrentItem = i;

          SendMessage (hWnd,
                       PM_GETITEM,
                       i,
                       (LPARAM) (LPPALPARM) &PalParm);

          SetDlgItemText (hWnd, ID_FILEDESC, PalParm.photo.szTitle);
          _ltoa (PalParm.photo.lMinDisplayTime, szBuffer, 10);
          SetDlgItemText  (hWnd, ID_FROM, szBuffer);
          _ltoa (PalParm.photo.lMaxDisplayTime, szBuffer, 10);
          SetDlgItemText  (hWnd, ID_TO, szBuffer);

          GlobalUnlock (hPalInstanceData);
        }

      hWndDisplayAsSelected = hWndPanel;
      SetWindowWord (hWndPanel, DISPLAYAS, GetWindowWord (hWndPanel, DISPLAYAS) | DISPLAYASSELECTED);

      SendMessage (hWnd,
                   WM_COMMAND,
                   GetWindowWord (hWndPanel, GWW_ID),
                   MAKELPARAM (hWndPanel, (GetKeyState (VK_SHIFT)   & 0x8000) ? PNN_SLBUTTONDOWN :
                                          (GetKeyState (VK_CONTROL) & 0x8000) ? PNN_CLBUTTONDOWN :
                                                                                PNN_LBUTTONDOWN));

      InvalidateRect (hWndPanel, NULL, TRUE);
      UpdateWindow (hWndPanel);
      return (TRUE);

    case WM_LBUTTONUP:
      /* Ignore WM_LBUTTONUP if it's the result of a
         WM_LBUTTONDBLCLK. */

      if (fIgnoreLButtonUp)
        {
          fIgnoreLButtonUp = FALSE;
          break;
        }

      ReleaseCapture ();

      if (fDragCanceled)
        {
          fDragCanceled = FALSE;
          break;
        }

      if (nTimer)
        {
          if (fDrag)
            KillTimer (hWndTargetPalette, nTimer);
          else
            KillTimer (hWnd, nTimer);

          nTimer = 0;
        }

      SetCursor (LoadCursor (NULL, IDC_ARROW));

      if (fDrag)
        {
          /* If the user tried to do a drop on something that won't accept drops, then
             we're done. */

          if (!hWndTargetPalette)
            break;

          if (hWndInsertAfter)
            {
              SetWindowWord (hWndInsertAfter, DISPLAYAS, GetWindowWord (hWndInsertAfter, DISPLAYAS) &
                  ~DISPLAYASINSERT);
              InvalidateRect (hWndInsertAfter, NULL, TRUE);
```

```
                UpdateWindow (hWndInsertAfter);
                hWndInsertAfter = NULL;
              }

            if (hWndInsertBefore)
              {
                SetWindowWord (hWndInsertBefore, DISPLAYAS, GetWindowWord (hWndInsertBefore, DISPLAYAS) &
                    ~DISPLAYASINSERT);
                InvalidateRect (hWndInsertBefore, NULL, TRUE);
                UpdateWindow (hWndInsertBefore);
                hWndInsertBefore = NULL;
              }

            /* Check the source to see if it has the PLN_NOMOVESOURCE style.  If it does,
               the control key better be down, otherwise do nothing. */

            if ((GetWindowLong (hWnd, GWL_STYLE) & PLS_NOMOVESOURCE) &&
                !(GetKeyState (VK_CONTROL) & 0x8000))
              break;

            /* It's show time!  Time to do the actual move/copy.  The window
               that had the focus (this window) is the source.  The destination
               window is hWndTargetPalette (it's possible that
               hWnd == hWndTargetPalette). */

            hPalInstanceData = GetWindowWord (hWnd, HPALINSTANCEDATA);
            lpPalInstanceData = (LPPALINSTANCEDATA) GlobalLock (hPalInstanceData);

            /* Keep track of lpPalItem's zero based position. */

            i = 0;

            for (lpPalItem = MAKEP (PID.hObjects, PID.nppalItemHead);
                 (int) OFFSETOF (lpPalItem) != -1;
                 lpPalItem = MAKEP (PID.hObjects, lpPalItem->nppalItemNext))
              {
                if (lpPalItem->fSelected)
                  {
                    /* Get the item and insert it into the destination. */

                    GetPalParm (&PalParm, lpPalItem);

                    //DebugPrintf ("dropping item path = %s", PalParm.photo.szPhotoPath);
                    //DebugPrintf ("                 name = %s", PalParm.photo.szPhotoFileName);


                    SendMessage (hWndTargetPalette,
                                 PM_INSERTITEM,
                                 (WPARAM) nInsertAfterItem,
                                 (LPARAM) (LPPALPARM) &PalParm);

                    if (nInsertAfterItem != -1)
                      nInsertAfterItem++;

                    /* Is this a copy operation?  If not, we leave the item selected and do
                       an en-masse delete of the selected items. */

                    if (wParam & MK_CONTROL)
                      {
                        /* Yes, it's a copy.  De-select the item and repaint it if
                           necessary. */

                        lpPalItem->fSelected = FALSE;

                        if (i >= (PID.nFirstVisCol - 1) * PID.nPanelsPerCol &&
                            i <  (PID.nFirstVisCol + PID.nPanelsPerRow - 1) * PID.nPanelsPerCol)
                          {
                            InvalidateRect (GetDlgItem (hWnd, ItemToPanel (lpPalInstanceData, i + 1)), NULL,
                                TRUE);
                            UpdateWindow   (GetDlgItem (hWnd, ItemToPanel (lpPalInstanceData, i + 1)));
                          }
                      }
                  }

                i++;
              }

          if (!(wParam & MK_CONTROL))
            {
              SendMessage (hWnd, PM_DELETESELECTEDITEMS, 0, 0L);

              /* Notify our parent of a change (if style is LBS_NOTIFY). */

              if (GetWindowLong (hWnd, GWL_STYLE) & LBS_NOTIFY)
                SendMessage (GetParent (hWnd),
                             WM_COMMAND,
                             GetWindowWord (hWnd, GWW_ID),
                             MAKELPARAM (hWnd, PLN_PALETTECHANGED));
            }

          /* Notify the other guy's parent of a change */

          if (hWnd != hWndTargetPalette && GetWindowLong (hWndTargetPalette, GWL_STYLE) & LBS_NOTIFY)
            SendMessage (GetParent (hWndTargetPalette),
                         WM_COMMAND,
                         GetWindowWord (hWndTargetPalette, GWW_ID),
                         MAKELPARAM (hWndTargetPalette, PLN_PALETTECHANGED));

          GlobalUnlock (hPalInstanceData);
          break;
```

```
            }

          hWndPanel = ChildWindowFromPoint (hWnd, MAKEPOINT (lParam));

          if (!hWndPanel || hWndPanel == hWnd)
            break;

          if (!IsWindowVisible (hWndPanel))
            break;

          hWndDisplayAsSelected = NULL;

          /* Clear the DISPLAYASSELECTED bit.  This does NOT change the
             item's selection.  It only prevents the panel from being
             forced to display as selected.  Take a panel that's not
             selected.  With the mouse over the panel, press the left
             mouse button.  The panel is displayed as though it were
             selected.  That's because when the mouse button was
             pressed, the panel's DISPLAYASSELECTED bit was turned on
             and the the panel was repainted.  The corresponding item
             is not selected though.  It only becomes selected once
             the mouse button is released.  If, while the panel is
             down, the mouse is dragged off of the panel, we clear
             the DISPLAYASSELECTED bit and repaint the panel.  The
             panel's WM_PAINT routine paints the panel as though it
             were selected if the corresponding item is selected, or
             if the panel's DISPLAYASSELECTED bit is on. */

          SetWindowWord (hWndPanel, DISPLAYAS, GetWindowWord (hWndPanel, DISPLAYAS) & ~DISPLAYASSELECTED);

          SendMessage (hWnd,
                       WM_COMMAND,
                       GetWindowWord (hWndPanel, GWW_ID),
                       MAKELPARAM (hWndPanel, (GetKeyState (VK_SHIFT)   & 0x8000) ? PNN_SLBUTTONUP :
                                              (GetKeyState (VK_CONTROL) & 0x8000) ? PNN_CLBUTTONUP :
                                                                                    PNN_LBUTTONUP));
          break;

        case WM_MOUSEMOVE:
          /* Not interested if left button isn't down. */

          if (!(wParam & MK_LBUTTON))
            break;

          /* Not intersated if we've received the WM_LBUTTONDBLCLK but not
             yet received the WM_LBUTTONUP. */

          if (fIgnoreLButtonUp)
            break;

          /* When the palette window sees a left mouse button down, it
             captures the mouse.  Therefore, hWnd is the *always* the
             window handle of a palette window.  Furthermore, it is
             *always* the window handle to a palette window in which
             a drag operation started.  The mouse may not
             be over the palette window, but hWnd is always the
             handle to a palette window. */

          /* If we were moving or copying a panel (or a group of panels)
             and the escape key was pressed, then ignore all mouse
             movement until the left mouse button is released.
             Releasing the left mouse button will clear the
             fDragCaanceled flag. */

          if (fDragCanceled)
            break;

          if (fDragEnabled)
            {
              SendMessage (hWnd, PM_QUERYDRAGICON, wParam, lParam);
              break;
            }

          pt = MAKEPOINT (lParam);

          i = 0;

          hPalInstanceData = GetWindowWord (hWnd, HPALINSTANCEDATA);
          lpPalInstanceData = (LPPALINSTANCEDATA) GlobalLock (hPalInstanceData);

          do  /* do once */
            {
              /* Is the mouse in the left scroll area? */

              GetClientRect (hWnd, &rect);

              rect.right = rect.left + 5;

              if (PtInRect (&rect, pt) && PID.nFirstVisCol != 1)
                {
                  i = TID_SCROLLLEFT;
                  break;
                }

              /* Is the mouse in the right scroll area? */

              GetClientRect (hWnd, &rect);

              rect.left = rect.right - 5;
```

1C/14PRINT

```
            if (PtInRect (&rect, pt) && PID.nFirstVisCol != ((PID.nItemCount - 1) / PID.nPanelsPerCol + 1 -
                (PID.nWholePanelsPerRow - 1)))
              {
                i = TID_SCROLLRIGHT;
                break;
              }
          } while (0);

        GlobalUnlock (hPalInstanceData);

        /* If we're scrolling and we either want to stop scrolling or start scrolling
           in another direction, then kill the timer. */

        if (nTimer && (!i || i != nTimer))
          {
            KillTimer (hWnd, nTimer);
            nTimer = 0;
          }

        /* If we want to scroll and we don't already have a timer, then start the timer. */

        if (i && !nTimer)
          nTimer = SetTimer (hWnd, i, 400, NULL) ? i : 0;

        if (nTimer)
          SetCursor (LoadCursor (hLibInstance, "SCROLL"));
        else
          SetCursor (LoadCursor (NULL, IDC_ARROW));

        hWndPanel = ChildWindowFromPoint (hWnd, pt);

        /* Don't do anything if the cursor is not over a child window (panel). */

        if (!hWndPanel || GetParent (hWndPanel) != hWnd)
          {
            if (hWndDisplayAsSelected)
              {
                SetWindowWord (hWndDisplayAsSelected, DISPLAYAS, GetWindowWord (hWndDisplayAsSelected,
                    DISPLAYAS) & ~DISPLAYASSELECTED);
                InvalidateRect (hWndDisplayAsSelected, NULL, TRUE);
                UpdateWindow (hWndDisplayAsSelected);
                hWndDisplayAsSelected = NULL;
              }

            break;
          }

        /* The cursor is over a child window (panel) */

        /* If the panel does not have the DISPLAYASSELECTED bit set,
           then the mouse was moved to a different panel.  Clear
           the DISPLAYASSELECTED bit in the window whose handle is
           held in hWndDisplayAsSelected and set the bit in the
           new panel.  Set hWndDisplayAsSelected to the handle
           of the new panel. */

        if (!(GetWindowWord (hWndPanel, DISPLAYAS) & DISPLAYASSELECTED))
          {
            if (hWndDisplayAsSelected)
              {
                SetWindowWord (hWndDisplayAsSelected, DISPLAYAS, GetWindowWord (hWndDisplayAsSelected,
                    DISPLAYAS) & ~DISPLAYASSELECTED);
                InvalidateRect (hWndDisplayAsSelected, NULL, TRUE);
                UpdateWindow (hWndDisplayAsSelected);
              }

            SetWindowWord (hWndPanel, DISPLAYAS, GetWindowWord (hWndPanel, DISPLAYAS) | DISPLAYASSELECTED);
            hWndDisplayAsSelected = hWndPanel;
            InvalidateRect (hWndPanel, NULL, TRUE);
            UpdateWindow (hWndPanel);

            hPalInstanceData = GetWindowWord (hWnd, HPALINSTANCEDATA);
            lpPalInstanceData = (LPPALINSTANCEDATA) GlobalLock (hPalInstanceData);

            i = PanelToItem (lpPalInstanceData, GetWindowWord (hWndPanel, GWW_ID)) - 1;

            PID.nCurrentItem = i;

            SendMessage (hWnd,
                         PM_GETITEM,
                         i,
                         (LPARAM) (LPPALPARM) &PalParm);

            SetDlgItemText (hWnd, ID_FILEDESC, PalParm.photo.szTitle);
            _ltoa (PalParm.photo.lMinDisplayTime, szBuffer, 10);
            SetDlgItemText  (hWnd, ID_FROM, szBuffer);
            _ltoa (PalParm.photo.lMaxDisplayTime, szBuffer, 10);
            SetDlgItemText  (hWnd, ID_TO, szBuffer);

            GlobalUnlock (hPalInstanceData);

            break;
          }

        break;

    case WM_TIMER:
      hPalInstanceData = GetWindowWord (hWnd, HPALINSTANCEDATA);
      lpPalInstanceData = (LPPALINSTANCEDATA) GlobalLock (hPalInstanceData);

        switch (wParam)
          {
            case TID_SCROLLLEFT:
              if (PID.nFirstVisCol == 1)
                {
                  KillTimer (hWnd, (int) wParam);
                  nTimer = 0;
                  break;
                }

              SendMessage (hWnd,
                           WM_HSCROLL,
                           SB_LINELEFT,
                           MAKELPARAM (0, GetDlgItem (hWnd, ID_SCROLLBAR)));

              break;

            case TID_SCROLLRIGHT:
              if (PID.nFirstVisCol == ((PID.nItemCount - 1) / PID.nPanelsPerCol + 1 - (PID.nWholePanelsPerRow
                  - 1)))
                {
                  KillTimer (hWnd, (int) wParam);
                  nTimer = 0;
                  break;
                }

              SendMessage (hWnd,
                           WM_HSCROLL,
                           SB_LINERIGHT,
                           MAKELPARAM (0, GetDlgItem (hWnd, ID_SCROLLBAR)));

              break;
          }

        GlobalUnlock (hPalInstanceData);
        break;

    case WM_KEYDOWN:
      switch (wParam)
        {
          case VK_ESCAPE:
            SendMessage (hWnd,
                         WM_COMMAND,
                         0,
                         MAKELPARAM (0, PNN_ESCAPE));
            break;

          case VK_DELETE:
            SendMessage (hWnd,
                         WM_COMMAND,
                         0,
                         MAKELPARAM (0, PNN_DELETE));
            break;
        }

      break;

    case PM_ADDSTRING:
    case PM_INSERTSTRING:
      memset(&PalParm, '\0', sizeof (PalParm));

      lstrcpy (PalParm.photo.szPhotoFileName, (LPSTR) lParam);
      _getcwd (PalParm.photo.szPhotoPath, sizeof (PalParm.photo.szPhotoPath));

      lstrcpy (PalParm.photo.szThumbPath, PalParm.photo.szPhotoPath);

      if (PalParm.photo.szThumbPath [lstrlen (PalParm.photo.szThumbPath) - 1] != '\\')
        lstrcat (PalParm.photo.szThumbPath, "\\");

      lstrcat (PalParm.photo.szThumbPath, "THMBNAIL\\");

      lstrcpy (PalParm.photo.szThumbFileName, PalParm.photo.szPhotoFileName);

      for (i = 0; (c = PalParm.photo.szThumbFileName[i]) && c != '.'; i++);

      if (c != '.')
        PalParm.photo.szThumbFileName[i] = '.';

      i++;

      lstrcpy (&PalParm.photo.szThumbFileName[i], "DDB");

      //DebugPrintf ("path = %s", (LPSTR) PalParm.photo.szPhotoPath);

      if (message == PM_ADDSTRING)
        {
          /* If PLS_SORT isn't specified, then append the new
             item, else add by its key. */

          if (GetWindowLong (hWnd, GWL_STYLE) & PLS_SORT)
            SendMessage (hWnd, PM_ADDITEM, 0, (LPARAM) (LPPALPARM) &PalParm);
          else
            SendMessage (hWnd, PM_INSERTITEM, (WPARAM) -1, (LPARAM) (LPPALPARM) &PalParm);
        }
      else
        SendMessage (hWnd, PM_INSERTITEM, 0, (LPARAM) (LPPALPARM) &PalParm);

      break;

    case PM_QUERYDRAGICON:
```

```
        pt = MAKEPOINT (lParam);
        ClientToScreen (hWnd, &pt);

        if (!fDrag)
          {
            /* This is the first time the mouse moved since the
               left button was depressed on top of a selected
               panel. */

            /* See if the mouse has been moved a significant amount since the
               left button was pressed. */

            if (abs (ptLast.x - pt.x) <= GetSystemMetrics (SM_CXDOUBLECLK) &&
                abs (ptLast.y - pt.y) <= GetSystemMetrics (SM_CYDOUBLECLK))
              break;

            fDrag = TRUE;
          }

        if (ptLast.x == pt.x && ptLast.y == pt.y)
          break;

        /* See if the mouse is over a palette window.  */

        hWndChild = GetDropableWindowFromPoint (GetDesktopWindow (), pt);

        if (!hWndChild || !(GetWindowLong (hWndChild, GWL_STYLE) & PLS_DROPTARGET))
          {
            /* No, set the cursor, kill the timer if its active and we're
               gone! */

            SetCursor (LoadCursor (hLibInstance, "CURNONE"));

            if (nTimer)
              {
                KillTimer (hWndTargetPalette, nTimer);
                nTimer = 0;
              }

            if (hWndInsertAfter)
              {
                SetWindowWord (hWndInsertAfter, DISPLAYAS, GetWindowWord (hWndInsertAfter, DISPLAYAS) &
                     ~DISPLAYASINSERT);
                InvalidateRect (hWndInsertAfter, NULL, TRUE);
                UpdateWindow (hWndInsertAfter);
                hWndInsertAfter = NULL;
              }

            if (hWndInsertBefore)
              {
                SetWindowWord (hWndInsertBefore, DISPLAYAS, GetWindowWord (hWndInsertBefore, DISPLAYAS) &
                     ~DISPLAYASINSERT);
                InvalidateRect (hWndInsertBefore, NULL, TRUE);
                UpdateWindow (hWndInsertBefore);
                hWndInsertBefore = NULL;
              }

            hWndTargetPalette = NULL;
            break;
          }

        /* The mouse is over a palette window and it is not necessarily
           this window (hWnd).  If we've changed from one palette window
           to another, then kill the timer if it's active.  Going from
           one palette window directly to another is *very* rare.  Normally
           you go from one palette window to something that's not a palette
           window (at which time the timer is killed if it's active), and
           then to another palette window.  The only time you go directly
           from one palette window to another is if they happen to be
           flush up against each other.  Normally, at the very least,
           they're separated by the frame of the windows which contain
           them. */

        if (hWndTargetPalette != hWndChild)
          {
            if (nTimer)
              {
                KillTimer (hWndTargetPalette, nTimer);
                nTimer = 0;
              }

            hWndTargetPalette = hWndChild;
          }

        hPalInstanceData = GetWindowWord (hWndTargetPalette, HPALINSTANCEDATA);
        lpPalInstanceData = (LPPALINSTANCEDATA) GlobalLock (hPalInstanceData);

        i = 0;

        do
          {
            GetWindowRect (hWndTargetPalette, &rect);

            rect.right = rect.left + 5;

            if (PtInRect (&rect, pt) && PID.nFirstVisCol != 1)
              {
                i = TID_SCROLLLEFT;
                break;
              }

            GetWindowRect (hWndTargetPalette, &rect);

            rect.left = rect.right - 5;

            if (PtInRect (&rect, pt) && PID.nFirstVisCol != ((PID.nItemCount - 1) / PID.nPanelsPerCol + 1 -
                (PID.nWholePanelsPerRow - 1)))
              {
                i = TID_SCROLLRIGHT;
                break;
              }
          } while (0);

        if (nTimer && nTimer != i)
          {
            KillTimer (hWndTargetPalette, nTimer);
            nTimer = 0;
          }

        if (i && !nTimer)
          nTimer = SetTimer (hWndTargetPalette, i, 400, NULL) ? i : 0;

        if (nTimer)
          SetCursor (LoadCursor (hLibInstance,
                                 (GetKeyState (VK_CONTROL) & 0x8000) ? "CURSCOPY" : "CURSMOVE"));
        else
          SetCursor (LoadCursor (hLibInstance,
                                 (GetKeyState (VK_CONTROL) & 0x8000) ? "CURCOPY" : "CURMOVE"));

        OffsetRect (&rectFocus, pt.x - ptLast.x, pt.y - ptLast.y);  /* Shift pos of frame */
        ptLast = pt;

        ScreenToClient (hWndTargetPalette, &pt);

        /* Set i to the one based column which contains the mouse pointer. */

        i = (pt.x + (PID.nXInterPanelSpacing / 2)) / (PID.nXPanel + PID.nXInterPanelSpacing) + 1;

        /* Set j to the one based row which contains the mouse pointer. */

        j = (pt.y - (PID.nYInterPanelSpacing / 2)) / (PID.nYPanel + PID.nYInterPanelSpacing) + 1;

        /* Constrain i & j to the actual number of columns and rows. */

        i = min (i, PID.nPanelsPerRow);
        j = min (j, PID.nPanelsPerCol);

        /* Set nInsertBeforePanel and nInsertAfterPanel to the panels
           between which the selected source panels will be
           copied/moved to.  It is possible that the resultant
           panel values will be invalid (i.e. zero or greater than
           the actual number of panels).  Normally, when we say that
           the mouse is between two panels, we mean that the two
           panels are arranged vertically.  If there's only
           one row of panels though, we want to determine
           if the mouse is between two horizontal panels. */

        if (PID.nPanelsPerCol == 1)
          {
            if (pt.x <  (i - 1) * (PID.nXPanel + PID.nXInterPanelSpacing) +
                        PID.nXInterPanelSpacing +
                        (PID.nXPanel + PID.nXInterPanelSpacing)  / 2)
              {
                nInsertBeforePanel = i - 1 + j;
                nInsertAfterPanel  = nInsertBeforePanel - 1;
              }
            else
              {
                nInsertAfterPanel  = i - 1 + j;
                nInsertBeforePanel = nInsertAfterPanel + 1;
              }
          }
        else
          {
            if (pt.y <  (j - 1) * (PID.nYPanel + PID.nYInterPanelSpacing) +
                        PID.nYInterPanelSpacing +
                        (PID.nYPanel + PID.nYInterPanelSpacing)  / 2)
              {
                nInsertBeforePanel = (i - 1) * PID.nPanelsPerCol + j;
                nInsertAfterPanel  = nInsertBeforePanel - 1;
              }
            else
              {
                nInsertAfterPanel  = (i - 1) * PID.nPanelsPerCol + j;
                nInsertBeforePanel = nInsertAfterPanel + 1;
              }
          }

        /* If nInsertAfterPanel is valid, set nInsertAfterItem to the item
           that corresponds to the panel.  If it's not already marked
           as an insert panel, then mark it as such.  If another panel
           already is marked as an insert panel, remove its marking. */

        if (nInsertAfterItem = PanelToItem (lpPalInstanceData, nInsertAfterPanel))
          {
            hWndPanel = GetDlgItem (hWndTargetPalette, nInsertAfterPanel);

            if (!(GetWindowWord (hWndPanel, DISPLAYAS) & DISPLAYASINSERT))
              {
                if (hWndInsertAfter)
```

```
            {
              SetWindowWord (hWndInsertAfter, DISPLAYAS, GetWindowWord (hWndInsertAfter, DISPLAYAS) &
                  ~DISPLAYASINSERT);
              InvalidateRect (hWndInsertAfter, NULL, TRUE);
              UpdateWindow (hWndInsertAfter);
            }

          SetWindowWord (hWndPanel, DISPLAYAS, GetWindowWord (hWndPanel, DISPLAYAS) | DISPLAYASINSERT);
          hWndInsertAfter = hWndPanel;
          InvalidateRect (hWndPanel, NULL, TRUE);
          UpdateWindow (hWndPanel);
        }
    }
  else
  if (hWndInsertAfter)
    {
      SetWindowWord (hWndInsertAfter, DISPLAYAS, GetWindowWord (hWndInsertAfter, DISPLAYAS) &
          ~DISPLAYASINSERT);
      InvalidateRect (hWndInsertAfter, NULL, TRUE);
      UpdateWindow (hWndInsertAfter);
      hWndInsertAfter = NULL;
    }

  /* If nInsertBeforePanel is valid, set nInsertBeforeItem to the item
     that corresponds to the panel.  If it's not already marked
     as an insert panel, then mark it as such.  If another panel
     already is marked as an insert panel, remove its marking. */

  if (nInsertBeforeItem = PanelToItem (lpPalInstanceData, nInsertBeforePanel))
    {
      hWndPanel = GetDlgItem (hWndTargetPalette, nInsertBeforePanel);

      if (!(GetWindowWord (hWndPanel, DISPLAYAS) & DISPLAYASINSERT))
        {
          if (hWndInsertBefore)
            {
              SetWindowWord (hWndInsertBefore, DISPLAYAS, GetWindowWord (hWndInsertBefore, 0) &
                  ~DISPLAYASINSERT);
              InvalidateRect (hWndInsertBefore, NULL, TRUE);
              UpdateWindow (hWndInsertBefore);
            }

          SetWindowWord (hWndPanel, DISPLAYAS, GetWindowWord (hWndPanel, DISPLAYAS) | DISPLAYASINSERT);
          hWndInsertBefore = hWndPanel;
          InvalidateRect (hWndPanel, NULL, TRUE);
          UpdateWindow (hWndPanel);
        }
    }
  else
  if (hWndInsertBefore)
    {
      SetWindowWord (hWndInsertBefore, DISPLAYAS, GetWindowWord (hWndInsertBefore, DISPLAYAS) &
          ~DISPLAYASINSERT);
      InvalidateRect (hWndInsertBefore, NULL, TRUE);
      UpdateWindow (hWndInsertBefore);
      hWndInsertBefore = NULL;
    }

  /* If nInsertBeforeItem is zero, then set nInsetAfterItem to
     -1.  This will cause any item(s) that are
     dropped in the palette window, but not on any panel, to be
     appended to the end of that window's list. */

  if (!nInsertBeforeItem)
    nInsertAfterItem = -1;

  /* It's possible that both nInsertAfterItem and nInsertBeforeItem are
     zero.  This means that the cursor is not over
     a panel.  However, we know that the cursor is in the palette window,
     so even if its not over a panel, set the curser.  The "no drop here"
     cursor (CURNONE), is not valid here because you can always drop
     something on a palette window, even if it's empty. */

  if (nTimer)
    SetCursor (LoadCursor (hLibInstance,
                          (GetKeyState (VK_CONTROL) & 0x8000) ? "CURSCOPY" : "CURSMOVE"));
  else
    SetCursor (LoadCursor (hLibInstance,
                          (GetKeyState (VK_CONTROL) & 0x8000) ? "CURCOPY" : "CURMOVE"));

  GlobalUnlock (hPalInstanceData);
  break;

case PM_DELETESELECTEDITEMS:
  hPalInstanceData = GetWindowWord (hWnd, HPALINSTANCEDATA);
  lpPalInstanceData = (LPPALINSTANCEDATA) GlobalLock (hPalInstanceData);

  /* Delete all selected items. */

  i =  1;    /* The current item */
  j = -1;    /* The item number of the first selected item. */

  /* We can't use a simple for loop like this:

  for (lpPalItem = MAKEP (PID.hObjects, PID.nppalItemHead);
       (int) OFFSETOF (lpPalItem) != -1;
       lpPalItem = MAKEP (PID.hObjects, lpPalItem->nppalItemNext))
    {
    }

     because inside the loop we may delete *lpPalItem, which puts
     *lpPalItem on the free list.  When we execute the

     lpPalItem = MAKEP (PID.hObjects, lpPalItem->nppalItemNext))

     statement in the for loop, we'd get a pointer to the
     next free item, not the next item in the linked list.
     Instead, we use a while loop and get the pointer to
     the next item at the top of the loop (it's at the
     bottom in a for loop).  */

  lpPalItem = MAKEP (PID.hObjects, PID.nppalItemHead);

  while ((int) OFFSETOF (lpPalItem) != -1)
    {
      lpPalItemNext = (LPPALITEM) MAKEP (PID.hObjects, lpPalItem->nppalItemNext);

      if (lpPalItem->fSelected)                              /* If it's selected ... */
        {
          /* Set j to item number of the first selected item. */

          if (j == -1)
            j = i;

          /* Now, remove the item from the linked list. */

          UnlinkPalItem (lpPalInstanceData, lpPalItem);
        }

      i++;
      lpPalItem = lpPalItemNext;
    }

  /* Make sure something was selected */

  if (j != -1)
    {
      RepaintShiftedItems (lpPalInstanceData, hWnd, j);

      if (GetWindowLong (hWnd, GWL_STYLE) & LBS_NOTIFY)
        SendMessage (GetParent (hWnd),
                     WM_COMMAND,
                     GetWindowWord (hWnd, GWW_ID),
                     MAKELPARAM (hWnd, PLN_PALETTECHANGED));
    }

  GlobalUnlock (hPalInstanceData);
  break;

case PM_RESETCONTENT:
  hPalInstanceData = GetWindowWord (hWnd, HPALINSTANCEDATA);
  lpPalInstanceData = (LPPALINSTANCEDATA) GlobalLock (hPalInstanceData);

  /* Select every item. */

  for (lpPalItem = MAKEP (PID.hObjects, PID.nppalItemHead);
       (int) OFFSETOF (lpPalItem) != -1;
       lpPalItem = MAKEP (PID.hObjects, lpPalItem->nppalItemNext))
    lpPalItem->fSelected = TRUE;

  /* Delete everything. */

  SendMessage (hWnd, PM_DELETESELECTEDITEMS, 0, 0L);

  /* Notify parent of change. */

  if (GetWindowLong (hWnd, GWL_STYLE) & LBS_NOTIFY)
    SendMessage (GetParent (hWnd),
                 WM_COMMAND,
                 GetWindowWord (hWnd, GWW_ID),
                 MAKELPARAM (hWnd, PLN_PALETTECHANGED));

  InvalidateRect (GetDlgItem (hWnd, ID_FILENAME), NULL, TRUE);
  UpdateWindow (GetDlgItem (hWnd, ID_FILENAME));

  GlobalUnlock (hPalInstanceData);
  break;

case PM_GETPANELSEL:
  hPalInstanceData = GetWindowWord (hWnd, HPALINSTANCEDATA);
  lpPalInstanceData = (LPPALINSTANCEDATA) GlobalLock (hPalInstanceData);

  /* Returns the selection state of the one based item associated
     with the wParam-th panel. */

  i = PanelToItem (lpPalInstanceData, (int) wParam);

  /* Find the i-th item by position (not by key) */

  for (lpPalItem = MAKEP (PID.hObjects, PID.nppalItemHead);
       --i;
       lpPalItem = MAKEP (PID.hObjects, lpPalItem->nppalItemNext));

  GlobalUnlock (hPalInstanceData);
  return ((LRESULT) lpPalItem->fSelected);

case PM_GETSEL:
  hPalInstanceData = GetWindowWord (hWnd, HPALINSTANCEDATA);
  lpPalInstanceData = (LPPALINSTANCEDATA) GlobalLock (hPalInstanceData);
```

```
      i = (int) wParam;

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext));

      GlobalUnlock (hPalInstanceData);
      return ((LRESULT) ((int) OFFSETOF (lpPalItem) == -1) ? LB_ERR : lpPalItem->fSelected);

    case PM_GETTEXT:
      hPalInstanceData = GetWindowWord (hWnd, HPALINSTANCEDATA);
      lpPalInstanceData = (LPPALINSTANCEDATA) GlobalLock (hPalInstanceData);

      i = (int) wParam;

      if (i < 0)
        {
          GlobalUnlock (hPalInstanceData);
          return ((LRESULT) LB_ERR);
        }

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext));

      if ((int) OFFSETOF (lpPalItem) == -1)
        {
          GlobalUnlock (hPalInstanceData);
          return ((LRESULT) LB_ERR);
        }

      if (lpPalItem->npszPhotoFileName)
        lstrcpy ((LPSTR) lParam, (LPSTR) MAKEP (PID.hStringHeap, lpPalItem->npszPhotoFileName));
      else
        ((LPSTR) lParam)[0] = '\0';

      GlobalUnlock (hPalInstanceData);
      return ((LRESULT) lstrlen ((LPSTR) lParam));

    case PM_FINDSTRING:
      hPalInstanceData = GetWindowWord (hWnd, HPALINSTANCEDATA);
      lpPalInstanceData = (LPPALINSTANCEDATA) GlobalLock (hPalInstanceData);

      i = (int) wParam + 1;

      /* Move pointer to starting position. */

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext));

      if ((int) OFFSETOF (lpPalItem) == -1)
        {
          GlobalUnlock (hPalInstanceData);
          return ((LRESULT) LB_ERR);
        }

      /* Start looking */

      i = (int) wParam + 1;

      for (;
           (int) OFFSETOF (lpPalItem) != -1;
           lpPalItem = MAKEP (PID.hObjects, lpPalItem->nppalItemNext))
        {
          if (!lstrcmpi ((LPSTR) lParam, (LPSTR) MAKEP (PID.hStringHeap, lpPalItem->npszPhotoFileName)))
            break;

          i++;
        }

      /* Did we find the string before we hit bottom? */

      if ((int) OFFSETOF (lpPalItem) != -1)
        {
          /* Yes, i is the index */

          GlobalUnlock (hPalInstanceData);
          return ((LRESULT) i);
        }

      /* Nope, we hit bottom.  Start again at the top. */

      i = (int) wParam + 1;
      j = 0;

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext))
        {
          if (!lstrcmpi ((LPSTR) lParam, (LPSTR) MAKEP (PID.hStringHeap, lpPalItem->npszPhotoFileName)))
            break;

          j++;
        }

      /* Now, if we didn't find it, then it's not there. */

      if (!i)
```

```
        {
          GlobalUnlock (hPalInstanceData);
          return ((LRESULT) LB_ERR);
        }

      /* We found it! */

      GlobalUnlock (hPalInstanceData);
      return ((LRESULT) j);

    case PM_GETTOPINDEX:
      hPalInstanceData = GetWindowWord (hWnd, HPALINSTANCEDATA);
      lpPalInstanceData = (LPPALINSTANCEDATA) GlobalLock (hPalInstanceData);

      i = PanelToItem (lpPalInstanceData, 1) - 1;

      GlobalUnlock (hPalInstanceData);
      return ((LRESULT) i);

    case PM_GETITEM:
      hPalInstanceData = GetWindowWord (hWnd, HPALINSTANCEDATA);
      lpPalInstanceData = (LPPALINSTANCEDATA) GlobalLock (hPalInstanceData);

      i = (int) wParam;

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext));

      if ((int) OFFSETOF (lpPalItem) == -1)
        {
          GlobalUnlock (hPalInstanceData);
          return ((LRESULT) LB_ERR);
        }

      GetPalParm ((LPPALPARM) lParam, lpPalItem);

      GlobalUnlock (hPalInstanceData);
      return ((LRESULT) TRUE);

    case PM_DELETEITEM:
      hPalInstanceData = GetWindowWord (hWnd, HPALINSTANCEDATA);
      lpPalInstanceData = (LPPALINSTANCEDATA) GlobalLock (hPalInstanceData);

      i = (int) wParam;

      for (lpPalItem = MAKEP (PID.hObjects, PID.nppalItemHead);
           i-- && (int) OFFSETOF (lpPalItem) != -1;
           lpPalItem = MAKEP (PID.hObjects, lpPalItem->nppalItemNext));

      if ((int) OFFSETOF (lpPalItem) == -1)
        {
          GlobalUnlock (hPalInstanceData);
          return ((LRESULT) LB_ERR);
        }

      UnlinkPalItem (lpPalInstanceData, lpPalItem);
      RepaintShiftedItems (lpPalInstanceData, hWnd, (int) wParam + 1);  /* Func takes one based item */

      if (GetWindowLong (hWnd, GWL_STYLE) & LBS_NOTIFY)
        SendMessage (GetParent (hWnd),
                     WM_COMMAND,
                     GetWindowWord (hWnd, GWW_ID),
                     MAKELPARAM (hWnd, PLN_PALETTECHANGED));

      i = PID.nItemCount;

      GlobalUnlock (hPalInstanceData);
      return ((LRESULT) i);

    case PM_GETCOUNT:
      hPalInstanceData = GetWindowWord (hWnd, HPALINSTANCEDATA);
      lpPalInstanceData = (LPPALINSTANCEDATA) GlobalLock (hPalInstanceData);

      i = PID.nItemCount;

      GlobalUnlock (hPalInstanceData);
      return ((LRESULT) i);

    case PM_GETCURSEL:
    case PM_GETCARETINDEX:
      if (GetWindowLong (hWnd, GWL_STYLE) & (LBS_MULTIPLESEL | LBS_EXTENDEDSEL))

        /* Slightly alter the behavior of PM_GETCURSEL.  Instead of returning
           LB_ERR if the palette has the LBS_MULTIPLESEL or LBS_EXTENDEDSEL
           style, return LB_ERR if the selection count is not equal to 1. */

        if (SendMessage (hWnd, PM_GETSELCOUNT, 0, 0L) != 1)
          return ((LRESULT) LB_ERR);

      hPalInstanceData = GetWindowWord (hWnd, HPALINSTANCEDATA);
      lpPalInstanceData = (LPPALINSTANCEDATA) GlobalLock (hPalInstanceData);

      i = 0;

      for (lpPalItem = MAKEP (PID.hObjects, PID.nppalItemHead);
           (int) OFFSETOF (lpPalItem) != -1;
           lpPalItem = MAKEP (PID.hObjects, lpPalItem->nppalItemNext))
        {
          if (lpPalItem->fSelected)
```

IC/14PRINT

```
            break;

          i++;
        }

      GlobalUnlock (hPalInstanceData);
      return ((LRESULT) ((int) OFFSETOF (lpPalItem) == -1) ? LB_ERR : i);

    case PM_GETSELCOUNT:
      if (!(GetWindowLong (hWnd, GWL_STYLE) & (LBS_MULTIPLESEL | LBS_EXTENDEDSEL)))
        return ((LRESULT) LB_ERR);

      hPalInstanceData = GetWindowWord (hWnd, HPALINSTANCEDATA);
      lpPalInstanceData = (LPPALINSTANCEDATA) GlobalLock (hPalInstanceData);

      i = 0;

      for (lpPalItem = MAKEP (PID.hObjects, PID.nppalItemHead);
           (int) OFFSETOF (lpPalItem) != -1;
           lpPalItem = MAKEP (PID.hObjects, lpPalItem->nppalItemNext))
        if (lpPalItem->fSelected)
          i++;

      GlobalUnlock (hPalInstanceData);
      return ((LRESULT) i);

    case PM_GETSELITEMS:
      if (!(GetWindowLong (hWnd, GWL_STYLE) & (LBS_MULTIPLESEL | LBS_EXTENDEDSEL)))
        return ((LRESULT) LB_ERR);

      hPalInstanceData = GetWindowWord (hWnd, HPALINSTANCEDATA);
      lpPalInstanceData = (LPPALINSTANCEDATA) GlobalLock (hPalInstanceData);

      i = 0;    /* Zero based item count */
      j = 0;    /* Index into passed array */

      for (lpPalItem = MAKEP (PID.hObjects, PID.nppalItemHead);
           (int) OFFSETOF (lpPalItem) != -1;
           lpPalItem = MAKEP (PID.hObjects, lpPalItem->nppalItemNext))
        {
          if (lpPalItem->fSelected)
            if (wParam)
              {
                ((int FAR *) lParam)[j++] = i;
                wParam--;
              }

          i++;
        }

      GlobalUnlock (hPalInstanceData);
      return ((LRESULT) j);

    case PM_SELECTALL:
    case PM_DESELECTALL:
      hPalInstanceData = GetWindowWord (hWnd, HPALINSTANCEDATA);
      lpPalInstanceData = (LPPALINSTANCEDATA) GlobalLock (hPalInstanceData);

      for (lpPalItem = MAKEP (PID.hObjects, PID.nppalItemHead);
           (int) OFFSETOF (lpPalItem) != -1;
           lpPalItem = MAKEP (PID.hObjects, lpPalItem->nppalItemNext))
        lpPalItem->fSelected = (message == (UINT) PM_SELECTALL);

      for (i = 1; i <= PID.nPanelCount - PID.nHiddenPanelCount; i++)
        {
          InvalidateRect (GetDlgItem (hWnd, i), NULL, TRUE);
          UpdateWindow (GetDlgItem (hWnd, i));
        }

      GlobalUnlock (hPalInstanceData);
      break;

    case PM_RECREATETHUMBNAILS:
      /* Recreates all thumbnail views and redraws those panels which
         are visible with the new thumbnails.  This message can be
         received even before any thumbnails for the palette have
         been created if the nPanelSize field of PalCreateParms
         specifies a size (as opposed to a negative number, which fixes
         the number of panels per column).  For example, during the processing of a
         single message, you can create a palette window, send
         it items and then send it this message.

         Returns either the number of thumbnails created or -1 if
         the nPanelSize field of PalCreateParms is negative and
         the panel size has not yet been determined. */

      hPalInstanceData = GetWindowWord (hWnd, HPALINSTANCEDATA);
      lpPalInstanceData = (LPPALINSTANCEDATA) GlobalLock (hPalInstanceData);

      if (PID.nPanelSize < 0 && !PID.nXPanel && !PID.nYPanel)
        {
          GlobalUnlock (hPalInstanceData);
          return ((LRESULT) -1);
        }

      GetDlgItemText (hWnd, ID_FILENAME, szBuffer2, sizeof (szBuffer2));
      hOldCursor = GetCursor ();
      SetCursor (LoadCursor (NULL, IDC_WAIT));

      j = 0;

      for (lpPalItem = MAKEP (PID.hObjects, PID.nppalItemHead);
           (int) OFFSETOF (lpPalItem) != -1;
           lpPalItem = MAKEP (PID.hObjects, lpPalItem->nppalItemNext))
        {
          /* Delete and re-create the existing thumbnail. */

          HackOutPath (szBuffer, (LPSTR) MAKEP (PID.hStringHeap, lpPalItem->npszPhotoFileName));
          SendDlgItemMessage (hWnd, ID_FILENAME, WM_USER, RED, (LPARAM) (LPSTR) szBuffer);

          hBitmap = CreateThumbnail (lpPalItem);
          SendMessage (GetParent (hWnd), WM_ITEMCHANGED, j, 0L);

          if (hBitmap)
            {
              GetThumbnailBits (hBitmap, lpPalItem);
              DeleteObject (hBitmap);
            }
          else
            DebugPrintf ("CreateThumbnail returned 0 for %s",
              (LPSTR) MAKEP (lpPalItem->hStringHeap,
                             lpPalItem->npszPhotoFileName));

          j++;

          if (i = ItemToPanel (lpPalInstanceData, j))
            {
              InvalidateRect (GetDlgItem (hWnd, i), NULL, TRUE);
              UpdateWindow (GetDlgItem (hWnd, i));
            }
        }

      SendDlgItemMessage (hWnd, ID_FILENAME, WM_USER, BLACK, (LPARAM) (LPSTR) szBuffer2);
      SetCursor (hOldCursor);
      GlobalUnlock (hPalInstanceData);
      return ((LRESULT) j);

    case PM_ADDITEM:
      /* wParam - not used
         lpPalParm = (LPPALPARM) lParam; */

      /* Fall thru */
      /* Fall thru */
      /* Fall thru */

    case PM_INSERTITEM:
      /* nPos      = (int) wParam
         lpPalParm = (LPPALPARM) lParam;

         Inserts before the zero based position nPos.  To make an item
         the first in the list, nPos = 0.  To make
         an item the last in the list, nPos = num of
         item in list or nPos = -1. */

      hPalInstanceData = GetWindowWord (hWnd, HPALINSTANCEDATA);
      lpPalInstanceData = (LPPALINSTANCEDATA) GlobalLock (hPalInstanceData);

      lpPalParm = (LPPALPARM) lParam;

      /* Allocate storage out of the string heap */

      if (lpPalParm->photo.szTitle[0])
        {
          lpString = (LPSTR) SubAlloc (PID.hStringHeap, LMEM_FIXED, lstrlen (lpPalParm->photo.szTitle) + 1);
          lstrcpy (lpString, lpPalParm->photo.szTitle);
          PalItem.npszTitle = (NPSTR) OFFSETOF (lpString);
        }
      else
        PalItem.npszTitle = (NPSTR) 0;

      if (lpPalParm->photo.szPhotoFileName[0])
        {
          lpString = (LPSTR) SubAlloc (PID.hStringHeap, LMEM_FIXED, lstrlen (lpPalParm->photo.szPhotoFileNam
              e) + 1);
          lstrcpy (lpString, _fstrlwr (lpPalParm->photo.szPhotoFileName));
          PalItem.npszPhotoFileName = (NPSTR) OFFSETOF (lpString);
        }
      else
        PalItem.npszPhotoFileName = (NPSTR) 0;

      if (lpPalParm->photo.szPhotoPath[0])
        {
          lpString = (LPSTR) SubAlloc (PID.hStringHeap, LMEM_FIXED, lstrlen (lpPalParm->photo.szPhotoPath) +
              1);
          lstrcpy (lpString, _fstrlwr (lpPalParm->photo.szPhotoPath));
          PalItem.npszPhotoPath = (NPSTR) OFFSETOF (lpString);
        }
      else
        PalItem.npszPhotoPath = (NPSTR) 0;

      if (lpPalParm->photo.szThumbFileName[0])
        {
          lpString = (LPSTR) SubAlloc (PID.hStringHeap, LMEM_FIXED, lstrlen (lpPalParm->photo.szThumbFileNam
              e) + 1);
          lstrcpy (lpString, _fstrlwr (lpPalParm->photo.szThumbFileName));
          PalItem.npszThumbFileName = (NPSTR) OFFSETOF (lpString);
        }
      else
        PalItem.npszThumbFileName = (NPSTR) 0;
```

```
    if (lpPalParm->photo.szThumbPath[0])
      {
        lpString = (LPSTR) SubAlloc (PID.hStringHeap, LMEM_FIXED, lstrlen (lpPalParm->photo.szThumbPath) +
            1);
        lstrcpy (lpString, _fstrlwr (lpPalParm->photo.szThumbPath));
        PalItem.npszThumbPath = (NPSTR) OFFSETOF (lpString);
      }
    else
      PalItem.npszThumbPath = (NPSTR) 0;

    if (lpPalParm->photo.szFastLoadFileName[0])
      {
        lpString = (LPSTR) SubAlloc (PID.hStringHeap, LMEM_FIXED, lstrlen (lpPalParm->photo.szFastLoadFile
            Name) + 1);
        lstrcpy (lpString, _fstrlwr (lpPalParm->photo.szFastLoadFileName));
        PalItem.npszFastLoadFileName = (NPSTR) OFFSETOF (lpString);
      }
    else
      PalItem.npszFastLoadFileName = (NPSTR) 0;

    if (lpPalParm->photo.szFastLoadPath[0])
      {
        lpString = (LPSTR) SubAlloc (PID.hStringHeap, LMEM_FIXED, lstrlen (lpPalParm->photo.szFastLoadPath
            ) + 1);
        lstrcpy (lpString, _strupr (lpPalParm->photo.szFastLoadPath));
        PalItem.npszFastLoadPath = (NPSTR) OFFSETOF (lpString);
      }
    else
      PalItem.npszFastLoadPath = (NPSTR) 0;

    PalItem.usFlags        = lpPalParm->photo.usFlags;
    PalItem.sPhotoLeft     = lpPalParm->photo.sPhotoLeft;
    PalItem.sPhotoTop      = lpPalParm->photo.sPhotoTop;
    PalItem.sPhotoRight    = lpPalParm->photo.sPhotoRight;
    PalItem.sPhotoBottom   = lpPalParm->photo.sPhotoBottom;
    PalItem.sThumbLeft     = lpPalParm->photo.sThumbLeft;
    PalItem.sThumbTop      = lpPalParm->photo.sThumbTop;
    PalItem.sThumbRight    = lpPalParm->photo.sThumbRight;
    PalItem.sThumbBottom   = lpPalParm->photo.sThumbBottom;
    PalItem.sCropLeft      = lpPalParm->photo.sCropLeft;
    PalItem.sCropTop       = lpPalParm->photo.sCropTop;
    PalItem.sCropRight     = lpPalParm->photo.sCropRight;
    PalItem.sCropBottom    = lpPalParm->photo.sCropBottom;
    PalItem.sDisplayScale = lpPalParm->photo.sDisplayScale;
    PalItem.lMinDisplayTime  = lpPalParm->photo.lMinDisplayTime;
    PalItem.lMaxDisplayTime     = lpPalParm->photo.lMaxDisplayTime;
    PalItem.db_addr          = lpPalParm->db_addr;

    /* Each PALITEM structure gets its own copy of the handle to
       to string heap (this makes life simpler in the panel
       window proc). */

    PalItem.hStringHeap = PID.hStringHeap;
    PalItem.nXPanel     = PID.nXPanel;
    PalItem.nYPanel     = PID.nYPanel;
    PalItem.hBitmapBits = 0;
    PalItem.fSelected   = FALSE;

    /* The file name is the major sort key. nSeqNo is the
       minor sort key.  Since each item inserted into
       the tree as a unique sequence number, duplicate
       file names may be stored in the tree. */

    PalItem.nSeqNo = PID.nItemSeq;
    PalItem.wSig   = PALITEM_SIG;

    new_node = tavl_insert (PID.tree,
                            &PalItem,
                            TRUE);

    PID.nItemCount++;
    PID.nItemSeq++;

    if (message == PM_ADDITEM)
      {
        /* Find the position of the new object based on the key. */

        i = -1;    /* i will be a zero based counter */

        for (node = tavl_reset (PID.tree);    /* Get the head node (no data) */
             node && new_node != node;        /* Never true the first time   */
             node = tavl_succ (node))         /* Get the next node           */
          i++;

        if (!node)
          {
            //DebugPrintf ("ERROR! node is NULL");
            break;
          }

        /* The zero based position of the just insterted item is indicated by i.
           Insert the item in the linked list of items in the i position.
           This results in two lists, the linked list we maintain and
           the balanced binary tree the TAVL routines maintain, that are
           in the same order.  The difference is that we can change the
           order in our linked list by move, copy and insert operations,
           whereas the TAVL binary tree will always be in key order. */

        j = i;  /* save a copy of i */
      }
    else
      {
        /* i is used as a loop counter.  After the loop, we want
           to know what i started out as so that we can figure
           out which column and panel are involved.  We normally
           set j = i so that after the loop j holds i's initial
           value.  If, however, i starts out as -1 then we
           set j = 0 and increment j for each loop iteration.
           The loop will eventually end, even if i stays at
           -1.  At that point, j will equal the number of
           items in the linked list.  Thus, everything
           works just as if the user specified this value for
           i instead of -1. */

        i = (int) wParam;

        j = (i == -1) ? 0 : i;
      }

    lpPalItem = (LPPALITEM) new_node->dataptr;

    if (PID.nppalItemHead == (NPPALITEM) -1)
      {
        PID.nppalItemHead          = (NPPALITEM) OFFSETOF (lpPalItem);
        lpPalItem->nppalItemNext = (NPPALITEM) -1;
        lpPalItem->nppalItemPrev = (NPPALITEM) -1;
      }
    else
      {
        for (lpPalItem2 = MAKEP (PID.hObjects, PID.nppalItemHead);
             i && lpPalItem2->nppalItemNext != (NPPALITEM) -1;
             lpPalItem2 = MAKEP (PID.hObjects, lpPalItem2->nppalItemNext))
          if (i == -1)
            j++;
          else
            i--;

        if (i)
          {
            /* We are inserting this item after the last item (i.e. we
               are adding it to the end of the linked list. */

            lpPalItem->nppalItemNext = (NPPALITEM) -1;
            lpPalItem->nppalItemPrev = (NPPALITEM) OFFSETOF (lpPalItem2);

            lpPalItem2->nppalItemNext = (NPPALITEM) OFFSETOF (lpPalItem);
          }
        else
          {
            /* Insert the item pointed to by lpPalItem into the linked list at
               to position occupied by the item pointed to by lpPalItem2. */

            lpPalItem->nppalItemNext = (NPPALITEM) OFFSETOF (lpPalItem2);
            lpPalItem->nppalItemPrev = lpPalItem2->nppalItemPrev;

            if (lpPalItem2->nppalItemPrev != (NPPALITEM) -1)
              ((LPPALITEM) MAKEP (PID.hObjects, lpPalItem2->nppalItemPrev))->nppalItemNext = (NPPALITEM)
                  OFFSETOF (lpPalItem);
            else
              PID.nppalItemHead = (NPPALITEM) OFFSETOF (lpPalItem);

            lpPalItem2->nppalItemPrev = (NPPALITEM) OFFSETOF (lpPalItem);
          }
      }

    /* Notify parent of change. */

    if (GetWindowLong (hWnd, GWL_STYLE) & LBS_NOTIFY)
      SendMessage (GetParent (hWnd),
                   WM_COMMAND,
                   GetWindowWord (hWnd, GWW_ID),
                   MAKELPARAM (hWnd, PLN_PALETTECHANGED));

    /* If nothing's been displayed yet (which is the case if you
       add a bunch of items immediately after creating the
       palette window), then we're done. */

    if (!PID.nPanelsPerCol)
      {
        GlobalUnlock (hPalInstanceData);
        break;
      }

    SetScrollBarArrows (hWnd);

    /* Compute the column number in which a panel that is associated
       with this new item would be displayed. */

    i = j / PID.nPanelsPerCol + 1;

    //DebugPrintf ("item %d would be displayed in column %d", j, i);
    //DebugPrintf ("nFirstVisCol = %d, nPanelsPerRow = %d", PID.nFirstVisCol, PID.nPanelsPerRow);

    /* Would this column be either completely or partially visible? */

    if (i <  PID.nFirstVisCol ||
        i >= PID.nFirstVisCol + PID.nPanelsPerRow)
      {
        /* No.  The column that contains the associated panel
```

```
            is not in view. */

          GlobalUnlock (hPalInstanceData);
          break;
        }

      /* Are any panels hidden (scrolling can cause panels
         to be hidden) ? */

      if (PID.nHiddenPanelCount)
        {
          /* Yes, take the first hidden panel and unhide it. */

          int i;

          i = PID.nPanelCount - PID.nHiddenPanelCount + 1;
          PID.nHiddenPanelCount--;
          ShowWindow (GetDlgItem (hWnd, i), SW_SHOW);
          InvalidateRect (GetDlgItem (hWnd, i), NULL, TRUE);
          UpdateWindow (GetDlgItem (hWnd, i));
        }
      else
        {
          /* No hidden panels. Is there room to create one more
             panel?  */

          if ( (PID.nPanelCount / PID.nPanelsPerCol + 1) <= PID.nPanelsPerRow)
            {
              /* Yes, there's room for at least one more panel. */

              AddPanel (hWnd, new_node);
            }
        }

     /* Set i to the item number associated with the first panel.  Then
        get its file name and display it in the ID_FILENAME control. */

     i = PanelToItem (lpPalInstanceData, i);

     for (lpPalItem = MAKEP (PID.hObjects, PID.nppalItemHead);
          --i && ((int) OFFSETOF (lpPalItem) != -1);
          lpPalItem = MAKEP (PID.hObjects, lpPalItem->nppalItemNext));

     if ((int) OFFSETOF (lpPalItem) == -1)
       {
         //DebugPrintf ("ERROR - we went too far");
         break;
       }

     HackOutPath (szBuffer, (LPSTR) MAKEP (PID.hStringHeap, lpPalItem->npszPhotoFileName));
     SendDlgItemMessage (hWnd, ID_FILENAME, WM_USER, BLACK, (LPARAM) (LPSTR) szBuffer);

     /* The column that contains the panel associated with the item
        is visible.  Get the exact panel number. */

     i = ItemToPanel (lpPalInstanceData, j + 1);

     /* All the panels starting with the i-th panel need to be repainted. */

     for (;
          i <= PID.nPanelCount - PID.nHiddenPanelCount;
          i++)
       {
         InvalidateRect (GetDlgItem (hWnd, i), NULL, TRUE);
         ShowWindow (GetDlgItem (hWnd, i), SW_SHOW);
       }

     GlobalUnlock (hPalInstanceData);
     break;

   case WM_COMMAND:
     hPalInstanceData = GetWindowWord (hWnd, HPALINSTANCEDATA);
     lpPalInstanceData = (LPPALINSTANCEDATA) GlobalLock (hPalInstanceData);

     switch (wParam)
       {
         case ID_FILEDESC:
           switch (HIWORD (lParam))
             {
               case EN_CHANGE:
                 fItemFieldChanged = TRUE;
                 break;

               case EN_SETFOCUS:
                 fItemFieldChanged = FALSE;
                 break;

               case EN_KILLFOCUS:
                 if (!fItemFieldChanged)
                   break;

                 GetDlgItemText (hWnd, ID_FILEDESC, PalParm.photo.szTitle, sizeof (PalParm.photo.szTitle));

                 i = PID.nCurrentItem;

                 for (lpPalItem = MAKEP (PID.hObjects, PID.nppalItemHead);
                      i-- && lpPalItem != (NPPALITEM) -1;
                      lpPalItem = MAKEP (PID.hObjects, lpPalItem->nppalItemNext));

                 /* Free any existing file description */

                 if (lpPalItem->npszTitle)
                   SubFree ((HANDLE32) MAKEP (lpPalItem->hStringHeap, lpPalItem->npszTitle));

                 /* Allocate and store the new path */

                 lpString = (LPSTR) SubAlloc (lpPalItem->hStringHeap, LMEM_FIXED, lstrlen
                      (PalParm.photo.szTitle) + 1);
                 lstrcpy (lpString, PalParm.photo.szTitle);
                 lpPalItem->npszTitle = (NPSTR) OFFSETOF (lpString);
                 SendMessage (GetParent (hWnd), WM_ITEMCHANGED, PID.nCurrentItem, 0L);
             }

           break;

         case ID_FROM:
           switch (HIWORD (lParam))
             {
               case EN_CHANGE:
                 fItemFieldChanged = TRUE;
                 break;

               case EN_SETFOCUS:
                 fItemFieldChanged = FALSE;
                 break;

               case EN_KILLFOCUS:
                 if (!fItemFieldChanged)
                   break;

                 GetDlgItemText (hWnd, ID_FROM, szBuffer, sizeof (szBuffer));

                 i = PID.nCurrentItem;

                 for (lpPalItem = MAKEP (PID.hObjects, PID.nppalItemHead);
                      i-- && lpPalItem != (NPPALITEM) -1;
                      lpPalItem = MAKEP (PID.hObjects, lpPalItem->nppalItemNext));

                 lpPalItem->lMinDisplayTime = atol (szBuffer);
                 SendMessage (GetParent (hWnd), WM_ITEMCHANGED, PID.nCurrentItem, 0L);
                 break;
             }

           break;

         case ID_TO:
           switch (HIWORD (lParam))
             {
               case EN_CHANGE:
                 fItemFieldChanged = TRUE;
                 break;

               case EN_SETFOCUS:
                 fItemFieldChanged = FALSE;
                 break;

               case EN_KILLFOCUS:
                 if (!fItemFieldChanged)
                   break;

                 GetDlgItemText (hWnd, ID_TO, szBuffer, sizeof (szBuffer));

                 i = PID.nCurrentItem;

                 for (lpPalItem = MAKEP (PID.hObjects, PID.nppalItemHead);
                      i-- && lpPalItem != (NPPALITEM) -1;
                      lpPalItem = MAKEP (PID.hObjects, lpPalItem->nppalItemNext));

                 lpPalItem->lMaxDisplayTime = atol (szBuffer);
                 SendMessage (GetParent (hWnd), WM_ITEMCHANGED, PID.nCurrentItem, 0L);
                 break;
             }

           break;

         default:
           /* Must be a panel */

           switch (HIWORD (lParam))
             {
               case PNN_ITEMCHANGED:
                 SendMessage (GetParent (hWnd), WM_ITEMCHANGED, PanelToItem (lpPalInstanceData, (int)
                      wParam) - 1, 0L);
                 break;

               case PNN_LBUTTONDOWN:
               case PNN_SLBUTTONDOWN:
                 if (HIWORD (lParam) != PNN_SLBUTTONDOWN ||
                     !(GetWindowLong (hWnd, GWL_STYLE) & (PLS_MULTIPLESEL | PLS_EXTENDEDSEL)) )
                   {
                     /* If any of the items to be de-selected are visible
                        (i.e. there is a panel associated with the item), then clear
                        the panel's selection state. */

                     /* Set j to the zero based item number associated with this panel. */

                     j = PanelToItem (lpPalInstanceData, (int) wParam) - 1;

                     /* Keep track of lpPalItem's zero based position. */
```

IC/14PRINT

```
            i = 0;

            for (lpPalItem = MAKEP (PID.hObjects, PID.nppalItemHead);
                (int) OFFSETOF (lpPalItem) != -1;
                lpPalItem = MAKEP (PID.hObjects, lpPalItem->nppalItemNext))
              {
                /* Skip the current panel.  If it's selected, it will remain selcted. */

                if (i == j)
                  {
                    i++;
                    continue;
                  }

                if (lpPalItem->fSelected)
                  {
                    lpPalItem->fSelected = FALSE;

                    //DebugPrintf ("Checking %d <= %d < %d",
                    //  (PID.nFirstVisCol - 1) * PID.nPanelsPerCol,
                    //  i,
                    //  (PID.nFirstVisCol + PID.nPanelsPerRow - 1) * PID.nPanelsPerCol);

                    if (i >= (PID.nFirstVisCol - 1) * PID.nPanelsPerCol &&
                        i <  (PID.nFirstVisCol + PID.nPanelsPerRow - 1) * PID.nPanelsPerCol)
                      {
                        //DebugPrintf ("Clearing select state for panel %d", ItemToPanel
                            (lpPalInstanceData, i + 1));

                        InvalidateRect (GetDlgItem (hWnd, ItemToPanel (lpPalInstanceData, i + 1)),
                            NULL, TRUE);
                        UpdateWindow   (GetDlgItem (hWnd, ItemToPanel (lpPalInstanceData, i +
                            1)));
                      }
                  }

                i++;
              }
          }

        break;

      case PNN_SLBUTTONUP:
      case PNN_LBUTTONUP:
        if (HIWORD (lParam) == PNN_LBUTTONUP ||
          !(GetWindowLong (hWnd, GWL_STYLE) & (PLS_MULTIPLESEL | PLS_EXTENDEDSEL)) )
          {
            /* If any of the items to be de-selected are visible
              (i.e. there is a panel associated with the item), then clear
              the panel's selection state. */

            /* Set j to the zero based item number associated with this panel. */

            j = PanelToItem (lpPalInstanceData, (int) wParam) - 1;

            /* Keep track of lpPalItem's zero based position. */

            i = 0;

            for (lpPalItem = MAKEP (PID.hObjects, PID.nppalItemHead);
                (int) OFFSETOF (lpPalItem) != -1;
                lpPalItem = MAKEP (PID.hObjects, lpPalItem->nppalItemNext))
              {
                /* Skip the current panel.  If it's selected, it will remain selcted. */

                if (i == j)
                  {
                    i++;
                    continue;
                  }

                if (lpPalItem->fSelected)
                  {
                    lpPalItem->fSelected = FALSE;

                    //DebugPrintf ("Checking %d <= %d < %d",
                    //  (PID.nFirstVisCol - 1) * PID.nPanelsPerCol,
                    //  i,
                    //  (PID.nFirstVisCol + PID.nPanelsPerRow - 1) * PID.nPanelsPerCol);

                    if (i >= (PID.nFirstVisCol - 1) * PID.nPanelsPerCol &&
                        i <  (PID.nFirstVisCol + PID.nPanelsPerRow - 1) * PID.nPanelsPerCol)
                      {
                        //DebugPrintf ("Clearing select state for panel %d", i - (PID.nFirstVisCol
                            - 1) * PID.nPanelsPerCol   + 1);

                        InvalidateRect (GetDlgItem (hWnd, ItemToPanel (lpPalInstanceData, i + 1)),
                            NULL, TRUE);
                        UpdateWindow   (GetDlgItem (hWnd, ItemToPanel (lpPalInstanceData, i +
                            1)));
                      }
                  }

                i++;
              }
          }

        /* Fall thru */
        /* Fall thru */
        /* Fall thru */
```

```
      case PNN_CLBUTTONUP:
        /* Set i to the item number associated with this panel (the
          first item number is 1, not 0) */

        i = PanelToItem (lpPalInstanceData, (int) wParam);

        //DebugPrintf ("Setting select state for item (one based) %d", i);

        /* Find the i-th item by position (not by key) */

        for (lpPalItem = MAKEP (PID.hObjects, PID.nppalItemHead);
            --i;
            lpPalItem = MAKEP (PID.hObjects, lpPalItem->nppalItemNext));

        if (!lpPalItem->fSelected)
          {
            if (HIWORD (lParam) != PNN_CLBUTTONUP)
              lpPalItem->fSelected = TRUE;
          }
        else
        if (HIWORD (lParam) == PNN_CLBUTTONUP)
          lpPalItem->fSelected = FALSE;
#if 0

        /* If the item has become unselected, then repaint it as so.
          If it has become selected, then notify the parent
          that the selection has changed. */

        if (!lpPalItem->fSelected)
          {
            InvalidateRect (GetDlgItem (hWnd, wParam), NULL, TRUE);
            UpdateWindow   (GetDlgItem (hWnd, wParam));
          }
        else
        if (GetWindowLong (hWnd, GWL_STYLE) & PLS_NOTIFY)
          SendMessage (GetParent (hWnd),
                       WM_COMMAND,
                       GetWindowWord (hWnd, GWW_ID),
                       MAKELPARAM (hWnd, PLN_SELCHANGE));
#endif

        /* If the item has become unselected, then repaint it. */

        if (!lpPalItem->fSelected)
          {
            InvalidateRect (GetDlgItem (hWnd, wParam), NULL, TRUE);
            UpdateWindow   (GetDlgItem (hWnd, wParam));
          }

        /* Notify the parent if an item as become selected or if an item
           has become unselected. */

        if (GetWindowLong (hWnd, GWL_STYLE) & PLS_NOTIFY)
          SendMessage (GetParent (hWnd),
                       WM_COMMAND,
                       GetWindowWord (hWnd, GWW_ID),
                       MAKELPARAM (hWnd, PLN_SELCHANGE));
        break;

      case PNN_PAINT:
        /* Set i to the item number associated with this panel (the
          first item number is 1, not 0) */

        i = PanelToItem (lpPalInstanceData, (int) wParam);

        //DebugPrintf ("nFirstVisCol = %d, nPanelsPerCol = %d, wParam = %d, i = %d",
            PID.nFirstVisCol, PID.nPanelsPerCol, (int) wParam, i);

        /* Find the i-th item by position (not by key) */

        for (lpPalItem = MAKEP (PID.hObjects, PID.nppalItemHead);
            --i;
            lpPalItem = MAKEP (PID.hObjects, lpPalItem->nppalItemNext));

        GlobalUnlock (hPalInstanceData);
        return ((LRESULT) lpPalItem);

      case PNN_RIGHTARROW:
      case PNN_LEFTARROW:
        i = (int) wParam + ((HIWORD (lParam) == PNN_RIGHTARROW) ? PID.nPanelsPerCol :
            -PID.nPanelsPerCol);

        if (i < 1 || i > (PID.nPanelCount - PID.nHiddenPanelCount))
          break;

        SetFocus (GetDlgItem (hWnd, i));
        break;


      case PNN_ESCAPE:
        if (nTimer)
          {
            if (fDrag)
              KillTimer (hWndTargetPalette, nTimer);
            else
              KillTimer (hWnd, nTimer);

            nTimer = 0;
          }

        SetCursor (LoadCursor (NULL, IDC_ARROW));
```

LC74PRINT

```
                  if (hWndInsertAfter)
                    {
                      SetWindowWord (hWndInsertAfter, DISPLAYAS, GetWindowWord (hWndInsertAfter, DISPLAYAS)
                          & ~DISPLAYASINSERT);
                      InvalidateRect (hWndInsertAfter, NULL, TRUE);
                      UpdateWindow (hWndInsertAfter);
                      hWndInsertAfter = NULL;
                    }

                  if (hWndInsertBefore)
                    {
                      SetWindowWord (hWndInsertBefore, DISPLAYAS, GetWindowWord (hWndInsertBefore,
                          DISPLAYAS) & ~DISPLAYASINSERT);
                      InvalidateRect (hWndInsertBefore, NULL, TRUE);
                      UpdateWindow (hWndInsertBefore);
                      hWndInsertBefore = NULL;
                    }

                  fDragEnabled  = FALSE;
                  fDrag         = FALSE;
                  fDragCanceled = TRUE;

                  break;

                case PNN_DELETE:
                  if (GetWindowLong (hWnd, GWL_STYLE) & PLS_DELETE)
                    SendMessage (hWnd, PM_DELETESELECTEDITEMS, 0, 0L);

                  break;

                case PNN_SPACE:
                  break;
              }

            break;
        }

      GlobalUnlock (hPalInstanceData);
      break;

    case WM_HSCROLL:
      hPalInstanceData = GetWindowWord (hWnd, HPALINSTANCEDATA);
      lpPalInstanceData = (LPPALINSTANCEDATA) GlobalLock (hPalInstanceData);

      GetClientRect (hWnd, &rect);

      //DebugPrintf ("nFirstVisCol was %d", PID.nFirstVisCol);

      switch (wParam)
        {
          case SB_LINELEFT:
            PID.nFirstVisCol = max (1,
                                    PID.nFirstVisCol - 1);
            break;

          case SB_LINERIGHT:
            PID.nFirstVisCol = min ((PID.nItemCount - 1) / PID.nPanelsPerCol + 1 - (PID.nWholePanelsPerRow -
                1),
                                    PID.nFirstVisCol + 1);
            break;

          case SB_PAGELEFT:
            PID.nFirstVisCol = max (1,
                                    PID.nFirstVisCol - PID.nWholePanelsPerRow);
            break;

          case SB_PAGERIGHT:
            PID.nFirstVisCol = min ((PID.nItemCount - 1) / PID.nPanelsPerCol + 1 - (PID.nWholePanelsPerRow -
                1),
                                    PID.nFirstVisCol + PID.nWholePanelsPerRow);
            break;

          case SB_THUMBPOSITION:
            PID.nFirstVisCol = LOWORD (lParam);
            break;

          case SB_THUMBTRACK:
            j = PID.nFirstVisCol;   /* Save nFirstVisCol */
            PID.nFirstVisCol = LOWORD (lParam);
            break;
        }

      /* Set i to the item number associated with the first panel.  Then
         get its file name and display it in the ID_FILENAME control. */

      i = PanelToItem (lpPalInstanceData, 1);

      for (lpPalItem = MAKEP (PID.hObjects, PID.nppalItemHead);
           --i && ((int) OFFSETOF (lpPalItem) != -1);
           lpPalItem = MAKEP (PID.hObjects, lpPalItem->nppalItemNext));

      if ((int) OFFSETOF (lpPalItem) == -1)
        {
          //DebugPrintf ("ERROR - we went too far");
          break;
        }

      HackOutPath (szBuffer, (LPSTR) MAKEP (PID.hStringHeap, lpPalItem->npszPhotoFileName));
      SendDlgItemMessage (hWnd, ID_FILENAME, WM_USER, BLACK, (LPARAM) (LPSTR) szBuffer);

      switch (wParam)
        {
          case SB_LINELEFT:
          case SB_LINERIGHT:
          case SB_PAGELEFT:
          case SB_PAGERIGHT:
          case SB_THUMBPOSITION:
            PID.nHiddenPanelCount = 0;

            for (i = 1; i <= PID.nPanelCount; i++)
              {
                hWndPanel = GetDlgItem (hWnd, i);

                /* If, because we've scrolled the palette window, we have more panels
                   than there are remaining images to display, hide the un-needed panels,
                   else show the panels and make them repaint themselves. */

                if (!PanelToItem (lpPalInstanceData, i))
                  {
                    ShowWindow (hWndPanel, SW_HIDE);
                    PID.nHiddenPanelCount++;
                  }
                else
                  {
                    ShowWindow     (hWndPanel, SW_SHOW);
                    InvalidateRect (hWndPanel, NULL, FALSE);
                    UpdateWindow   (hWndPanel);
                  }
              }

            SetScrollBarArrows (hWnd);
            break;

          case SB_THUMBTRACK:
            PID.nFirstVisCol = j;  /* Restore nFirstVisCol */
            break;
        }

      GlobalUnlock (hPalInstanceData);
      break;

    case WM_PAINT:
      hPalInstanceData = GetWindowWord (hWnd, HPALINSTANCEDATA);
      lpPalInstanceData = (LPPALINSTANCEDATA) GlobalLock (hPalInstanceData);

      hDC = BeginPaint (hWnd, &ps);
      EndPaint (hWnd, &ps);

      /* Set i to the item number associated with the first panel.  Then
         get its file name and display it in the ID_FILENAME control. */

      i = PanelToItem (lpPalInstanceData, 1);

      if (!i)
        {
          GlobalUnlock (hPalInstanceData);
          break;
        }

      for (lpPalItem = MAKEP (PID.hObjects, PID.nppalItemHead);
           --i && ((int) OFFSETOF (lpPalItem) != -1);
           lpPalItem = MAKEP (PID.hObjects, lpPalItem->nppalItemNext));

      if ((int) OFFSETOF (lpPalItem) == -1)
        {
          //DebugPrintf ("ERROR - we went too far");
          GlobalUnlock (hPalInstanceData);
          break;
        }

      HackOutPath (szBuffer, (LPSTR) MAKEP (PID.hStringHeap, lpPalItem->npszPhotoFileName));
      SendDlgItemMessage (hWnd, ID_FILENAME, WM_USER, BLACK, (LPARAM) (LPSTR) szBuffer);

      GlobalUnlock (hPalInstanceData);
      break;

    case WM_DESTROY:
      hPalInstanceData = GetWindowWord (hWnd, HPALINSTANCEDATA);
      lpPalInstanceData = (LPPALINSTANCEDATA) GlobalLock (hPalInstanceData);

      /* Find the window in the window table */

      for (i = 0; i < nPalettes; i++)
        if (ahWnd[i] == hWnd)
          break;

      /* Shift everything above the entry down one, thus
         shortening the table by one. */

      for (j = i + 1; j < nPalettes; j++)
        ahWnd[i] = ahWnd[i + 1];

      nPalettes--;

      /* Find the task in the task table. */

      for (i = 0; i < nTasks; i++)
        if (TaskTable[i].hTask == GetCurrentTask ())
          break;
```

```
        /* Decrement the usage count. */

        TaskTable[i].nCount--;

        /* If the usage count went to zero, then unhook the hook
           and shift everything above the entry down one, thus
           shortening the table by one. */

        if (!TaskTable[i].nCount)
          {
//          DebugPrintf ("Removing hook for task %.4X", GetCurrentTask ());
            UnhookWindowsHookEx (TaskTable[i].hkMsgHook);

            for (j = i + 1; j < nTasks; j++)
              TaskTable[i] = TaskTable[i + 1];

            nTasks--;
          }

       for (lpPalItem = MAKEP (PID.hObjects, PID.nppalItemHead);
            (int) OFFSETOF (lpPalItem) != -1;
            lpPalItem = MAKEP (PID.hObjects, lpPalItem->nppalItemNext))
         if (lpPalItem->hBitmapBits)
           GlobalFree (lpPalItem->hBitmapBits);

       GlobalFree (PID.hTAVL);
       GlobalFree (PID.hStringHeap);
       GlobalFree (PID.hObjects);

       GlobalUnlock (hPalInstanceData);
       GlobalFree (hPalInstanceData);
       break;

     default:
       return (DefWindowProc(hWnd, message, wParam, lParam));
   }

  return (NULL);
}

long WINAPI PanelWndProc
  (
    HWND    hWnd,
    UINT    message,
    WPARAM  wParam,
    LPARAM  lParam
  )

{
  HDC             hCompatDC, hDC;
  LPPALITEM       lpPalItem;
  RECT            rect;
  HRGN            hRgn;
  POINT           apts[6];
  PAINTSTRUCT     ps;
  HBRUSH          hbr;
  int             i, nDepth;
  HPALETTE        hPal;
  LPSTR           lpszPhotoFileName;
  TEXTMETRIC      tm;
  char            szBuffer[_MAX_PATH];
  char            szBuffer2[_MAX_PATH];
  HBITMAP         hBitmap;
  LPVOID          lpBits;
  int             nShift;
  DWORD           dwExt;

  static LPSTR  lpszError1 = "Cannot";
  static LPSTR  lpszError2 = "read.";


#if 0
  MSG             msg;
  msg.hwnd        = hWnd;
  msg.message     = message;
  msg.wParam      = wParam;
  msg.lParam      = lParam;

  DebugOutputMessage (&msg);
#endif

  switch (message)
    {
      /* Let palette handle all mouse stuff */

      case WM_LBUTTONDOWN:
      case WM_MBUTTONDOWN:
      case WM_RBUTTONDOWN:
      case WM_LBUTTONDBLCLK:
      case WM_MBUTTONDBLCLK:
      case WM_RBUTTONDBLCLK:
        /* Re-cast the lParam in client units relative
           to palette. */

        ClientToScreen (hWnd, (LPPOINT) &lParam);
        ScreenToClient (GetParent (hWnd), (LPPOINT) &lParam);

        SendMessage (GetParent (hWnd),
                     message,
                     wParam,
                     lParam);
        break;

      case WM_GETDLGCODE:
        if (lParam)
          switch (((LPMSG) lParam)->message)
            {
              case WM_KEYDOWN:
                switch (((LPMSG) lParam)->wParam)
                  {
                    case VK_RIGHT:
                    case VK_LEFT:
                    case VK_ESCAPE:
                    case VK_DELETE:
                    case VK_SPACE:
                      return (DLGC_WANTMESSAGE);
                  }

                break;
            }

        return (0L);

      case WM_KEYDOWN:
        switch (wParam)
          {
            case VK_RIGHT:
              SendMessage (GetParent (hWnd),
                           WM_COMMAND,
                           GetWindowWord (hWnd, GWW_ID),
                           MAKELPARAM (hWnd, PNN_RIGHTARROW));
              break;

            case VK_LEFT:
              SendMessage (GetParent (hWnd),
                           WM_COMMAND,
                           GetWindowWord (hWnd, GWW_ID),
                           MAKELPARAM (hWnd, PNN_LEFTARROW));
              break;

            case VK_ESCAPE:
              SendMessage (GetParent (hWnd),
                           WM_COMMAND,
                           GetWindowWord (hWnd, GWW_ID),
                           MAKELPARAM (hWnd, PNN_ESCAPE));
              break;

            case VK_DELETE:
              SendMessage (GetParent (hWnd),
                           WM_COMMAND,
                           GetWindowWord (hWnd, GWW_ID),
                           MAKELPARAM (hWnd, PNN_DELETE));
              break;

            case VK_SPACE:
            //  SendMessage (GetParent (hWnd),
            //               WM_COMMAND,
            //               GetWindowWord (hWnd, GWW_ID),
            //               MAKELPARAM (hWnd, PNN_SPACE));

              break;

          }

        break;

      case WM_SETFOCUS:
      case WM_KILLFOCUS:
        rect.left   = GetWindowWord (hWnd, RECTLEFT);
        rect.top    = GetWindowWord (hWnd, RECTTOP);
        rect.right  = GetWindowWord (hWnd, RECTRIGHT);
        rect.bottom = GetWindowWord (hWnd, RECTBOTTOM);

        hDC = GetDC (hWnd);
        DrawFocusRect (hDC, &rect);
        ReleaseDC (hWnd, hDC);
        break;

      case WM_PAINT:
        hDC = BeginPaint (hWnd, &ps);
        GetClientRect (hWnd, &rect);
        nDepth = 2;
        nShift = 0;

        // Draw a black frame around the panel

        FrameRect (hDC, &rect, GetStockObject (BLACK_BRUSH)) ;

        InflateRect (&rect, -1, -1);

        lpPalItem = (LPPALITEM) SendMessage (GetParent (hWnd),
                                             WM_COMMAND,
                                             GetWindowWord (hWnd, GWW_ID),
                                             MAKELPARAM (hWnd, PNN_PAINT));

        if (lpPalItem->fSelected || (GetWindowWord (hWnd, DISPLAYAS) & DISPLAYASSELECTED))
          {
            apts[0].x = rect.left;          apts[0].y = rect.top;
            apts[1].x = rect.right;         apts[1].y = rect.top;
```

```
            apts[2].x = rect.right;             apts[2].y = rect.top      + nDepth;
            apts[3].x = rect.left   + nDepth;   apts[3].y = rect.top      + nDepth;
            apts[4].x = rect.left   + nDepth;   apts[4].y = rect.bottom;
            apts[5].x = rect.left;              apts[5].y = rect.bottom;

            hRgn = CreatePolygonRgn (apts, 6, ALTERNATE);

            FillRgn (hDC, hRgn, GetStockObject (BLACK_BRUSH));

            DeleteObject (hRgn);

            rect.top  += nDepth;
            rect.left += nDepth;
            nShift     = nDepth;

            hbr = CreateSolidBrush (GetNearestColor (hDC, (GetWindowWord (hWnd, DISPLAYAS) & DISPLAYASINSERT)
                7 RGB (191, 0, 0) : RGB (0, 0, 191)));
            FillRect (hDC, &rect, hbr);
            DeleteObject (hbr);

            GetClientRect (hWnd, &rect);
            InflateRect (&rect, -nDepth, -nDepth);
            OffsetRect (&rect, nDepth, nDepth);
            SetTextColor (hDC, RGB (255, 255 , 255));
          }
        else
          {
            apts[0].x = rect.left;              apts[0].y = rect.top;
            apts[1].x = rect.right;             apts[1].y = rect.top;
            apts[2].x = rect.right - nDepth;    apts[2].y = rect.top      + nDepth;
            apts[3].x = rect.left   + nDepth;   apts[3].y = rect.top      + nDepth;
            apts[4].x = rect.left   + nDepth;   apts[4].y = rect.bottom - nDepth;
            apts[5].x = rect.left;              apts[5].y = rect.bottom;

            hRgn = CreatePolygonRgn (apts, 6, ALTERNATE);

            FillRgn (hDC, hRgn, GetStockObject (WHITE_BRUSH));

            DeleteObject (hRgn);

            apts[0].x = rect.right;             apts[0].y = rect.top;
            apts[1].x = rect.right;             apts[1].y = rect.bottom;
            apts[2].x = rect.left;              apts[2].y = rect.bottom;
            apts[3].x = rect.left   + nDepth;   apts[3].y = rect.bottom - nDepth;
            apts[4].x = rect.right - nDepth;    apts[4].y = rect.bottom - nDepth;
            apts[5].x = rect.right - nDepth;    apts[5].y = rect.top      + nDepth;

            hRgn = CreatePolygonRgn (apts, 6, ALTERNATE);

            FillRgn (hDC, hRgn, GetStockObject (DKGRAY_BRUSH));

            DeleteObject (hRgn);

            InflateRect (&rect, -nDepth, -nDepth);

            if (GetWindowWord (hWnd, DISPLAYAS) & DISPLAYASINSERT)
              {
                hbr = CreateSolidBrush (GetNearestColor (hDC, RGB (191, 0, 0)));
                FillRect (hDC, &rect, hbr);
                DeleteObject (hbr);
                SetTextColor (hDC, RGB (255, 255 , 255));
              }
            else
              {
                FillRect (hDC, &rect, GetStockObject (LTGRAY_BRUSH));
                SetTextColor (hDC, RGB (0, 0 , 0));
              }

            GetClientRect (hWnd, &rect);
            InflateRect (&rect, -nDepth, -nDepth);
          }

        rect.bottom -= nDepth;

        SaveDC (hDC);
        SelectObject (hDC, hFont);
        SetTextAlign (hDC, TA_CENTER | TA_BOTTOM);
        SetBkMode (hDC, TRANSPARENT);

        /* Display only the file name and extentsion.  */

        lpszPhotoFileName = (LPSTR) MAKEP (lpPalItem->hStringHeap, lpPalItem->npszPhotoFileName);

        i = HackOutPath (szBuffer, lpszPhotoFileName);

        ExtTextOut (hDC,
                    (rect.right + rect.left) / 2,
                    rect.bottom,
                    ETO_CLIPPED,
                    &rect,
                    szBuffer,
                    i,
                    NULL);

        dwExt = GetTextExtent (hDC, szBuffer, lstrlen (szBuffer));

        i = (rect.right - rect.left - LOWORD (dwExt) - 4) / 2;
        i = max (0, i);  /* Make sure i is positive */

        rect.left  += i;
        rect.right -= i;
        rect.top    = rect.bottom - HIWORD (dwExt);

        SetWindowWord (hWnd, RECTLEFT,    rect.left);
        SetWindowWord (hWnd, RECTTOP,     rect.top);
        SetWindowWord (hWnd, RECTRIGHT,   rect.right);
        SetWindowWord (hWnd, RECTBOTTOM,  rect.bottom);

        hBitmap = NULL;

        if (!lpPalItem->hBitmapBits)
          {
            /* Try to load the thumbnail view. */

            if (lpPalItem->npszThumbPath && lpPalItem->npszThumbFileName)
              {
                lstrcpy (szBuffer, (LPSTR) MAKEP (lpPalItem->hStringHeap, lpPalItem->npszThumbPath));

                if (szBuffer[lstrlen (szBuffer) - 1] != '\\')
                  lstrcat (szBuffer, "\\");

                lstrcat (szBuffer, (LPSTR) MAKEP (lpPalItem->hStringHeap, lpPalItem->npszThumbFileName));

                hBitmap = LoadDDB (szBuffer);
              }

            /* If no thumbnail is specified, or if the thumbnail couldn't be
               opened, then create a new thumbnail. */

            if (!hBitmap)
              {
                GetDlgItemText (GetParent (hWnd), ID_FILENAME, szBuffer2, sizeof (szBuffer2));

                HackOutPath (szBuffer, (LPSTR) MAKEP (lpPalItem->hStringHeap, lpPalItem->npszPhotoFileName));
                SendDlgItemMessage (GetParent (hWnd), ID_FILENAME, WM_USER, RED, (LPARAM) (LPSTR) szBuffer);

                hBitmap = CreateThumbnail (lpPalItem);

                SendDlgItemMessage (GetParent (hWnd), ID_FILENAME, WM_USER, BLACK, (LPARAM) (LPSTR)
                    szBuffer2);

                SendMessage (GetParent (hWnd),
                             WM_COMMAND,
                             GetWindowWord (hWnd, GWW_ID),
                             MAKELPARAM (hWnd, PAN_ITEMCHANGED));
              }

            if (hBitmap)
              GetThumbnailBits (hBitmap, lpPalItem);
          }

        /* At this point, if hBitmap is defined, then it contains a valid thumbnail.  If it's
           zero, then a thumbnail could not be created. */

        hPal = NULL;

        if (lpPalItem->hBitmapBits)
          {
            hCompatDC = CreateCompatibleDC (hDC);
            SaveDC (hCompatDC);
            hPal = CreatePalette ((LPLOGPALETTE) &FixedPalette);

            if (!hBitmap)
              {
                lpBits = GlobalLock (lpPalItem->hBitmapBits);
                lpPalItem->Bitmap.bmBits = lpBits;
                hBitmap = CreateBitmapIndirect (&lpPalItem->Bitmap);
                GlobalUnlock (lpPalItem->hBitmapBits);
              }

            SelectObject (hCompatDC, hBitmap);

            SelectPalette (hDC,      hPal, FALSE);

            RealizePalette (hDC);

            BitBlt (hDC,
                    (lpPalItem->nXPanel - lpPalItem->Bitmap.bmWidth)  / 2 + nShift,
                    (lpPalItem->nYPanel - lpPalItem->Bitmap.bmHeight) / 4 + nShift,
                    lpPalItem->Bitmap.bmWidth,
                    lpPalItem->Bitmap.bmHeight,
                    hCompatDC,
                    0,
                    0,
                    SRCCOPY);

            RestoreDC (hCompatDC, -1);
            DeleteDC  (hCompatDC);

            DeleteObject (hBitmap);
          }
        else
          {
            SetTextColor (hDC, RGB (255, 0 , 0));
            GetTextMetrics (hDC, &tm);

            ExtTextOut (hDC,
                        lpPalItem->nXPanel / 2 + nShift,
                        lpPalItem->nYPanel / 2 + nShift,
                        0,
```

ICI14PRINT

```
                        NULL,
                        lpszError1,
                        lstrlen (lpszError1),
                        NULL);

            ExtTextOut (hDC,
                        lpPalItem->nXPanel / 2 + nShift,
                        lpPalItem->nYPanel / 2 + nShift + ((tmHeight * 3) / 2),
                        0,
                        NULL,
                        lpszError2,
                        lstrlen (lpszError2),
                        NULL);
          }

        RestoreDC (hDC, -1);

        if (hPal)
          DeleteObject (hPal);

        EndPaint (hWnd, &ps);
        break;

      default:
        return (DefWindowProc(hWnd, message, wParam, lParam));
    }

  return (NULL);
}

long WINAPI TextWndProc
  (
    HWND    hWnd,
    UINT    message,
    WPARAM  wParam,
    LPARAM  lParam
  )

{
// MSG         msg;
  HDC          hDC;
  TEXTMETRIC   tm;
  PAINTSTRUCT  ps;
  char         szBuffer[200];
  RECT         rect;

#if 0
  msg.hwnd       = hWnd;
  msg.message    = message;
  msg.wParam     = wParam;
  msg.lParam     = lParam;

  DebugOutputMessage (&msg);
#endif

  switch (message)
    {
      case WM_CREATE:
        SetWindowWord (hWnd, 0, BLACK);
        break;

      case WM_USER:
        SetWindowWord (hWnd, 0, wParam);
        SetWindowText (hWnd, (LPSTR) lParam);
        InvalidateRect (hWnd, NULL, TRUE);
        UpdateWindow (hWnd);
        break;

      case WM_PAINT:
        hDC = BeginPaint (hWnd, &ps);
        GetWindowText (hWnd, szBuffer, sizeof (szBuffer));

        switch (GetWindowWord (hWnd, 0))
          {
            case BLACK:
              SetTextColor (hDC, RGB (0, 0, 0));
              break;

            case RED:
              SetTextColor (hDC, RGB (255, 0, 0));
              break;

            case GREEN:
              SetTextColor (hDC, RGB (0, 255, 0));
              break;

            case BLUE:
              SetTextColor (hDC, RGB (0, 0, 255));
              break;
          }

        SaveDC (hDC);
        SelectObject (hDC, hFont);

        GetTextMetrics (hDC, &tm);
        GetClientRect (hWnd, &rect);

        SetBkMode (hDC, TRANSPARENT);
        SetTextAlign (hDC, TA_BASELINE);

        ExtTextOut (hDC,
                    tm.tmAveCharWidth,
                    rect.bottom - 2 * tm.tmDescent, //tm.((Height * 3) / 2) / 4,
                    0,
                    NULL,
                    szBuffer,
                    lstrlen (szBuffer),
                    NULL);

        RestoreDC (hDC, -1);
        EndPaint (hWnd, &ps);

      default:
        return (DefWindowProc(hWnd, message, wParam, lParam));
    }

  return (NULL);
}

void WINAPI SetScrollBarArrows
  (
    HWND  hWnd
  )

{
  int nLastWholeVisCol;
  HANDLE             hPalInstanceData;
  LPPALINSTANCEDATA lpPalInstanceData;
  //RECT           rect;

  //GetClientRect (hWnd, &rect);

  /* Compute the number of the last column which can be displayed completely.
     This column may not exist.  For example, we may have room to display
     3 and 1/2 columns and we may have 4 colums of panels with the first
     visible column being column 3 (columns 1 and 2 have been scrolled out
     of view).  The first visible column, 3, plus 3 (the number of columns
     which can be displayed completely) less 1 is 5.  So, if we had a 5th
     column (which we don't) it could be displayed completely. */

  hPalInstanceData = GetWindowWord (hWnd, HPALINSTANCEDATA);
  lpPalInstanceData = (LPPALINSTANCEDATA) GlobalLock (hPalInstanceData);

  //nLastWholeVisCol = PID.nFirstVisCol + rect.right / (PID.nXPanel + PID.nXInterPanelSpacing) - 1;

  nLastWholeVisCol = PID.nFirstVisCol + PID.nWholePanelsPerRow - 1;

  //DebugPrintf ("nFirstViscol = %d, nPanelsPerRow = %d, nPanelsPerCol = %d, nLastWholeVisCol = %d, nItemCount
      = %d",
     //PID.nFirstVisCol, PID.nPanelsPerRow, PID.nPanelsPerCol, nLastWholeVisCol, PID.nItemCount);

  /* If the first visible column is column 1, then disable the left scroll panel.
     If the last visible column is greater than or equal to the number of columns present, then
     disable the right scroll panel. */

  EnableScrollBar (GetDlgItem (hWnd, ID_SCROLLBAR),
                   SB_CTL,
                   ESB_ENABLE_BOTH);

  if (!PID.nPanelsPerCol)
    {
      GlobalUnlock (hPalInstanceData);
      return;
    }

  EnableScrollBar (GetDlgItem (hWnd, ID_SCROLLBAR),
                   SB_CTL,
                   (PID.nFirstVisCol      == 1                                                  ? ESB_DISABLE_LEFT  :
                       0) |
                   (nLastWholeVisCol >= ((PID.nItemCount - 1) / PID.nPanelsPerCol + 1) ? ESB_DISABLE_RIGHT :
                       0)  );

  SetScrollRange (GetDlgItem (hWnd, ID_SCROLLBAR),
                  SB_CTL,
                  1,
                  (PID.nItemCount - 1) / PID.nPanelsPerCol + 1 - (PID.nWholePanelsPerRow - 1),
                  TRUE);

  SetScrollPos (GetDlgItem (hWnd, ID_SCROLLBAR), SB_CTL, PID.nFirstVisCol, TRUE);

  GlobalUnlock (hPalInstanceData);
}

LPVOID WINAPI GetObjectKey
  (
    LPPALITEM         lpPalItem
  )

{
  return lpPalItem;
}

LPPALITEM WINAPI AllocObject
  (
    LPPALINSTANCEDATA lpPalInstanceData,
    LPPALITEM         lpPalItem
  )

{
  LPPALITEM lppalReturn;
```

```
  /* Get a pointer to the first free object. */

  if (PID.nppalFreeHead == (NPPALITEM) -1)
    return NULL;

  lppalReturn = (LPPALITEM) MAKEP (PID.hObjects, PID.nppalFreeHead);

  /* Set head of free list to next object in list, which could be -1
     if lppalReturn happens to be the last free object. */

  PID.nppalFreeHead = lppalReturn->nppalItemNext;

  *lppalReturn = *lpPalItem;   /* Copy object */

  return (lppalReturn);
}

void WINAPI FreeObject
  (
    LPPALINSTANCEDATA lpPalInstanceData,
    LPPALITEM         lpPalItem
  )

{
  if (lpPalItem->npszTitle)
    SubFree ((HANDLE32) MAKEP (lpPalItem->hStringHeap, lpPalItem->npszTitle));

  if (lpPalItem->npszPhotoFileName)
    SubFree ((HANDLE32) MAKEP (lpPalItem->hStringHeap, lpPalItem->npszPhotoFileName));

  if (lpPalItem->npszPhotoPath)
    SubFree ((HANDLE32) MAKEP (lpPalItem->hStringHeap, lpPalItem->npszPhotoPath));

  if (lpPalItem->npszThumbFileName)
    SubFree ((HANDLE32) MAKEP (lpPalItem->hStringHeap, lpPalItem->npszThumbFileName));

  if (lpPalItem->npszThumbPath)
    SubFree ((HANDLE32) MAKEP (lpPalItem->hStringHeap, lpPalItem->npszThumbPath));

  lpPalItem->nppalItemNext = PID.nppalFreeHead;

  PID.nppalFreeHead = (NPPALITEM) OFFSETOF (lpPalItem);

  return;
}

int WINAPI CompareObject
  (
    LPPALITEM lpPalItem1,
    LPPALITEM lpPalItem2
  )

{
  int i;

  i = lstrcmp ((LPSTR) MAKEP (lpPalItem1->hStringHeap, lpPalItem1->npszPhotoPath),
               (LPSTR) MAKEP (lpPalItem2->hStringHeap, lpPalItem2->npszPhotoPath));

  if (i)
    return (i);

  i = lstrcmp ((LPSTR) MAKEP (lpPalItem1->hStringHeap, lpPalItem1->npszPhotoFileName),
               (LPSTR) MAKEP (lpPalItem2->hStringHeap, lpPalItem2->npszPhotoFileName));

  if (i)
    return (i);

  if (lpPalItem1->nSeqNo < lpPalItem2->nSeqNo)
    return (-1);
  else
  if (lpPalItem1->nSeqNo > lpPalItem2->nSeqNo)
    return (1);
  else
    return (0);
}

LPPALITEM WINAPI CopyObject
  (
    LPPALITEM lpPalItem1,
    LPPALITEM lpPalItem2
  )

{
  *lpPalItem1 = *lpPalItem2;

  return lpPalItem1;
}

BOOL WINAPI AddPanel
  (
    HWND          hWndParent,
    TAVL_nodeptr  node
  )

{
  LPPALINSTANCEDATA lpPalInstanceData;
  int     nXDisp, nYDisp;
  HANDLE  hPalInstanceData;
  HWND    hWnd;

  hPalInstanceData = GetWindowWord (hWndParent, HPALINSTANCEDATA);
  lpPalInstanceData = (LPPALINSTANCEDATA) GlobalLock (hPalInstanceData);

  /* If the number of columns present (PID.nPanelCount / PID.nPanelsPerCol + 1) is greater than the
     total number of columns that can be displayed, either completely or partially,
     then stop making new panels. */

  if ( (PID.nPanelCount / PID.nPanelsPerCol + 1) > PID.nPanelsPerRow)
    {
      //DebugPrintf ("Stopped making panels with PID.nPanelCount = %d", PID.nPanelCount);
      GlobalUnlock (hPalInstanceData);
      return (FALSE);
    }

  //DebugPrintf ("Creating panel for %s", (LPSTR) MAKEP (PID.hStringHeap, PalItem.npszFileName));

  nXDisp = (PID.nPanelCount / PID.nPanelsPerCol) * (PID.nXPanel + PID.nXInterPanelSpacing) +
       PID.nXInterPanelSpacing;
  nYDisp = (PID.nPanelCount % PID.nPanelsPerCol) * (PID.nYPanel + PID.nYInterPanelSpacing) +
       PID.nYInterPanelSpacing;

  PID.nPanelCount++;

  hWnd = CreateWindow (lpszPanelClass,
                  NULL,
                  WS_CHILD | WS_VISIBLE | ((PID.nPanelCount == 1) ? (WS_TABSTOP | WS_GROUP) : 0),
                  nXDisp,
                  nYDisp,
                  PID.nXPanel,
                  PID.nYPanel,
                  hWndParent,
                  PID.nPanelCount,
                  hLibInstance,
                  NULL);

  SetFocus (hWnd);

  GlobalUnlock (hPalInstanceData);
  return (TRUE);
}

int WINAPI PanelToItem
  (
    LPPALINSTANCEDATA lpPalInstanceData,
    int               nPanel
  )

{
  int i;

  if (nPanel <= 0)
    return (0);      /* Panel does not correspond to an item */

  if (nPanel > PID.nPanelCount - PID.nHiddenPanelCount)
    return (0);

  i = (PID.nFirstVisCol - 1) * PID.nPanelsPerCol + nPanel;

  if (i > PID.nItemCount)
    return (0);      /* This is an error */

  return (i);
}

int WINAPI ItemToPanel
  (
    LPPALINSTANCEDATA lpPalInstanceData,
    int               nItem
  )

{
  int i;

  /* Compute the zero based first visible item. */

  i = (PID.nFirstVisCol - 1) * PID.nPanelsPerCol;

  if (nItem <= i)
    return (0);      /* Item is out of view */

  if (nItem > i + PID.nPanelCount - PID.nHiddenPanelCount)
    return (0);      /* Item is out of view */

  return (nItem - i);
}

int WINAPI HackOutPath
  (
    LPSTR lpszOut,
    LPSTR lpszIn
  )

{
  char c;
  int i;

  for (i = lstrlen (lpszIn) - 1;
       i >= 0 && (c = lpszIn[i]) != '\\' && c != ':';
       i--);
```

```c
  i++;

  lstrcpy (lpszOut, &lpszIn[i]);
  return (lstrlen (lpszOut));
}

void WINAPI GetPalParm
  (
    LPPALPARM lpPalParm,
    LPPALITEM lpPalItem
  )

{
  if (lpPalItem->npszTitle)
    lstrcpy (lpPalParm->photo.szTitle,          (LPSTR) MAKEP (lpPalItem->hStringHeap, lpPalItem->npszTitle));
  else
    lpPalParm->photo.szTitle[0] = '\0';

  if (lpPalItem->npszPhotoFileName)
    lstrcpy (lpPalParm->photo.szPhotoFileName, (LPSTR) MAKEP (lpPalItem->hStringHeap, lpPalItem->npszPhotoFile
        Name));
  else
    lpPalParm->photo.szPhotoFileName[0] = '\0';

  if (lpPalItem->npszPhotoPath)
    lstrcpy (lpPalParm->photo.szPhotoPath,      (LPSTR) MAKEP (lpPalItem->hStringHeap, lpPalItem->npszPhotoPath
        ));
  else
    lpPalParm->photo.szPhotoPath[0] = '\0';

  if (lpPalItem->npszThumbFileName)
    lstrcpy (lpPalParm->photo.szThumbFileName, (LPSTR) MAKEP (lpPalItem->hStringHeap, lpPalItem->npszThumbFile
        Name));
  else
    lpPalParm->photo.szThumbFileName[0] = '\0';

  if (lpPalItem->npszThumbPath)
    lstrcpy (lpPalParm->photo.szThumbPath,      (LPSTR) MAKEP (lpPalItem->hStringHeap, lpPalItem->npszThumbPath
        ));
  else
    lpPalParm->photo.szThumbPath[0] = '\0';

  if (lpPalItem->npszFastLoadFileName)
    lstrcpy (lpPalParm->photo.szFastLoadFileName, (LPSTR) MAKEP (lpPalItem->hStringHeap, lpPalItem->npszFastLo
        adFileName));
  else
    lpPalParm->photo.szFastLoadFileName[0] = '\0';

  if (lpPalItem->npszFastLoadPath)
    lstrcpy (lpPalParm->photo.szFastLoadPath,     (LPSTR) MAKEP (lpPalItem->hStringHeap, lpPalItem->npszFastLo
        adPath));
  else
    lpPalParm->photo.szFastLoadPath[0] = '\0';

  lpPalParm->photo.usFlags             = lpPalItem->usFlags;
  lpPalParm->photo.sPhotoLeft          = lpPalItem->sPhotoLeft;
  lpPalParm->photo.sPhotoTop           = lpPalItem->sPhotoTop;
  lpPalParm->photo.sPhotoRight         = lpPalItem->sPhotoRight;
  lpPalParm->photo.sPhotoBottom        = lpPalItem->sPhotoBottom;
  lpPalParm->photo.sThumbLeft          = lpPalItem->sThumbLeft;
  lpPalParm->photo.sThumbTop           = lpPalItem->sThumbTop;
  lpPalParm->photo.sThumbRight         = lpPalItem->sThumbRight;
  lpPalParm->photo.sThumbBottom        = lpPalItem->sThumbBottom;
  lpPalParm->photo.sCropLeft           = lpPalItem->sCropLeft;
  lpPalParm->photo.sCropTop            = lpPalItem->sCropTop;
  lpPalParm->photo.sCropRight          = lpPalItem->sCropRight;
  lpPalParm->photo.sCropBottom         = lpPalItem->sCropBottom;
  lpPalParm->photo.sDisplayScale       = lpPalItem->sDisplayScale;
  lpPalParm->photo.lMinDisplayTime     = lpPalItem->lMinDisplayTime;
  lpPalParm->photo.lMaxDisplayTime     = lpPalItem->lMaxDisplayTime;
  lpPalParm->db_addr                   = lpPalItem->db_addr;
}

void WINAPI UnlinkPalItem
  (
    LPPALINSTANCEDATA lpPalInstanceData,
    LPPALITEM         lpPalItem
  )

{
  LPPALITEM         lpPalItemPrev;

  if (lpPalItem->nppalItemNext != (NPPALITEM) -1)
    ((LPPALITEM) MAKEP (PID.hObjects, lpPalItem->nppalItemNext))->nppalItemPrev = lpPalItem->nppalItemPrev;

  if (lpPalItem->nppalItemPrev != (NPPALITEM) -1)
    {
      lpPalItemPrev = (LPPALITEM) MAKEP (PID.hObjects, lpPalItem->nppalItemPrev);
      lpPalItemPrev->nppalItemNext = lpPalItem->nppalItemNext;
    }
  else
    {
      PID.nppalItemHead = lpPalItem->nppalItemNext;
    }

  /* Delete the item from the binary tree.  This will free any
     string objects from the string heap and add the
     item to the free list. */

```

```c
  tavl_delete (PID.tree, lpPalItem);

  PID.nItemCount--;
}

/* An item that was deleted could have been in one of three "places."
   It's logical panel could have been to the left of the first
   physical panel, it logical panel could be one of the physical
   panels or its logical panel could have been to the right of the
   last physical panel.  Handle each of these three cases accordingly. */

void WINAPI RepaintShiftedItems
  (
    LPPALINSTANCEDATA lpPalInstanceData,
    HWND              hWnd,
    int               nItem              /* The one based item that was deleted */
  )

{
  int i;

  /* If the column in which the first selected item appears is less than the current
     first visible column, then scroll to the column in which the first selecteditem
     appears.  If it greater than the last column displayed (either completely or
     partially) then do nothing.  Otherwise start painting from the items
     corresponding panel. */

  i = (nItem - 1) / PID.nPanelsPerCol + 1 ;

  if ( i < PID.nFirstVisCol)
    {
      SendMessage (hWnd,
                   WM_HSCROLL,
                   SB_THUMBPOSITION,
                   MAKELPARAM (i, GetDlgItem (hWnd, ID_SCROLLBAR)));
    }
  else
  if ( i >= PID.nFirstVisCol + PID.nPanelsPerRow)
    return;

  /* There were selected items that were visible.  If the new
     file count is less than the item number currently associated with the
     last non hidden panel, then the difference represents the number of panels that
     need to be hidden. */

  i = (PID.nFirstVisCol - 1) * PID.nPanelsPerCol + PID.nPanelCount - PID.nHiddenPanelCount - PID.nItemCount;

  while (i > 0)
    {
      ShowWindow (GetDlgItem (hWnd, PID.nPanelCount - PID.nHiddenPanelCount), SW_HIDE);
      PID.nHiddenPanelCount++;
      i--;
    }

  /* Finally, repaint the panels starting with first selected
     panel.  Make sure initial item corresponds to a
     panel. */

  for (i = ItemToPanel (lpPalInstanceData, nItem);
       i && i <= PID.nPanelCount - PID.nHiddenPanelCount;
       i++)
    {
      InvalidateRect (GetDlgItem (hWnd, i), NULL, TRUE);
      UpdateWindow (GetDlgItem (hWnd, i));
    }
}

HWND WINAPI GetDropableWindowFromPoint
  (
    HWND  hWndParent,
    POINT pt
  )

{
  HWND  hWnd, hWndChild;
  char  szClass[30];
  RECT  rect;
  static nLevel = 0;


  hWnd = (HWND) 0;

  for (hWndChild = GetWindow (hWndParent, GW_CHILD);
       hWndChild;
       hWndChild = GetWindow (hWndChild, GW_HWNDNEXT))
    {
      GetClassName (hWndChild, szClass, sizeof (szClass));

      if (!lstrcmp (szClass, lpszPaletteClass))
        {
          GetWindowRect (hWndChild, &rect);

          if (PtInRect (&rect, pt))
            return (hWndChild);
        }

      nLevel++;
      hWnd = GetDropableWindowFromPoint (hWndChild, pt);
      nLevel--;

```

```
      if (hWnd)
        return (hWnd);
    }

  return (hWnd);
}

/* Returns a handle to a device dependent bitmap that was
   color matched to the file's DIB using the fixed palette.
   Also sets all but the bmBits field of lpPalItem->Bitmap. */

HBITMAP WINAPI CreateThumbnail
  (
    LPPALITEM lpPalItem
  )

{
  int         i;
  HBITMAP     hBitmap;
  char        szBuffer[_MAX_PATH];
  char        szBuffer2[_MAX_PATH];
  char        szBuffer3[_MAX_PATH];
  char        c;
  LPSTR              lpString;
  struct _find_t   fileinfo;
  HCURSOR   hCursor, hOldCursor;

  szBuffer[0]  = '\0';
  szBuffer2[0] = '\0';

  if (!lpPalItem->npszPhotoPath || !lpPalItem->npszPhotoFileName)
    return (NULL);

  hOldCursor = GetCursor ();
  hCursor    = LoadCursor (NULL, IDC_WAIT);

  if (hCursor != hOldCursor)
    SetCursor (hCursor);

  /* Create a path to the photo, including the filename. */

  lstrcpy (szBuffer2, (LPSTR) MAKEP (lpPalItem->hStringHeap, lpPalItem->npszPhotoPath));

  if (szBuffer2[lstrlen (szBuffer2) - 1] != '\\')
    lstrcat (szBuffer2, "\\");

  lstrcat (szBuffer2, (LPSTR) MAKEP (lpPalItem->hStringHeap, lpPalItem->npszPhotoFileName));

  /* Create a path to the thumbnail, without the filename. */

  lstrcpy (szBuffer, (LPSTR) MAKEP (lpPalItem->hStringHeap, lpPalItem->npszPhotoPath));

  if (szBuffer[lstrlen (szBuffer) - 1] != '\\')
    lstrcat (szBuffer, "\\");

  lstrcat (szBuffer, "THMBNAIL");

  /* Does the THMBNAIL directory exist? */

  if (_dos_findfirst (szBuffer, _A_SUBDIR, &fileinfo))
    _mkdir (szBuffer);  /* No, create the THMBNAIL directory */

  /* Free any existing stored path */

  if (lpPalItem->npszThumbPath)
    SubFree ((HANDLE32) MAKEP (lpPalItem->hStringHeap, lpPalItem->npszThumbPath));

  /* Allocate and store the new path */

  lpString = (LPSTR) SubAlloc (lpPalItem->hStringHeap, LMEM_FIXED, lstrlen (szBuffer) + 1);
  lstrcpy (lpString, szBuffer);
  lpPalItem->npszThumbPath = (NPSTR) OFFSETOF (lpString);

  /* Free any existing stored file name */

  if (lpPalItem->npszThumbFileName)
    SubFree ((HANDLE32) MAKEP (lpPalItem->hStringHeap, lpPalItem->npszThumbFileName));

  /* Copy the photo file name.  We'll do some work on the copy so that its
     extension will be .DDB */

  lstrcpy (szBuffer3, (LPSTR) MAKEP (lpPalItem->hStringHeap, lpPalItem->npszPhotoFileName));

  for (i = 0; (c = szBuffer3[i]) && c != '.'; i++);

  if (c != '.')
    szBuffer3[i] = '.';

  i++;

  lstrcpy (&szBuffer3[i], "DDB");

  /* Allocate and store the new file name */

  lpString = (LPSTR) SubAlloc (lpPalItem->hStringHeap, LMEM_FIXED, lstrlen (szBuffer3) + 1);
  lstrcpy (lpString, szBuffer3);
  lpPalItem->npszThumbFileName = (NPSTR) OFFSETOF (lpString);

  lstrcat (szBuffer, "\\");
  lstrcat (szBuffer, szBuffer3);

  /* Delete the existing thumbnail file */

  _unlink (szBuffer);

  /* If this fails, hBitmap will remain zero. */

  hBitmap = CreateThumbnailDDB (szBuffer2, szBuffer, lpPalItem->nXPanel, lpPalItem->nYPanel);

  if (hCursor != hOldCursor)
    SetCursor (hOldCursor);

  return (hBitmap);
}

HBITMAP WINAPI CreateThumbnailDDB
  (
    LPSTR lpszPhotoPathAndFileName,
    LPSTR lpszThumbPathAndFileName,
    int   nXPanel,
    int   nYPanel
  )

{
  int                 nBitsPerPixel, nRet;
  HDIB                hDIB;
  HDC                 hDC;
  HPALETTE            hPal;
  PROCESSSTRUCT       ProcessImageData;
  FILEINFO            FileInfo;
  BITMAPHANDLE        BitmapHandle;
  long                lScaleFactor;
  HBITMAP             hBitmap;
  OFSTRUCT            OpenBuf;
  HFILE               hFile;
  int                 nWidth, nHeight, nDepth;
  RESOLUTION          Resolution;
  char                szBuffer[100];

  hDC = GetDC (NULL);
  nBitsPerPixel = GetDeviceCaps (hDC, BITSPIXEL) * GetDeviceCaps (hDC, PLANES);
  ReleaseDC (NULL, hDC);

  if (nBitsPerPixel > 8)
    nBitsPerPixel=24;
  else
    nBitsPerPixel=8;

  /* Just pull off the extension */

  _splitpath (lpszPhotoPathAndFileName, NULL, NULL, NULL, szBuffer);

  /* Is it fractal? */

  //DebugPrintf ("File extension = %s", (LPSTR) szBuffer);

  if (!lstrcmpi (szBuffer, ".fif"))
    {
      /* Yes, it's a fractal file */

      hFile = OpenFile (lpszPhotoPathAndFileName, &OpenBuf, OF_READ | OF_SHARE_EXCLUSIVE);

      if (hFile == HFILE_ERROR)
        return (NULL);

      //SetFifColorTable (256, &FixedPalette.palPalEntry);

      GetFIFFileDimensions (hFile, &nWidth, &nHeight, &nDepth);

      lScaleFactor = max ((((long) nWidth  * 1000) / (nXPanel  * 7),
                          ((long) nHeight * 1000) / (nYPanel * 7));

      if (!lScaleFactor)
        lScaleFactor = 100;

      Resolution.Scale  = IGNORE_SCALE;
      Resolution.Width  = (short) ( ((long) nWidth  * 100) / lScaleFactor );
      Resolution.Height = (short) ( ((long) nHeight * 100) / lScaleFactor );

      hDIB = 0;

      nRet = FIFFileToBuffer (hFile,
                      -1,
                      &hDIB,
                      NULL,
                      &Resolution,
                      //DIB_COLORMAPPED_8);
                      DIB_TRUECOLOR_24);

      _lclose (hFile);

      if (!hDIB)
        return (NULL);

      hPal = CreatePalette ((LPLOGPALETTE) &FixedPalette);

      hBitmap = DIBToBitmap (hDIB, hPal);

      GlobalFree (hDIB);
      DeleteObject (hPal);
```

```
      SaveDDB (hBitmap, lpszThumbPathAndFileName);

      return (hBitmap);
    }

  if ((nRet = L_FileInfo (lpszPhotoPathAndFileName, &FileInfo)) != SUCCESS)
    {
      /* May not be a file format this library recognizes.  See if it's a .flf file. */

      //DebugPrintf ("L_FileInfo returned %d for file %s", nRet, (LPSTR) lpszPhotoPathAndFileName);
      return (NULL);
    }

  if (FileInfo.BitsPerPixel <=8)
    nRet = L_LoadBitmap (lpszPhotoPathAndFileName, &BitmapHandle, FileInfo.BitsPerPixel, TRUE);
  else
    nRet = L_LoadBitmap (lpszPhotoPathAndFileName, &BitmapHandle,  nBitsPerPixel, TRUE);

  if (nRet != SUCCESS)
    {
      //DebugPrintf ("L_LoadBitmap returned %d for file %s", nRet, (LPSTR) lpszPhotoPathAndFileName);
      return (NULL);
    }

  if (nBitsPerPixel < BitmapHandle.BitsPerPixel && nBitsPerPixel <= 8)
    {
      ProcessImageData.nDitherToBits = nBitsPerPixel;
      nRet = L_ProcessBitmap (&BitmapHandle, DITHER, &ProcessImageData);

      if (nRet != SUCCESS)
        {
          //DebugPrintf ("L_ProcessBitmap (DITHER) returned %d for file %s", nRet, (LPSTR)
              lpszPhotoPathAndFileName);
          return (NULL);
        }
    }

  lScaleFactor = max (((long) FileInfo.Width  * 1000) / (nXPanel  * 7),
                      ((long) FileInfo.Height * 1000) / (nYPanel * 7));

  if (!lScaleFactor)
    lScaleFactor = 100;

  ProcessImageData.nNewWidth  = (short) ( ((long) FileInfo.Width  * 100) / lScaleFactor );
  ProcessImageData.nNewHeight = (short) ( ((long) FileInfo.Height * 100) / lScaleFactor );

  /* Resize the bitmap */

  if ((nRet = L_ProcessBitmap (&BitmapHandle, RESIZE, &ProcessImageData)) != SUCCESS)
    {
      //DebugPrintf ("L_ProcessBitmap (RESIZE) returned %d for file %s", nRet, lpszPhotoPathAndFileName);
      L_FreeBitmap (&BitmapHandle);
      return (NULL);
    }

  hDIB = L_ConvertToDIB (&BitmapHandle);
  hPal = CreatePalette ((LPLOGPALETTE) &FixedPalette);

  hBitmap = DIBToBitmap (hDIB, hPal);

  GlobalFree (hDIB);
  DeleteObject (hPal);

  SaveDDB (hBitmap, lpszThumbPathAndFileName);

  L_FreeBitmap (&BitmapHandle);

  return (hBitmap);
}

void WINAPI GetThumbnailBits
  (
    HBITMAP   hBitmap,
    LPPALITEM lpPalItem
  )


{
  LPVOID lpBits;

  if (lpPalItem->hBitmapBits)
    GlobalFree (lpPalItem->hBitmapBits);

  GetObject (hBitmap, sizeof (BITMAP), &lpPalItem->Bitmap);
  lpPalItem->lBitmapSize = lpPalItem->Bitmap.bmWidthBytes * lpPalItem->Bitmap.bmHeight;
  lpPalItem->hBitmapBits = GlobalAlloc (GHND, lpPalItem->lBitmapSize);
  lpBits = GlobalLock (lpPalItem->hBitmapBits);
  GetBitmapBits (hBitmap, lpPalItem->lBitmapSize, lpBits);
  GlobalUnlock (lpPalItem->hBitmapBits);
}

/****************************************************************************
 *
 * DIBToBitmap()
 *
 * Parameters:
 *
 * HDIB hDIB          - specifies the DIB to convert
 *
 * HPALETTE hPal      - specifies the palette to use with the bitmap
 *
 * Return Value:
 *
 * HBITMAP            - identifies the device-dependent bitmap
 *
 * Description:
 *
 * This function creates a bitmap from a DIB using the specified palette.
 * If no palette is specified, default is used.
 *
 * NOTE:
 *
 * The bitmap returned from this funciton is always a bitmap compatible
 * with the screen (e.g. same bits/pixel and color planes) rather than
 * a bitmap with the same attributes as the DIB.  This behavior is by
 * design, and occurs because this function calls CreateDIBitmap to
 * do its work, and CreateDIBitmap always creates a bitmap compatible
 * with the hDC parameter passed in (because it in turn calls
 * CreateCompatibleBitmap).
 *
 * So for instance, if your DIB is a monochrome DIB and you call this
 * function, you will not get back a monochrome HBITMAP -- you will
 * get an HBITMAP compatible with the screen DC, but with only 2
 * colors used in the bitmap.
 *
 * If your application requires a monochrome HBITMAP returned for a
 * monochrome DIB, use the function SetDIBits().
 *
 * Also, the DIBpassed in to the function is not destroyed on exit. This
 * must be done later, once it is no longer needed.
 *
 * History:   Date      Author               Reason
 *            6/01/91   Garrett McAuliffe    Created
 *            9/15/91   Patrick Schreiber    Added header and comments
 *            3/27/92   Mark Bader           Added comments about resulting
 *                                           bitmap format
 *
 ****************************************************************************/


HBITMAP WINAPI DIBToBitmap(HDIB hDIB, HPALETTE hPal)
{
   LPSTR lpDIBHdr, lpDIBBits;  // pointer to DIB header, pointer to DIB bits
   HBITMAP hBitmap;            // handle to device-dependent bitmap
   HDC hDC;                    // handle to DC
   HPALETTE hOldPal = NULL;    // handle to a palette

   /* if invalid handle, return NULL */

   if (!hDIB)
      return NULL;

   /* lock memory block and get a pointer to it */
   lpDIBHdr = GlobalLock(hDIB);

   /* get a pointer to the DIB bits */
   lpDIBBits = FindDIBBits(lpDIBHdr);

   /* get a DC */
   hDC = GetDC(NULL);
   if (!hDC)
   {
      /* clean up and return NULL */
      GlobalUnlock(hDIB);
      return NULL;
   }

   /* select and realize palette */
   if (hPal)
      hOldPal = SelectPalette(hDC, hPal, FALSE);
   RealizePalette(hDC);

   /* create bitmap from DIB info. and bits */
   hBitmap = CreateDIBitmap(hDC, (LPBITMAPINFOHEADER)lpDIBHdr, CBM_INIT,
                  lpDIBBits, (LPBITMAPINFO)lpDIBHdr, DIB_RGB_COLORS);

   /* restore previous palette */
   if (hOldPal)
      SelectPalette(hDC, hOldPal, FALSE);

   /* clean up */
   ReleaseDC(NULL, hDC);
   GlobalUnlock(hDIB);

   /* return handle to the bitmap */
   return hBitmap;
}


/****************************************************************************
 *
 * FindDIBBits()
 *
 * Parameter:
 *
 * LPSTR lpDIB        - pointer to packed-DIB memory block
 *
 * Return Value:
 *
```

1C/14PRINT

```
 * LPSTR              - pointer to the DIB bits
 *
 * Description:
 *
 * This function calculates the address of the DIB's bits and returns a
 * pointer to the DIB bits.
 *
 * History:   Date      Author              Reason
 *            6/01/91   Garrett McAuliffe   Created
 *            9/15/91   Patrick Schreiber   Added header and comments
 *
 ************************************************************************/


LPSTR WINAPI FindDIBBits(LPSTR lpDIB)
{
   return (lpDIB + *(LPDWORD)lpDIB + PaletteSize(lpDIB));
}

/*************************************************************************
 *
 * PaletteSize()
 *
 * Parameter:
 *
 * LPSTR lpDIB        - pointer to packed-DIB memory block
 *
 * Return Value:
 *
 * WORD               - size of the color palette of the DIB
 *
 * Description:
 *
 * This function gets the size required to store the DIB's palette by
 * multiplying the number of colors by the size of an RGBQUAD (for a
 * Windows 3.0-style DIB) or by the size of an RGBTRIPLE (for an OS/2-
 * style DIB).
 *
 * History:   Date      Author              Reason
 *            6/01/91   Garrett McAuliffe   Created
 *            9/15/91   Patrick Schreiber   Added header and comments
 *
 ************************************************************************/


WORD WINAPI PaletteSize(LPSTR lpDIB)
{
   /* calculate the size required by the palette */
   if (IS_WIN30_DIB (lpDIB))
      return (DIBNumColors(lpDIB) * sizeof(RGBQUAD));
   else
      return (DIBNumColors(lpDIB) * sizeof(RGBTRIPLE));
}

/*************************************************************************
 *
 * DIBNumColors()
 *
 * Parameter:
 *
 * LPSTR lpDIB        - pointer to packed-DIB memory block
 *
 * Return Value:
 *
 * WORD               - number of colors in the color table
 *
 * Description:
 *
 * This function calculates the number of colors in the DIB's color table
 * by finding the bits per pixel for the DIB (whether Win3.0 or OS/2-style
 * DIB). If bits per pixel is 1: colors=2, if 4: colors=16, if 8: colors=256,
 * if 24, no colors in color table.
 *
 * History:   Date      Author              Reason
 *            6/01/91   Garrett McAuliffe   Created
 *            9/15/91   Patrick Schreiber   Added header and comments
 *
 ************************************************************************/


WORD WINAPI DIBNumColors(LPSTR lpDIB)
{
   WORD wBitCount;  // DIB bit count

   /*  If this is a Windows-style DIB, the number of colors in the
    *  color table can be less than the number of bits per pixel
    *  allows for (i.e. lpbi->biClrUsed can be set to some value).
    *  If this is the case, return the appropriate value.
    */

   if (IS_WIN30_DIB(lpDIB))
   {
      DWORD dwClrUsed;

      dwClrUsed = ((LPBITMAPINFOHEADER)lpDIB)->biClrUsed;
      if (dwClrUsed)
     return (WORD)dwClrUsed;
   }

   /*  Calculate the number of colors in the color table based on
    *  the number of bits per pixel for the DIB.
    */
   if (IS_WIN30_DIB(lpDIB))
      wBitCount = ((LPBITMAPINFOHEADER)lpDIB)->biBitCount;
   else
      wBitCount = ((LPBITMAPCOREHEADER)lpDIB)->bcBitCount;

   /* return number of colors based on bits per pixel */
   switch (wBitCount)
      {
   case 1:
      return 2;

   case 4:
      return 16;

   case 8:
      return 256;

   default:
      return 0;
      }
}

BOOL WINAPI SaveDDB
   (
    HBITMAP   hBitmap,
    LPSTR     lpszFileName
   )

{
  HFILE hFile;
  OFSTRUCT OpenBuf;
  HANDLE  hBits;
  BITMAP  Bitmap;
  LPVOID  lpBits;

  hFile = OpenFile (lpszFileName, &OpenBuf, OF_CREATE | OF_WRITE | OF_SHARE_EXCLUSIVE);

  //DebugPrintf ("SaveDDB opening %s", lpszFileName);

  if (hFile == HFILE_ERROR)
    {
    //DebugPrintf ("SaveDDB failed");
    return (FALSE);
    }

  GetObject (hBitmap, sizeof (BITMAP), &Bitmap);

  _lwrite (hFile, &Bitmap, sizeof (BITMAP));

  hBits = GlobalAlloc (GHND, Bitmap.bmWidthBytes * Bitmap.bmHeight);

  lpBits = GlobalLock (hBits);

  GetBitmapBits (hBitmap, Bitmap.bmWidthBytes * Bitmap.bmHeight, lpBits);

  _lwrite (hFile, lpBits, Bitmap.bmWidthBytes * Bitmap.bmHeight);

  GlobalUnlock (hBits);
  GlobalFree   (hBits);

  _lclose (hFile);
  return (TRUE);
}

HBITMAP WINAPI LoadDDB
   (
    LPSTR     lpszFileName
   )

{
  HFILE hFile;
  OFSTRUCT OpenBuf;
  HANDLE  hBits;
  BITMAP  Bitmap;
  LPVOID  lpBits;
  HBITMAP hBitmap;

  hFile = OpenFile (lpszFileName, &OpenBuf, OF_READ | OF_SHARE_EXCLUSIVE);

  //DebugPrintf ("LoadDDB opening %s", lpszFileName);

  if (hFile == HFILE_ERROR)
    {
    //DebugPrintf ("LoadDDB failed");
    return (NULL);
    }

  _lread (hFile, &Bitmap, sizeof (BITMAP));

  hBits = GlobalAlloc (GHND, Bitmap.bmWidthBytes * Bitmap.bmHeight);

  lpBits = GlobalLock (hBits);

  _lread (hFile, lpBits, Bitmap.bmWidthBytes * Bitmap.bmHeight);

  Bitmap.bmBits = lpBits;

  hBitmap = CreateBitmapIndirect (&Bitmap);
```

```
  GlobalUnlock (hBits);
  GlobalFree   (hBits);

  _lclose (hFile);

  return (hBitmap);
}

LRESULT CALLBACK MessageHook
  (
    int     nCode,
    WPARAM  wParam,
    LPARAM  lParam
  )

{
  HHOOK   hkMsgHook;
  int i;
  static BOOL fInIsDialogMessage = FALSE;

  for (i = 0; i < nTasks; i++)
    if (TaskTable[i].hTask == GetCurrentTask ())
      break;

  hkMsgHook = TaskTable[i].hkMsgHook;

  if (nCode < 0)
    return (CallNextHookEx (hkMsgHook, nCode, wParam, lParam));

  /* Don't do anything if we're just peeking. */

  if (!(wParam & PM_REMOVE))
    return (CallNextHookEx (hkMsgHook, nCode, wParam, lParam));

  /* Prevent IsDialogMessage from being reentered.  If we don't
     do this, everyting works fine until you click on any of
     the scroll bar arrows.  Then, as long as the mouse is over
     the scroll bar arrow, it's as though you held the mouse
     button down over the scroll bar (even though you're not
     holding the button down) and kept the scroll bar enabled.
     The palette control (the scroll bar's parent) gets a
     repetative stream of WM_HSCROLL messages.  Also, the
     scroll bar button is drawn has though the scroll bar
     was using the desktop's DC in addition to its own
     DC.  The scroll bar's button appears in the upper left
     corner of the screen while at the same time it's being
     grayed/ungrayed on the scroll bar.  Also, it seems
     to capture the mouse (even though SOFT-ICE/W shows that
     it's not capturing the mouse).  The scroll bar gets
     WM_SYSTIMER (undocumented) messages and then sends
     WM_HSCROLL messages to the parent.  Preventing reentry
     into IsDialogMessage solves this problem. I have no
     idea why it solves the problem.  In theory, if the
     application's message loop contained a call to
     IsDialogMessage and IsDialogMessage caused a message
     to be sent to a control, that message would be
     returned from GetMessage and thus it would be
     passed into IsDialogMessage.  Thus, IsDialogMessage
     seems to be written to handle receiving messages that
     it sent, yet if we don't prevent reentry here, everything
     turns to shit. */

  if (fInIsDialogMessage)
    return (CallNextHookEx (hkMsgHook, nCode, wParam, lParam));

  fInIsDialogMessage = TRUE;

  for (i = 0; i < nPalettes; i++)
    if (ahWnd[i] && IsDialogMessage (ahWnd[i], (LPMSG) lParam))
      {
        /* Since IsDialogMessage handled the message, we
           don't want it returned by the application's
           call to GetMessage, where it would subsequently
           be dispatched (again) to the target window.  We
           can't prevent this from happening, but we can
           set the handle to the window to zero.  This, in
           effect, causes DispatchMessage to eat the message. */

        ((LPMSG) lParam)->hwnd = 0;
        fInIsDialogMessage = FALSE;
        return 0L;
      }

  fInIsDialogMessage = FALSE;

  return (CallNextHookEx (hkMsgHook, nCode, wParam, lParam));
}
```

```
/* Copyright 1989-1994 FotoAttacher by Michael B. Mast, licensed
    to ProCentric Computer Service, Inc., all rights reserverd.
        Trade secret and patent pending. */

#define FORWARDREF

typedef struct _PALITEM NEAR * NPPALITEM;
typedef struct _PALINSTANCEDATA FAR * LPPALINSTANCEDATA;
typedef struct _PALCREATEPARMS FAR * LPPALCREATEPARMS;
typedef struct _PALPARM FAR * LPPALPARM;
typedef struct _PALITEM FAR * LPPALITEM;

typedef struct tavlnode far *TAVL_nodeptr;
typedef struct tavltree far *TAVL_treeptr;
```

ICV24PRINT

```
/* Copyright 1989-1994 FotoAttacher by Michael B. Mast, licensed
   to ProCentric Computer Service, Inc., all rights reserverd,
        Trade secret and patent pending. */

#ifdef __coluxplus
extern "C" {
#endif

/* Handle to a DIB */
#define HDIB HANDLE
#define IS_WIN30_DIB(lpbi)   ((*(LPDWORD)(lpbi)) == sizeof(BITMAPINFOHEADER))

/*****************************************************************************
    Palette window sytles.

    PLS_NOTIFY           Parent receives notification messages.
    PLS_SORT             Items are sorted as they are added.
    PLS_DELETE           Delete key deletes selected item(s).
    PLS_MULTIPLESEL      Mulitple selections allowed.
    PLS_DESCRIPTION      Creates item description field on palette.
    PLS_DRAGSOURCE       Panel may be drag source.
    PLS_DROPTARGET       Palette may be drop target.
    PLS_NOMOVESOURCE     Panel may not be moved when it is a drag source.
                         It may only be copied.  Forces the user to drag
                         with the control key help down.
    PLS_EXTENDEDSEL      Same as PLS_MULTIPLESEL.
*****************************************************************************/

#define PLS_NOTIFY        LBS_NOTIFY        /* 0x0001L */
#define PLS_SORT          LBS_SORT          /* 0x0002L */
#define PLS_DELETE                             0x0004L
#define PLS_MULTIPLESEL   LBS_MULTIPLESEL   /* 0x0008L */
#define PLS_DESCRIPTION                        0x0010L
#define PLS_DRAGSOURCE                         0x0020L
#define PLS_DROPTARGET                         0x0040L
#define PLS_NOMOVESOURCE                       0X00801
#define PLS_EXTENDEDSEL   LBS_EXTENDEDSEL   /* 0x0800L */

/* Palette messages */

#define PM_ADDSTRING                  LB_ADDSTRING      /* lParam = (LPSTR) &szString */
#define PM_INSERTSTRING               LB_INSERTSTRING
#define PM_RESETCONTENT               LB_RESETCONTENT
#define PM_GETSEL                     LB_GETSEL
#define PM_GETCURSEL                  LB_GETCURSEL
#define PM_GETTEXT                    LB_GETTEXT
#define PM_GETCOUNT                   LB_GETCOUNT
#define PM_GETSELITEMS                LB_GETSELITEMS
#define PM_GETSELCOUNT                LB_GETSELCOUNT
#define PM_GETCARETINDEX              LB_GETCARETINDEX
#define PM_FINDSTRING                 LB_FINDSTRING
#define PM_GETTOPINDEX                LB_GETTOPINDEX
#define PM_DELETESELECTEDITEMS        (WM_USER + 100)
#define PM_QUERYDRAGICON              (WM_USER + 101)
#define PM_ADDITEM                    (WM_USER + 102)   /* lParam = (LPPALPARM) &PalParm */
#define PM_INITIALIZE                 (WM_USER + 103)
#define PM_INSERTITEM                 (WM_USER + 104)
#define PM_GETPANELSEL                (WM_USER + 105)
#define PM_GETITEM                    (WM_USER + 106)
#define PM_SELECTALL                  (WM_USER + 107)
#define PM_DESELECTALL                (WM_USER + 108)
#define PM_RECREATETHUMBNAILS         (WM_USER + 109)
#define PM_DELETEITEM                 (WM_USER + 110)
#define PM_PASTEITEM                  (WM_USER + 111)
#define WM_ITEMCHANGED             (WM_USER + 112)

/* Palette notification codes */

#define PLN_DBLCLK            LBN_DBLCLK
#define PLN_KILLFOCUS         LBN_KILLFOCUS
#define PLN_SELCHANGE         LBN_SELCHANGE
#define PLN_CREATE            100
#define PLN_PALETTECHANGED    101

typedef struct _PALCREATEPARMS
  {
    int   nPanelSize;              /* Width and height of panel in hundreths of an inch.
                                      or number of panels/coluen if < 0 */
    int   nInterPanelSpacing;      /* Hundreths of an inch. */
  } PALCREATEPARMS;

#ifndef FORWARDREF
typedef PALCREATEPARMS FAR * LPPALCREATEPARMS;
#endif

#ifndef PHOTO
struct Photo {
    char  szTitle[52];
    char  szPhotoPath[129];
    char  szPhotoFileName[115];
    char  szThumbPath[129];
    char  szThumbFileName[129];
    char  szFastLoadPath[129];
    char  szFastLoadFileName[129];
    unsigned short  usFlags;
    long  lMinDisplayTime;
    long  lMaxDisplayTime;
    short  sPhotoLeft;
    short  sPhotoTop;
    short  sPhotoRight;
    short  sPhotoBottom;
    short  sThumbLeft;
    short  sThumbTop;
    short  sThumbRight;
    short  sThumbBottom;
    short  sCropLeft;
    short  sCropTop;
    short  sCropRight;
    short  sCropBottom;
    short  sDisplayScale;
};

#define PHOTO
#endif

typedef struct _PALPARM
  {
    struct Photo photo;
    unsigned long db_addr;
  } PALPARM;

#ifndef FORWARDREF
typedef PALPARM FAR * LPPALPARM;
#endif

void       WINAPI PaletteInit (void);
HBITMAP    WINAPI DIBToBitmap (HDIB hDIB, HPALETTE hPal /* , LPBITMAP lpBitmap */);

#ifdef __cplusplus
}
#endif
```

```c
/* Copyright 1989-1994 FotoAttacher by Michael B. Mast, licensed
   to ProCentric Computer Service, Inc., all rights reserverd.
        Trade secret and patent pending. */

#define MAKEP(s,o) ((void far *) (((DWORD) (s) << 16) + (WORD) (o)))
#define PID  lpPalInstanceData[0]
#define ACTIVEPALETTE(pBitmap) (((pBITMAPHANDLE) pBitmap)->Flags.FixedPalette ? ((pBITMAPHANDLE)
     pBitmap)->hFixedPalette : ((pBITMAPHANDLE) pBitmap)->hPalette)

#define PALITEM_SIG     0x4950  /* PI */

/* cbWndExtra offsets for palette class */

#define HPALINSTANCEDATA  0
#define PALETTECBWNDEXTRA 2  /* Always 2 more than highest index */

/* cbWndExtra offsets for panel class */

#define DISPLAYAS         0
#define RECTLEFT          2
#define RECTTOP           4
#define RECTRIGHT         6
#define RECTBOTTOM        8
#define PANELCBWNDEXTRA 10   /* Always 2 more than highest index */

/* panel class cbWndExtra flags  */

#define DISPLAYASSELECTED 0x0001
#define DISPLAYASINSERT   0x0002

/* Timer ID's */

#define TID_SCROLLLEFT  1
#define TID_SCROLLRIGHT 2

/* Child window ID's */

#define ID_SCROLLBAR     10000   /* Must be > the largest number of files
                                    that will appear on the palette. */
#define ID_FILENAME      10001
#define ID_FILEDESC      10002
#define ID_STATIC1       10003
#define ID_FROM          10004
#define ID_STATIC2       10005
#define ID_TO            10006
#define ID_STATIC3       10007

/* Notification messages (HIWORD (lParam) of WM_COMMAND message) sent
   from panel to palette. */

#define PNN_LBUTTONDBLCLK    0
#define PNN_LBUTTONDOWN      1
#define PNN_LBUTTONUP        2
#define PNN_RBUTTONDBLCLK    3
#define PNN_RBUTTONDOWN      4
#define PNN_RBUTTONUP        5

#define PNN_SLBUTTONDBLCLK   6 /* Same as above with shift key down */
#define PNN_SLBUTTONDOWN     7
#define PNN_SLBUTTONUP       8
#define PNN_SRBUTTONDBLCLK   9
#define PNN_SRBUTTONDOWN     10
#define PNN_SRBUTTONUP       11

#define PNN_CLBUTTONDBLCLK  12 /* Same as above with control key down */
#define PNN_CLBUTTONDOWN    13
#define PNN_CLBUTTONUP      14
#define PNN_CRBUTTONDBLCLK  15
#define PNN_CRBUTTONDOWN    16
#define PNN_CRBUTTONUP      17

#define PNN_PAINT           18
#define PNN_RIGHTARROW      19
#define PNN_LEFTARROW       20
#define PNN_ESCAPE          21
#define PNN_DELETE          22
#define PNN_SPACE           23
#define PNN_ITEMCHANGED     24

typedef struct _TASKTABLE
  {
    HHOOK   hkMsgHook;
    HTASK   hTask;
    int     nCount;
  } TASKTABLE;

typedef struct _PALINSTANCEDATA
  {
    int        nPanelSize;             /* 00 Width and height of panel in one hundreths of an,
                                             inch (MM_LOENGLISH) or number of panels/column if < 0 */
    int        nInterPanelSpacing;     /* 02 In one hundreths of an inch (MM_LOENGLISH) */
    int        nPanelsPerCol;          /* 04 Current whole panels per col */
    int        nPanelsPerRow;          /* 06 Current whole and partial panels per row */
    int        nWholePanelsPerRow;     /* 08 Current whole panels per row */
    int        nXPanel;                /* 0A Width of panel in device units */
    int        nYPanel;                /* 0C Height of panel in device units */
    int        nXInterPanelSpacing;    /* 0E device units */
    int        nYInterPanelSpacing;    /* 10 device units */
    int        nItemCount;             /* 12 */
    int        nPanelCount;            /* 14 */
    int        nHiddenPanelCount;      /* 16 */
    int        nFirstVisCol;           /* 18 */
    NPPALITEM  nppalCurrentItem;       /* 1C For painting the file name */
    NPPALITEM  nppalFreeHead;          /* 1E Head to linked list of free items */
    NPPALITEM  nppalItemHead;          /* 20 Head to linked list of positional items */
    TAVL_treeptr  tree;                /* 22 */

    HANDLE     hTAVL;                  /* 24 Handle to segment containing heap in which a
                                             threaded Adelson-Velskii-Landis height-balanced
                                             tree is maintained. */
    HANDLE     hStringHeap;            /* 28 Handle to segment containing heap in which all
                                             the strings are kept. */
    HANDLE     hObjects;               /* 2A Handle to segment containing an array of
                                             objects is kept (no heap). */
    int        nItemSeq;               /* 2C Used to ensure that item keys are unique */
    int        nCurrentItem;

  } PALINSTANCEDATA;

typedef struct _PALITEM
  {
    /* The following fields are required for the palette window proc
       to be able to do its thing.  There are no user fields here. */

    WORD       wSig;             /* 00 0x4950  */
    NPPALITEM  nppalItemNext;    /* 02 */
    NPPALITEM  nppalItemPrev;    /* 04 */
    long       lBitmapSize;
    HANDLE     hBitmapBits;
    BITMAP     Bitmap;
    int        nXPanel;             /*  Width of panel in device units */
    int        nYPanel;             /*  Height of panel in device units */
    int        nSeqNo;          /* 0C */
    HANDLE     hStringHeap;      /* 0E */
    BOOL       fSelected;        /* 10 */

    /* The following fields:

    char  szTitle[52];
    char  szPhotoFileName[129];
    char  szPhotoPath[129];
    char  szThumbFileName[129];
    char  szThumbPath[129];

    have been changed thusly:   */

    NPSTR  npszTitle;
    NPSTR  npszPhotoFileName;
    NPSTR  npszPhotoPath;
    NPSTR  npszThumbFileName;
    NPSTR  npszThumbPath;
    NPSTR  npszFastLoadFileName;
    NPSTR  npszFastLoadPath;

    /* This was done to make this structure much smaller and to use
       only as much memory (in the string heap) as is required to
       store the string as opposed to reserving the maximum
       amount of memory that each string may use (i.e. 52 or 129 bytes). */

   unsigned short  usFlags;
   long  lMinDisplayTime;
   long  lMaxDisplayTime;
   short  sPhotoLeft;
   short  sPhotoTop;
   short  sPhotoRight;
   short  sPhotoBottom;
   short  sThumbLeft;
   short  sThumbTop;
   short  sThumbRight;
   short  sThumbBottom;
   short  sCropLeft;
   short  sCropTop;
   short  sCropRight;
   short  sCropBottom;
   short  sDisplayScale;
    unsigned long db_addr;

  } PALITEM;

typedef struct _LOGPANELPALETTE
  {
    WORD  palVersion;
    WORD  palNumEntries;
    PALETTEENTRY palPalEntry[256];
  } LOGPANELPALETTE;

typedef LOGPANELPALETTE FAR * LPLOGPANELPALETTE;
```

```c
/* Copyright 1989-1994 FotoAttacher by Michael B. Mast, licensed
   to ProCentric Computer Service, Inc., all rights reserverd.
        Trade secret and patent pending. */

#define OEMRESOURCE
//#define MOUSEHOOK

#include <windows.h>
#include <shellapi.h>  // For ShellExecute
#include <winundoc.h>  // From Schulman
#include "prochook.h"
#include "bitblock.h"
#include <cpl.h>
#include <dos.h>
#include <time.h>
#include <debug.h>
#include <string.h>
#include <stdlib.h>
#include <toolhelp.h>
#include <commdlg.h>
#include <dlgs.h>
#include "userobj.h"
#include "resource.h"

/* Defines used by l_bitmap.h */

#define WIN31
#define FOR_DLL     // Must define this before including l_bitmap.h

#include <l_bitmap.h>
#include <l_error.h>

#define HIDE_POPUP    0
#define SHOW_POPUP    1
#define CONVERT_POPUP 2

#include "fadll.h"

BOOL WINAPI DoNothing (HDC hDC, WORD code, DWORD data, DWORD lParam);



//#define DEBUGTILECHILDWINDOWS        /* TileChildWindows/CascadeChildWindows is hooked for debugging purposes
     only. */
//#define DEBUGSELECTOBJECT            /* SelectObject is hooked for debugging purposes only */
//#define DEBUGINTERNALGETRELEASEDC // If defined, installs permanent hooks at startup.  Used
                                    // for debugging purposes only.  Hooked a second time as part of
                                    // normal processing.  Currently chained hooks don't seem to work,
                                    // resulting in page faults.

//#define SINGLESTEPDRAWER

NPHOOKCHILD npHookDeferWindowPos;
NPHOOKCHILD npHookBeginDeferWindowPos;
NPHOOKCHILD npHookCreateWindow;
NPHOOKCHILD npHookCreateWindowEx;
NPHOOKCHILD npHookInternalGetWindowDC;
NPHOOKCHILD npHookInternalReleaseDC;

#ifdef DEBUGINTERNALGETRELEASEDC
NPHOOKCHILD npHookDebugInternalGetWindowDC;
NPHOOKCHILD npHookDebugInternalReleaseDC;
#endif

#ifdef DEBUGSELECTOBJECT
NPHOOKCHILD npHookDebugSelectObject;
#endif

#ifdef DEBUGTILECHILDWINDOWS
NPHOOKCHILD npHookTileChildWindows;
NPHOOKCHILD npHookCascadeChildWindows;
#endif

int           nHookInternalGetRelease = 0;
HWND          hWndServer = NULL;
HINSTANCE     hInstanceServer = NULL;
BOOL          fHooksInstalled = FALSE;
BOOL          fClockOnCaption = FALSE;
BOOL          fRButtonDblClk  = FALSE;

/* Define those non-exported functions whose entry points must
   be computed as either offsets from exported functions or
   as offsets from code segments. */

typedef HDWP  (WINAPI *LPFNINTERNALDEFERWINDOWPOS) (HDWP, HWND, HWND, int, int, int, int, UINT);
typedef HDC   (WINAPI *LPFNINTERNALGETWINDOWDC)    (HWND, WORD, WORD, WORD);
typedef int   (WINAPI *LPFNINTERNALRELEASEDC)      (HDC, WORD);

LPFNINTERNALDEFERWINDOWPOS lpfnInternalDeferWindowPos;
LPFNINTERNALGETWINDOWDC             lpfnInternalGetWindowDC;
LPFNINTERNALRELEASEDC                     lpfnInternalReleaseDC;

DCHOOKS               DCHooks[10];
INSTANCE_TABLE_ENTRY InstanceTable[MAXINSTANCES];

LPINSTANCE_TABLE_ENTRY lpInstanceTable = InstanceTable;

int              nInstanceTableEntries = 0;

FARPROC          lpfnOldFrameWndProc;
HANDLE           hLibInstance;
HANDLE           hLibModule;
UINT             unRollupMessage;
UINT             unBitmapLoadedMessage;
WORD             wDefUserHeap;
HWND             hDummyWnd;
int              nDrawerFrames = 8; /* There are 8 drawer frames */
int              nScale;
BOOL             fOptimizePalettes;
int              nResizeHandleSize;
int              nResizeFrameInset;
int              nQueuedServerMessages = 0;
HANDLE           hQueuedServerMessages = NULL;

static LPSTR lpszMonth[] =
  {"Jan", "Feb", "Mar", "Apr", "May", "Jun", "Jul", "Aug", "Sep", "Oct", "Nov", "Dec"};

static LPSTR lpszDay[] =
  {"Sun", "Mon", "Tue", "Wed", "Thu", "Fri", "Sat"};

#define HO_RWIN31      0
#define HO_DWIN31      1
#define HO_RWIN311     2
#define HO_DWIN311     3
#define HO_RCHICAGO    4
#define HO_DCHICAGO    5
#define HO_RWIN31NT    6
#define HO_DWIN31NT    7

#define HO_DEFWINPOS             0
#define HO_INTGETWINDC           1
#define HO_INTRELDC              2
#define HO_FIRSTDCE              3  // Not a hook offset
#define HO_MENUMAGIC             4
#define HO_CALLGETWINDOWTEXT     5

#define INDICIES 6
#define VERSIONS 8

WORD mHookOffset[INDICIES][VERSIONS] =
  {
                            /*  Retail   Debug    Retail   Debug                      Retail   Debug
                                */
                            /*  Windows  Windows  Windows  Windows  Retail   Debug    Windows  Windows
                                */
                            /*    3.1      3.1      3.11     3.11   Chicago  Chicago  3.1 NT   3.1 NT
                                */

    /* DeferWindowPos        */ 0x005F,  0x0085,  0x005F,  0x0085,  0x0000,  0x0000,  0x0000,  0x0000,
    /* InternalGetWindowDC   */ 0x847B,  0x8F68,  0x847B,  0x8F68,  0x3AD6,  0x0000,  0x0000,  0x0000,
    /* InternalReleaseDC     */ 0x8805,  0x9470,  0x8805,  0x9470,  0x3E86,  0x0000,  0x0000,  0x0000,
    /* FirstDCE              */ 0x012E,  0x0170,  0x012E,  0x0170,  0x0236,  0x0000,  0x0000,  0x0000,
    /* Menu magic offset     */ 0x0054,  0x0078,  0x0054,  0x0078,  0x0000,  0x0000,  0x0000,  0x0000,
    /* Call GetWindowText    */ 0x01A8,  0x01EA,  0x01A8,  0x01EA,  0x0000,  0x0000,  0x0000,  0x0000,
  };

int nWinVer;

WORD wOffsetDefWinPos;
WORD wOffsetIntGetWinDC;
WORD wOffsetIntRelDC;
WORD wOffsetFirstDCE;
WORD wOffsetMenuMagic;
WORD wOffsetCallGetWindowText;

#ifdef MOUSEHOOK
static HHOOK     hMouseHook;
#endif

static char     szTimeDate[30];
static char     szMask[32];
static WORD     awShow[2]  = {2, SW_SHOW};
static LPSTR    lpszPopupClassName  = "FotoAttPopup";
static LPSTR    lpszDummy           = "FotoAttDummy";

/* When compiled with SINGLESTEPDRAWER defined, a single WM_TIMER
   message is processed with each toggle of the Scroll Lock
   key.  This allows us to easily do screen captures of the
   drawer opening and closing to create promotional material. */

#ifdef SINGLESTEPDRAWER
static BOOL fSingleStepDrawer = FALSE;
#endif


LPSTR lpszResizeClassName = "FotoAttResize";

/* First function to be called.  This occurs when the driver (this DLL) is
   loaded by Windows during Windows startup processing. */

/* This function is called by the driver procedure (drvproc.c) when it
   receives the DRV_LOAD message.  At this point, LibMain has already
   been called.  This functions starts FOTOATT.EXE. */

#ifdef BITBLOCKER
int      __loadds WINAPI   BitBlockerCallback
  (
    int       nIndex,
    HWND FAR * lphWnd
```

1C/14PRINT

```
  }

{
  if (nIndex < nInstanceTableEntries)
    {
      /* If hwndPopup is invalid (which as far as I'm aware of
         only happens when there's no popup window attached
         to PROGMAN.EXE as a result of starting FotoAttacher
         after PROGMAN.EXE is up and running) BitBlocker will
         ignore it (i.e. it's ok to pass bad handles to
         BitBlocker). */

      *lphWnd = InstanceTable[nIndex].hwndPopup;

      /* Tell BitBlocker to enumerate the next window */

      return (nIndex + 1);
    }

  /* Tell BitBlocker to stop enumerating windows. */

  return (0);
}
#endif

void                    CalcSize
  (
    int      nInstanceTableIx,
    LPRECT   lpRect
  )

{
  long lStyle;
  register LPINSTANCE_TABLE_ENTRY lpITE;

  //DebugPrintf ("CalcSize, lpRect = (%d, %d, %d, %d)", RECT_LTRB (lpRect));

  lpITE = &InstanceTable[nInstanceTableIx];

  lpITE->rectWindow  = * (LPRECT) lpRect;
  lpITE->rectCaption = * (LPRECT) lpRect;

  lpITE->rectCaption.top = max (0, lpITE->rectCaption.top);   // 9/24
  //lpITE->rectCaption.top = lpITE->rectCaption.top;

  lStyle = GetWindowLong (lpITE->hWnd, GWL_STYLE);

  if (lpRect->left >= 0)
    {
      if (lStyle & WS_THICKFRAME)
        {
          lpITE->rectCaption.left    += GetSystemMetrics (SM_CXFRAME);
          lpITE->rectCaption.right   -= GetSystemMetrics (SM_CXFRAME);
          lpITE->rectCaption.top     += GetSystemMetrics (SM_CYFRAME);
          lpITE->rectWindow.bottom   -= GetSystemMetrics (SM_CXFRAME);
        }
      else
        {
          lpITE->rectCaption.left    += GetSystemMetrics (SM_CXBORDER);
          lpITE->rectCaption.right   -= GetSystemMetrics (SM_CXBORDER);
          lpITE->rectCaption.top     += GetSystemMetrics (SM_CYBORDER);
          lpITE->rectWindow.bottom   -= GetSystemMetrics (SM_CXBORDER);
        }
    }

  lpITE->rectCaption.bottom = lpITE->rectCaption.top +
                              GetSystemMetrics (SM_CYCAPTION) -
                              3 * GetSystemMetrics (SM_CYBORDER);

  lpITE->nMenuTop = lpITE->rectCaption.bottom +
                    2 * GetSystemMetrics (SM_CYBORDER);

  if (lStyle & WS_SYSMENU)
    lpITE->rectCaption.left  += GetSystemMetrics (SM_CXSIZE);

  if (lStyle & WS_MAXIMIZEBOX)
    lpITE->rectCaption.right -= GetSystemMetrics (SM_CXSIZE);

  if (lStyle & WS_MINIMIZEBOX)
    lpITE->rectCaption.right -= GetSystemMetrics (SM_CXSIZE);

#if 0
  /* Draw a short white line at the top and bottom of the
     caption bar and draw a short black line at the top of
     the menu bar. */

  {
    HDC   hDC;

    hDC = GetDC (NULL);

    SaveDC (hDC);

    SelectObject (hDC, GetStockObject (WHITE_PEN));

    MoveTo (hDC, lpITE->rectCaption.left,       lpITE->rectCaption.top);
    LineTo (hDC, lpITE->rectCaption.left + 20,  lpITE->rectCaption.top);

    MoveTo (hDC, lpITE->rectCaption.left,       lpITE->rectCaption.bottom);
    LineTo (hDC, lpITE->rectCaption.left + 20,  lpITE->rectCaption.bottom);

    SelectObject (hDC, GetStockObject (BLACK_PEN));

    MoveTo (hDC, lpITE->rectCaption.left,       lpITE->nMenuTop);
    LineTo (hDC, lpITE->rectCaption.left + 20,  lpITE->nMenuTop);

    RestoreDC (hDC, -1);
    ReleaseDC (NULL, hDC);
  }
#endif

  lpITE->nCaptionLead   = lpITE->rectCaption.left  - lpITE->rectWindow.left;
  lpITE->nCaptionWidth  = lpITE->rectCaption.right - lpITE->rectCaption.left;
  lpITE->nCaptionFollow = lpITE->rectWindow.right  - lpITE->rectCaption.right;
}

void                    ChildToPopup
  (
    HWND  hwndParent,
    HWND  hwndPopup
  )

{
  HWND              hwndPrevious;
  LPWND_3_1         lpwndPopup, lpwndParent, lpwndPrevious;


  //DebugPrintf ("ChildToPopup (%.4X, %.4X)", hwndParent, hwndPopup);

  if (!IsWindow (hwndPopup))
    {
      DebugPrintf ("ERROR - ChildToPopup called with invalid hwndPopup");
      return;
    }

  hwndPrevious = GetNextWindow (hwndParent, GW_HWNDPREV);

  //DebugPrintf ("Switching %.4X from child to popup", hwndPopup);

  lpwndPrevious = (LPWND_3_1) MAKEP (wDefUserHeap, hwndPrevious);
  lpwndPopup    = (LPWND_3_1) MAKEP (wDefUserHeap, hwndPopup);
  lpwndParent   = (LPWND_3_1) MAKEP (wDefUserHeap, hwndParent);

#if 0
  DebugPrintf ("Parent = %.4X, next = %.4X, child = %.4X, parent = %.4X, owner = %.4X, last active = %.4X",
    hwndParent,
     lpwndParent->hwndNext,
     lpwndParent->hwndChild,
     lpwndParent->hwndParent,
     lpwndParent->hwndOwner,
     lpwndParent->hwndLastActive);

  DebugPrintf (" Popup = %.4X, next = %.4X, child = %.4X, parent = %.4X, owner = %.4X, last active = %.4X",
    hwndPopup,
     lpwndPopup->hwndNext,
     lpwndPopup->hwndChild,
     lpwndPopup->hwndParent,
     lpwndPopup->hwndOwner,
     lpwndPopup->hwndLastActive);

  DebugPrintf ("Popup style = ");

  if (lpwndPopup->rgfStyle & WS_POPUP)     DebugPrintf ("  WS_POPUP");
  if (lpwndPopup->rgfStyle & WS_CHILD)     DebugPrintf ("  WS_CHILD");
  if (lpwndPopup->rgfStyle & WS_VISIBLE)   DebugPrintf ("  WS_VISIBLE");
  if (lpwndPopup->rgfStyle & WS_DISABLED)  DebugPrintf ("  WS_DISABLED");
#endif

  lpwndPrevious->hwndNext = hwndPopup;
  lpwndParent->hwndChild  = lpwndPopup->hwndNext;
  lpwndPopup->hwndNext    = hwndParent;

  lpwndPopup->hwndParent = GetDesktopWindow ();  /* Used to be hwndParent */
  lpwndPopup->hwndOwner  = hwndParent;           /* Used to be NULL */
  lpwndPopup->rgfStyle  |= WS_VISIBLE;
}

BOOL                    ContainsLocalHeap
  (
    WORD seg
  )

{
  LOCALENTRY le;
  le.dwSize = sizeof(le);
  return LocalFirst(&le, seg);
}

LONG              WINAPI   CPlApplet
  (
    HWND           hwndCPL,
    unsigned int   iMessage,
    LONG           lParam1,
    LONG           lParam2
  )

{
  LPNEWCPLINFO lpNewCPlInfo;
  FARPROC      lpfnDlgProc;
```

IC/14PRINT

```
  //DebugPrintf ("CPlApplet hwndCPL: %.4X, iMessage: %.4X, lParam1: %.8lX, lParam2: %.8lX",
  //                hwndCPL, iMessage, lParam1, lParam2);

  switch (iMessage)
    {
      case CPL_INIT:
        return ((LONG) TRUE);

      case CPL_GETCOUNT:
        return (1L);

      case CPL_NEWINQUIRE:
        lpNewCPlInfo = (LPNEWCPLINFO) lParam2;

        lpNewCPlInfo->dwSize        = sizeof (NEWCPLINFO);  /* Make Windows happy */
        lpNewCPlInfo->dwFlags       = 0L;
        lpNewCPlInfo->dwHelpContext = 0L;
        lpNewCPlInfo->lData         = 0L;

        lpNewCPlInfo->hIcon         = LoadIcon (hLibInstance, MAKEINTRESOURCE (IDI_ATTACHER));
        lpNewCPlInfo->szHelpFile[0] = '\0';

        lstrcpy (lpNewCPlInfo->szName, "FotoAttacher");
        lstrcpy (lpNewCPlInfo->szInfo, "Activate FotoAttacher user interface");

        //DebugPrintf ("hLibInstance = %.4X, hIcon = %.4X", hLibInstance, lpNewCPlInfo->hIcon);
        break;

      case CPL_SELECT:
        break;

      case CPL_DBLCLK:
        PostMessage (hWndServer, FA_UIUNHIDE, 0, NULL);
        break;

      case CPL_STOP:
        break;

      case CPL_EXIT:
        break;

      default:
        break;
    }

  return (0L);
}

#ifdef DEBUGINTERNALGETRELEASEDC
HDC     __loadds WINAPI   DebugInternalGetWindowDC
  (
    HWND hWnd,
    HRGN hRgn,
    int  nFunctionID,
    WORD wFlags
  )

{
  HDC   hDeviceDC;

  DebugPrintf ("Line %d", __LINE__);
  ProcUnhook (npHookDebugInternalGetWindowDC);

  hDeviceDC = (*lpfnInternalGetWindowDC) (hWnd, hRgn, nFunctionID, wFlags);

  DebugPrintf ("Line %d", __LINE__);
  ProcHook (npHookDebugInternalGetWindowDC);

  DebugPrintf ("DebugInternalGetWindowDC (%.4X, %.4X, %.4X, %.4X) returning hdc %.4X",
               hWnd, hRgn, nFunctionID, wFlags, hDeviceDC);

  return (hDeviceDC);
}

int     __loadds WINAPI   DebugInternalReleaseDC
  (
    HDC   hDC,
    WORD  wWord
  )

{
  int   nReturn;

  ProcUnhook (npHookDebugInternalReleaseDC);

  _asm
    {
      push  es                                 ; Just in case this dll uses es (???)
      push  ds                                 ; Save our data seg
      push  word  ptr  hDC                     ; Push the hDC
      push  word  ptr  wWord                   ; Push the only-god-knows-what-this-is
      mov   ax, ds                             ; Save our ds in es because lpfnInternalReleaseDC
      mov   es, ax                             ;   lives in our data seg, not in GDI's data seg
      mov   ds, [bp-2]                         ; Reload GDI's ds, which is NOT the same as this dll's
      call  dword ptr  es:lpfnInternalReleaseDC ; Call the internal ReleaseDC
      mov   nReturn, ax                        ; Save the return value
      pop   ds                                 ; Reload our data seg
      pop   es                                 ; Reload es
    }

  ProcHook (npHookDebugInternalReleaseDC);

  DebugPrintf ("DebugInternalReleaseDC (%.4X, %.4X) returning %d",
               hDC, wWord, nReturn);

  return (nReturn);
}
#endif

#ifdef DEBUGSELECTOBJECT
HGDIOBJ __loadds WINAPI   DebugSelectObject
  (
    HDC     hDC,
    HGDIOBJ hGDIObj
  )

{
  HGDIOBJ  hReturn;

  DebugPrintf ("Line %d", __LINE__);
  ProcUnhook (npHookDebugSelectObject);

  hReturn = SelectObject (hDC, hGDIObj);

  DebugPrintf ("Line %d", __LINE__);
  ProcHook (npHookDebugSelectObject);

  DebugPrintf ("DebugSelectObject (%.4X, %.4X) returning %.4X",
               hDC, hGDIObj, hReturn);

  /* HACK HACK - the following looks for a very specific occurance */

  if (hDC == 0x0DFE && hGDIObj == 0x0006 && hReturn == 0x0082)
    DebugBreak ();

  return (hReturn);
}
#endif

BOOL              WINAPI   DoNothing (HDC hDC, WORD code, DWORD data, DWORD lParam)
{
  return (TRUE);
}

long     __loadds WINAPI   DummyWndProc
  (
    HWND     hWnd,
    UINT     message,
    WPARAM   wParam,
    LPARAM   lParam
  )

{
  /* This has GOT to be the worlds smallest window proc! */

  return (DefWindowProc (hWnd, message, wParam, lParam));
}

void                        FreePopupObjects
  (
    int  nInstanceTableIx
  )

{
  /* First, free the existing bitmaps. */

  if (ITE.hSaveNonClientBitmap)
    {
      DeleteObject (ITE.hSaveNonClientBitmap);
      ITE.hSaveNonClientBitmap = 0;
      //DebugPrintf ("Freeing hSaveNonClientBitmap for subclassed window %.4X", ITE.hWnd);
    }
  //else
  //  DebugPrintf ("Not freeing hSaveNonClientBitmap for subclassed window %.4X", ITE.hWnd);

  if (ITE.hDDPictBitmap)
    {
      DeleteObject (ITE.hDDPictBitmap);
      ITE.hDDPictBitmap = 0;
      //DebugPrintf ("Freeing hDDPictBitmap for subclassed window %.4X", ITE.hWnd);
    }
  //else
  //  DebugPrintf ("Not freeing hDDPictBitmap for subclassed window %.4X", ITE.hWnd);

  /* Free any palette */

  if (ITE.hPictPalette)
    {
      DeleteObject (ITE.hPictPalette);
      ITE.hPictPalette = 0;
      //DebugPrintf ("Freeing hPictPalette for subclassed window %.4X", ITE.hWnd);
    }
  //else
  //  DebugPrintf ("Not freeing hPictPalette for subclassed window %.4X", ITE.hWnd);
}

HWND              WINAPI   GetFotoAttWnd (void)
{
  return (hWndServer);
}
```

```c
WORD                    GetPrivateProfileHex
        (
                LPSTR  lpszSection,
                LPSTR  lpszEntry,
                WORD   wDefault,
                LPSTR  lpszFile
        )

{
        char szBuffer[10];
        int  i, j;
        WORD w;
        char c;

        i = GetPrivateProfileString (lpszSection, lpszEntry, "", szBuffer, sizeof (szBuffer), lpszFile);

        if (!i)
                return (wDefault);

        w = 0;

        for (j = 0; j < i; j++)
                {
                        c = szBuffer[j];

                        if ('0' <= c && c <= '9')
                                c -= '0';
                        else
                        if ('A' <= c && c <= 'F')
                                c = c - 'A' + 10;
                        else
                        if ('a' <= c && c <= 'f')
                                c = c - 'a' + 10;
                        else
                                break;

                        w = (w << 4) + c;
                }

        return (w);
}

void                    HackOutMDIClientName
  (
    LPSTR pchString
  )

{
  short si, sj;


//DebugPrintf (">HackOutMDIClientName");

  sj = strlen (pchString) - 3;

  for (si = 0; si < sj; si++)
    {
      if (' ' != pchString[si])
        continue;

      if ('-' != pchString[si + 1])
        continue;

      if (' ' != pchString[si + 2])
        continue;

      pchString[si] = '\0';
      break;
    }

  /* Remove trailing spaces from the caption */

  for (si = lstrlen (pchString) - 1;
       si >= 0 && pchString[si] == ' ';
       si--);

  pchString[si + 1] = '\0';
}

#if 0
// Used for implementing replacement system menus, which we're not doing now.
BOOL                    IsMenuHeap
  (
    WORD wSel
  )

{
  // This is a terrible hack, but it appears to work!

  return ((MENU_3_1 FAR *) MAKEP (wSel, wOffsetMenuMagic))->wMagic == MENU_MAGIC;
}
#endif

BOOL            WINAPI   ITEFirst
  (
    LPINSTANCE_TABLE_ENTRY lpITE
  )

{
  if (!nInstanceTableEntries)
    return (FALSE);

  *lpITE = InstanceTable[0];
  return (TRUE);
}

BOOL            WINAPI   ITENext
  (
    LPINSTANCE_TABLE_ENTRY lpITE
  )

{
  if (lpITE->nITEntry + 1 < nInstanceTableEntries)
    {
      *lpITE = InstanceTable[lpITE->nITEntry + 1];
      return (TRUE);
    }

  return (FALSE);
}

void    __loadds WINAPI   LibInit1
  (
    BOOL fBitBlocker,
    BOOL fDebugLog
  )

{
  char  szBuffer[100], szEntry[50];
  int   i, nInstanceTableIx;
  LPSTR pchItem, pchBuffer;
  WNDCLASS  wc;
  SYSHEAPINFO       shi;
  BOOL  fContinue;
  TASKENTRY te;
        DWORD dWord;

  DebugEnableLogging (fDebugLog);

        // Version determination used to be here.

  /* Initialize the global wDefUserHeap. */

  shi.dwSize = sizeof (shi);
  SystemHeapInfo (&shi);
  wDefUserHeap = shi.hUserSegment;  /* USER's default heap seg */
  wDefUserHeap &= 0xfffc;
  wDefUserHeap |= 1;

  for (nInstanceTableIx = 0; nInstanceTableIx < MAXINSTANCES; nInstanceTableIx++)
    {
      ITE.wSig1 = CAPTION_SIG;
      ITE.wSig2 = ITE_SIG;
      ITE.hWnd  = 0;
    }

  /* Initialize the DCHooks table used for hooking InternalGetWindowDC
     and InternalReleaseDC */

  for (i = 0; i < 10; i++)
    {
      DCHooks[i].wSig1 = CAPTION_SIG;
      DCHooks[i].wSig2 = DCHOOKS_SIG;
      DCHooks[i].hCompatDC = 0;
    }

  GetPrivateProfileString ("FotoAttacher", "ClockOnCaption", "No", szBuffer, sizeof (szBuffer),
       "ATTACHER.INI");

  fClockOnCaption = !lstrcmpi (szBuffer, "YES");

  GetPrivateProfileString ("FotoAttacher", "ExitWindowsOnSysMenuRightButtonDoubleClick", "No", szBuffer,
       sizeof (szBuffer), "ATTACHER.INI");

  fRButtonDblClk = !lstrcmpi (szBuffer, "YES");

  /* Register the class for the popup window. */

  wc.style            = CS_SAVEBITS;
  wc.lpfnWndProc      = PopupWndProc;
  wc.cbClsExtra       = 0;
  wc.cbWndExtra       = sizeof (int);  /* Instance table index. */
  wc.hInstance        = hLibInstance;
  wc.hIcon            = 0;
  wc.hCursor          = LoadCursor (NULL, IDC_ARROW);
  wc.hbrBackground    = NULL; /* GetStockObject (WHITE_BRUSH); */
  wc.lpszMenuName     = NULL;
  wc.lpszClassName    = lpszPopupClassName;

  RegisterClass (&wc);

  /* Register the class for the popup resize window window. */

  wc.style            = CS_SAVEBITS;
  wc.lpfnWndProc      = ResizeWndProc;
  wc.cbClsExtra       = 0;
  wc.cbWndExtra       = sizeof (int);  /* Instance table index. */
  wc.hInstance        = hLibInstance;
  wc.hIcon            = 0;
```

```
    wc.hCursor          = LoadCursor (NULL, IDC_ARROW);
    wc.hbrBackground    = NULL;
    wc.lpszMenuName     = NULL;
    wc.lpszClassName    = lpszResizeClassName;

    RegisterClass (&wc);

    /* Register the class for the dummy window. */

    wc.style            = 0;
    wc.lpfnWndProc      = DummyWndProc;
    wc.cbClsExtra       = 0;
    wc.cbWndExtra       = 0;
    wc.hInstance        = hLibInstance;
    wc.hIcon            = 0;
    wc.hCursor          = 0;
    wc.hbrBackground    = NULL;
    wc.lpszMenuName     = NULL;
    wc.lpszClassName    = lpszDummy;

    RegisterClass (&wc);

    /* Initialize resize popup window variables. */

    nResizeHandleSize = GetSystemMetrics (SM_CYSCREEN) / 68;
    nResizeFrameInset = nResizeHandleSize / 2;

    /* Register the private rollup message.  The popup window proc posts this message to
       the application.  Of course, the bitmap subclass proc gets it before the application
       ever sees it.  Upon receiving it, the bitmap subclass proc begins the rollup of
       the popup window. */

    unRollupMessage        = RegisterWindowMessage ("unRollupMessage");
    unBitmapLoadedMessage  = RegisterWindowMessage ("unBitmapLoadedMessage");

    DebugPrintf ("unRollupMessage       = %.4X", unRollupMessage);
    DebugPrintf ("unBitmapLoadedMessage = %.4X", unBitmapLoadedMessage);

    /* Create the dummy window.  The dummy window is used as follows.  We give to the
       dummy window the menu of a window that is about to be resized.  Then we resize
       the dummy window to what will be the size of the window that is about to be resized.
       We then compute the height of the dummy window's non client area.
       If it's different than the height of the non client area of the window that's
       about to be resized, we know that the
       window's non client area will change its height after it's been resized.  We need
       this information to decide if we can convert the popup window to a child window and
       let Windows move the window via a giant BitBlt or if we have to manually move the
       window via DeferWindowPos.  The dummy window is never visible. */

    hDummyWnd = CreateWindow
      (
        lpszDummy,
        NULL,
        WS_OVERLAPPED | WS_CAPTION | WS_THICKFRAME,
        0,
        0,
        0,
        0,
        GetDesktopWindow (),
        NULL,
        hLibInstance,
        NULL
      );

    /* Install the DeferWindowPos/BeginDeferWindowPos hooks. */

    lpfnInternalDeferWindowPos = (LPFNINTERNALDEFERWINDOWPOS) ((DWORD) BeginDeferWindowPos + wOffsetDefWinPos);
    lpfnInternalGetWindowDC    = (LPFNINTERNALGETWINDOWDC)     MAKEP (HIWORD (GetWindowDC),
        wOffsetIntGetWinDC);
    lpfnInternalReleaseDC      = (LPFNINTERNALRELEASEDC)       MAKEP (HIWORD (ReleaseDC),    wOffsetIntRelDC);

#ifdef DEBUGINTERNALGETRELEASEDC
    npHookDebugInternalGetWindowDC = SetProcAddress (lpfnInternalGetWindowDC, DebugInternalGetWindowDC,
        FALSE);
    npHookDebugInternalReleaseDC   = SetProcAddress (lpfnInternalReleaseDC,   DebugInternalReleaseDC,
        FALSE);
#endif

#ifdef DEBUGSELECTOBJECT
    npHookDebugSelectObject     = SetProcAddress (SelectObject,                DebugSelectObject,       FALSE);
#endif

    npHookDeferWindowPos        = SetProcAddress (lpfnInternalDeferWindowPos,  NewDeferWindowPos,       FALSE);
    npHookBeginDeferWindowPos   = SetProcAddress (BeginDeferWindowPos,         NewBeginDeferWindowPos,  FALSE);
    npHookCreateWindowEx        = SetProcAddress (CreateWindowEx,              NewCreateWindowEx,       FALSE);
    npHookCreateWindow          = SetProcAddress (CreateWindow,                NewCreateWindow,         FALSE);

    //DebugPrintf ("SetProcAddress (lpfnInternalDeferWindowPos) = %.4X", npHookDeferWindowPos);
    //DebugPrintf ("SetProcAddress (BeginDeferWindowPos) = %.4X", npHookBeginDeferWindowPos);

#ifdef DEBUGTILECHILDWINDOWS
    npHookTileChildWindows      = SetProcAddress (TileChildWindows,            NewTileChildWindows,     FALSE);
    npHookCascadeChildWindows   = SetProcAddress (CascadeChildWindows,         NewCascadeChildWindows,  FALSE);
#endif

    fHooksInstalled = TRUE;

#ifdef BITBLOCKER
    DebugPrintf ("Bitblocker is %s", fBitBlocker ? (LPSTR) "enabled" : (LPSTR) "disabled");

    if (fBitBlocker)
      OpenBitBlocker (BitBlockerCallback);
#endif

#ifdef MOUSEHOOK
    /* Install the system wide mouse hook.  This is used only to help debug capdll.
       It provides an opportunity to dump a message to the debug log whenever a
       mouse event of interest occurs.  */

    hMouseHook = SetWindowsHookEx (WH_MOUSE, (HOOKPROC) MouseHook, hLibInstance, NULL);
#endif

    GetPrivateProfileString ("FotoAttacher", "ServerPath", "", szBuffer, sizeof (szBuffer), "ATTACHER.INI");

    /* ShellExecute does not like paths that end with backslashes. */

    if (szBuffer[0] && szBuffer[lstrlen (szBuffer) - 1] == '\\')
      szBuffer[lstrlen (szBuffer) - 1] = '\0';

    /* ShellExecute will not return untill FOTOATT.EXE's main window has been
       created.  That means that FOTOATT.EXE will call NewCreateWindowEx before
       ShellExecute returns.  Because we don't want to subclass FOTOATT.EXE,
       we test to see if, at the time NewCreateWindowEx is called, hInstanceServer
       is equal to -1.  If it is, we know that the window handle is for the
       server.  We could also take the window handle and get the name of the
       executable and compare that to "FOTOATT.EXE", but we don't want to go
       through all that work for every top level window that is created. */

    hInstanceServer = (HINSTANCE) -1;

    hInstanceServer = ShellExecute (GetDesktopWindow (),
                                    NULL,
                                    "fotoatt.exe",
                                    NULL,
                                    szBuffer,
                                    SW_HIDE);

    DebugPrintf ("hInstanceServer = %.4X", hInstanceServer);

    if (hInstanceServer > 32)
      {
        for (fContinue = TaskFirst (&te);
             fContinue && te.hInst != i;
             fContinue = TaskNext (&te));

        if (fContinue)
          DebugPrintf ("Server task = %.4X", te.hTask);
        else
          DebugPrintf ("Server task not found");
      }
    else
      DebugPrintf ("WinExec failed, return value %d, dir = %s", hInstanceServer, (LPSTR) szBuffer);

    UpdateCaptions ();
}

/* This function is called when FOTOATT.EXE is loaded. At this point
   LibMain and LibInit1 have already been called. */

VOID            WINAPI   LibInit2
  (
    HWND            hwnd,
    LPLIBINIT2PARMS lpLibInit2Parms
  )

{
  LPMSG  lpMsg;
  int    i;

        //hInstanceServer = 0;   // Remove this line when you uncomment the ShellExecute

  hWndServer = hwnd;

  lpLibInit2Parms->unBitmapLoadedMessage = unBitmapLoadedMessage;
  lpLibInit2Parms->unRollupMessage       = unRollupMessage;

  if (hQueuedServerMessages)
    {
      lpMsg = (LPMSG) GlobalLock (hQueuedServerMessages);

      for (i = 0; i < nQueuedServerMessages; i++)
        {
          PostMessage (hWndServer,
                       lpMsg->message,
                       lpMsg->wParam,
                       lpMsg->lParam);

          lpMsg++;
        }

      GlobalUnlock (hQueuedServerMessages);
      GlobalFree   (hQueuedServerMessages);
    }
}

int      __loadds WINAPI   LibMain
  (
    HANDLE  hInstance,
    WORD    wDataSeg,
    WORD    wHeapSize,
```

IC/14PRINT

```
    LPSTR   lpCmdLine
  )

{
        char szBuffer[200];
        int  i, nVerMaj, nVerMin, nINIVerMaj, nINIVerMin;
        DWORD dWord;
        BOOL  fNewVersion, fAssumptionsMade;

GetPrivateProfileString ("FotoAttacher", "DisableFotoAttacher", "No", szBuffer, sizeof (szBuffer),
     "ATTACHER.INI");

if (!lstrcmpi (szBuffer, "YES"))
                return 0;

        dWord = GetVersion ();

        nVerMaj = (int) LOBYTE (LOWORD (dWord));
        nVerMin = (int) HIBYTE (LOWORD (dWord));

        nINIVerMaj = GetPrivateProfileInt ("FotoAttacher", "MajorWindowsVersion", 0, "ATTACHER.INI");
        nINIVerMin = GetPrivateProfileInt ("FotoAttacher", "MinorWindowsVersion", 0, "ATTACHER.INI");

        if (!nINIVerMaj || !nINIVerMin)
                {
                        WritePrivateProfileInt ("FotoAttacher", "MajorWindowsVersion", nVerMaj,
                             "ATTACHER.INI");
                        WritePrivateProfileInt ("FotoAttacher", "MinorWindowsVersion", nVerMin,
                             "ATTACHER.INI");
                }
        else
        if (nVerMaj != nINIVerMaj || nVerMin != nINIVerMin) /* The user must have installed a new version of
             Windows */
                {
                        fNewVersion = TRUE;
                        goto lookup_offsets;
                }

        if (GetSystemMetrics (SM_DEBUG))
                {
                        wOffsetDefWinPos            = GetPrivateProfileHex ("FotoAttacher", "DOffset1", -1,
                             "ATTACHER.INI");
                        wOffsetIntGetWinDC          = GetPrivateProfileHex ("FotoAttacher", "DOffset2", -1,
                             "ATTACHER.INI");
                        wOffsetIntRelDC             = GetPrivateProfileHex ("FotoAttacher", "DOffset3", -1,
                             "ATTACHER.INI");
                        wOffsetFirstDCE             = GetPrivateProfileHex ("FotoAttacher", "DOffset4", -1,
                             "ATTACHER.INI");
                        wOffsetMenuMagic            = GetPrivateProfileHex ("FotoAttacher", "DOffset5", -1,
                             "ATTACHER.INI");
                        wOffsetCallGetWindowText    = GetPrivateProfileHex ("FotoAttacher", "DOffset6", -1,
                             "ATTACHER.INI");
                }
        else
                {
                        wOffsetDefWinPos            = GetPrivateProfileHex ("FotoAttacher", "ROffset1", -1,
                             "ATTACHER.INI");
                        wOffsetIntGetWinDC          = GetPrivateProfileHex ("FotoAttacher", "ROffset2", -1,
                             "ATTACHER.INI");
                        wOffsetIntRelDC             = GetPrivateProfileHex ("FotoAttacher", "ROffset3", -1,
                             "ATTACHER.INI");
                        wOffsetFirstDCE             = GetPrivateProfileHex ("FotoAttacher", "ROffset4", -1,
                             "ATTACHER.INI");
                        wOffsetMenuMagic            = GetPrivateProfileHex ("FotoAttacher", "ROffset5", -1,
                             "ATTACHER.INI");
                        wOffsetCallGetWindowText    = GetPrivateProfileHex ("FotoAttacher", "ROffset6", -1,
                             "ATTACHER.INI");
                }

        if (wOffsetDefWinPos          != -1 ||
                wOffsetIntGetWinDC        != -1 ||
                wOffsetIntRelDC           != -1 ||
                wOffsetFirstDCE           != -1 ||
                wOffsetMenuMagic          != -1 ||
                wOffsetCallGetWindowText  != -1)
                goto have_offsets;

lookup_offsets:

        fAssumptionsMade = FALSE;

        switch (nVerMaj)
                {
                        case 3:
                                switch (nVerMin)
                                        {
                                                case 10:
                                                nWinVer = GetSystemMetrics (SM_DEBUG) ? HO_DWIN31 : HO_RWIN31);
                                                        break;

                                                case 11:
                                                nWinVer = GetSystemMetrics (SM_DEBUG) ? HO_DWIN311 :
                                                     HO_RWIN311;
                                                        break;

                                                default:
                                                        /* Warning - unrecognized minor version.  Setting
                                                             nWinVer to
                                                                highest known minor version. */

                                                nWinVer = GetSystemMetrics (SM_DEBUG) ? HO_DWIN311 :
                                                     HO_RWIN311;
                                                        fAssumptionsMade = TRUE;
                                                        break;
                                        }

                                break;

                        default:
                                /* Warning - unrecognized major version.  Setting nWinVer to
                                        highest known major and minor version. */

                        nWinVer = GetSystemMetrics (SM_DEBUG) ? HO_DWIN311 : HO_RWIN311;
                                fAssumptionsMade = TRUE;
                                break;
                }

        wOffsetDefWinPos            = mHookOffset[HO_DEFWINPOS]                 [nWinVer];
        wOffsetIntGetWinDC          = mHookOffset[HO_INTGETWINDC]               [nWinVer];
        wOffsetIntRelDC             = mHookOffset[HO_INTRELDC]                  [nWinVer];
        wOffsetFirstDCE                 = mHookOffset[HO_FIRSTDCE]              [nWinVer];
        wOffsetMenuMagic                = mHookOffset[HO_MENUMAGIC]             [nWinVer];
        wOffsetCallGetWindowText        = mHookOffset[HO_CALLGETWINDOWTEXT] [nWinVer];

        if (!fAssumptionsMade)
                {
                        /* If the user installed a new version of Windows, it must
                                be one we know about. */

                  if (fNewVersion)
                        {
                                WritePrivateProfileInt ("FotoAttacher", "MajorWindowsVersion",
                                     nVerMaj, "ATTACHER.INI");
                                WritePrivateProfileInt ("FotoAttacher", "MinorWindowsVersion",
                                     nVerMin, "ATTACHER.INI");
                        }

                        goto have_offsets;
                }

GetPrivateProfileString ("FotoAttacher", "InstallationAssumptionsMade", "No", szBuffer, sizeof (szBuffer),
     "ATTACHER.INI");

        if (!lstrcmpi (szBuffer, "NO"))
                {
                        /* This is the first time LibMain is being called with installation (offset)
                             assumptions.
                                Issue a warning to the user and set InstallationAssumptionsMade=Yes so that
                                     the
                                user only receives one warning. */

    MessageBox (NULL,
                                "Warning!  FotoAttacher was unable to recognize this version of
                                     Windows.  "
                                                "You should order a new version of
                                                     FotoAttacher which does recognize
                                                     this "
                                                "version of Windows.  FotoAttacher has
                                                     made certain assumptions about
                                                     this "
                                                "version of Windows.  If those
                                                     assumptions are wrong, Windows
                                                     will fail to "
                                                "run.  In that event, restart Windows.
                                                     FotoAttacher will ask you if the "
                                                "assumptions it made worked.  Answer
                                                     NO.  If Windows does run, the next
                                                     "
                                                "time you start Windows, answer YES.",
                                                "FotoAttacher", MB_ICONEXCLAMATION |
                                                     MB_OK);

                WritePrivateProfileString ("FotoAttacher", "InstallationAssumptionsMade", "Yes",
                     "ATTACHER.INI");
                        goto have_offsets;
                }

        i = MessageBox (NULL,
                        "In a prior Windows session, FotoAttacher was unable to recognize this version "
                                        "of Windows.  You should order a new version of
                                             FotoAttacher which does "
                                        "recognize this version of Windows.  FotoAttacher
                                             made certain assumptions about "
                                        "this version of Windows.  If those assumptions
                                             were correct, then Windows and "
                                        "FotoAttacher should have worked fine.  If those
                                             assumptions were incorrect, then "
                                        "Windows would have failed to run.  Did Windows
                                             and FotoAttacher run fine during "
                                        "your last Windows session?",
                                        "FotoAttacher", MB_ICONQUESTION | MB_YESNO);

        if (i == IDYES)
                {
                        if (GetSystemMetrics (SM_DEBUG))
                                {
                                        WritePrivateProfileHex ("FotoAttacher", "DOffset1", wOffsetDefWinPos,
                                             "ATTACHER.INI");
                                        WritePrivateProfileHex ("FotoAttacher", "DOffset2",
                                             wOffsetIntGetWinDC,        "ATTACHER.INI");
```

IC/14PRINT

```
                    WritePrivateProfileHex ("FotoAttacher", "DOffset3", wOffsetIntRelDC,
                        "ATTACHER.INI");
                    WritePrivateProfileHex ("FotoAttacher", "DOffset4", wOffsetFirstDCE,
                        "ATTACHER.INI");
                    WritePrivateProfileHex ("FotoAttacher", "DOffset5", wOffsetMenuMagic,
                        "ATTACHER.INI");
                    WritePrivateProfileHex ("FotoAttacher", "DOffset6",
                        wOffsetCallGetWindowText,    "ATTACHER.INI");
                }
            else
                {
                    WritePrivateProfileHex ("FotoAttacher", "ROffset1", wOffsetDefWinPos,
                        "ATTACHER.INI");
                    WritePrivateProfileHex ("FotoAttacher", "ROffset2",
                        wOffsetIntGetWinDC,          "ATTACHER.INI");
                    WritePrivateProfileHex ("FotoAttacher", "ROffset3", wOffsetIntRelDC,
                        "ATTACHER.INI");
                    WritePrivateProfileHex ("FotoAttacher", "ROffset4", wOffsetFirstDCE,
                        "ATTACHER.INI");
                    WritePrivateProfileHex ("FotoAttacher", "ROffset5", wOffsetMenuMagic,
                        "ATTACHER.INI");
                    WritePrivateProfileHex ("FotoAttacher", "ROffset6",
                        wOffsetCallGetWindowText,    "ATTACHER.INI");
                }

            WritePrivateProfileInt ("FotoAttacher", "MajorWindowsVersion", nVerMaj,
                "ATTACHER.INI");
            WritePrivateProfileInt ("FotoAttacher", "MinorWindowsVersion", nVerMin,
                "ATTACHER.INI");
            goto have_offsets;
        }

    i = MessageBox (NULL,
                    "You ansered NO, meaning that the assumptions FotoAttacher made about "
                                    "this version of Windows were wrong.  Would you
                                        like to permanently "
                                    "disable FotoAttacher from attempting to load?",
                                    "FotoAttacher", MB_ICONQUESTION | MB_YESNO);

    if (i == IDYES)
    WritePrivateProfileString ("FotoAttacher", "DisableFotoAttacher", "Yes", "ATTACHER.INI");

    return 0;

have_offsets:
  hLibInstance = hInstance;
  return 1;
}

#ifdef MOUSEHOOK
LRESULT __loadds CALLBACK MouseHook
  (
    int nCode,
    WORD wParam,
    LONG lParam
  )

{
  LPMOUSEHOOKSTRUCT lpMouseHookStruct;


//DebugPrintf (">MouseHook");

  lpMouseHookStruct = (LPMOUSEHOOKSTRUCT) lParam;

  if (nCode < 0)
    return CallNextHookEx (hMouseHook, nCode, wParam, lParam);

  if (wParam == WM_LBUTTONUP)
    DebugPrintf ("WM_LBUTTONUP: pt.x = %4d, pt.y = %4d, hwnd = %.4X, wHT = %.4X",
      lpMouseHookStruct->pt.x,
      lpMouseHookStruct->pt.y,
      lpMouseHookStruct->hwnd,
      lpMouseHookStruct->wHitTestCode);
  else
  if (wParam == WM_NCLBUTTONUP)
    DebugPrintf ("WM_NCLBUTTONUP: pt.x = %4d, pt.y = %4d, hwnd = %.4X, wHT = %.4X",
      lpMouseHookStruct->pt.x,
      lpMouseHookStruct->pt.y,
      lpMouseHookStruct->hwnd,
      lpMouseHookStruct->wHitTestCode);

  return CallNextHookEx (hMouseHook, nCode, wParam, lParam);
}
#else
/* MOUSEHOOK is not defined.  Define a dummy MouseHook to satisfy
    LINK ('cause MouseHook is still exported) */

void    __loadds WINAPI   MouseHook (void) {}
#endif

HDWP    __loadds WINAPI   NewDeferWindowPos
  (
    HDWP  hdwp,
    HWND  hwnd,
    HWND  hwndInsertAfter,
    int   x,
    int   y,
    int   cx,
    int   cy,
    UINT  flags
  )

{
  int           nInstanceTableIx;
  int           xRect, cxRect, yRect, cyRect;
  LONG          lParentStyle, lPopupStyle;
  RECT          NewWindowRect;
  LPWND_3_1     lpwndParent, lpwndPopup, lpwndDummy;
  int           nAction;
  register LPINSTANCE_TABLE_ENTRY lpITE;

  lParentStyle = GetWindowLong (hwnd, GWL_STYLE);

  /* Find the window handle in the instance table.  It's very likely that
      the window handle won't be found.  This is true for two reasons;

      1.  This is a system wide hook and not every application may be
          be subclassed.  Thus we may be passed window handles for
          applications which we don't care about.

      2.  The function we're hooking gets passed lots of window handles.
          They are not necessarily for top level windows.  */

  for (nInstanceTableIx = 0; nInstanceTableIx < nInstanceTableEntries; nInstanceTableIx++)
    if (ITE.hWnd == hwnd)
      break;

  lpITE = &InstanceTable[nInstanceTableIx];

#if 0
  if (nInstanceTableIx < nInstanceTableEntries)
    {
      DebugPrintf ("Call to DeferWindowPos for instanced window %.4X", hwnd);
      DebugPrintf ("flag parm:");

      if (flags & SWP_DRAWFRAME)        DebugPrintf ("  SWP_DRAWFRAME");
      if (flags & SWP_HIDEWINDOW)       DebugPrintf ("  SWP_HIDEWINDOW");
      if (flags & SWP_NOACTIVATE)       DebugPrintf ("  SWP_NOACTIVATE");
      if (flags & SWP_NOMOVE)           DebugPrintf ("  SWP_NOMOVE");
      if (flags & SWP_NOOWNERZORDER)    DebugPrintf ("  SWP_NOOWNERZORDER");
      if (flags & SWP_NOSIZE)           DebugPrintf ("  SWP_NOSIZE");
      if (flags & SWP_NOREDRAW)         DebugPrintf ("  SWP_NOREDRAW");
      if (flags & SWP_NOZORDER)         DebugPrintf ("  SWP_NOZORDER");
      if (flags & SWP_SHOWWINDOW)       DebugPrintf ("  SWP_SHOWWINDOW");

      if (lParentStyle & WS_VISIBLE)
        DebugPrintf ("Parent %.4X is visible", hwnd);
      else
        DebugPrintf ("Parent %.4X is not visible", hwnd);

      if (ISPOPUP (hwnd, lpITE->hwndPopup))
        {
          lPopupStyle  = GetWindowLong (lpITE->hwndPopup, GWL_STYLE);

          if (lPopupStyle & WS_VISIBLE)
            DebugPrintf ("Popup  %.4X is visible", lpITE->hwndPopup);
          else
            DebugPrintf ("Popup  %.4X is not visible", lpITE->hwndPopup);
        }
      else
      if (ISCHILD (hwnd, lpITE->hwndPopup))
        {
          lPopupStyle  = GetWindowLong (lpITE->hwndPopup, GWL_STYLE);

          if (lPopupStyle & WS_VISIBLE)
            DebugPrintf ("Child  %.4X is visible", lpITE->hwndPopup);
          else
            DebugPrintf ("Child  %.4X is not visible", lpITE->hwndPopup);
        }
    }
#endif

  /* Make sure DeferWindowPos was called for a window that we've subclassed,
      that the subclassed window is visible (or at least is being made
      visible) and that we
      haven't already changed the popup into a child. Note that if
      hwndPopup is an invalid window handle, then !ISPOPUP will be
      true and we'll pass the function call along.  This allows
      this function to work, even if, for some reason, hwndPopup is
      invalid. */          /* Also pass along if the popup
      doesn't have a bitmap assigned to it yet. */

  if (nInstanceTableIx == nInstanceTableEntries ||  /* It's not a subclassed window */
      ISCHILD (hwnd, lpITE->hwndPopup)              || /* It's subclassed, but already a child */
     !ISPOPUP (hwnd, lpITE->hwndPopup)              || /* Not a child & not a popup => invalid */
     (!(lParentStyle & WS_VISIBLE) && !(flags & SWP_SHOWWINDOW)) ||  /* App not visible & not becoming
          visible */
      !lpITE->hDDPictBitmap )                                            /* App is/will be visible but popup
          has no bitmap */
    {
      /* Either the window handle is not in the instance table, or if it
          is, it may not be visible (and won't be made visible).  If it
          is visible (or at least is being made visible), the associated
          popup window has already been converted to
          a child window.  In either case, just pass the function along
          the hook chain. */

#if 0
      /* For debugging purposes, let's see if hwnd is a popup window. */
```

```
      for (nInstanceTableIx = 0; nInstanceTableIx < nInstanceTableEntries; nInstanceTableIx++)
        if (lpITE->hwndPopup == hwnd)
          break;

      if (nInstanceTableIx < nInstanceTableEntries)
        {
          /* Yes, hwnd is the handle to a popup window. */

          DebugPrintf ("Call to DeferWindowPos for popup window %.4X made", hwnd);
          DebugPrintf ("flag parm:");

          if (flags & SWP_DRAWFRAME)       DebugPrintf ("  SWP_DRAWFRAME");
          if (flags & SWP_HIDEWINDOW)      DebugPrintf ("  SWP_HIDEWINDOW");
          if (flags & SWP_NOACTIVATE)      DebugPrintf ("  SWP_NOACTIVATE");
          if (flags & SWP_NOMOVE)          DebugPrintf ("  SWP_NOMOVE");
          if (flags & SWP_NOOWNERZORDER)   DebugPrintf ("  SWP_NOOWNERZORDER");
          if (flags & SWP_NOSIZE)          DebugPrintf ("  SWP_NOSIZE");
          if (flags & SWP_NOREDRAW)        DebugPrintf ("  SWP_NOREDRAW");
          if (flags & SWP_NOZORDER)        DebugPrintf ("  SWP_NOZORDER");
          if (flags & SWP_SHOWWINDOW)      DebugPrintf ("  SWP_SHOWWINDOW");

          lPopupStyle = GetWindowLong (hwnd, GWL_STYLE);

          lpwndPopup = (LPWND_3_1) MAKEP (wDefUserHeap, hwnd);

          if (lPopupStyle & WS_VISIBLE)
            DebugPrintf ("Popup  %.4X is visible", lpITE->hwndPopup);
          else
            DebugPrintf ("Popup  %.4X is not visible", lpITE->hwndPopup);

          DebugPrintf ("Current popup rect = (%4d, %4d, %4d, %4d)", RECT_LTRB (&lpwndPopup->rectWindow));

          xRect  = lpwndPopup->rectWindow.left;
          yRect  = lpwndPopup->rectWindow.top;
          cxRect = lpwndPopup->rectWindow.right  - lpwndPopup->rectWindow.left;
          cyRect = lpwndPopup->rectWindow.bottom - lpwndPopup->rectWindow.top;

          if (!(flags & SWP_NOMOVE))
            {
              xRect = x;
              yRect = y;
            }

          if (!(flags & SWP_NOSIZE))
            {
              cxRect = cx;
              cyRect = cy;
            }

          NewWindowRect.top    = yRect;
          NewWindowRect.bottom = yRect + cyRect;
          NewWindowRect.left   = xRect;
          NewWindowRect.right  = xRect + cxRect;

          DebugPrintf ("New     popup rect = (%4d, %4d, %4d, %4d)", RECT_LTRB (&NewWindowRect));
        }
#endif

      ProcUnhook (npHookDeferWindowPos);

      hdwp = (*lpfnInternalDeferWindowPos) (hdwp,
                                            hwnd,
                                            hwndInsertAfter,
                                            x,
                                            y,
                                            cx,
                                            cy,
                                            flags);

      ProcHook (npHookDeferWindowPos);
      return (hdwp);
    }

  /* hwnd is in the instance table, it is visible AND the popup really
     is a popup (i.e. has not been converted to a child). */

  /* Are we hiding the app window.  If so, convert the popup to a child
     so that it will be hidden at the exact moment the app window is
     removed. */

  if (flags & SWP_HIDEWINDOW)
    {
      PopupToChild (hwnd, lpITE->hwndPopup);

      ProcUnhook (npHookDeferWindowPos);

      hdwp = (*lpfnInternalDeferWindowPos) (hdwp,
                                            hwnd,
                                            hwndInsertAfter,
                                            x,
                                            y,
                                            cx,
                                            cy,
                                            flags);

      ProcHook (npHookDeferWindowPos);
      return (hdwp);
    }

  lPopupStyle  = GetWindowLong (lpITE->hwndPopup, GWL_STYLE);

  lpwndPopup  = (LPWND_3_1) MAKEP (wDefUserHeap, lpITE->hwndPopup);
  lpwndDummy  = (LPWND_3_1) MAKEP (wDefUserHeap, hDummyWnd);
  lpwndParent = (LPWND_3_1) MAKEP (wDefUserHeap, hwnd);

  //DebugPrintf ("Current parent rect = (%4d, %4d, %4d, %4d)", RECT_LTRB (&lpwndParent->rectWindow));

  xRect  = lpwndParent->rectWindow.left;
  yRect  = lpwndParent->rectWindow.top;
  cxRect = lpwndParent->rectWindow.right  - lpwndParent->rectWindow.left;
  cyRect = lpwndParent->rectWindow.bottom - lpwndParent->rectWindow.top;

  if (!(flags & SWP_NOMOVE))
    {
      xRect = x;
      yRect = y;
    }

  if (!(flags & SWP_NOSIZE))
    {
      cxRect = cx;
      cyRect = cy;
    }

  NewWindowRect.top    = yRect;
  NewWindowRect.bottom = yRect + cyRect;
  NewWindowRect.left   = xRect;
  NewWindowRect.right  = xRect + cxRect;

  //DebugPrintf ("New     parent rect = (%4d, %4d, %4d, %4d)", RECT_LTRB (&NewWindowRect));

  CalcSize (nInstanceTableIx, &NewWindowRect);  /* 9/24 */

  if (!(lPopupStyle & WS_VISIBLE))
    {
      /* The popup is not visible.  Determine if there's
         enough room on the caption bar to display the popup window.  If there isn't,
         then just pass the call along to DeferWindowPos.  The popup will remain
         invisible and the next time this hook is called for the parent window we'll
         try again to see if the popup can be made visible.

         It's possible that the app window is being moved and/or resized, so
         call CalcSize with the position of the new app window.  Then if
         we do make the popup visible, it will appear in the correct place. */

//        CalcSize (nInstanceTableIx, &NewWindowRect);    9/24

      if ((lpITE->nCaptionWidth >= lpITE->nPopupWndWidth + 25) &&
          (lpITE->rectWindow.bottom - lpITE->rectWindow.top >= lpITE->nPopupWndHeight))
        {
          /* Yes, there's enough room to display the window.  Set the initial
             position of the popup window in screen units. */

          lpITE->nPopupWndPosSU = lpITE->rectCaption.right - lpITE->nPopupWndWidth - 25;

#if 0
          DebugPrintf ("Moving popup origin to (%d, %d) and making visible",
                       lpITE->nPopupWndPosSU,
                       lpITE->rectCaption.top);
#endif
          ProcUnhook (npHookDeferWindowPos);

          hdwp = (*lpfnInternalDeferWindowPos) (hdwp,
                                                lpITE->hwndPopup,
                                                HWND_TOP,
                                                lpITE->nPopupWndPosSU,
                                                lpITE->rectCaption.top + (lpITE->fPhotoRolledUp ?
                                                    GetSystemMetrics (SM_CYSIZE) + GetSystemMetrics
                                                     (SM_CYBORDER) : 0),
                                                0,
                                                0,
                                                SWP_NOSIZE | SWP_NOACTIVATE | SWP_SHOWWINDOW);

          ProcHook (npHookDeferWindowPos);
        }

      ProcUnhook (npHookDeferWindowPos);

      hdwp = (*lpfnInternalDeferWindowPos) (hdwp,
                                            hwnd,
                                            hwndInsertAfter,
                                            x,
                                            y,
                                            cx,
                                            cy,
                                            flags);

      ProcHook (npHookDeferWindowPos);
      return (hdwp);
    }

  /* Both windows are visible. */

  if (  (flags & SWP_NOMOVE) && (flags & SWP_NOSIZE) )
    {
      //DebugPrintf ("SWP_NOMOVE & SWP_NOSIZE - Not calling PopupToChild");

      ProcUnhook (npHookDeferWindowPos);
```

```
        hdwp = (*lpfnInternalDeferWindowPos) (hdwp,
                                              hwnd,
                                              hwndInsertAfter,
                                              x,
                                              y,
                                              cx,
                                              cy,
                                              flags);

        ProcHook (npHookDeferWindowPos);

        return (hdwp);
      }

  /* At this point, we know that we're either moving and/or sizing the
     app window.  Before we do anything else, call CalcSize with
     the new app window rectangle. */

//  CalcSize (nInstanceTableIx, &NewWindowRect);  9/24

  /* The popup is visible.  The app window is either visible, or if it isn't, we know that it will be made
     visible.  */

  /* Is SWP_NOSIZE set?  If so, then we are just moving the window. */

  if (flags & SWP_NOSIZE)
    {
      /* Reflect the fact that the popup window's screen coordinates have changed.  This is true for
         moves (obviously) and for sizing (if the window is enlarged by dragging the left edge
         towards the left or the top edge towards the top). */

      lpITE->nPopupWndPosSU += NewWindowRect.left - lpwndParent->rectWindow.left;

      /* Switch the window from a popup to a child and set the flag indicating that the
         window is now a child window. */

      PopupToChild (hwnd, lpITE->hwndPopup);

      ProcUnhook (npHookDeferWindowPos);

      hdwp = (*lpfnInternalDeferWindowPos) (hdwp,
                                            hwnd,
                                            hwndInsertAfter,
                                            x,
                                            y,
                                            cx,
                                            cy,
                                            flags);

      ProcHook (npHookDeferWindowPos);
      return (hdwp);
    }

  /* The window is being resized.  The height of the non-client area may change.  This is because
     there may be so many menu items in the menu bar, that in order to display them all in the
     menu bar of the resized window, Windows may have to increase the height of the non-client
     area (at the cost of the client area) so that it can increase the number of lines used
     to display the menu bar.  We compute the present (as yet to be resized) non-client area
     height.  We then give to the dummy window the menu of the parent window and resize the
     dummy window to the dimensions that the parent window will be sized to.  Then we compute
     the height of the dummy window's non-client area.  If it is not equal to the height of the
     parent window's present non-client area then we know, before we change its size, that the
     parent window's non-client area's height will change.  In that case we can't switch the
     popup window to a child window.  Windows moves the contents of the client area relative
     to the client area.  That means that if a 2 inch high popup window, which starts at the
     top of the caption bar and decends into the menu bar and then into the client area, protrudes
     1 inch into the client area, it will still protrude 1 inch into the client area after the
     window has been resized.  If the non-client area grew 1/4 inch (to accomodate an additional
     line of menu text) then the top of the popup will be 1/4 below the top of the caption
     bar.  This effect is undesirable.  To get around this problem, we just have Windows
     move our popup window along with the parent window.  To do this we subtract from the
     present location of the parent window the new location of the parent window.  This gives
     us the displacement that the parent window will move.  We apply the same displacement
     to the popup window.  Then we call DeferWindowPos and pass the handle and new location
     of the popup window before we call DeferWindowPos passing the handle of the parent window.
     This forces the popup to move relative to the parent's non-client area as opposed to the
     parent's client area.  The downside to doing it this way is that the popup does appear
     to lag behind the parent window when it is being moved.  Aesthetically, it's not as
     pleasing as converting the popup to a child.  Also, we must use DeferWindowPos to
     move the popup instead of converting the popup to a child if the new parent window
     size would cause the popup to appear outside of the parent window.  If a parent
     window is 200 units wide (the units aren't important) and the popup starts at
     position 170 (relative to the left of the parent) and the parent is resized to
     be 100 units wide, we don't want the popup to appear hanging in space 70 units to
     the right of the parent window. */

  lpwndDummy->wID_Menu = lpwndParent->wID_Menu;

  ProcUnhook (npHookDeferWindowPos);

  DrawMenuBar (hDummyWnd);

  SetWindowPos (hDummyWnd,
                NULL,
                0,
                0,
                cx,
                cy,
                SWP_NOZORDER | SWP_NOMOVE | SWP_NOACTIVATE);

  ProcHook (npHookDeferWindowPos);

#if 0
  DebugPrintf ("x                                    = %4d", x);
  DebugPrintf ("cx                                   = %4d", cx);
  DebugPrintf ("x + cx                               = %4d", x + cx);
  DebugPrintf ("lpITE->nPopupWndPosSU                  = %4d", lpITE->nPopupWndPosSU);
  DebugPrintf ("lpITE->nPopupWndWidth                  = %4d", lpITE->nPopupWndWidth);
  DebugPrintf ("lpITE->nCaptionLead                    = %4d", lpITE->nCaptionLead);
  DebugPrintf ("lpITE->nCaptionFollow                  = %4d", lpITE->nCaptionFollow);
  DebugPrintf ("lpITE->rectCaption.left                = %4d", lpITE->rectCaption.left);
  DebugPrintf ("lpITE->rectCaption.right               = %4d", lpITE->rectCaption.right);
  DebugPrintf ("lpwndParent->rectWindow.left  = %4d", lpwndParent->rectWindow.left);
  DebugPrintf ("lpwndParent->rectWindow.right = %4d", lpwndParent->rectWindow.right);
#endif

  /* If the window will become too narrow or to short to fit the popup, then
     hide the popup. */

  if ((cx - lpITE->nCaptionLead - lpITE->nCaptionFollow < lpITE->nPopupWndWidth + 25) ||
     (cy < lpITE->nPopupWndHeight))
    {
     nAction = HIDE_POPUP;
     //DebugPrintf ("No room to display popup.  nAction set to HIDE_POPUP");
    }

  else

  /* Does the position of the right side of the popup extend beyond what will be the
     new right side of the caption? */

  if (lpITE->nPopupWndPosSU + lpITE->nPopupWndWidth - lpwndParent->rectWindow.left > cx -
      lpITE->nCaptionFollow)
    {
      /* Yes, calculate a new position for the popup such that it will be within the window's
         caption bar after the window has been resized. */

      lpITE->nPopupWndPosSU = cx - lpITE->nCaptionFollow - lpITE->nPopupWndWidth - 25 + NewWindowRect.left;
      nAction = SHOW_POPUP;
#if 0
      DebugPrintf ("Popup would extend beyond new position of parent.");
      DebugPrintf ("Placing popup at (%d, %d) (screen units), nAction to SHOW_POPUP",
                   lpITE->nPopupWndPosSU,
                   lpITE->rectCaption.top);
#endif
    }

  else

  /* Will the parent's non-client area change its height? */

  if (lpwndDummy->rectClient.top  - lpwndDummy->rectWindow.top !=
      lpwndParent->rectClient.top - lpwndParent->rectWindow.top)
    {
      lpITE->nPopupWndPosSU += NewWindowRect.left - lpwndParent->rectWindow.left;
      nAction = SHOW_POPUP;
#if 0
      DebugPrintf ("Parent's non-client area's height will change.");
      DebugPrintf ("Placing popup at (%d, %d) (screen units), nAction to SHOW_POPUP",
                   lpITE->nPopupWndPosSU,
                   lpITE->rectCaption.top);
#endif
    }

  else
    {
      /* No, compute the new popup window position such that it maintains the same position relative
         to the left side of the app window after the app window has been repositioned. */

      lpITE->nPopupWndPosSU += NewWindowRect.left - lpwndParent->rectWindow.left;
      nAction = CONVERT_POPUP;
      //DebugPrintf ("Able to convert popup to child.  Setting nPopupWndPosSU to %d, nAction to
          CONVERT_POPUP", lpITE->nPopupWndPosSU);
    }

  ProcHook (npHookDeferWindowPos);

  SetWindowPos (hDummyWnd,
                NULL,
                0,
                0,
                0,
                0,
                SWP_NOZORDER | SWP_NOMOVE | SWP_NOACTIVATE);

  ProcUnhook (npHookDeferWindowPos);

  switch (nAction)
    {
     case HIDE_POPUP:
       /* The new parent's caption bar is not wide enough to hold the popup window, so hide the popup. */

       ProcUnhook (npHookDeferWindowPos);

       hdwp = (*lpfnInternalDeferWindowPos) (hdwp,
                                             lpITE->hwndPopup,
                                             HWND_TOP,
                                             0,
                                             0,
                                             0,
```

IC/14PRINT

```
                                                   0,
                                                   SWP_NOMOVE | SWP_NOSIZE | SWP_HIDEWINDOW);

          ProcHook (npHookDeferWindowPos);
          break;

        case SHOW_POPUP:
          /* Either the parent's non-client area will change its height or the popup would
             appear outside of the parent window. */

          ProcUnhook (npHookDeferWindowPos);

          hdwp = (*lpfnInternalDeferWindowPos) (hdwp,
                                                   lpITE->hwndPopup,
                                                   HWND_TOP,
                                                   lpITE->nPopupWndPosSU,
                                                   lpITE->rectCaption.top + (lpITE->fPhotoRolledUp ?
                                                       GetSystemMetrics (SM_CYSIZE) + GetSystemMetrics
                                                       (SM_CYBORDER) : 0),
                                                   0,
                                                   0,
                                                   SWP_NOSIZE);

          ProcHook (npHookDeferWindowPos);
          break;

        case CONVERT_POPUP:
          /* The parent's non-client area will not change its height and the popup will
             not appear outside of the parent window. */

          PopupToChild (hwnd, lpITE->hwndPopup);
          break;
      }

    /* Now add the original function request. */

    ProcUnhook (npHookDeferWindowPos);

    hdwp = (*lpfnInternalDeferWindowPos) (hdwp,
                                          hwnd,
                                          hwndInsertAfter,
                                          x,
                                          y,
                                          cx,
                                          cy,
                                          flags);

    ProcHook (npHookDeferWindowPos);
    return (hdwp);
}

/* Because it's possible that we may insert the popup window
   into the list of windows that are to be moved and/or resized,
   add 1 to the value being passed to BeginDeferWindowPos. */

HDWP     __loadds WINAPI   NewBeginDeferWindowPos
  (
    int    cWindow
  )

{
  HDWP      i;

  ProcUnhook(npHookBeginDeferWindowPos);

  i = BeginDeferWindowPos (cWindow + 1);

  ProcHook(npHookBeginDeferWindowPos);

  return (i);
}

HWND     __loadds WINAPI   NewCreateWindow
  (
    LPCSTR     lpszClassName,     /* address of registered class name */
    LPCSTR     lpszWindowName,    /* address of window text */
    DWORD      dwStyle,           /* window style */
    int        x,                 /* horizontal position of the window  */
    int        y,                 /* vertical position of the window  */
    int        nWidth,            /* window width */
    int        nHeight,           /* window height  */
    HWND       hwndParent,        /* handle of parent window  */
    HMENU      hmenu,             /* handle of menu or child-window identifier  */
    HINSTANCE hinst,              /* handle of application instance */
    void FAR* lpvCreateParams     /* address of window-creation data  */
  )

{
  HWND  hWnd;

  ProcUnhook (npHookCreateWindow);

  hWnd = CreateWindow
             (
               lpszClassName,
               lpszWindowName,
               dwStyle,
               x,
               y,
               nWidth,
               nHeight,
               hwndParent,
               hmenu,
               hinst,
               lpvCreateParams
             );

  ProcHook (npHookCreateWindow);

  /* Is the window a popup or child window.  If it is then we skip it. */

  if (dwStyle & (WS_POPUP | WS_CHILD))
    {
      //DebugPrintf ("NewCreateWindow %.4X is popup", hWnd);
      return (hWnd);
    }

  /* Does the window have a caption? If not, skip it. */

  if (!(dwStyle & WS_CAPTION))
    {
      //DebugPrintf ("NewCreateWindow %.4X no caption", hWnd);
      return (hWnd);
    }

  /* Was the window created by a dll?  If it was, then skip it. */

  if (hinst != GetTaskDS ())
    {
      /* More precisely, the window was not created by the task.
         If it wasn't created by the task, it must have been
         created by a dll. */

      //DebugPrintf ("NewCreateWindow %.4X created by dll", hWnd);
      return (hWnd);
    }

  /* Don't sublcass the server. */

  if (hInstanceServer == -1)
    return (hWnd);

  /* Subclass the window and add the handle to the instance table */

  UpdateInstanceTable (hWnd);

  return (hWnd);
}

HWND     __loadds WINAPI   NewCreateWindowEx
  (
    DWORD      dwExStyle,         /* extended window style  */
    LPCSTR     lpszClassName,     /* address of registered class name */
    LPCSTR     lpszWindowName,    /* address of window text */
    DWORD      dwStyle,           /* window style */
    int        x,                 /* horizontal position of the window  */
    int        y,                 /* vertical position of the window  */
    int        nWidth,            /* window width */
    int        nHeight,           /* window height  */
    HWND       hwndParent,        /* handle of parent window  */
    HMENU      hmenu,             /* handle of menu or child-window identifier  */
    HINSTANCE hinst,              /* handle of application instance */
    void FAR* lpvCreateParams     /* address of window-creation data  */
  )

{
  HWND  hWnd;

  ProcUnhook (npHookCreateWindowEx);

  hWnd = CreateWindowEx
             (
               dwExStyle,
               lpszClassName,
               lpszWindowName,
               dwStyle,
               x,
               y,
               nWidth,
               nHeight,
               hwndParent,
               hmenu,
               hinst,
               lpvCreateParams
             );

  ProcHook (npHookCreateWindowEx);

  /* Is the window a popup or child window.  If it is then we skip it. */

  if (dwStyle & (WS_POPUP | WS_CHILD))
    {
      //DebugPrintf ("NewCreateWindowEx %.4X is popup", hWnd);
      return (hWnd);
    }

  /* Does the window have a caption? If not, skip it. */

  if (!(dwStyle & WS_CAPTION))
    {
```

```
      //DebugPrintf ("NewCreateWindowEx %.4X no caption", hWnd);
      return (hWnd);
    }

  /* Was the window created by a dll?  If it was, then skip it. */

  if (hinst != GetTaskDS ())
    {
      /* More precisely, the window was not created by the task.
         If it wasn't created by the task, it must have been
         created by a dll. */

      //DebugPrintf ("NewCreateWindowEx %.4X created by dll", hWnd);
      return (hWnd);
    }

  /* Don't sublcass the server. */

  if (hInstanceServer == -1)
    return (hWnd);

  /* Subclass the window and add the handle to the instance table */

  UpdateInstanceTable (hWnd);

  return (hWnd);
}

#ifdef DEBUGTILECHILDWINDOWS
void    __loadds WINAPI   NewTileChildWindows
  (
    HWND  hWnd,
    WORD  wAction
  )

{
  DebugPrintf ("NewTileChildWindows (%.4X, %.4X) called", hWnd, wAction);

  DebugPrintf ("Line %d", __LINE__);
  ProcUnhook (npHookTileChildWindows);

  TileChildWindows (hWnd, wAction);

  DebugPrintf ("Line %d", __LINE__);
  ProcHook (npHookTileChildWindows);

  return;
}

void    __loadds WINAPI   NewCascadeChildWindows
  (
    HWND  hWnd,
    WORD  wAction
  )

{
  DebugPrintf ("NewCascadeChildWindows (%.4X, %.4X) called", hWnd, wAction);

  DebugPrintf ("Line %d", __LINE__);
  ProcUnhook (npHookCascadeChildWindows);

  CascadeChildWindows (hWnd, wAction);

  DebugPrintf ("Line %d", __LINE__);
  ProcHook (npHookCascadeChildWindows);

  return;
}
#endif

/* Wonder of wonders, mysteries of mysteries... */

HDC     __loadds WINAPI   NewInternalGetWindowDC
  (
    HWND hWnd,
    HRGN hRgn,          /* If hRgn > 1, then hRgn is handle to region whose lock count
                           is ALWAYS zero.  So if it's freed, why pass its handle to
                           NewInternalGetWindowDC ?? */
    int  nFunctionID,
    WORD wFlags
  )

{
  HDC   hDeviceDC;
  HANDLE  hDCE;
  RECT rect;
  int   i, nInstanceTableIx;
  DCE FAR *lpDCE;
  DWORD   dWord;
  FARPROC lpfnDCHook;

// DebugPrintf ("NewInternalGetWindowDC (%.4X, %.4X, %.4X, %.4X)", hWnd, hRgn, nFunctionID, wFlags);

  ProcUnhook (npHookInternalGetWindowDC);

  /* Let Windows retrieve a DC (it either allocates one or assigns a pre-allocated one).
     The returned DC always has a visible region with a lock count of 1.  If the visible
     region points to another region (via the next field in the GDI object header), that
     region always has a lock count of 0.  The returned DC never has a clipping region. */

  hDeviceDC = (*lpfnInternalGetWindowDC) (hWnd, hRgn, nFunctionID, wFlags);

  ProcHook (npHookInternalGetWindowDC);  // 9/27

  /* Don't hook this hDeviceDC if the window handle isn't in the instance table. */

  for (nInstanceTableIx = 0; nInstanceTableIx < nInstanceTableEntries; nInstanceTableIx++)
    if (ITE.hWnd == hWnd)
      break;

  if (nInstanceTableIx == nInstanceTableEntries)
    {
      //DebugPrintf ("hWnd %.4X not in instance table.  Not hooking hDC %.4X", hWnd, hDeviceDC);
      return (hDeviceDC);
    }

  /* The window handle is in the instance table.  Make sure we want to hook it. */

  if (!ITE.fHookInternalGetRelease)
    {
      //DebugPrintf ("fHookInternalGetRelease is FALSE for hWnd %.4X not in instance table.  Not hooking hDC
          %.4X", hWnd, hDeviceDC);
      return (hDeviceDC);
    }

//  DebugPrintf ("Request for our window");

  /* Find an available entry. */

  for (i = 0; i < 10; i++)
    if (!DCHooks[i].hCompatDC)
      break;

  /* Live dangerously; assume i != 10 */

  GetWindowRect (hWnd, &rect);

  DCHooks[i].hWnd                = hWnd;
  DCHooks[i].hRgn                = hRgn;
  DCHooks[i].nFunctionID         = nFunctionID;
  DCHooks[i].wFlags              = wFlags;
  DCHooks[i].cx                  = rect.right  - rect.left;
  DCHooks[i].cy                  = rect.bottom - rect.top;
  DCHooks[i].hDeviceDC           = hDeviceDC;
  DCHooks[i].hCompatDC           = CreateCompatibleDC (hDeviceDC);
  DCHooks[i].hCompatBitmap       = CreateCompatibleBitmap (hDeviceDC, rect.right - rect.left, rect.bottom -
      rect.top);
  DCHooks[i].hOldCompatBitmap = SelectObject (DCHooks[i].hCompatDC, DCHooks[i].hCompatBitmap);
  DCHooks[i].hDCE                = 0;

  //dWord = GetDCHook (hDeviceDC, &lpfnDCHook);
  //SetDCHook (DCHooks[i].hCompatDC, lpfnDCHook, dWord);


  SetDCHook (DCHooks[i].hCompatDC, DoNothing, 0L);

  /* Watch out for GetWindowDC/GetDC and ReleaseDC where the hDC was used only to
     allocate a compatible DC, bitmap or both but where the hDC was never actually
     written to.  We must test the DC to see if it's dirty.  If not, don't write
     the compatible bitmap to the device. */


  /* Normally InternalGetWindowDC returns to the app a hDC with no clipping region.  Presumably,
     the app selects clipping regions into the DC and performs drawing or painting operations.
     Parts of the devices surface remain unaffected by the painting, due to the clipping regions.
     By the time we get the hDC in the InternalReleaseDC hook, there are no clipping regions
     selected into the DC.  Even if there were, we couldn't rely on them.  This is because
     betweeen calling InternalGetWindowDC and InternalReleaseDC many clipping regions could have
     been selected into the DC with corresponding painting occuring.  In other words, it's not
     sufficient to know only the ending state of the clipping regions in the DC (which, as I've
     mentioned, we can't know because there are no clipping regions selected), we have to know
     the entire history of the DC.  We have a compatible DC that we'd like to BitBlt onto the
     device surface, but we can't because we don't know what parts of the selected bitmap should
     be excluded from the BitBlt.  If we knew the entire history of the compatible DC while the
     app had control of it, we could reconstruct those regions of the bitmap that were uneffected
     by whatever drawing took place and *NOT* BitBlt those regions to the device surface.  This
     is too onerous a job to do.  We'd have hook everything that can affect the display surface,
     including (but certainly not limited to) MoveTo and LineTo.  A far easier way around this
     problem (and also hugely ineffecient) is to copy to the compatible DC the entire display
     surface whose bounds are mapped into the device DC.  Then, when we BitBlt the entire
     bitmap to the display surface.  Those areas that should remain unaffected will simply be
     redrawn with the identical data.  This solution has its drawbacks (besides the fact that
     it's supremely inefficient).  Ever see a drawing program like Micrografx Designer run?
     The background is erased and then objects are drawn in the client area.  It looks as
     though one layer is drawn at a time with some objects being drawn over the background
     and some being drawn over already drawn objects (or both).  As this occurs you can
     see the image being "built."  For a complicated drawing, this process can take a while.
     Assume that the drawing program gets a device DC and doesn't relinquish it until it's done
     drawing.  Using our technique, the user would see nothing except and hour glass for
     as long as it takes to draw the image (in our yet undisplayed compatible DC).  Then
     when the user is just about to re-boot his computer because he's certain that it's
     hung, BLAMO! the compatible DC is drawn to the screen in one fell swoop! */

  /* Now in reality, don't copy the display surface to the compatible DC.  This is because
     we're only interested in the non client portion of the screen, which Windows always draws
     in its entirety (i.e. the clipping region contains the entire non client area).  OK,
     I lied again.  If a WM_NCACTIVATE message is being painted, then only the frame and the
     caption bar are redrawn by Windows, not the menu bar and any scroll bars that may be
     present (scroll bars due to WS_VSCROLL and WS_HSCROLL window styles are non-client
     objects).  But we don't care if the compatible bitmap contains garbage for the
```

IC/14PRINT

```
    non client areas that Windows doesn't redraw because we're smart enough to know that
    Windows didn't redraw them and when it's time to BitBlt the compatible bitmap to the
    actual device, we exclude those garbage areas from the clipping region. */

 /* Ok, experienced has proved that it's best to copy the device surface to the
    compatible bitmap at the time the DC is acquired and then dump the entire
    compatible bitmap back to the device surface, without exluding anything from
    the clipping region, when the DC is released.  If
    we're only hooking GetWindowDC calls (either explicity or by processing WM_NCPAINT
    messages) then when the DC is released we only need to paint that portion of the
    non-client area that Windows updated (via either the WM_NCACTIVATE or WM_NCPAINT
    messages).  We do this by excluding from the clipping region everything else
    that we know Windows didn't draw.  This prevents us from having to copy to the
    entire bitmap the surface of the device.  This breaks downs, however, when between
    the getting of the DC and the releasing of the DC the app calls GetWindowDC and ReleaseDC
    not to paint anything, but instead to use the hDC to allocate either a compatible DC or a
    compatible bitmap.  When the app releases the DC, the InternalReleaseDC hook assumes
    that the DC is being released by Windows after having processed either WM_NCACTIVATE
    or WM_NCPAINT and paints what it thinks is the appropriate non-client area.  But, the
    app never did anything with the DC, hence the non-client area is trashed.  Also, it's
    a mistake to assume that an app will use GetDC instead of GetWindowDC.  The way it's being
    done now is a good compromise between performance and the ability to capture portions of
    the client area; namely, we "batch up" all writes to the non-client area (good performance
    but the user can't see the non-client area being drawn - which he normally wouldn't anyway)
    and all writes to the client area are passed thru with only a small portion carved out
    via ExcludeVisRect, thus allowing the user to watch the client area being drawn. */

 BitBlt (DCHooks[i].hCompatDC,
         0,
         0,
         rect.right  - rect.left,
         rect.bottom - rect.top,
         hDeviceDC,
         0,
         0,
         SRCCOPY);

 /* Is the hDeviceDC that was returned for a pre-allocated DC?  In other
    words, does there exist a DCE for this window and hDeviceDC? */

 for (hDCE = * (LPWORD) MAKEP (wDefUserHeap, wOffsetFirstDCE);
      hDCE;
      hDCE = lpDCE->hdceNext)
   {
    lpDCE = (DCE FAR *) MAKEP (wDefUserHeap, hDCE);

    if (lpDCE->hwnd == hWnd &&
        lpDCE->hDC  == hDeviceDC)
      {
       /* We are hooking a DC which has an entry in the DCE.
          Save the hDCE of the DCE which contains both the
          hWnh and the hDeviceDC. */

       DCHooks[i].hDCE = hDCE;

       /* Zap the hDC in the DCE.  If we don't do this then the DCE will
          have one hDC and the application will have another hDC.  Also,
          ReleaseDC will barf if the passed hDC doesn't match the hDC
          in the DCE. */

       lpDCE->hDC = DCHooks[i].hCompatDC;
      }
   }
#if 0
  DebugPrintf ("DCHooks[%d].hWnd               = %.4X\n"
               "DCHooks[%d].hRgn               = %.4X\n"
               "DCHooks[%d].nFunctionID        = %.4X\n"
               "DCHooks[%d].wFlags             = %.4X\n"
               "DCHooks[%d].cx                 = %d\n"
               "DCHooks[%d].cy                 = %d\n"
               "DCHooks[%d].hDeviceDC          = %.4X\n"
               "DCHooks[%d].hCompatDC          = %.4X\n"
               "DCHooks[%d].hCompatBitmap      = %.4X\n"
               "DCHooks[%d].hOldCompatBitmap   = %.4X\n"
               "DCHooks[%d].hDCE               = %.4X\n",
               i, DCHooks[i].hWnd,
               i, DCHooks[i].hRgn,
               i, DCHooks[i].nFunctionID,
               i, DCHooks[i].wFlags,
               i, DCHooks[i].cx,
               i, DCHooks[i].cy,
               i, DCHooks[i].hDeviceDC,
               i, DCHooks[i].hCompatDC,
               i, DCHooks[i].hCompatBitmap,
               i, DCHooks[i].hOldCompatBitmap,
              .i, DCHooks[i].hDCE);
#endif

  //ProcHook (npHookInternalGetWindowDC);  9/27
  //ProcHook (npHookInternalReleaseDC);    9/27

#if 0
  DebugPrintf ("NewInternalGetWindowDC (%.4X, %.4X, %.4X, %.4X) returning compatible hdc %.4X, device hdc =
       %.4X",
               hWnd, hRgn, nFunctionID, wFlags, DCHooks[i].hCompatDC, hDeviceDC);
#endif

  return (DCHooks[i].hCompatDC);
}

/* Internal Windows ReleaseDC function.  The DC to be released always has a visible region
   with lock count 1 and never has a clipping region. */

int     __loadds WINAPI   NewInternalReleaseDC
  (
   HDC   hDC,
   WORD  wWord
  )

{
  int       i, nReturn;
  DCE FAR *lpDCE;
  HRGN      hTempRgn;
  HDC       hDeviceDC;

  //DebugPrintf (">NewInternalReleaseDC (%.4X, %.4X)", hDC, wWord);

  /* We may have been passed a hDC that InternalGetWindowDC returned.  In other
     words, we may not have substituted a compatible DC for this hDC, thus
     the hDC may not be in the DCHooks table.  If it's not, then just pass the
     hDC along to InternalReleaseDC.

     If the passed hDC is in the DCHooks table, then
     we don't want to pass to the internal ReleaseDC the hDC passed to this hook.
     We still need the DC to get to it's bitmap.  Also you can't free a
     compatible DC by calling ReleaseDC; you have to use DeleteDC.  Now, find
     hDC in the DCHooks table and then pass back the original DC handle. */

  for (i = 0; i < 10; i++)
    if (DCHooks[i].hCompatDC == hDC)
      break;

  /* Are we trying to release a DC that was never hooked? */

  if (i < 10)
    {
     /* No, the DC was hooked. */
     //DebugPrintf ("Request for our task");
#if 0
     DebugPrintf ("DCHooks[%d].hWnd               = %.4X\n"
                  "DCHooks[%d].hRgn               = %.4X\n"
                  "DCHooks[%d].nFunctionID        = %d\n"
                  "DCHooks[%d].wFlags             = %.4X\n"
                  "DCHooks[%d].cx                 = %d\n"
                  "DCHooks[%d].cy                 = %d\n"
                  "DCHooks[%d].hDeviceDC          = %.4X\n"
                  "DCHooks[%d].hCompatDC          = %.4X\n"
                  "DCHooks[%d].hCompatBitmap      = %.4X\n"
                  "DCHooks[%d].hOldCompatBitmap   = %.4X\n"
                  "DCHooks[%d].hDCE               = %.4X\n",
                  i, DCHooks[i].hWnd,
                  i, DCHooks[i].hRgn,
                  i, DCHooks[i].nFunctionID,
                  i, DCHooks[i].wFlags,
                  i, DCHooks[i].cx,
                  i, DCHooks[i].cy,
                  i, DCHooks[i].hDeviceDC,
                  i, DCHooks[i].hCompatDC,
                  i, DCHooks[i].hCompatBitmap,
                  i, DCHooks[i].hOldCompatBitmap,
                  i, DCHooks[i].hDCE);
#endif
     /* Did we zap the DCE for this hDC? */

     if (DCHooks[i].hDCE)
       {
        /* Yes, store the original hDC in the DCE. */

        lpDCE = (DCE FAR *) MAKEP (wDefUserHeap, DCHooks[i].hDCE);

        if (lpDCE->hDC != DCHooks[i].hCompatDC)
          FatalExit (2);

        lpDCE->hDC = DCHooks[i].hDeviceDC;
       }

     ProcUnhook (npHookInternalGetWindowDC);  // 9/27
     ProcUnhook (npHookInternalReleaseDC);    // 9/27

     ReleaseCompatibleDC (i);

     ProcHook (npHookInternalGetWindowDC);  // 9/27
     ProcHook (npHookInternalReleaseDC);    // 9/27


     DCHooks[i].hCompatDC = 0;
     hDeviceDC = DCHooks[i].hDeviceDC;
    }
  else
    {
     hDeviceDC = hDC;
    //DebugPrintf ("Request for a non hooked DC");
    }

  ProcUnhook (npHookInternalReleaseDC);    // 9/27

  _asm
    {
     push  es                               ; Just in case this dll uses es (???)
     push  ds                               ; Save our data seg
```

```
        push   word  atr  hDeviceDC               ; Push the hDC
        push   word  atr  wWord                   ; Push the only-god-knows-what-this-is
        mov    ax, ds                             ; Save our ds in es because lpfnInternalReleaseDC
        mov    es, ax                             ;   lives in our data seg, not in USER's data seg
        mov    ds, [bp-2]                         ; Reload USER's ds, which is NOT the same as this dll's
        call   dword ptr  es:lpfnInternalReleaseDC ; Call the internal ReleaseDC
        mov    nReturn, ax                        ; Save the return value
        pop    ds                                 ; Reload our data seg
        pop    es                                 ; Reload es
      }

  ProcHook (nmHookInternalReleaseDC);

  //DebugPrintf ("NewInternalReleaseDC (%.4X, %.4X) returning %d", hDC, wWord, nReturn);

  return (nReturn);
}

void                         PopupToChild
  (
    HWND  hwndParent,
    HWND  hwndPopup
  )

{
  HWND               hwndPrevious;
  LPWND_3_1          lpwndPopup, lpwndParent, lpwndPrevious;


  //DebugPrintf ("PopupToChild (%.4X, %.4X)", hwndParent, hwndPopup);

  if (!IsWindow (hwndPopup))
    {
      DebugPrintf ("ERROR - PopupToChild called with invalid hwndPopup");
      return;
    }

  //DebugPrintf ("Switching %.4X from popup to child", hwndPopup);

  /* Because the popup window is on top of the application window, it's
      window structure appears before the application's window structure
      in the window manager's list of window structures.  */

  hwndPrevious = GetNextWindow (hwndPopup, GW_HWNDPREV);

  if (hwndPrevious == hwndParent)
    {
      /*  As luck would have it, this routine still does what it's supposed
          to, even though the windows structures aren't in the expected
          order. */

      DebugPrintf ("WARNING - the popup's PREVIOUS window is the parent.");
      DebugPrintf ("           In other words, the popup is behind the parent.");
    }

  lpwndPrevious = (LPWND_3_1) MAKEP (wDefUserHeap, hwndPrevious);
  lpwndPopup    = (LPWND_3_1) MAKEP (wDefUserHeap, hwndPopup);
  lpwndParent   = (LPWND_3_1) MAKEP (wDefUserHeap, hwndParent);

#if 0
  DebugPrintf ("Parent = %.4X, next = %.4X, child = %.4X, parent = %.4X, owner = %.4X, last active = %.4X",
    hwndParent,
    lpwndParent->hwndNext,
    lpwndParent->hwndChild,
    lpwndParent->hwndParent,
    lpwndParent->hwndOwner,
    lpwndParent->hwndLastActive);

  DebugPrintf (" Popup = %.4X, next = %.4X, child = %.4X, parent = %.4X, owner = %.4X, last active = %.4X",
    hwndPopup,
    lpwndPopup->hwndNext,
    lpwndPopup->hwndChild,
    lpwndPopup->hwndParent,
    lpwndPopup->hwndOwner,
    lpwndPopup->hwndLastActive);

  DebugPrintf ("Popup style = ");

  if (lpwndPopup->rgfStyle & WS_POPUP)     DebugPrintf ("  WS_POPUP");
  if (lpwndPopup->rgfStyle & WS_CHILD)     DebugPrintf ("  WS_CHILD");
  if (lpwndPopup->rgfStyle & WS_VISIBLE)   DebugPrintf ("  WS_VISIBLE");
  if (lpwndPopup->rgfStyle & WS_DISABLED)  DebugPrintf ("  WS_DISABLED");
#endif

  /* The previous application's "next window" field points to the
      popup window.  Change this so that it points to the popup's
      "next window" field. */

  lpwndPrevious->hwndNext = lpwndPopup->hwndNext;

  /* The popup window will become the application's first child.
      That means that the first child will become the popup's
      next child. */

  lpwndPopup->hwndNext     = lpwndParent->hwndChild;
  lpwndParent->hwndChild   = hwndPopup;

  /* Now the window structure is the way we want it.  The previous
      application's "next window" points to the current application's
      window structure.  The current application's first child
      is the popup window.  The popup window's "next window" is the
      applications real first child window.  All that's left to do
      is make the popup window look like a child window.  When
      the popup window was created, we changed is style from WS_POPUP
      to WS_CHILD, so we don't need to do that.  Just adjust the
      owner and parent fields and we're done. */

  lpwndPopup->hwndParent = hwndParent;   /* Used to be HWND_DESKTOP */
  lpwndPopup->hwndOwner  = 0;            /* Used to be hwndParent   */

  /* When Windows rearranges all of the application windows in response to the TileChildWindows function
      being called (undocumented in USER), for some strange reason, an application window may be "parked"
      temporarily somewhere on the screen (but not visible) before it is moved again to its final destination.
      While the window is "parked" on the screen awaiting its final move via DeferWindowPos to its ultimate
      destination, the popup window's frame is displayed (the client is not displayed nor does it receive
      any type of message which would cause it to be displayed).  Since I can't stop Windows from "parking" the
      application window before it reaches its final location, I clear the WS_VISIBLE bit in the popup window
      while the popup window exists as a child window.  Upon converting the popup back into a popup from a
          child
      I set the WS_VISIBLE bit.  This seems to keep the frame from appearing while the application is "parked."
          */

  lpwndPopup->rgfStyle &= ~WS_VISIBLE;
}

void                         ReleaseCompatibleDC
  (
    int  nDCHooksIx
  )

{
  LPWND_3_1      lpwnd;
  int            nInstanceTableIx;
  HDC            hSaveNonClientDC;
  HBITMAP        hOldSaveNonClientBitmap;
  HPALETTE       hpalOld, hpalOld2;
  HDC            hMaskDC, hDrawerDC, hSaveDrawerDC;
  HBITMAP        hDrawerBitmap, hOldDrawerBitmap, hSaveDrawerBitmap, hOldSaveDrawerBitmap, hMaskBitmap,
      hOldMaskBitmap;
  RECT           rect;
  HBRUSH         hbrBrush;
  int            aCheckeredBits[] = {0x00, 0x55, 0x00, 0x55, 0x00, 0x55, 0x00, 0x55};
  HBRUSH         hbrCheckered;
  HBITMAP        hCheckeredBitmap;
  HPEN           hBlackPen, hOldPen;
  register LPINSTANCE_TABLE_ENTRY lpITE;


  //DebugPrintf ("ReleaseCompatibleDC");

  /* Create a memory DC (save caption DC) which will hold a bitmap of the caption bar.  We will
      use the copy of the caption bar to build the drawer open and close sequence of bitmaps. */

  for (nInstanceTableIx = 0; nInstanceTableIx < nInstanceTableEntries; nInstanceTableIx++)
    if (ITE.hWnd == DCHooks[nDCHooksIx].hWnd)
      break;

  lpITE = &InstanceTable[nInstanceTableIx];

  //DebugPrintf ("Taking a snapshot of hWnd %.4X, hwndPopup = %.4X", lpITE->hWnd, lpITE->hwndPopup);

  lpwnd = (LPWND_3_1) MAKEP (wDefUserHeap, lpITE->hWnd);

  //DebugDumpWND (lpITE->hWnd);

  hSaveNonClientDC = CreateCompatibleDC (DCHooks[nDCHooksIx].hDeviceDC);

  if (!lpITE->hSaveNonClientBitmap)
    lpITE->hSaveNonClientBitmap =
      CreateCompatibleBitmap (DCHooks[nDCHooksIx].hDeviceDC,
                              lpITE->nPopupWndWidth + 2 * lpITE->nDrawerOverhang + nDrawerFrames,
                              GetSystemMetrics (SM_CYSIZE) + GetSystemMetrics (SM_CYBORDER) + nDrawerFrames);

  hOldSaveNonClientBitmap = SelectObject (hSaveNonClientDC, lpITE->hSaveNonClientBitmap);

  //DebugPrintf ("Saving non client DC, width = %d", lpITE->nPopupWndWidth);

  BitBlt (hSaveNonClientDC,
          0,
          0,
          lpITE->nPopupWndWidth + 2 * lpITE->nDrawerOverhang + nDrawerFrames,

          /* If Windows painted the menu bar then save a portion of the menu bar (nDrawerFrames
              scan lines), otherwise don't save any part of the menu bar.  If Windows didn't
              draw the menu bar, then the photo will be over the menu bar and we don't want to
              copy part of the photo into lpITE->hSaveNonClientBitmap. */

          GetSystemMetrics (SM_CYSIZE) +
            GetSystemMetrics (SM_CYBORDER) +
            ((DCHooks[nDCHooksIx].nFunctionID == FN_WM_NCPAINT) ? nDrawerFrames : 0),

          DCHooks[nDCHooksIx].hCompatDC,
          lpITE->nPopupWndPosSU - lpwnd->rectWindow.left - lpITE->nDrawerOverhang,
          GetSystemMetrics ((lpwnd->rgfStyle & WS_THICKFRAME) ? SM_CYFRAME : SM_CYBORDER),
          SRCCOPY);

  SelectObject (hSaveNonClientDC, hOldSaveNonClientBitmap);
  DeleteDC     (hSaveNonClientDC);

  /* If any part of the drawer is visible, draw it in the compatible DC.  Then when
```

IC/14PRINT

```
    the compatible DC is written to the device DC, the drawer will appear.  This is
    better than writing the compatible DC to the device DC and then writing the
    drawer to the device DC, which would cause a flicker.  */

if (lpITE->fDrawerVisible)
  ShowDrawer (DCHooks[nDCHooksIx].hCompatDC,
              nInstanceTableIx);
else
if (lpITE->fPhotoRolledUp && IsWindowVisible (lpITE->hwndPopup))
  {
    hDrawerDC     = CreateCompatibleDC (DCHooks[nDCHooksIx].hDeviceDC);
    hSaveDrawerDC = CreateCompatibleDC (DCHooks[nDCHooksIx].hDeviceDC);
    hMaskDC       = CreateCompatibleDC (DCHooks[nDCHooksIx].hDeviceDC);

    hDrawerBitmap         = CreateCompatibleBitmap
                              (
                                DCHooks[nDCHooksIx].hDeviceDC,
                                lpITE->nPopupWndWidth + 2 * lpITE->nDrawerOverhang,
                                GetSystemMetrics (SM_CYSIZE) /* + GetSystemMetrics (SM_CYBORDER) */
                              );

    hOldDrawerBitmap      = SelectObject (hDrawerDC, hDrawerBitmap);

    hSaveDrawerBitmap     = CreateCompatibleBitmap
                              (
                                DCHooks[nDCHooksIx].hDeviceDC,
                                lpITE->nPopupWndWidth + 2 * lpITE->nDrawerOverhang,
                                GetSystemMetrics (SM_CYSIZE) /* + GetSystemMetrics (SM_CYBORDER) */
                              );

    hOldSaveDrawerBitmap  = SelectObject
                              (
                                hSaveDrawerDC, hSaveDrawerBitmap
                              );

    hMaskBitmap           = CreateBitmap
                              (
                                lpITE->nPopupWndWidth + 2 * lpITE->nDrawerOverhang,
                                GetSystemMetrics (SM_CYSIZE) /* + GetSystemMetrics (SM_CYBORDER) */,
                                1, 1, NULL
                              );

    hOldMaskBitmap = SelectObject (hMaskDC, hMaskBitmap);

    if (lpITE->fActive)
      {
        SetBkColor   (DCHooks[nDCHooksIx].hCompatDC, GetSysColor (COLOR_CAPTIONTEXT));
        SetTextColor (DCHooks[nDCHooksIx].hCompatDC, GetSysColor (COLOR_ACTIVECAPTION));
      }
    else
      {
        SetBkColor   (DCHooks[nDCHooksIx].hCompatDC, GetSysColor (COLOR_INACTIVECAPTIONTEXT));
        SetTextColor (DCHooks[nDCHooksIx].hCompatDC, GetSysColor (COLOR_INACTIVECAPTION));
      }

    BitBlt (hMaskDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            DCHooks[nDCHooksIx].hCompatDC,
            lpITE->nPopupWndPosSU - lpwnd->rectWindow.left - lpITE->nDrawerOverhang,
            GetSystemMetrics ((lpwnd->rgfStyle & WS_THICKFRAME) ? SM_CYFRAME : SM_CYBORDER),
            SRCCOPY);

    rect.left   = 0;
    rect.top    = 0;
    rect.right  = lpITE->nPopupWndWidth + 2 * lpITE->nDrawerOverhang;
    rect.bottom = GetSystemMetrics (SM_CYSIZE) /* + GetSystemMetrics (SM_CYBORDER) */;

    hbrBrush = CreateSolidBrush (lpITE->fActive ? RGB (255, 0, 0) : RGB (0, 0, 255));

    FillRect (hDrawerDC, &rect, hbrBrush);

    DeleteObject (hbrBrush);

    hCheckeredBitmap  = CreateBitmap (8, 8, 1, 1, aCheckeredBits);
    hbrCheckered      = CreatePatternBrush (hCheckeredBitmap);

    hbrBrush = SelectObject (hDrawerDC, hbrCheckered);

    BitBlt (hDrawerDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            DCHooks[nDCHooksIx].hCompatDC,
            lpITE->nPopupWndPosSU - lpwnd->rectWindow.left - lpITE->nDrawerOverhang,
            GetSystemMetrics ((lpwnd->rgfStyle & WS_THICKFRAME) ? SM_CYFRAME : SM_CYBORDER),
            0x00AC0744L);  /* D <- (D & P) | (S & ~P) */

    /* We want to do D <- (D & ~M) | (C & M) where:

       D = hDrawerDC,
       M = hMaskDC,
       C = hCompatDC

       This is logically equivalent to D <- DMCDxax.  We start
       by doing D <- CDx, then D <- DMa, then
       D <- (the original D)Dx.  Thus, we save hDrawerDC in
       hSaveDrawerDC, so that we can perform the last step. */

    BitBlt (hSaveDrawerDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            hDrawerDC,
            0,
            0,
            SRCCOPY);

    BitBlt (hDrawerDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            DCHooks[nDCHooksIx].hCompatDC,
            lpITE->nPopupWndPosSU - lpwnd->rectWindow.left - lpITE->nDrawerOverhang,
            GetSystemMetrics ((lpwnd->rgfStyle & WS_THICKFRAME) ? SM_CYFRAME : SM_CYBORDER),
            SRCINVERT);

    BitBlt (hDrawerDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            hMaskDC,
            0,
            0,
            SRCAND);

    BitBlt (hDrawerDC,
            0,
            0,
            lpITE->nPopupWndWidth + 2 * lpITE->nDrawerOverhang,
            GetSystemMetrics (SM_CYSIZE) /* + GetSystemMetrics (SM_CYBORDER) */,
            hSaveDrawerDC,
            0,
            0,
            SRCINVERT);

    /* hDrawerDC contains the desired bitmap.  Now just stuff in the
       vertical lines. */

    hBlackPen = GetStockObject (BLACK_PEN);

    hOldPen = SelectObject (hDrawerDC, hBlackPen);

    /* Draw the left rear vertical */

    MoveTo (hDrawerDC, 0, 0);
    LineTo (hDrawerDC, 0, GetSystemMetrics (SM_CYSIZE) + GetSystemMetrics (SM_CYBORDER));

    /* Draw the right rear vertical */

    MoveTo (hDrawerDC, lpITE->nPopupWndWidth + 2 * lpITE->nDrawerOverhang - 1, 0);
    LineTo (hDrawerDC, lpITE->nPopupWndWidth + 2 * lpITE->nDrawerOverhang - 1, GetSystemMetrics (SM_CYSIZE)
        + GetSystemMetrics (SM_CYBORDER));

    SelectObject (hDrawerDC, hOldPen);

    /* The finished product is in hDrawerDC.  Now copy hDrawerDC into the
       appropriate position within hCompatDC.  */

    BitBlt (DCHooks[nDCHooksIx].hCompatDC,
            lpITE->nPopupWndPosSU - lpwnd->rectWindow.left - lpITE->nDrawerOverhang,
            GetSystemMetrics ((lpwnd->rgfStyle & WS_THICKFRAME) ? SM_CYFRAME : SM_CYBORDER),
            lpITE->nPopupWndWidth + 2 * lpITE->nDrawerOverhang,
            GetSystemMetrics (SM_CYSIZE) /* + GetSystemMetrics (SM_CYBORDER) */,
            hDrawerDC,
            0,
            0,
            SRCCOPY);

    /* Free all the junk we used to build the bitmap in hDrawerDC. */

    SelectObject (hDrawerDC,      hOldDrawerBitmap);
    SelectObject (hDrawerDC,      hbrBrush);
    SelectObject (hSaveDrawerDC,  hOldSaveDrawerBitmap);
    SelectObject (hMaskDC,        hOldMaskBitmap);

    DeleteObject (hDrawerBitmap);
    DeleteObject (hSaveDrawerBitmap);
    DeleteObject (hbrCheckered);
    DeleteObject (hCheckeredBitmap);
    DeleteObject (hMaskBitmap);

    DeleteDC     (hMaskDC);
    DeleteDC     (hDrawerDC);
    DeleteDC     (hSaveDrawerDC);
  }

if (ITE.hDDPictBitmap)
  {
    hpalOld  = SelectPalette (DCHooks[nDCHooksIx].hDeviceDC, ITE.hPictPalette, lpITE->fBackgroundPalette);
    hpalOld2 = SelectPalette (DCHooks[nDCHooksIx].hCompatDC, ITE.hPictPalette, lpITE->fBackgroundPalette);
    RealizePalette (DCHooks[nDCHooksIx].hDeviceDC);
  }
```

```
  BitBlt (DCHooks[nDCHooksIx].hDeviceDC,
          0,
          0,
          DCHooks[nDCHooksIx].cx,
          DCHooks[nDCHooksIx].cy,
          DCHooks[nDCHooksIx].hCompatDC,
          0,
          0,
          SRCCOPY);

  if (ITE.hDDPictBitmap)
    {
      SelectPalette (DCHooks[nDCHooksIx].hDeviceDC, hpalOld,  lpITE->fBackgroundPalette);
      SelectPalette (DCHooks[nDCHooksIx].hCompatDC, hpalOld2, lpITE->fBackgroundPalette);
      RealizePalette (DCHooks[nDCHooksIx].hDeviceDC);
    }

  SelectObject (DCHooks[nDCHooksIx].hCompatDC, DCHooks[nDCHooksIx].hOldCompatBitmap);
  DeleteObject (DCHooks[nDCHooksIx].hCompatBitmap);
  DeleteDC     (DCHooks[nDCHooksIx].hCompatDC);
}

void                      StartServerSession
  (
    int   nInstanceTableIx,
    HWND  hWnd,
    LPSTR lpszBuffer
  )

{
  LPFABITMAPINFO  lpFABitmapInfo;
  HANDLE          hFABitmapInfo;
  char            szBuffer[100];

  lstrcpy (szBuffer, lpszBuffer);
  HackOutMDIClientName (szBuffer);

  /* Allocate and build the request block that will be passed
     to the server. */

  hFABitmapInfo  = GlobalAlloc (GHND, sizeof (FABITMAPINFO));
  lpFABitmapInfo = (LPFABITMAPINFO) GlobalLock (hFABitmapInfo);

  ITE.hFABitmapInfo                  = hFABitmapInfo;

  lpFABitmapInfo->wFlags             = FAB_INITIALLOAD;
  lpFABitmapInfo->hWnd               = hWnd;
  lpFABitmapInfo->hWndPopup          = ITE.hwndPopup;
  lpFABitmapInfo->nPopupWndWidth     = 0;            /* Use default width */
  lpFABitmapInfo->nPopupWndHeight    = 0;            /* Use default height */
  lpFABitmapInfo->nPopupWndPosSU     = 0;            /* Return pos of 0 to DLL */
  lstrcpy (lpFABitmapInfo->szBuffer, szBuffer);

  GlobalUnlock (hFABitmapInfo);

  /* Ask the server to open the default image file. */

  /* If the server isn't active yet, then queue up the messages.
     When the server calls LibInit2, we'll post it any queued
     up messages. */

  if (!hWndServer)
    {
      LPMSG lpMsg;

      if (!hQueuedServerMessages)
        {
          hQueuedServerMessages = GlobalAlloc (GHND, sizeof (MSG) * 20);
          nQueuedServerMessages = 0;
        }

      lpMsg = (LPMSG) GlobalLock (hQueuedServerMessages);
      lpMsg += nQueuedServerMessages++;   // Adds nQueuedServerMessage * sizeof (MSG) to lpMsg

      lpMsg->hwnd     = 0;   /* We know we're posting these to the server, so this can be anything. */
      lpMsg->message  = FA_OPENBITMAPFILE;
      lpMsg->wParam   = (WPARAM) hFABitmapInfo;
      lpMsg->lParam   = NULL;

      GlobalUnlock (hQueuedServerMessages);

      return;
    }

  PostMessage (hWndServer,
               FA_OPENBITMAPFILE,
               (WPARAM) hFABitmapInfo,
               //NULL);
               MAKELPARAM (hWnd, 0)); // Server doesn't need this.  It just helps during debugging
                                      // to have the handle of the window that posted this message
                                      // to be visible in the debug log.
}

long    __loadds WINAPI   SubClassProc
  (
    HWND     hWnd,
    unsigned iMessage,
    WORD     wParam,
    LONG     lParam
  )
```

```

{
  int                  nInstanceTableIx;
  long                 lReturnValue;
  int                  nBitmapDisp;
  int                  nMousePos;
  int                  nMouseDisp;
  int                  nNewBitmapPos;
  int                  nColorsChanged;
  int                  nHeight;
  int                  i, j, nLen;
  char                 *pchBuffer;
  HANDLE               hGlobalMemory;
  LPSTR                lpGlobalMemory;
  HDC                  hWindowDC;
  HDC                  hSaveDC;
  HBITMAP              hSaveBitmap;
  RECT                 Rect;
  LPSTR                lpBitmap;
  LPWINDOWPOS          lpWindowPos;
  LPNCCALCSIZE_PARAMS lpCalcSizeParams;
  HPALETTE             hOldPal;
  HDC                  hDC;
  HANDLE               hpe;
  LPPALETTEENTRY       lppe;
  LRESULT              lResult;
  char                 szBuffer[100];
  DWORD                dWord;
  HANDLE               hFABitmapInfo;
  LPFABITMAPINFO       lpFABitmapInfo;
  HWND                 hWndPrevious;
  LPWND_3_1            lpwndPopup, lpwndApp, lpwndPrevious;
  register LPINSTANCE_TABLE_ENTRY lpITE;
         HRGN                   hVisibleRgn;

#if 0
  MSG   msg;

  msg.hwnd    = hWnd;
  msg.message = iMessage;
  msg.wParam  = wParam;
  msg.lParam  = lParam;

  DebugOutputMessage (&msg);
#endif


//DebugPrintf (">SubClassProc");

  /* Find the window handle in the instance table */

  lpITE = (LPINSTANCE_TABLE_ENTRY) &InstanceTable;

  for (nInstanceTableIx = 0; nInstanceTableIx < nInstanceTableEntries; nInstanceTableIx++, lpITE++)
    if (lpITE->hWnd == hWnd)
      break;

  if (nInstanceTableIx == nInstanceTableEntries)
    {
      DebugBreak ();
      FatalExit (1);
    }

  if (!IsWindow (lpITE->hwndPopup))
    DebugPrintf ("hwndPopup = %.4X, not a valid window handle", lpITE->hwndPopup);

  /* Don't do anything if the window is iconic. */

  if (IsIconic (hWnd))
    return CallWindowProc (lpITE->lpfnOldClassProc, hWnd, iMessage, wParam, lParam) ;

  /* Check to see if it's a registered message. */

  if (iMessage == unBitmapLoadedMessage)
    {
      lpFABitmapInfo = (LPFABITMAPINFO) GlobalLock (ITE.hFABitmapInfo);

      /* If there are any bitmap related objects allocated, free them. */

      FreePopupObjects (nInstanceTableIx);

      ITE.hDDPictBitmap    = lpFABitmapInfo->hDDPictBitmap;
      ITE.hPictPalette     = lpFABitmapInfo->hPictPalette;
  //  ITE.nPopupWndWidth set below - do not set here
      ITE.nPopupWndHeight = lpFABitmapInfo->nPopupWndHeight;
      ITE.nBitmapWidth     = lpFABitmapInfo->nBitmapWidth;
      ITE.nBitmapHeight    = lpFABitmapInfo->nBitmapHeight;
      lstrcpy (ITE.szCurrentPictFile, lpFABitmapInfo->szBuffer);

      GetWindowRect (hWnd, &Rect);
      CalcSize (nInstanceTableIx, &Rect);

      if (lpFABitmapInfo->wFlags & FAB_REPLACE)
        {
          //DebugPrintf ("FAB_REPLACE is set");

          /* Subtract from nPopupWndPosSU the difference between the
             widths of the new image and the old image.  This will keep
             the right edge of the new image aligned with the right
             edge of the old image. */
```

```
            ITE.nPopupWndPosSU -= lpFABitmapInfo->nPopupWndWidth - lpITE->nPopupWndWidth;

            ITE.nPopupWndWidth  = lpFABitmapInfo->nPopupWndWidth;

            /* Because fPhotoRolledUp is TRUE, a snapshot of the non client area will be taken
               and saved in lpITE->hSaveNonClientBitmap. */

            SendMessage (hWnd, WM_NCPAINT, 1, NULL);

            /* Position the window just below the caption bar. */

            SetWindowPos (ITE.hwndPopup,
                          HWND_TOP,
                          ITE.nPopupWndPosSU,
                          ITE.nMenuTop + nDrawerFrames,
                          ITE.nPopupWndWidth,
                          0,
                          SWP_NOZORDER | SWP_NOACTIVATE);

          PostMessage (hWnd, unRollupMessage, ROLLDOWN, NULL);
        }
      else
        {
          /* We are either showing the photo for the first time, or we're
             replacing the existing photo with the same resized photo. */

          ITE.nPopupWndWidth  = lpFABitmapInfo->nPopupWndWidth;

          if (lpFABitmapInfo->wFlags & FAB_RESIZE)
            ITE.nPopupWndPosSU = lpFABitmapInfo->nPopupWndPosSU;
          else
            {
              ITE.nPopupWndPosSU = ITE.rectCaption.right - ITE.nPopupWndWidth - 25;

              /* First time any photo is being displayed.  Take a snapshot of the
                 caption bar. */

              ITE.fPhotoRolledUp = TRUE;
              SendMessage (hWnd, WM_NCPAINT, 1, NULL);
              ITE.fPhotoRolledUp = FALSE;
            }

          InvalidateRect (ITE.hwndPopup, NULL, FALSE);

          SetWindowPos (ITE.hwndPopup,
                        HWND_TOP,
                        ITE.nPopupWndPosSU,
                        ITE.rectCaption.top,
                        ITE.nPopupWndWidth,
                        ITE.nPopupWndHeight,
                        SWP_NOZORDER | SWP_NOACTIVATE | (IsWindowVisible (hWnd) ? SWP_SHOWWINDOW : 0));
        }

      GlobalUnlock (ITE.hFABitmapInfo);
      GlobalFree   (ITE.hFABitmapInfo);

      ITE.hFABitmapInfo = 0;
    }
  else
  if (iMessage == unRollupMessage)
    {
      /* wParam == ROLLUP   : roll up   sequence
         wParam == ROLLDOWN : roll down sequence

         LOWORD (lParam) == hFABitmapInfo */

      /* Make sure we have a bitmap before we try to roll anything up.
         If the server fails to load an initial bitmap, we can still
         get rollup messages. */

      if (!lpITE->hDDPictBitmap)
        return (0L);

      /* Make sure we not don't already have a rollup in progress.  It's
         possible that the server post a rollup message while we're still
         processing a previous rollup message that was posted by the server.
         This is the case if it takes a long time to rollup a window (which
         often happens while debugging and could also happen with large
         pictures.  Also, if we're rolled up and have already requested
         that the server load a new bitmap, ignore any ROLLUP requests
         from the server. */

      if (lpITE->fRollupInProgress || (lpITE->fPhotoRolledUp && wParam == ROLLUP))
        return (0L);

                        /* Make sure the popup window is visible.  A window which would be visible, but isn't
                           because
                                another window completely obscures it, is still cønsidered visible by
                                    Windows.  Only windows
                                that have been hiden (SW_HIDE) are not visible. */

                        if (!IsWindowVisible (lpITE->hwndPopup))
                              return (0L);

                        /* At this point the following is true: The popup window has a bitmap.
                                A rollup (either up or down) is not in progress.  If the window
                                is rolled up (it may not be) then wParam == ROLLDOWN (i.e. we're
                                not trying to roll up a window which has already been rolled up).
                                Now we'd like to know if the popup window is completely obscured
                                by another window.  Normally, this is an easy thing to do.  You
                                get the windows visible region and test to see if that region's
                                bounding rectangle is empty.  However, the situation is complicated
                                by the fact that the popup window may be rolled up, i.e. its height
                                is zero.  In that situation you have a window that, if its height
                                were not zero, it would be visible.  Because its height is zero
                                though, the test we do to determine if the window is obscured
                                gives us the wrong answer.  We are led to believe that the window
                                is obscured when in reality, it's not, it just has zero height.
                                Instead of investing a lot of time and effort to differentiate
                                a truly obscured window with one that's not obscured but has
                                height zero, we make a compromise.  If the window is not rolled
                                up and its visible region's bounding rectangle is empty, then
                                the window really is obscured.  On the other hand, if the
                                window is rolled up, then we don't know if the window is really
                                obscured or if Windows just thinks it is because it has height
                                zero.  In the former case we ignore the rollup message.  In
                                the latter case, we process the rollup message.  The result
                                of this is that we may rollup a window that really is not
                                visible.  However, once it's rolled up, then we'll forever
                                ignore subsequent rollup messages (until it's no longer
                                obscured anyway). */

                        /* Get the popup window's visible region. */

                        hDC = GetDC (lpITE->hwndPopup);
                        hVisibleRgn = InquireVisRgn (hDC);
                        ReleaseDC (lpITE->hwndPopup, hDC);

                        if (!hVisibleRgn)
                              return (0L);      // I have *never* seen a visible region == NULL

                        /* See if its region is empty */

                        GetRgnBox (hVisibleRgn, &Rect);

                        if (IsRectEmpty (&Rect) && !lpITE->fPhotoRolledUp)
                              return (0L);

                        lpITE->fRollupInProgress = TRUE;  // 9/30

      lpITE->hFABitmapInfo = LOWORD (lParam);

      /* We're going to start sending timer messages to the application.  Set
         fRollupInProgress to TRUE so we'll know not to send the timer
         messages along to the application. */

      lpITE->fRollupInProgress  = TRUE;
      lpITE->fHook_WM_NCPAINT   = TRUE;
      lpITE->nScanLinesPerTick  = 6;
      lpITE->nTimePerTick       = 50;  /* milliseconds */

      //DebugPrintf ("Request to rollup window.");

      if (wParam == ROLLDOWN)
        {
          /* Roll down sequence */

          lpITE->nRollupTicks     = lpITE->nPopupWndHeight / lpITE->nScanLinesPerTick;
          SetTimer (hWnd, ROLLDOWNSEQ_DOWN, lpITE->nTimePerTick, (FARPROC) NULL);

          /* Set nRollupTimerTick to one more than the initial value because the first thing
             that happens upon receiving a ROLLDOWNSEQ_DOWN message is to decrement
             nRollupTimerTick.  We don't want to draw with one value of nRollupTimerTick and
             then increment or decrement it (depending on the message) because an intervening
             WM_NCPAINT message (caused by resizing the window during a rollup or rolldown)
             will cause the popup to be repainted.  If the value of nRollupTimerTick has
             changed (because it was incremented or decremented immediatly after drawing)
             the processing of the WM_NCPAINT will cause the popup to be painted
             nScanLinesPerTick to high or to low. */

          lpITE->nRollupTimerTick = lpITE->nRollupTicks + 1;
          lpITE->fDrawerVisible   = TRUE;
          lpITE->fPhotoRolledUp   = FALSE;
        }
      else
        {
          /* Roll up sequence */

          /* Compute how many timer ticks are required to roll down the popup window such
             that the top of the window is just below the caption bar. */

          lpITE->nRollupTicks = (GetSystemMetrics (SM_CYSIZE) + GetSystemMetrics (SM_CYBORDER)) /
               lpITE->nScanLinesPerTick;

          SetTimer (hWnd, ROLLUPSEQ_DOWN, lpITE->nTimePerTick, (FARPROC) NULL);

          /* Set nRollupTimerTick to one less than the initial value because the first thing
             that happens upon receiving a ROLLUPSEQ_DOWN message is to increment
             nRollupTimerTick.  See above comment. */

          lpITE->nRollupTimerTick = -1;
        }

      /* Because fRollupInProgress is TRUE, a snapshot of the non client area will be taken
         and saved in lpITE->hSaveNonClientBitmap. */

      SendMessage (hWnd, WM_NCPAINT, 1, NULL);
```

```
        //DebugPrintf ("unRollupMessage processing done.  Snapshot of caption bar taken");

        return (0L);
      }

    switch (iMessage)
      {
        case WM_TIMER:
          if (!lpITE->fRollupInProgress)
            return (CallWindowProc (lpITE->lpfnOldClassProc, hWnd, iMessage, wParam, lParam));

          //DebugPrintf ("nRollupTimerTick = %d, nRollupTicks = %d, nDrawerFrames = %d",
          //               ITE.nRollupTimerTick, ITE.nRollupTicks, nDrawerFrames);

          /* When compiled with SINGLESTEPDRAWER defined, a single WM_TIMER
             message is processed with each toggle of the Scroll Lock
             key.  This allows us to easily do screen captures of the
             drawer opening and closing to create promotional material. */

#ifdef SINGLESTEPDRAWER
          if (!(GetKeyState (VK_SCROLL) & 1))
            {
              fSingleStepDrawer = TRUE;
              return (0L);
            }

          if (!fSingleStepDrawer)
            return (0L);

          fSingleStepDrawer = FALSE;
#endif

          switch (wParam)
            {
              case ROLLUPSEQ_DOWN:
                lpITE->nRollupTimerTick++;

                if (lpITE->nRollupTimerTick < lpITE->nRollupTicks)
                  {
                    lpITE->fHook_WM_NCPAINT = FALSE;

                    SetWindowPos (lpITE->hwndPopup,
                                  HWND_TOP,
                                  lpITE->nPopupWndPosSU,
                                  lpITE->rectCaption.top +
                                    ((lpITE->nRollupTimerTick == lpITE->nRollupTicks - 1) ?
                                      GetSystemMetrics (SM_CYSIZE) + GetSystemMetrics (SM_CYBORDER) :
                                      (lpITE->nRollupTimerTick + 1) * lpITE->nScanLinesPerTick),
                                  0,
                                  0,
                                  SWP_NOSENDCHANGING | SWP_NOSIZE | SWP_NOZORDER | SWP_NOACTIVATE);

                    lpITE->fHook_WM_NCPAINT = TRUE;
                    break;
                  }

                /* Compute how many timer ticks are required to roll up the popup window.  */

                lpITE->nRollupTicks     = lpITE->nPopupWndHeight / lpITE->nScanLinesPerTick;
                lpITE->nRollupTimerTick = -1;

                KillTimer (hWnd, ROLLUPSEQ_DOWN);
                SetTimer (hWnd, ROLLUPSEQ_UP,  lpITE->nTimePerTick, (FARPROC) NULL);

                lpITE->nDrawerTimerTick = 0;
                lpITE->fDrawerVisible   = TRUE;
                break;

              case ROLLUPSEQ_UP:
                lpITE->nRollupTimerTick++;

                if (!lpITE->nRollupTimerTick)
                  {
                    ShowDrawer (NULL, nInstanceTableIx);

                    lpITE->fHook_WM_NCPAINT = FALSE;

                    SetWindowPos (lpITE->hwndPopup,
                                  HWND_TOP,
                                  lpITE->nPopupWndPosSU,
                                  lpITE->nMenuTop + nDrawerFrames,
                                  lpITE->nPopupWndWidth,
                                  lpITE->nPopupWndHeight - nDrawerFrames,
                                  SWP_NOREDRAW | SWP_NOSENDCHANGING | SWP_NOZORDER | SWP_NOACTIVATE);

                    InvalidateRect (lpITE->hwndPopup, NULL, TRUE);
                    UpdateWindow (lpITE->hwndPopup);

                    lpITE->fHook_WM_NCPAINT = TRUE;
                    break;
                  }

                lpITE->fHook_WM_NCPAINT = FALSE;

                if (ShowDrawer (NULL, nInstanceTableIx) == nDrawerFrames)
                  {
                    ScrollWindowEx (lpITE->hwndPopup, 0, - lpITE->nScanLinesPerTick, NULL, NULL, NULL, NULL, 0);

                    SetWindowPos (lpITE->hwndPopup,
                                  HWND_TOP,
                                  0,
                                  0,
                                  lpITE->nPopupWndWidth,
                                  lpITE->nPopupWndHeight - nDrawerFrames - lpITE->nRollupTimerTick *
                                      lpITE->nScanLinesPerTick,
                                  SWP_NOMOVE | SWP_NOZORDER | SWP_NOACTIVATE);
                  }
                else
                  {
                    SetWindowPos (lpITE->hwndPopup,
                                  HWND_TOP,
                                  0,
                                  0,
                                  lpITE->nPopupWndWidth,
                                  0,
                                  SWP_NOMOVE | SWP_NOZORDER | SWP_NOACTIVATE);
                  }

                lpITE->fHook_WM_NCPAINT = TRUE;

                if (lpITE->nRollupTimerTick == lpITE->nRollupTicks)
                  {
                    KillTimer (hWnd, ROLLUPSEQ_UP);
                    lpITE->fRollupInProgress = FALSE;
                    lpITE->fDrawerVisible    = FALSE;
                    lpITE->fPhotoRolledUp    = TRUE;

                    /* Because fPhotoRolledUp is TRUE, sending a WM_NCPAINT will
                       cause the "drawer has something in it" bitmap to be drawn
                       on the caption bar. */

                    SendMessage (hWnd, WM_NCPAINT, 1, NULL);

                    /* At this point we are completely done rolling up the bitmap.  The popup window
                       is still "visible" only its height is now zero and the caption bar indicates
                       that there is an image "inside" it.  If the szNextPictFile field of the instance
                       table does not indicate that a new image should be displayed, then we're done.
                       When the user clicks on the portion of the caption bar that indicates where the
                       rolled up bitmap is "hiding" the roll down process will begin.  If, on the
                       other hand, szNextPictFile does contains a file name, we load that bitmap
                       and then automatically start the roll down process. */

                    if (!lpITE->hFABitmapInfo)
                      break;

                    /* Ask the server to open the file. BrowseImageFiles
                       has already populated the FABITMAPINFO structure,
                       which includes the name of the file to open. */

                    if (hWndServer)
                      PostMessage (hWndServer,
                                   FA_OPENBITMAPFILE,
                                   (WPARAM) lpITE->hFABitmapInfo,
                                   NULL);

                  }  /* End if (lpITE->nRollupTimerTick == lpITE->nRollupTicks) */

                break;

              case ROLLDOWNSEQ_DOWN:
                lpITE->nRollupTimerTick--;

                if (lpITE->nRollupTimerTick < 0)
                  {
                    KillTimer (hWnd, ROLLDOWNSEQ_DOWN);

                    lpITE->nRollupTicks = (GetSystemMetrics (SM_CYSIZE) + GetSystemMetrics (SM_CYBORDER)) /
                        lpITE->nScanLinesPerTick;

                    SetTimer (hWnd, ROLLDOWNSEQ_UP, lpITE->nTimePerTick, (FARPROC) NULL);

                    lpITE->fDrawerVisible   = FALSE;
                    lpITE->nRollupTimerTick = lpITE->nRollupTicks;
                    break;
                  }

                if (!lpITE->nRollupTimerTick)
                  {
                    ShowDrawer (NULL, nInstanceTableIx);

                    lpITE->fDrawerVisible   = FALSE;
                    lpITE->fHook_WM_NCPAINT = FALSE;

                    SetWindowPos (lpITE->hwndPopup,
                                  HWND_TOP,
                                  lpITE->nPopupWndPosSU,
                                  lpITE->nMenuTop,
                                  lpITE->nPopupWndWidth,
                                  lpITE->nPopupWndHeight,
                                  SWP_NOREDRAW | SWP_NOSENDCHANGING | SWP_NOZORDER | SWP_NOACTIVATE);

                    InvalidateRect (lpITE->hwndPopup, NULL, TRUE);
                    UpdateWindow (lpITE->hwndPopup);

                    lpITE->fHook_WM_NCPAINT = TRUE;
                    break;
                  }

                if (ShowDrawer (NULL, nInstanceTableIx) == nDrawerFrames)
                  {
```

```
                i = lpITE->nPopupWndHeight - nDrawerFrames - lpITE->nRollupTimerTick * lpITE->nScanLinesPerT
                    ick;

                SetWindowPos (lpITE->hwndPopup,
                              HWND_TOP,
                              0,
                              0,
                              lpITE->nPopupWndWidth,
                              i,
                              SWP_NOSENDCHANGING | SWP_NOMOVE | SWP_NOZORDER | SWP_NOACTIVATE | ((i >
                                  lpITE->nScanLinesPerTick) ? SWP_NOREDRAW : 0));

                if (i > lpITE->nScanLinesPerTick)
                  {
                    ScrollWindowEx (lpITE->hwndPopup, 0, lpITE->nScanLinesPerTick, NULL, NULL, NULL, NULL,
                        SW_INVALIDATE | SW_ERASE);
                    UpdateWindow (lpITE->hwndPopup);
                  }
              }
            else
              {
                SetWindowPos (lpITE->hwndPopup,
                              HWND_TOP,
                              0,
                              0,
                              lpITE->nPopupWndWidth,
                              0,
                              SWP_NOSENDCHANGING | SWP_NOMOVE | SWP_NOZORDER | SWP_NOACTIVATE);
              }

            lpITE->fHook_WM_NCPAINT = TRUE;
            break;

          case ROLLDOWNSEQ_UP:
            lpITE->nRollupTimerTick--;

            if (lpITE->nRollupTimerTick >= 0)
              {
                lpITE->fHook_WM_NCPAINT = FALSE;

                SetWindowPos (lpITE->hwndPopup,
                              HWND_TOP,
                              lpITE->nPopupWndPosSU,
                              lpITE->rectCaption.top +
                                lpITE->nRollupTimerTick * lpITE->nScanLinesPerTick,
                              0,
                              0,
                              SWP_NOSENDCHANGING | SWP_NOSIZE | SWP_NOZORDER | SWP_NOACTIVATE);

                lpITE->fHook_WM_NCPAINT = TRUE;
                break;
              }


            KillTimer (hWnd, ROLLDOWNSEQ_UP);

            lpITE->fRollupInProgress = FALSE;
            lpITE->fDrawerVisible    = FALSE;
            break;
        }

      return (0L);  /* Don't let the application see this message. */

    case WM_NCRBUTTONDBLCLK:
      if (fRButtonDblClk && wParam == HTSYSMENU)
        ExitWindows (0, 0);

      return CallWindowProc (lpITE->lpfnOldClassProc, hWnd, iMessage, wParam, lParam) ;

    case WM_QUERYNEWPALETTE:
      /* We have absolutely no idea what the subclassed application will do with
         the WM_QUERYNEWPALLETE message.  We want to know, however, if it
         updates the system palette (via the RealizePalette function).  Calling
         RealizePalette causes WM_PALETTECHANGED messages to be sent, as opposed
         to posted, if the system palette is indeed updated.  Therefore we clear
         a flag and let the subclassed application process the WM_QUERYNEWPALETTE
         message.  If the subclassed application receives a WM_PALETTECHANGED message
         then we set the flag.  After the WM_QUERYNEWPALETTE message has been
         processed, we examine the flag.  If it's clear we know the application
         did not update the system palette.  In that case, we realize the popup's
         pallete as a background palette here.  Otherwise it gets realized as a
         background palette during
         the processing of the WM_PALETTECHANGED message. */

      lpITE->fSystemPaletteChanged = FALSE;

      lReturnValue = CallWindowProc (lpITE->lpfnOldClassProc, hWnd, iMessage, wParam, lParam);

      if (!IsWindow (lpITE->hwndPopup))
        return (lReturnValue);

      /* Make sure the popup's been assigned a bitmap.  Just created popups don't
         have bitmaps.  At the time the popup is created, a request for a bitmap
         is posted to the server, but the server may take a while before
         posting back unBitmapLoadedMessage. */

      if (!lpITE->hDDPictBitmap)
        return (lReturnValue);

      if (!lpITE->fSystemPaletteChanged && IsWindow (lpITE->hwndPopup))
        {
          /* The application that we've subclassed has not changed
             the system palette.  We want to realize the popup window's
             palette, BUT the popup window is NOT the active window.
             The application's window is the active window.  If all the
             entries in the system palette are occupied (which is verly
             likey if we've ever displayed any photograph) Windows
             won't let us realize our palette (or at least not much
             of it) because we're NOT the active app.  If it did, it
             would have to kick out entries from other applications,
             includeing the active app.  This doesn't make much sense.
             So, like everything else in this program, we lie to
             Windows.  We get a DC for the app's window (which is
             the active window), and then
             select the popup window's palette into it.  This makes
             Windows happy.  It makes us happy too because it makes
             the popup window that's attached to the active app the
             best looking of all the popup windows (assuming there
             are more than one). */

          hDC = GetDC (hWnd);
          hOldPal = SelectPalette (hDC, ITE.hPictPalette, lpITE->fBackgroundPalette);

          RealizePalette (hDC);

          SelectPalette (hDC, hOldPal, lpITE->fBackgroundPalette);
          RealizePalette (hDC);
          ReleaseDC (hWnd, hDC);
        }

      return (lReturnValue);

    case WM_PALETTECHANGED:
      lReturnValue = CallWindowProc (lpITE->lpfnOldClassProc, hWnd, iMessage, wParam, lParam);

      lpITE->fSystemPaletteChanged = TRUE;

      if (!IsWindow (lpITE->hwndPopup))
        return (lReturnValue);

      /* Make sure the popup's been assigned a bitmap.  Just created popups don't
         have bitmaps.  At the time the popup is created, a request for a bitmap
         is posted to the server, but the server may take a while before
         posting back unBitmapLoadedMessage. */

      if (!lpITE->hDDPictBitmap)
        return (lReturnValue);

      /* The application DID realize a palette, so we don't want to
         stomp on the system palette and force the popup windows
         palette entries in.  On the other hand, there may be a few
         empty palette slots.  So we'll lie to Windows again, and
         tell it that the palette we're selecting IS for the
         active application (i.e. the DC we'll get will be for
         the app's window, not the popup's window).  Only this
         time we won't be so rude.  We'll ask that the palette
         be realized as a background palette.  If Windows can
         accomodate us, it will. */


      //hDC = GetDC (hWnd /* lpITE->hwndPopup */);
      hDC = GetDC (lpITE->hwndPopup);
      hOldPal = SelectPalette (hDC, ITE.hPictPalette, TRUE);

      RealizePalette (hDC);

      SelectPalette (hDC, hOldPal, TRUE);
      RealizePalette (hDC);
      //ReleaseDC (hWnd /* lpITE->hwndPopup */, hDC);
      ReleaseDC (lpITE->hwndPopup, hDC);

      return (lReturnValue);

    case WM_DESTROY:
      /* Un-subclass the application and
         remove its entries from FotoAttacher's tables. */

      UnhookApplication (TRUE, nInstanceTableIx);

      /* At this point, we've already converted the popup into a child
         (we did this when the app window was hidden, which happens
         shortly before receiving the WM_DESTROY message).  Because the
         popup is owned by the app, it would be destroyed even if we
         hadn't converted it to a child (i.e. we didn't convert it to
         a child simply to faciliate its destruction). */

      return CallWindowProc (lpITE->lpfnOldClassProc, hWnd, iMessage, wParam, lParam) ;

    case WM_NCHITTEST:
      /* If popup has not been snapped up, then don't even look at
         this message. */

      if (!lpITE->fSnap)
        return (CallWindowProc (lpITE->lpfnOldClassProc, hWnd, iMessage, wParam, lParam));
//DebugBreak();
      if ((int) LOWORD (lParam) < lpITE->nPopupWndPosSU - lpITE->nDrawerOverhang ||
          (int) LOWORD (lParam) > lpITE->nPopupWndPosSU + lpITE->nPopupWndWidth + lpITE->nDrawerOverhang)
        return (CallWindowProc (lpITE->lpfnOldClassProc, hWnd, iMessage, wParam, lParam));
      if ((int) HIWORD (lParam) < lpITE->rectCaption.top ||
```

```
        (int) HIWORD (lParam) > lpITE->rectCaption.bottom)
      return (CallWindowProc (lpITE->lpfnOldClassProc, hWnd, iMessage, wParam, lParam));

    /* Redraw the caption without the hidden drawer marker. */

    lpITE->fPhotoRolledUp = FALSE;

                                /* Because fPhotoRolledUp is now false, sending the window proc
                                       a WM_NCPAINT message will cause the caption bar to be
                                       repainted without the drawer coloring or deliniation lines. */

    SendMessage (hWnd, WM_NCPAINT, 1, NULL);

                                DebugBreak ();
    SetWindowPos (lpITE->hwndPopup,
                  HWND_TOP,
                  lpITE->nPopupWndPosSU,
                  lpITE->rectCaption.top,
                  lpITE->nPopupWndWidth,
                  lpITE->nPopupWndHeight,
                  SWP_SHOWWINDOW | SWP_NOZORDER | SWP_NOACTIVATE);

    /* Clear the fIdleMouseEnabled flag.  Normally this flag is set.
       The popup window captures the mouse the first time it sees
       any mouse movement.  Normally, it also starts the idle
       mouse timer.  With fIdleMouseEnabled set to FALSE, the
       idle mouse timer will not be started.  Once the popup
       window has the capture, any movement off of the window
       will reset fIdleMouseEnabled. Setting the flag to FALSE
       allows the user to keep the cursor on the popup window
       after we've made it reappear without it disappearing again
       due to another idle mouse condition. */

    lpITE->fIdleMouseEnabled = FALSE;
    lpITE->fSnap             = FALSE;

    return (0L);

  case WM_NCLBUTTONDOWN:
    if (wParam != HTCAPTION || !lpITE->fPhotoRolledUp)
      return (CallWindowProc (lpITE->lpfnOldClassProc, hWnd, iMessage, wParam, lParam));

    if (lpITE->fRollupInProgress)
      return (CallWindowProc (lpITE->lpfnOldClassProc, hWnd, iMessage, wParam, lParam));

    if ((int) LOWORD (lParam) < lpITE->nPopupWndPosSU - lpITE->nDrawerOverhang ||
        (int) LOWORD (lParam) > lpITE->nPopupWndPosSU + lpITE->nPopupWndWidth + lpITE->nDrawerOverhang)
      return (CallWindowProc (lpITE->lpfnOldClassProc, hWnd, iMessage, wParam, lParam));

    /* The left mouse button was depressed in the "drawer has something in it" region
       of the caption bar.  Start the roll down process. */

    SendMessage (hWnd, WM_NCPAINT, 1, NULL);

    PostMessage (hWnd, unRollupMessage, ROLLDOWN, NULL);

    //lpITE->fRollupInProgress = TRUE; 9/29

    /* Clear the fIdleMouseEnabled flag.  Normally this flag is set.
       The popup window captures the mouse the first time it sees
       any mouse movement.  Normally, it also starts the idle
       mouse timer.  With fIdleMouseEnabled set to FALSE, the
       idle mouse timer will not be started.  Once the popup
       window has the capture, any movement off of the window
       will reset fIdleMouseEnabled. Setting the flag to FALSE
       allows the user to keep the cursor on the popup window
       after we've made it reappear without it disappearing again
       due to another idle mouse condition. */

    lpITE->fIdleMouseEnabled = FALSE;
    return (0L);

  case WM_SETTEXT:
    /* The default processing of the WM_SETTEXT message changes
       the caption text field of the window structure. If the
       window is visible, the new caption text is displayed in
       the caption of the window.  Thus, if the window is visible,
       a WM_NCPAINT message is produced to repaint the caption
       bar.  How does DefWindowProc get the text out of the
       window structure when painting the caption bar?
       It doesn't.  It just sends the
       window a WM_GETTEXT message and lets DefWindowProc
       return the caption text.  So, before DefWindowProc
       returns from processing the WM_SETTEXT message,
       a WM_GETTEXT message will have been (recursively) received
       and processed.  We wan't the behavior of the processing
       of the WM_GETTEXT message to be modified.  Instead of
       just returning the caption text, we want the time and
       date appended to the caption text.  Setting
       bModifyCaptionText to TRUE, tells the WM_GETTEXT
       case to append the time and date. */

    //DebugPrintf ("Start settext message processing");
    //DebugPrintf ("WM_SETTEXT setting text to %s", (LPSTR) lParam);

    lpITE->bModifyCaptionText = fClockOnCaption;

    /* Only set hooks if a bitmap has been loaded. */

    if (lpITE->hDDPictBitmap)
      {
        lpITE->fHookInternalGetRelease = TRUE;

        if (!nHookInternalGetRelease)
          {
            npHookInternalGetWindowDC = SetProcAddress (lpfnInternalGetWindowDC, NewInternalGetWindowDC,
                FALSE);  /* hack, hack */
            npHookInternalReleaseDC   = SetProcAddress (lpfnInternalReleaseDC,   NewInternalReleaseDC,
                FALSE);  /* hack, hack */

            //DebugPrintf ("SetProcAddress (lpfnInternalGetWindowDC) = %.4X", npHookInternalGetWindowDC);
            //DebugPrintf ("SetProcAddress (lpfnInternalReleaseDC)   = %.4X", npHookInternalReleaseDC);
          }

        nHookInternalGetRelease++;
      }

    lReturnValue = CallWindowProc (lpITE->lpfnOldClassProc, hWnd, iMessage, wParam, lParam);

    if (lpITE->hDDPictBitmap)
      {
        nHookInternalGetRelease--;

        if (!nHookInternalGetRelease)
          {
            SetProcRelease (npHookInternalGetWindowDC);
            SetProcRelease (npHookInternalReleaseDC);

            //DebugPrintf ("SetProcRelease (%.4X) = %d", npHookInternalGetWindowDC, SetProcRelease
                (npHookInternalGetWindowDC));
            //DebugPrintf ("SetProcRelease (%.4X) = %d", npHookInternalReleaseDC,   SetProcRelease
                (npHookInternalReleaseDC));
          }

        lpITE->fHookInternalGetRelease = FALSE;
      }

    lpITE->bModifyCaptionText = FALSE;

    //DebugPrintf ("End settext message processing");

    return lReturnValue;

  case WM_GETTEXT:
    //DebugPrintf ("Start gettext message processing");

    /* bModifyCaptionText is set to TRUE when we know that the
       caption text will be used to paint the caption bar.  If
       it's not TRUE (i.e. the text will be used for some purpose
       other than painting the caption bar) then we want the
       WM_GETTEXT message to behave normally.  If it is TRUE,
       then we append the date and time. */

    if (!lpITE->bModifyCaptionText)
      {
        lReturnValue = CallWindowProc (lpITE->lpfnOldClassProc, hWnd, iMessage, wParam, lParam) ;

        //DebugPrintf ("WM_GETTEXT returning %s", (LPSTR) lParam);
        //DebugPrintf ("End gettext message processing");

        return lReturnValue;
      }

    hGlobalMemory  = GlobalAlloc (GHND, 200L);
    lpGlobalMemory = GlobalLock  (hGlobalMemory);

    CallWindowProc (lpITE->lpfnOldClassProc, hWnd, iMessage, 200, (LONG) lpGlobalMemory);

    /* Not all applications start with caption text (even though they
       have captions).  DefWindowProc sends the app a WM_GETTEXT when
       it paints the caption bar, so this is a good place to
       check to see this is the first time we've been made aware of
       what the caption text will be. */

    if (!ITE.fAppHasCaptionText && ((LPSTR) lpGlobalMemory)[0])
      {
        StartServerSession (nInstanceTableIx, hWnd, (LPSTR) lpGlobalMemory);
        ITE.fAppHasCaptionText = TRUE;
      }

    lstrcat (lpGlobalMemory, "   ");
    lstrcat (lpGlobalMemory, szTimeDate);

    /* Ensure that we don't copy more data into the message sender's
       buffer than it can accomodate. */

    ((LPSTR) lpGlobalMemory)[wParam - 1] = '\0';

    lReturnValue = lstrlen (lstrcpy ((LPSTR) lParam, lpGlobalMemory));

    //DebugPrintf ("WM_GETTEXT returning %s", (LPSTR) lParam);

    GlobalUnlock (hGlobalMemory);
    GlobalFree   (hGlobalMemory);

    //DebugPrintf ("End gettext message processing");

    return (lReturnValue);

  case WM_NCACTIVATE:
```

```
        /* Set fActive for the current window so that if the popup is rolled up,
           we know with what color to mark the caption bar. */

        lpITE->fActive = wParam;

        /* Likewise, lookup the window that is being deactivated if the current window is
           being activated, or activated if the current window is being deactivated and
           set that window's fActive. */

        for (i = 0; i < nInstanceTableEntries; i++)
          if (InstanceTable[i].hWnd == LOWORD (lParam))
            break;

        if (i < nInstanceTableEntries)
          InstanceTable[i].fActive = !wParam;

        /* At some point during the processing of the WM_SYSCOMMAND, wParam = SC_PREVWINDOW command,
           Windows executes the following instruction:

             707:0a1a  mov [01ea], di   (debug 3.1)

             This instruction stores the window handle of the window that is about to be activated
             in USER's default data segment.

             Later, during processing of the WM_NCACTIVATE message, within the code that actually
             paints the caption bar, windows executes the following instruction:

             487:b59b  cmp  [01ea], 0  (debug 3.1)

             If the result is zero, Windows calls GetWindowText (which results in a WM_GETTEXT message) to
             get the caption title.  If the result is not zero, Windows gets the caption title from some
             saved area and does not call GetWindowText.  When this happens, no WM_GETTEXT message is
             sent,  denying us the opportunity to append to the caption title the clock info.  The result
             is that the caption is repainted without the clock info.  So, we boldy go where no programmer
             has gone before, and stuff a zero in the USER's default data segment.  This forces Windows
             to call GetWindowText and allows us to append the clock info. */

      * (WORD *) MAKEP (wDefUserHeap, wOffsetCallGetWindowText) = 0;  /* Hackity hack, don't talk back! */

        /* Now, if WE are being activated and our popup window is not rolled up, then
           see if ok to realize the palette. */

//      if (wParam && !ITE.fPhotoRolledUp)
//        {
//        DebugBreak ();
//        SendMessage (hWnd, WM_QUERYNEWPALETTE, 0, NULL);
//        }

        /* Fall thru */

      case WM_NCPAINT:
        //DebugPrintf ("Bitmap start message processing");

      /* The default window procecure, upon receipt of a WM_NCACTIVATE or
         WM_NCPAINT message may (not always) redraw the caption bar.  When
         it does, it sends itself a WM_GETTEXT message.  If we've
         received either a WM_NCACTIVATE or WM_NCPAINT message we set a
         flag in the instance table.  If the flag is set this sublcass
         procedure modifies the way the WM_GETTEXT message is processed
         by appending to the text the date string.  If the flag is not
         set then the WM_GETTEXT message is passed directly to the
         default window procedure. */

        lpITE->bModifyCaptionText = fClockOnCaption;

        /* If the application window is being destroyed, it will be made
           hidden before the WM_DESTROY message is received.  Immediately after
           it has been hidden (i.e. after returning from EndDeferWindowPos)
           the WM_WINDOWPOSCHANGED message will be received.  During the
           call to DeferWindowPos to hide the app window, we converted the
           popup to a child so that it would be hidden at the exact instant
           the app window was hidden.  If the app window is hidden now,
           don't convert the child back into a popup. */

        if ((GetWindowLong (hWnd, GWL_STYLE) & WS_VISIBLE) && ISCHILD (hWnd, lpITE->hwndPopup))
          {
          ChildToPopup (hWnd, lpITE->hwndPopup);
          RedrawWindow (lpITE->hwndPopup, NULL, NULL, RDW_FRAME | RDW_INVALIDATE | RDW_UPDATENOW);
          ShowWindow (lpITE->hwndPopup, SW_SHOWNORMAL);
#if 0
            {
            RECT  rectPopup;

            GetWindowRect (lpITE->hwndPopup, &rectPopup);

            if (rectPopup.top != lpITE->rectCaption.top ||
                rectPopup.left < lpITE->nPopupWndPosSU    ||
                rectPopup.right > lpITE->nPopupWndPosSU + lpITE->nPopupWndWidth)
              {
              DebugPrintf ("Popup has become disconnected from caption bar");
              DebugPrintf ("Popup rect (l, t, r, b) = (%4d, %4d, %4d, %4d)", RECT_LTRB (&rectPopup));
              DebugPrintf ("rectCaption.top = %d, nPopupWndPosSU = %d, nPopupWndPosSU + nPopupWndWidth =
                  %d",
                          lpITE->rectCaption.top, lpITE->nPopupWndPosSU, lpITE->nPopupWndPosSU +
                            lpITE->nPopupWndWidth);
              }
            }
#endif
          }

        /* Let Windows redraw the non-client area.   When Windows attempts to release the compatible DC
           that it used to paint the non-client area, ReleaseCompatibleDC will be called.  This will
           copy the bitmap in the compatible DC to the actual device so that the non-client area will
           actually be re-drawn.  It will then lookup the hWnd in the Instance Table and
           create a bitmap that contains the portion of the caption bar that we're interested in.
           Because the compatible DC's clipping and visible region enclose the entire bitmap, the
           resultant non-client area that will be drawn in the bitmap won't have the image of the
           popup window in it, even if the popup window is sitting on top of the caption bar or even
           if the "drawer" for the popup window is partially open.
           The handle to the bitmap will be stored in the table.  The device DC will then be released
           and the compatible DC which Windows actually drew in will be deleted. */

        if (!lpITE->fPhotoRolledUp && (!lpITE->fRollupInProgress || !lpITE->fHook_WM_NCPAINT))
          {
          //DebugPrintf ("Either rollup not in progress or we're not hooking WM_NCPAINT. Bitmap and message
              processing");

          lReturnValue = CallWindowProc (lpITE->lpfnOldClassProc, hWnd, iMessage, wParam, lParam);
          lpITE->bModifyCaptionText = FALSE;
          return (lReturnValue);
          }

        //DebugPrintf ("Rollup in progress");

        if (lpITE->hDDPictBitmap)
          {
          lpITE->fHookInternalGetRelease = TRUE;

          if (!nHookInternalGetRelease)
            {
            npHookInternalGetWindowDC = SetProcAddress (lpfnInternalGetWindowDC, NewInternalGetWindowDC,
                FALSE);  /* hack, hack */
            npHookInternalReleaseDC   = SetProcAddress (lpfnInternalReleaseDC,   NewInternalReleaseDC,
                FALSE);  /* hack, hack */

            //DebugPrintf ("SetProcAddress (lpfnInternalGetWindowDC) = %.4X", npHookInternalGetWindowDC);
            //DebugPrintf ("SetProcAddress (lpfnInternalReleaseDC)   = %.4X", npHookInternalReleaseDC);
            }

          nHookInternalGetRelease++;
          }

        lReturnValue = CallWindowProc (lpITE->lpfnOldClassProc, hWnd, iMessage, wParam, lParam);

        if (lpITE->hDDPictBitmap)
          {
          nHookInternalGetRelease--;

          if (!nHookInternalGetRelease)
            {
            SetProcRelease (npHookInternalGetWindowDC);
            SetProcRelease (npHookInternalReleaseDC);

            //DebugPrintf ("SetProcRelease (%.4X) = %d", npHookInternalGetWindowDC, SetProcRelease
                (npHookInternalGetWindowDC));
            //DebugPrintf ("SetProcRelease (%.4X) = %d", npHookInternalReleaseDC,   SetProcRelease
                (npHookInternalReleaseDC));
            }

          lpITE->fHookInternalGetRelease = FALSE;
          }

        lpITE->bModifyCaptionText = FALSE;
        //DebugPrintf ("Bitmap end message processing");
        return (lReturnValue);

      case WM_WINDOWPOSCHANGED:

      /* Can get WM_EXITSIZEMOVE without first getting WM_WINDOWPOSCHANGED.  I've seen this
         happen when you maximize a window by double clicking on the caption bar or activate
         an inactive window.  In fact, these
         are two of the instances where you do get the WM_WINDOWPOSCHANGING message, but never
         get the WM_WINDOWPOSCHANGED message.  */

      case WM_EXITSIZEMOVE:
        /* Return if hwndPopup is popup */

        if (ISPOPUP (hWnd, lpITE->hwndPopup))
          return (CallWindowProc (lpITE->lpfnOldClassProc, hWnd, iMessage, wParam, lParam));

        /* Return if hwndPopup isn't a child (it must therefore not exist) */

        if (!ISCHILD (hWnd, lpITE->hwndPopup))
          return (CallWindowProc (lpITE->lpfnOldClassProc, hWnd, iMessage, wParam, lParam));

        /* If the application window is being destroyed, it will be made
           hidden before the WM_DESTROY message is received.  Immediately after
           it has been hidden (i.e. after returning from EndDeferWindowPos)
           the WM_WINDOWPOSCHANGED message will be received.  During the
           call to DeferWindowPos to hide the app window, we converted the
           popup to a child so that it would be hidden at the exact instant
           the app window was hidden.  If the app window is hidden now,
           don't convert the child back into a popup. */

        if ((GetWindowLong (hWnd, GWL_STYLE) & WS_VISIBLE) && ISCHILD (hWnd, lpITE->hwndPopup))
          {
          ChildToPopup (hWnd, lpITE->hwndPopup);
          RedrawWindow (lpITE->hwndPopup, NULL, NULL, RDW_FRAME | RDW_INVALIDATE | RDW_UPDATENOW);
          ShowWindow (lpITE->hwndPopup, SW_SHOWNORMAL);
          }
```

```
#if 1
        {
          RECT  rectPopup;

          GetWindowRect (lpITE->hwndPopup, &rectPopup);

          if (rectPopup.top != lpITE->rectCaption.top ||
              rectPopup.left < lpITE->nPopupWndPosSU    ||
              rectPopup.right > lpITE->nPopupWndPosSU + lpITE->nPopupWndWidth)
            {
              DebugPrintf ("Popup has become disconnected from caption bar");
              DebugPrintf ("Popup rect (l, t, r, b) = (%4d, %4d, %4d, %4d)", RECT_LTRB (&rectPopup));
              DebugPrintf ("rectCaption.top = %d, nPopupWndPosSU = %d, nPopupWndPosSU + nPopupWndWidth = %d",
                           lpITE->rectCaption.top, lpITE->nPopupWndPosSU, lpITE->nPopupWndPosSU +
                              lpITE->nPopupWndWidth);
            }
        }
#endif
        return (CallWindowProc (lpITE->lpfnOldClassProc, hWnd, iMessage, wParam, lParam));

      default:
        return CallWindowProc (lpITE->lpfnOldClassProc, hWnd, iMessage, wParam, lParam);
    }

  return CallWindowProc (lpITE->lpfnOldClassProc, hWnd, iMessage, wParam, lParam);
}

void                        UnhookApplication
  (
    BOOL    fUnsubclass,
    int     nInstanceTableIx
  )

{
  int   i;

  /* It's possible that the application just "went away," leaving
     its window handle invalid.  If the window handle is invalid,
     this function will be called with fUnsubclass == FALSE.  We
     can't replace the application's window procedure if we don't
     have a valid window handle. */

  if (!fUnsubclass)
    DebugPrintf ("err FADLL unhooking app window %.4X without unsubclassing",
                 ITE.hWnd);

  if (fUnsubclass)
    {
      /* Unsubclass this instance */

      SetWindowLong (ITE.hWnd, GWL_WNDPROC, (DWORD) ITE.lpfnOldClassProc);
    }

  /* Indicate that this entry in the instance table is available
     for another window */

  ITE.hWnd = NULL;

  if (nInstanceTableIx + 1 == nInstanceTableEntries)
    nInstanceTableEntries--;
}

void                WINAPI   UpdateCaptions
  (
    void
  )

{
  int               i, nInstanceTableIx;
  HWND              hWorkWnd;
  unsigned long     ulTime;
  struct tm FAR * lpTime;


//DebugPrintf (">UpdateCaptions");

  time (&ulTime);
  lpTime = localtime (&ulTime);

  wsprintf
    (
      szTimeDate,
      "%2d:%2.2d %s %s %s %d",
      (i = lpTime->tm_hour % 12) ? i : 12,
      lpTime->tm_min,
      (lpTime->tm_hour < 12) ? "AM" : "PM",
      lpszDay[lpTime->tm_wday],
      lpszMonth[lpTime->tm_mon],
      lpTime->tm_mday
    );

  /* Post to every application whose main window handle is in the instance
     table a WM_NCACTIVATE message.  These applications are subclassed and
     it is the subclass function which responds to this message by
     updating the time displayed in the caption. */

  for (nInstanceTableIx = 0; nInstanceTableIx < nInstanceTableEntries; nInstanceTableIx++)
    {
      /* Skip empty table entries. */

      if (!ITE.hWnd)
        continue;

      /* If the application just "went away,", then unhook it
         and continue. */

      if (!IsWindow (ITE.hWnd))
        {
          UnhookApplication (FALSE, nInstanceTableIx);
          continue;
        }

      PostMessage
        (
          ITE.hWnd,
          WM_NCACTIVATE,
          GetActiveWindow () == ITE.hWnd,
          (LONG) NULL
        );
    }
}

/* This function must be exported so that ds is loaded.  There
   are other ways to load ds though. */

void     __loadds WINAPI   UpdateInstanceTable
  (
    HWND  hWnd
  )

{
  int                 i, j, k;
  int                 nInstanceTableIx;
  LPSTR               lpCaption;
  HMENU               hMenu;
  HMODULE             hModule;
  HDC                 hWindowDC;
  HDC                 hSaveDC;
  LPSTR               lpTaskDB, lpModule;
  WORD                segDosMem, selDosMem;
  DWORD               dwDosMem;
  HANDLE              hPopupWindowData;
  RECT                Rect;
  HDC                 hDC;
  char                szBuffer[100], szPath[100], szParm[100];

//DebugPrintf (">UpdateInstanceTable");

  /* Find the next available entry in the instance table. */

  for (nInstanceTableIx = 0; nInstanceTableIx < nInstanceTableEntries; nInstanceTableIx++)
    if (!ITE.hWnd)
      break;

  /* If there are no available entries in the instance table then
     grow the instance table to make an available entry. */

  if (nInstanceTableIx == nInstanceTableEntries)
    {
      /* Is there room to grow the instance table?  If not we
         quit, ignoring any remaining main application windows */

      if (nInstanceTableEntries >= MAXINSTANCES)
        return;

      nInstanceTableEntries++;
    }

  _fmemset (&InstanceTable[nInstanceTableIx], 0, sizeof (INSTANCE_TABLE_ENTRY));

  /* Add the window handle to the instance table. */

  ITE.nITEntry                = nInstanceTableIx;
  ITE.hWnd                    = hWnd;
  ITE.hTask                   = GetWindowTask (hWnd);
  ITE.bModifyCaptionText      = FALSE;
  ITE.lpfnOldClassProc        = (FARPROC) SetWindowLong (hWnd, GWL_WNDPROC, (LONG) SubClassProc);
  ITE.fRollupInProgress       = FALSE;
  ITE.fDrawerVisible          = FALSE;
  ITE.fBackgroundPalette      = FALSE;
  ITE.fIdleMouseEnabled       = TRUE;
  ITE.fAppHasCaptionText      = FALSE;

  /* nDrawerOverhang must be defined here, otherwise when InternalReleaseDC
     saves the portion of the non-client area in hSaveNonClientBitmap not
     enough will be saved. */

  ITE.nDrawerOverhang      = 5;

#if 0
  GetWindowRect (hWnd, &Rect);

  DebugPrintf ("Parent rect (l, t, r, b) = (%4d, %4d, %4d, %4d)", RECT_LTRB (&Rect));

  {
    WINDOWPLACEMENT wndpl;

    wndpl.length = sizeof (WINDOWPLACEMENT);

    GetWindowPlacement (hWnd, &wndpl);
```

```
    DebugPrintf ("flags = %.4X, showCmd = %.4X, ptMinPosition = (%d, %d), ptMaxPosition = (%d, %d),
        rcNormalPosition = (%4d, %4d, %4d, %4d)",
                wndpl.flags,
                wndpl.showCmd,
                wndpl.ptMinPosition.x,
                wndpl.ptMinPosition.y,
                wndpl.ptMaxPosition.x,
                wndpl.ptMaxPosition.y,
                RECT_LTRB (&wndpl.rcNormalPosition));
  }
#endif

  /* Create the popup window which will contain the bitmap */

  ITE.hwndPopup = CreateWindow
    (
     lpszPopupClassName,
     NULL,
     WS_POPUP,                /* Popup is initially not visible. */
     0,                       /* Origin is not set initially. */
     0,
     0,
     0,
     hWnd,                    /* Popup DOES have an owner */
     NULL,
     hLibInstance,
     (LPVOID) MAKELONG (nInstanceTableIx, 0)
    );

  GetWindowText (hWnd, szBuffer, sizeof (szBuffer));

  /* Not all applications start with caption text (even though they
     have captions).  DefWindowProc sends the app a WM_GETTEXT when
     it paints the caption bar, so now's this is a good place to
     check to see this is the first time we've been made aware of
     what the caption text will be. */

  if (szBuffer[0])
    {
     StartServerSession (nInstanceTableIx, hWnd, szBuffer);
     ITE.fAppHasCaptionText = TRUE;
    }
  //else
  //  DebugPrintf ("Not starting server session for popup for %.4X - window has no caption text", hWnd);
}

void            WINAPI   WEP
  (
   int nParameter
  )

{
  /* Under 3.1, there's enough stack to call functions. */

  if (fHooksInstalled)
    {
      SetProcRelease(npHookDeferWindowPos);
      SetProcRelease(npHookBeginDeferWindowPos);
      SetProcRelease(npHookCreateWindowEx);
      SetProcRelease(npHookCreateWindow);

#ifdef DEBUGINTERNALGETRELEASEDC
      SetProcRelease (npHookDebugInternalGetWindowDC);
      SetProcRelease (npHookDebugInternalReleaseDC);
#endif

#ifdef DEBUGSELECTOBJECT
      SetProcRelease (npHookDebugSelectObject);
#endif

#ifdef DEBUGTILECHILDWINDOWS
      SetProcRelease(npHookTileChildWindows);
      SetProcRelease(npHookCascadeChildWindows);
#endif
    }
DebugPrintf ("FADLL.DLL unloading");

  return;
}

BOOL    WritePrivateProfileHex
        (
                LPSTR   lpszSection,
                LPSTR lpszEntry,
                WORD  wData,
                LPSTR lpszFile
        )

{
        char szBuffer[10];

        wsprintf (szBuffer, "%.04X", wData);

        return (WritePrivateProfileString (lpszSection, lpszEntry, szBuffer, lpszFile));
}

BOOL    WritePrivateProfileInt
        (
                LPSTR   lpszSection,
                LPSTR lpszEntry,
                int   wData,
                LPSTR lpszFile
        )

{
        char szBuffer[10];

        wsprintf (szBuffer, "%d", wData);

        return (WritePrivateProfileString (lpszSection, lpszEntry, szBuffer, lpszFile));
}
```

```
/* Copyright 1989-1994 FotoAttacher by Michael B. Mast, licensed
   to ProCentric Computer Service, Inc., all rights reserverd.
        Trade secret and patent pending. */

#define OEMRESOURCE

#include <windows.h>
#include "prochook.h"
#include <cpl.h>
#include <dos.h>
#include <time.h>
#include <debug.h>
#include <string.h>
#include <stdlib.h>
#include <toolhelp.h>
#include "userobj.h"
#include "gdiobj.h"
#include <commdlg.h>
#include <dlgs.h>
#include "caprc.h"

/* Defines used by I_bitmap.h */

#define WIN31
#define FOR_DLL     // Must define this before including I_bitmap.h

#include <I_bitmap.h>
#include <I_error.h>

#include "fadll.h"

#define CUE_ID     1
#define CUE_TIME 750
#define LEFT       0
#define RIGHT      1

//#define CHAINKEYBOARD
#define CUECARD

DWORD __loadds CALLBACK KeyboardHook (int, WPARAM, LPARAM);
WORD       MyGDIBlockType(WORD wSeg, WORD wOfs, WORD wType);
void       Paint (HDC, HWND);

static HWND     hResizeWnd;
static HHOOK    hkOldKeyboardHook;
static BOOL   fPopupRButtonEnabled   = TRUE;  /* The user interface may be
                                                 activated. */

long __loadds WINAPI PopupWndProc
  (
    HWND     hWnd,
    UINT     message,
    WPARAM   wParam,
    LPARAM   lParam
  )

{
  HDC                  hDC;
  PAINTSTRUCT          ps;
  int                  i, j;
  MSG                  msg;
  POINT                pt;
  RECT                 rect;
  LPWINDOWPOS          lpWindowPos;
  LONG                 lResult;
  HMENU                hMenu, hPopupMenu;
  HDC                  hMemoryDC;
  HBITMAP              hOldBitmap;
  HPALETTE             hpalOld, hpalOld2;
  HANDLE               hpe;
  LPPALETTEENTRY       lppe;
  FARPROC              lpfnGetPaletteTrans = NULL;
  HANDLE               hDIBitmap;
  int                  nPopupWndDisp;
  int                  nMouseDisp;
  int                  nNewPopupWndPos;
  HANDLE               hFABitmapInfo;
  LPFABITMAPINFO       lpFABitmapInfo;
  LPINSTANCE_TABLE_ENTRY lpITE;

  static int  nFirstMousePos;
  static int  nLastMousePos;
  static int  nMousePosMax;
  static int  nMousePosMin;
  static BOOL fAnyMouseMovement;

  static BOOL fCueTimerActive      = FALSE;
  static BOOL fIgnoreMouseMovement = TRUE;  /* Ignore all mouse movement. */
        static HWND hWndCueCard = NULL;

#if 0
  msg.hwnd       = hWnd;
  msg.message    = message;
  msg.wParam     = wParam;
  msg.lParam     = lParam;

  DebugOutputMessage (&msg);
#endif

  /* This pointer is invalid until WM_NCCREATE has been processed. */

  lpITE = lpInstanceTable + GetWindowWord (hWnd, 0);

  switch (message)
    {
      case WM_NCCREATE:
        /* Now that the popup window has been created, make it look like
           a child window.  It retains its ability to exist, un-clipped,
           outside of the parent window's client area, but, like a normal
           child window, it does not de-activate the parent window when
           it becomes activated. */

        lResult = GetWindowLong (hWnd, GWL_STYLE);

        lResult &= ~WS_POPUP;
        lResult |=  WS_CHILD;

        SetWindowLong (hWnd, GWL_STYLE, lResult);

        /* Stuff nInstanceTableIx into the extra field in the window structure. */

        SetWindowWord (hWnd, 0, LOWORD (((LPCREATESTRUCT) lParam)->lpCreateParams));
        return (TRUE);

      case WM_SHOWWINDOW:
        switch (LOWORD (lParam))
          {
            case SW_PARENTCLOSING:
              PopupToChild (GetWindow (hWnd, GW_OWNER), hWnd);
              break;
          }

        return (0L);

      case WM_ERASEBKGND:
        Paint ((HDC) wParam, hWnd);
        ValidateRect (hWnd, NULL);
        return (TRUE);

      case WM_TIMER:
        if (wParam == CUE_ID)
          {
            KillTimer (hWnd, CUE_ID);
            fIgnoreMouseMovement = TRUE;
            fCueTimerActive      = FALSE;

            /* Snap up the window. */

#ifdef CUECARD
            hWndCueCard = CreateWindow
              (
                "edit",
                NULL,
                WS_VISIBLE | ES_MULTILINE | ES_READONLY,
                lpITE->nPopupWndPosSU - nResizeHandleSize,
                lpITE->rectCaption.top,
                lpITE->nPopupWndWidth + 2 * nResizeHandleSize,
                lpITE->nPopupWndHeight + nResizeHandleSize,
                lpITE->hWnd,
                NULL,
                hLibInstance,
                NULL
              );

                                          SetWindowText (hWndCueCard, "This is cue card text");
#else
            SetWindowPos (lpITE->hwndPopup,
                          HWND_TOP,
                          lpITE->nPopupWndPosSU,
                          lpITE->rectCaption.bottom + nDrawerFrames,
                          lpITE->nPopupWndWidth,
                          0,
                          SWP_NOZORDER | SWP_NOACTIVATE);

            lpITE->fPhotoRolledUp = TRUE;
            lpITE->fSnap          = TRUE;

            /* lpITE->fIdleMouseEnable must already be set to TRUE, otherwise
               we wouldn't have gotten this WM_TIMER message. */

            /* Because fPhotoRolledUp is TRUE, a snapshot of the non client area will be taken
               and saved in lplpITE->>hSaveNonClientBitmap. */

            SendMessage (lpITE->hWnd, WM_NCPAINT, 1, NULL);

            ReleaseCapture ();
#endif
          }

        break;

      case WM_RBUTTONDOWN:
        ReleaseCapture ();

        if (fCueTimerActive)
          {
            KillTimer (hWnd, CUE_ID);
            fCueTimerActive = FALSE;
          }
```

```
                                   if (hWndCueCard)
                                          {
                                                 DestroyWindow (hWndCueCard);
                                                 hWndCueCard = NULL;
                                          }

          break;

      case WM_RBUTTONUP:
        //DebugPrintf ("GetCapture = %.4X", GetCapture());

        if (fIgnoreMouseMovement)
          break;

        if (!fPopupRButtonEnabled)
          break;

        PostMessage (hWndServer, FA_UIUNHIDE, 0, NULL);

        fPopupRButtonEnabled = FALSE;
        break;

      case WM_LBUTTONDOWN:
        if (fCueTimerActive)
          {
            KillTimer (hWnd, CUE_ID);
            fCueTimerActive = FALSE;
          }

                                  if (hWndCueCard)
                                         {
                                                DestroyWindow (hWndCueCard);
                                                hWndCueCard = NULL;
                                         }

        if (lpITE->fRollupInProgress)
          break;

        /* This comment applies to both the WM_LBUTTONDOWN and WM_MOUSEMOVE messages.  When
           moving the popup window via SetWindowPos, an additional WM_MOUSEMOVE message is
           generated (I have no idea why).  Because the lParam field of WM_MOUSEMOVE is in
           client coordinates, it appears, when comparing the lParam of the current (unexplained)
           WM_MOUSEMOVE message with that of the prior WM_MOUSEMOVE message, that we
           are moving the window both in the opposlpITE->direction and an equal displacement
           that it was just moved.  Thus, if we use these client coordinates to compute
           a displacement to move the window, the displacement is never zero.  Thus, the
           window is made to alternate back and forth for the duration that LBUTTON is down.
           If, on the other hand,
           we convert all mouse coordinates to screen units, then the unexplained
           subsequent WM_MOUSEMOVE message indicates the same coordinates as the
           last WM_MOUSEMOVE messaem.  Thus, we compute a displacement of zero
           and ignore the WM_MOUSEMOVE message.  This results in correct window
           movement behavior. */

        pt.x = (int) LOWORD (lParam);      /* Client units */
        ClientToScreen (hWnd, &pt);

        /* nFirstMousePos is used to measure the distance from the
           mouse to the position that the mouse was in when the
           left button was first depressed.  If this measure remains
           less than the value associated with SM_CXDOUBLECLK then
           fAnyMouseMovement remains FALSE.  This allows the user to
           request the popup window rollup by clicking the left mouse
           button without having moved the mouse "very much".  */

        nFirstMousePos  = pt.x;  /* Screen units */
        nLastMousePos   = pt.x;  /* Screen units */

        nMousePosMax = (lpITE->rectCaption.right - lpITE->nDrawerOverhang - nDrawerFrames) -
                       (lpITE->nPopupWndPosSU + lpITE->nPopupWndWidth - nLastMousePos);

        nMousePosMin = (lpITE->rectCaption.left  + lpITE->nDrawerOverhang + nDrawerFrames) +
                       (nLastMousePos - lpITE->nPopupWndPosSU);

        /* SwitchToThisWindow (undocumented USER) activates the correct window, but if the window to be
           activated completely (or maybe even partially???) covers a non active window, the non active
           window appears on top of the active window (it remains non active, it just moves to the
           top).  I have no idea why.  ShowWindow (lpITE->hWnd, SW_SHOW) should activate the window
           (at least that's what the documentation says it does) but it doesn't.  Maybe it has something to
           do with the fact that it's the parent of an active popup.  Could also be that the fact that
           the popup's style is set to WS_CHILD and not WS_POPUP is confusing ShowWindow.  Anyway, it doesn't
           work.  SetWindowPos does work. */

        SetWindowPos (lpITE->hWnd, NULL, 0, 0, 0, 0, SWP_NOMOVE | SWP_NOSIZE);

        /* We'll set fAnyMouseMovement to TRUE if the mouse is moved BEFORE we receive the WM_LBUTTONUP
            message
           (i.e., if the mouse is moved while we have the capture). */

        fAnyMouseMovement = FALSE;
        break;

      case WM_MOUSEMOVE:
        /* If any mouse buttons are down and we are ignoring
           mouse movement, then continue ignoring mouse movement.
           If no mouse buttons are down, then we stop ignoring
           mouse movement.  We do this because we don't want to
           respond to WM_xBUTTONUP messages if the button was pressed
           while the mouse cursor was NOT over the popup window. */

        if (fIgnoreMouseMovement &&
            ((wParam & MK_LBUTTON) ||
             (wParam & MK_RBUTTON)))
          break;

        fIgnoreMouseMovement = FALSE;

        /* At this point, we are not ignoring mouse movement.  We
           do NOT know if any of the buttons are down. */

        /* In the following code, we may capture the mouse even if no
           buttons are down.  We do this so that we can detect when
           the mouse has moved off of the popup window.  This is
           necessary so that we can detect if we should raise the
           idle mouse condition. */

        /* If a subclassed application is not
           active, we don't want to raise an idle mouse condition for
           that application.  */

        if (!lpITE->fActive)
          break;

                                  /* If we are currently rollup up (or down) a popup, then
                                     ignore mouse movement. */

                                  if (lpITE->fRollupInProgress)
                                         break;

                                  /* If the control key is down, ignore mouse movement. */

                                  if (GetKeyState (VK_CONTROL) < 0)
                                         break;

        /* Get the mouse position in screen units and check to see
           if there as been any real mouse movement.  */

        pt = MAKEPOINT (lParam);
        ClientToScreen (hWnd, &pt);

        nMouseDisp = pt.x - nLastMousePos;

        if (!nMouseDisp)
          break;

        /* If we don't have a cue timer going and no buttons are
           down, then start a cue timer. Any button activity will
           kill the cue timer.  Also, moving the mouse off of the
           popup window will kill the cue timer. If we receive
           the timer message, then the mouse was over the popup
           window for the specified period without any button
           activity.  At that point we either present the user
           with the cue card, roll or snap up the window,
           or do nothing, depending on the user defined settings. */

        GetWindowRect (hWnd, &rect);

        if (!PtInRect (&rect, pt))
          {
            /* The mouse is not over the popup window (this condition
               is possible because we've captured the mouse).  If the
               left button is not down, then release the capture (a
               mouse that's off the window with the left button
               down indicates a drag operation). */

            if (!(wParam & MK_LBUTTON))
              {
                ReleaseCapture ();
                fIgnoreMouseMovement = TRUE;  /* Start ignoring mouse
                                                 movement again. */
                lpITE->fIdleMouseEnabled = TRUE;

                if (fCueTimerActive)
                  {
                    KillTimer (hWnd, CUE_ID);
                    fCueTimerActive = FALSE;
                  }

                                                        if (hWndCueCard)
                                                               {
                                                                      DestroyWindow (hWndCueCard);
                                                                      hWndCueCard = NULL;
                                                               }

                return 0L;
              }
          }
        else
          {
            /* The mouse is over the popup window. If we don't have
               the capture, then set the capture and start the
               CUE timer. */

            if (GetCapture () != hWnd)
              {
                SetCapture (hWnd);

                if (!fCueTimerActive && lpITE->fIdleMouseEnabled)
                  {
                    SetTimer (hWnd, CUE_ID, CUE_TIME, (FARPROC) NULL);
```

ICS14PRINT

```
                    fCueTimerActive = TRUE;
                  }
              }
          }

        /* Ignore mouse movement if the right button is down. */

        if (wParam & MK_RBUTTON)
          break;

        /* Ignore mouse movement if the left button is not down. */

        if (!(wParam & MK_LBUTTON))
          {
            nLastMousePos = pt.x;
            break;
          }

        /* At this point we know that the left button is down. */

        /* Has there been any *significant* movement of the mouse? */

        if (max (nFirstMousePos - pt.x, pt.x - nFirstMousePos) >= GetSystemMetrics (SM_CXDOUBLECLK))
          fAnyMouseMovement = TRUE;     /* Yes, indicate so */

        if (pt.x < nMousePosMin)
          {
            if ((lpITE->rectCaption.left + lpITE->nDrawerOverhang + nDrawerFrames) < lpITE->nPopupWndPosSU)
              {
                lpITE->nPopupWndPosSU = (lpITE->rectCaption.left + lpITE->nDrawerOverhang + nDrawerFrames);

                SetWindowPos (hWnd, HWND_TOP, lpITE->nPopupWndPosSU, lpITE->rectCaption.top, 0, 0,
                    SWP_NOSIZE);
              }

            /* We don't want to use a displacement from an area outside the
               caption bar to an area inside the caption bar. */

            nLastMousePos = nMousePosMin;
            break;
          }

        if (pt.x > nMousePosMax)
          {
            if (lpITE->nPopupWndPosSU + lpITE->nPopupWndWidth < (lpITE->rectCaption.right -
              lpITE->nDrawerOverhang - nDrawerFrames))
              {
                lpITE->nPopupWndPosSU = (lpITE->rectCaption.right - lpITE->nDrawerOverhang - nDrawerFrames) -
                    lpITE->nPopupWndWidth;

                SetWindowPos (hWnd, HWND_TOP, lpITE->nPopupWndPosSU, lpITE->rectCaption.top, 0, 0,
                    SWP_NOSIZE);
              }

            /* We don't want to use a displacement from an area outside the
               caption bar to an area inside the caption bar. */

            nLastMousePos = nMousePosMax;
            break;
          }

        nLastMousePos = pt.x;
        lpITE->nPopupWndPosSU += nMouseDisp;
        SetWindowPos (hWnd, HWND_TOP, lpITE->nPopupWndPosSU, lpITE->rectCaption.top, 0, 0, SWP_NOSIZE);
        break;

      case WM_LBUTTONUP:
        if (fIgnoreMouseMovement)
          break;

        /* If the control key was down while the left mouse button
           was released, then create the resize window. */

        if (wParam & MK_CONTROL)
          {
            CreateWindow
              (
                lpszResizeClassName,
                NULL,
                WS_VISIBLE | WS_POPUP,
                lpITE->nPopupWndPosSU - nResizeHandleSize,
                lpITE->rectCaption.top,
                lpITE->nPopupWndWidth + 2 * nResizeHandleSize,
                lpITE->nPopupWndHeight + nResizeHandleSize,
                lpITE->hWnd,
                NULL,
                hLibInstance,
                (LPVOID) MAKELONG (GetWindowWord (hWnd, 0), 0)
              );

            fIgnoreMouseMovement = TRUE;

            break;
          }

        /* Did the user click the left mouse button without moving the mouse?
           If so, that's the request to roll up the popup window so it no
           longer obscures the menu bar and the client area.  We'll post a
           registered message to the application.  The subclassed
           application's window
           procedure will pick it up and start rolling up the popup window.
           It's cleaner if the subclass proc handles this because it's got
           to fiddle around with the application's main window's DC and
           I'd rather that not be done from inside an owned popup window's
           window proc. */

        if (!fAnyMouseMovement && !lpITE->fRollupInProgress)
          {
            PostMessage (lpITE->hWnd, unRollupMessage, ROLLUP, 0L);
        //    lpITE->fRollupInProgress = TRUE;  fadll.dll will set this to true
            ReleaseCapture ();
          }

        break;

      case WM_PALETTECHANGED:
        if (wParam == hWnd)
          break;

      case WM_QUERYNEWPALETTE:
        //InvalidateRect (hWnd, NULL, TRUE);
        //UpdateWindow (hWnd);

        if (lpITE->hDDPictBitmap)
          {
            hDC = GetDC (hWnd);
            hpalOld = SelectPalette (hDC, lpITE->hPictPalette, lpITE->fBackgroundPalette);
            UpdateColors (hDC);
            SelectPalette (hDC, hpalOld, lpITE->fBackgroundPalette);
            ReleaseDC (hWnd, hDC);
          }

        break;

      case WM_PAINT:
        hDC = BeginPaint (hWnd, &ps);
        Paint (hDC, hWnd);
        EndPaint (hWnd, &ps);
        break;

      case WM_DESTROY:
        /* Delete any bitmaps. */

        //if (lpITE->hDDMaskBitmap)
        //  DeleteObject (lpITE->hDDMaskBitmap);

        if (lpITE->hSaveNonClientBitmap)
          DeleteObject (lpITE->hSaveNonClientBitmap);

        DeleteObject (lpITE->hDDPictBitmap);
        DeleteObject (lpITE->hPictPalette);
        break;

      default:
        return (DefWindowProc (hWnd, message, wParam, lParam));
    }

  return (NULL);
}

void Paint
  (
    HDC  hDC,
    HWND hWnd
  )

{
  int                   i, j;
  HANDLE                hPopupWindowData;
  HDC                   hMemoryDC;
  HBITMAP               hOldBitmap;
  HPALETTE              hpalOld, hpalOld2;
  RECT                  rect;
  LPINSTANCE_TABLE_ENTRY lpITE;

  lpITE = lpInstanceTable + GetWindowWord (hWnd, 0);

  if (!lpITE->hDDPictBitmap)
    {
      //DebugPrintf ("Paint: lpITE->hDDPictBitmap == NULL, returning");
      return;
    }

  /* For now, just copy the bitmap onto the display surface.  Later
     we'll copy the underlying bitmap, AND in the mask and OR in
     the bitmap for the full effect. */

  hMemoryDC         = CreateCompatibleDC (hDC);
  hOldBitmap        = SelectObject  (hMemoryDC, lpITE->hDDPictBitmap);

#if 0
  /* This code is to help track down:

     ** Bitmap already selected

     messages.  This doesn't necessarily mean that the bitmap is already
     selected into the dc that we're currently trying to select it into.
     It means that the bitmap is selected into some dc.  This code
     is to help find which dc it's selected into.  Once we know that
     we look for the code that selects it in but doesn't select it out.
```

I<C/T4PRINT

```
    It will probably be the case that it does select it out, only some
    thing happened that caused some other code to be run (like a message
    was sent someplace) before the bitmap gets selected out.  It is
    this other code that tries to select it in again.  If you can't
    find/figure out where it getting selected in in the first place,
    you can define DEBUGSELECTOBJECT to watch for stuff being selected
    into and out of dc's.  It works for me! */

  DebugPrintf ("Paint: CreateCompatibleDC returned %.4X", hMemoryDC);
  DebugPrintf ("Paint: SelectObject (%.4X, %.4X) returned %.4X", hMemoryDC, lpITE->hDDPictBitmap, hOldBitmap);

  if (!hOldBitmap)
    {
      SYSHEAPINFO shi;
      LOCALENTRY  le;
      BOOL        ok;
      WORD        wDefGDIHeap;
      WORD        wMagic;

      shi.dwSize = sizeof(shi);
      SystemHeapInfo(&shi);

      wDefGDIHeap = shi.hGDISegment;
      wDefGDIHeap &= 0xfffc;
      wDefGDIHeap |= 1;

      le.dwSize = sizeof (le);

      ok = LocalFirst (&le, wDefGDIHeap);

      while (ok)
        {
          wMagic = * (WORD FAR *) MK_FP (wDefGDIHeap, le.wAddress + 2);

          if (wMagic == 'OM' ||
              wMagic == 'ON' ||
              wMagic == 'OO' ||
              wMagic == 'OQ')
            DebugDumpDC (le.hHandle);  //Don't need to go thru local arena

          ok = LocalNext (&le);
        }
    }
#endif

  if (lpITE->hPictPalette)
    {
      hpalOld         = SelectPalette (hMemoryDC, lpITE->hPictPalette, lpITE->fBackgroundPalette);
      hpalOld2        = SelectPalette (hDC,       lpITE->hPictPalette, lpITE->fBackgroundPalette);
      RealizePalette (hDC);
    }

  BitBlt (hDC,
          0,
          0,
          lpITE->nPopupWndWidth,
          lpITE->nPopupWndHeight,
          hMemoryDC,
          0,

          /* Actually, if lpITE->fDrawerVisible is FALSE, then lpITE->nRollupTimerTick
             will be zero, so we don't really need to test lpITE->fDrawerVisible. */

          lpITE->fDrawerVisible ? lpITE->nRollupTimerTick * lpITE->nScanLinesPerTick + nDrawerFrames : 0,
          SRCCOPY);

  if (lpITE->hPictPalette)
    {
      SelectPalette  (hMemoryDC, hpalOld,  lpITE->fBackgroundPalette);
      SelectPalette  (hDC,       hpalOld2, lpITE->fBackgroundPalette);
      RealizePalette (hDC);
    }

  SelectObject (hMemoryDC, hOldBitmap);
  DeleteDC     (hMemoryDC);
}

long __loadds WINAPI ResizeWndProc
  (
    HWND    hWnd,
    UINT    message,
    WPARAM  wParam,
    LPARAM  lParam
  )

{
  int           nXDisp, nYDisp, nWidth, nHeight;
  int           x, y, i, j;
  MSG           msg;
  HDC           hDC, hCompatDC;
  PAINTSTRUCT ps;
  SIZE  size;
  POINT pt;
  DWORD dw;
  LOGFONT logfont;
  HFONT   hOldFont, hFont;
  TEXTMETRIC tm;
  RECT    rect;
  HBRUSH  hbrResizeHandle, hbrResizeFrame;
  HANDLE          hFABitmapInfo;
  LPFABITMAPINFO  lpFABitmapInfo;
  LPINSTANCE_TABLE_ENTRY lpITE;

  static RECT rectFrame;

  static int    nHandle;
  static int    nAspectRatio;
  static POINT  ptLast;
  static HWND   hWndPrevCapture;
  static HANDLE hPrevCursor;
  static BOOL   fSizeWarningEnabled;
  static BOOL   fSizeWarningIssued;


  /* Normally, when the left mouse button is pressed while over
     a sizing handle we'd capture the mouse.  While the
     sizing window is displayed we don't want mouse input going
     anywhere but to this window.  So instead of capturing the
     mouse when the left button is pressed over a sizing handle,
     we capture it upon creation of the window.  In place of
     setting and testing the capture, we set and test fTrackMouse. */

  static BOOL  fTrackMouse;

#if 0
  msg.hwnd       = hWnd;
  msg.message    = message;
  msg.wParam     = wParam;
  msg.lParam     = lParam;

  DebugOutputMessage (&msg);
#endif

  /* lpITE is invalid until WM_CREATE has been processed. */

  lpITE = lpInstanceTable + GetWindowWord (hWnd, 0);

  switch (message)
    {
      case WM_CREATE:
        /* Stuff nInstanceTableIx into the extra field in the window structure. */

        SetWindowWord (hWnd, 0, LOWORD (((LPCREATESTRUCT) lParam)->lpCreateParams));

        nAspectRatio    = (int) (((long) lpITE->nPopupWndWidth * 1000) / lpITE->nPopupWndHeight);

        hkOldKeyboardHook = SetWindowsHookEx (WH_KEYBOARD,
                                              (FARPROC) KeyboardHook,
                                              hLibModule,         // Not hLibInstance as per Q92659
                                              NULL);

        hWndPrevCapture       = SetCapture (hWnd);
        hPrevCursor           = GetCursor ();
        fTrackMouse           = FALSE;
        fSizeWarningEnabled   = FALSE;
        fSizeWarningIssued    = FALSE;
        hResizeWnd            = hWnd;
        break;

      case WM_PAINT:
        hDC = BeginPaint (hWnd, &ps);
        hbrResizeHandle = CreateSolidBrush (RGB (0, 255,   0));
        hbrResizeFrame  = CreateSolidBrush (RGB (0,   0, 255));

        /* Draw lower left resize box */

        GetClientRect (hWnd, &rect);

        rect.top = rect.bottom - nResizeHandleSize;
        rect.right = rect.left + nResizeHandleSize;

        FillRect (hDC, &rect, hbrResizeHandle);
        FrameRect (hDC, &rect, GetStockObject (BLACK_BRUSH));

        /* Draw lower right resize box */

        GetClientRect (hWnd, &rect);

        rect.top = rect.bottom - nResizeHandleSize;
        rect.left = rect.right - nResizeHandleSize;

        FillRect (hDC, &rect, hbrResizeHandle);
        FrameRect (hDC, &rect, GetStockObject (BLACK_BRUSH));

        /* Draw left vertical bar */

        GetClientRect (hWnd, &rect);

        rect.right   = rect.left + nResizeHandleSize;
        rect.left   += nResizeFrameInset + 1;
        rect.bottom -= nResizeHandleSize - 1;

        FillRect (hDC, &rect, hbrResizeFrame);
        FrameRect (hDC, &rect, GetStockObject (BLACK_BRUSH));

        /* Draw right vertical bar */

        GetClientRect (hWnd, &rect);

        rect.left    = rect.right - nResizeHandleSize;
```

```
          rect.right  -= nResizeFrameInset + 1;
          rect.bottom -= nResizeHandleSize - 1;

          FillRect (hDC, &rect, hbrResizeFrame);
          FrameRect (hDC, &rect, GetStockObject (BLACK_BRUSH));

          /* Draw bottom horizontal bar */

          GetClientRect (hWnd, &rect);

          rect.left   += nResizeHandleSize - 1;
          rect.right  -= nResizeHandleSize - 1;
          rect.top     = rect.bottom - nResizeHandleSize;
          rect.bottom -= nResizeFrameInset + 1;

          FillRect (hDC, &rect, hbrResizeFrame);
          FrameRect (hDC, &rect, GetStockObject (BLACK_BRUSH));

          EndPaint (hWnd, &ps);
          DeleteObject (hbrResizeHandle);
          DeleteObject (hbrResizeFrame);

          GetClientRect (hWnd, &rect);

          rect.left   += nResizeHandleSize;
          rect.right  -= nResizeHandleSize;
          rect.bottom -= nResizeHandleSize;

          pt.x = rect.left;
          pt.y = rect.top;

          ClientToScreen (hWnd, &pt);

          rectFrame.left = pt.x;
          rectFrame.top  = pt.y;

          pt.x = rect.right;
          pt.y = rect.bottom;

          ClientToScreen (hWnd, &pt);

          rectFrame.right  = pt.x;
          rectFrame.bottom = pt.y;

          hDC = GetDC (NULL);
          DrawFocusRect (hDC, &rectFrame);
          ReleaseDC (NULL, hDC);

          break;

        case WM_LBUTTONDOWN:
          GetClientRect (hWnd, &rect);

          rect.top   = rect.bottom - nResizeHandleSize;
          rect.right = rect.left   + nResizeHandleSize;

          if (PtInRect (&rect, MAKEPOINT (lParam)))
            {
              fTrackMouse = TRUE;
              nHandle = LEFT;
              ptLast = MAKEPOINT (lParam);
              ClientToScreen (hWnd, &ptLast);
              SetCursor (LoadCursor (NULL, IDC_SIZENESW));
              break;
            }

          GetClientRect (hWnd, &rect);

          rect.top  = rect.bottom - nResizeHandleSize;
          rect.left = rect.right  - nResizeHandleSize;

          if (PtInRect (&rect, MAKEPOINT (lParam)))
            {
              fTrackMouse = TRUE;
              nHandle = RIGHT;
              ptLast = MAKEPOINT (lParam);
              ClientToScreen (hWnd, &ptLast);
              SetCursor (LoadCursor (NULL, IDC_SIZENWSE));
              break;
            }

          break;

        /* WM_USER causes resize window to go away.  This is posted after
           the new size has been determined (on release of the left
           mouse button) or when the user cancels the resize operation
           (by pressing the escape key). */

        case WM_USER:
          if (hWndPrevCapture)
            SetCapture (hWndPrevCapture);
          else
            ReleaseCapture ();

          /* DrawFocusRect in exact same spot that we DrawFocusRect'ed
             the last time the mouse moved.  Since this function uses
             XOR, this'll erase the focus rectangle. */

          hDC = GetDC (NULL);
          DrawFocusRect (hDC, &rectFrame);
          ReleaseDC (NULL, hDC);
          SetCursor (hPrevCursor);
          UnhookWindowsHookEx (hkOldKeyboardHook);
          DestroyWindow (hWnd);

          break;

        case WM_LBUTTONUP:
          if (fTrackMouse)
            {
              /* DrawFocusRect in exact same spot that we DrawFocusRect'ed
                 the last time the mouse moved.  Since this function uses
                 XOR, this'll erase the focus rectangle. */

              hFABitmapInfo = GlobalAlloc (GHND, sizeof (FABITMAPINFO));
              lpFABitmapInfo = (LPFABITMAPINFO) GlobalLock (hFABitmapInfo);

              lpITE->hFABitmapInfo = hFABitmapInfo;

              lpFABitmapInfo->wFlags            = FAB_RESIZE;
              lpFABitmapInfo->hWnd              = lpITE->hWnd;
              lpFABitmapInfo->nPopupWndWidth    = rectFrame.right  - rectFrame.left;
              lpFABitmapInfo->nPopupWndHeight   = rectFrame.bottom - rectFrame.top;
              lpFABitmapInfo->nPopupWndPosSU    = rectFrame.left;

              lstrcpy (lpFABitmapInfo->szBuffer, lpITE->szCurrentPictFile);

              GlobalUnlock (hFABitmapInfo);

              /* Ask the server to open the default image file. */

              PostMessage (hWndServer,
                           FA_OPENBITMAPFILE,
                           (WPARAM) hFABitmapInfo,
                           NULL);

              PostMessage (hWnd, WM_USER, 0, 0);
            }

          break;

        case WM_MOUSEMOVE:
          while (!fTrackMouse)
            {
              GetClientRect (hWnd, &rect);

              rect.top   = rect.bottom - nResizeHandleSize;
              rect.right = rect.left   + nResizeHandleSize;

              if (PtInRect (&rect, MAKEPOINT (lParam)))
                {
                  SetCursor (LoadCursor (NULL, IDC_SIZENESW));
                  break;
                }

              GetClientRect (hWnd, &rect);

              rect.top  = rect.bottom - nResizeHandleSize;
              rect.left = rect.right  - nResizeHandleSize;

              if (PtInRect (&rect, MAKEPOINT (lParam)))
                {
                  SetCursor (LoadCursor (NULL, IDC_SIZENWSE));
                  break;
                }

              SetCursor (LoadCursor (NULL, IDC_ARROW));
              break;
            }

          if (!fTrackMouse)
            break;

          pt = MAKEPOINT (lParam);
          ClientToScreen (hWnd, &pt);

          if (pt.x == ptLast.x && pt.y == ptLast.y)
            break;

          nXDisp = pt.x - ptLast.x;
          nYDisp = pt.y - ptLast.y;

          //DebugPrintf ("nXDisp = %d", nXDisp);

          /* Using the mouse's X displacement, compute what the new
             height would have to be and what the mouse's Y position
             would have to be to maintain the same aspect ratio. */

          if (nHandle == LEFT)
            nWidth  = rectFrame.right - rectFrame.left - nXDisp;
          else
            nWidth  = rectFrame.right - rectFrame.left + nXDisp;

          nHeight = (int) (((long) nWidth * 1000) / nAspectRatio);

          y = nHeight + rectFrame.top;

          /* Using the mouses Y displacement, compute what the new
             width would have to be and what the mouses's X position
             would have to be to maintain the same aspect ratio. */
```

```
      nHeight = rectFrame.bottom - rectFrame.top + nYDisp;
      nWidth  = (int) (((long) nHeight * nAspectRatio) / 1000);

      x = (nHandle == LEFT) ? rectFrame.right - nWidth :
                              rectFrame.left  + nWidth;

      if (    x < (lpITE->rectCaption.left  + lpITE->nDrawerOverhang) ||
           pt.x < (lpITE->rectCaption.left  + lpITE->nDrawerOverhang) ||
              x > (lpITE->rectCaption.right - lpITE->nDrawerOverhang) ||
           pt.x > (lpITE->rectCaption.right - lpITE->nDrawerOverhang) ||
              y < lpITE->rectCaption.bottom                            ||
           pt.y < lpITE->rectCaption.bottom                            ||
              y > lpITE->rectWindow.bottom                             ||
           pt.y > lpITE->rectWindow.bottom)
        {
          SetCursorPos (ptLast.x, ptLast.y);
          break;
        }

      hDC = GetDC (NULL);

      DrawFocusRect (hDC, &rectFrame);

      if (abs (nXDisp) > abs (nYDisp))
        {
          SetCursorPos (pt.x, y);
          ptLast.x = pt.x;
          ptLast.y = y;

          rectFrame.bottom = y;

          if (nHandle == LEFT)
            rectFrame.left = pt.x;
          else
            rectFrame.right = pt.x;
        }
      else
        {
          SetCursorPos (x, pt.y);
          ptLast.x = x;
          ptLast.y = pt.y;

          rectFrame.bottom = pt.y;

          if (nHandle == LEFT)
            rectFrame.left = x;
          else
            rectFrame.right = x;
        }

      DrawFocusRect (hDC, &rectFrame);
      ReleaseDC (NULL, hDC);

      /* If the focus rect becomes larger than the size of the
         non scaled bitmap, then issue a warning and set a flag
         so we don't issue another warning until the focus rect
         has once again been made smaller than or equal to
         the size of the non scaled bitmap.  Issuing warnings
         is only enabled from the point in time at which the
         focus rect is less than or equal to the size of the
         non scaled bitmap. */

      if (((rectFrame.right  - rectFrame.left) > lpITE->nBitmapWidth) ||
          ((rectFrame.bottom - rectFrame.top)  > lpITE->nBitmapHeight))
        {
          if (fSizeWarningEnabled && !fSizeWarningIssued)
            {
              MessageBeep (0);
              fSizeWarningIssued = TRUE;
            }
        }
      else
        {
          fSizeWarningIssued  = FALSE;
          fSizeWarningEnabled = TRUE;
        }

      break;

    default:
      return (DefWindowProc(hWnd, message, wParam, lParam));
  }

  return (NULL);
}

DWORD __loadds CALLBACK KeyboardHook
  (
    int     code,
    WPARAM  wParam,
    LPARAM  lParam
  )

{
  if (code < 0)
    return (CallNextHookEx (hkOldKeyboardHook, code, wParam, lParam));

/* Define CHAINKEYBOARD when you want keyboard messages that
   we're not interested in to be processed by the previous
   handler.  Normally, we don't want to do this.  We do want
   to do this when when we want to be able to use a screen
   capture program to take promotional shots of the screen
   while we're resizing. */

#ifdef CHAINKEYBOARD
  if (wParam == VK_ESCAPE)
    {
      PostMessage (hResizeWnd, WM_USER, 0, 0);
      return (1L);
    }

  return (CallNextHookEx (hkOldKeyboardHook, code, wParam, lParam));
#else
  if (wParam == VK_ESCAPE)
    PostMessage (hResizeWnd, WM_USER, 0, 0);

  return (1L);
#endif
}


void WINAPI EnablePopupRButton ()
{
  fPopupRButtonEnabled = TRUE;
}
```

```
/* Copyright 1989-1994 FotoAttacher by Michael B. Mast, licensed
   to ProCentric Computer Service, Inc., all rights reserverd.
        Trade secret and patent pending. */

#include <windows.h>
#include "prochook.h"
#include <debug.h>
#include <commdlg.h>
#include <dlgs.h>
#include "userobj.h"
/* Defines used by l_bitmap.h */

#define WIN31
#define FOR_DLL     // Must define this before includiing l_bitmap.h

#include <l_bitmap.h>
#include <l_error.h>

#include "fadll.h"

int  ShowDrawer
  (
    HDC    hOutputDC,
    int    nInstanceTableIx
  )

{
  HDC          hWindowDC, hPictDC, hSaveNonClientDC, hConstDC;
  HBITMAP      hOldSaveNonClientBitmap, hOldPictBitmap, hConstBitmap, hOldConstBitmap;
  HPEN         hOldPen, hBlackPen /* , hErasePen */;
  HRGN         hRgn;
  int          nTop;
  long         lStyle;
  int          nPictLines, nTimerTick;
  RECT         rect;
  HBRUSH       hBrush, hOldBrush;
  POINT        aptVertex[6];
  HPALETTE         hpalOld, hpalOld2;

  lStyle = GetWindowLong (ITE.hWnd, GWL_STYLE);

  nTop = GetSystemMetrics ((lStyle & WS_THICKFRAME) ? SM_CYFRAME : SM_CYBORDER);

  hWindowDC             = GetWindowDC (ITE.hWnd);

  hSaveNonClientDC      = CreateCompatibleDC (hWindowDC);

  if (!IsGDIObject (ITE.hSaveNonClientBitmap))
    {
      DebugPrintf ("hSaveNonClientBitmap invalid GDI object for subclassed window %.4X", ITE.hWnd);
      DebugBreak ();
    }

  hOldSaveNonClientBitmap = SelectObject (hSaveNonClientDC, ITE.hSaveNonClientBitmap);


#if 0
  // dump to screen

  DebugBreak ();
  DebugPrintf ("ShowDrawer: width = %d", ITE.nPopupWndWidth);

  {
    HDC hDC;

    hDC = GetDC (NULL);

    BitBlt (hDC,
            300,
            300,
            ITE.nPopupWndWidth + 2 * ITE.nDrawerOverhang + nDrawerFrames,
            GetSystemMetrics (SM_CYSIZE) + GetSystemMetrics (SM_CYBORDER) + nDrawerFrames,
            hSaveNonClientDC,
            0,
            0,
            SRCCOPY);

    ReleaseDC (NULL, hDC);
  }
#endif

  hConstDC              = CreateCompatibleDC (hWindowDC);

  hConstBitmap          = CreateCompatibleBitmap (hWindowDC,
                                    ITE.nPopupWndWidth + 2 * ITE.nDrawerOverhang +
                                       nDrawerFrames,
                                    GetSystemMetrics (SM_CYSIZE) + GetSystemMetrics
                                       (SM_CYBORDER) + nDrawerFrames);

  hOldConstBitmap       = SelectObject (hConstDC, hConstBitmap);

  hPictDC               = CreateCompatibleDC (hWindowDC);
  hOldPictBitmap        = SelectObject (hPictDC, ITE.hDDPictBitmap);

  /* Copy the saved caption bitmap to the construction bitmap. */

  //ProcUnhook(npHookBitBlt);

  BitBlt (hConstDC,
          0,
          0,
          ITE.nPopupWndWidth + 2 * ITE.nDrawerOverhang + nDrawerFrames,
          GetSystemMetrics (SM_CYSIZE) + GetSystemMetrics (SM_CYBORDER) + nDrawerFrames,
          hSaveNonClientDC,
          0,
          0,
          SRCCOPY);

  /* Copy the picture bitmap to the construction bitmap */

  //DebugPrintf ("ITE.nPopupWndHeight - ITE.nRollupTimerTick * ITE.nScanLinesPerTick = %d",
  //  ITE.nPopupWndHeight - ITE.nRollupTimerTick * ITE.nScanLinesPerTick);

  //DebugPrintf ("nDrawerFrames = %d", nDrawerFrames);

  //DebugPrintf ("(ITE.nRollupTicks - ITE.nRollupTimerTick - 1) * ITE.nScanLinesPerTick = %d",
      (ITE.nRollupTicks - ITE.nRollupTimerTick - 1) * ITE.nScanLinesPerTick);

  //DebugPrintf ("ITE.nRollupTimerTick * ITE.nScanLinesPerTick = %d", ITE.nRollupTimerTick *
      ITE.nScanLinesPerTick);

  nPictLines =
    (ITE.nPopupWndHeight - ITE.nRollupTimerTick * ITE.nScanLinesPerTick > nDrawerFrames) ?
     nDrawerFrames :
     (ITE.nRollupTicks - ITE.nRollupTimerTick) * ITE.nScanLinesPerTick;

  //DebugPrintf ("expression = %d", nPictLines);

  BitBlt (hConstDC,
          ITE.nDrawerOverhang,
          GetSystemMetrics (SM_CYSIZE) + GetSystemMetrics (SM_CYBORDER),
          ITE.nPopupWndWidth,
          nPictLines,
          hPictDC,
          0,
          ITE.nRollupTimerTick * ITE.nScanLinesPerTick,
          SRCCOPY);

/* Watch out.  We have ITE.hDDPictBitmap selected into hPictDC.
   RealizePalette causes the popup to receive a WM_PALETTECHANGED
   message.  During the processing of that message, the popup
   is invalidated and updated.  This causes a WM_PAINT to be
   sent to the popup.  During the processing of the WM_PAINT
   message, we try to select ITE.hDDPictBitmap into a compatible
   DC (hMemoryDC to be exact).  This will fail if we don't first
   select out the bitmap because the bitmap
   is ALREADY selected into another dc, namely this function's
   hPictDC. */

  SelectObject (hPictDC, hOldPictBitmap);
  DeleteDC     (hPictDC);

  if (ITE.nRollupTimerTick < nDrawerFrames)
    nTimerTick = ITE.nRollupTimerTick;
  else
  if (ITE.nRollupTimerTick > ITE.nRollupTicks - nDrawerFrames)
    nTimerTick = ITE.nRollupTicks - ITE.nRollupTimerTick;
  else
    nTimerTick = nDrawerFrames - 1;

  //DebugPrintf ("nRollupTimerTick = %d, nRollupTicks = %d, nDrawerFrames = %d, nTimerTick = %d",
  //  ITE.nRollupTimerTick, ITE.nRollupTicks, nDrawerFrames, nTimerTick);

  if (nTimerTick || ITE.fPhotoRolledUp)
    {
      hBlackPen = GetStockObject (BLACK_PEN);

      hOldPen = SelectObject (hConstDC, hBlackPen);

      /* Draw the left rear vertical */

      MoveTo (hConstDC, 0, 0);
      LineTo (hConstDC, 0, GetSystemMetrics (SM_CYSIZE) + GetSystemMetrics (SM_CYBORDER));

      /* Draw the right rear vertical */

      MoveTo (hConstDC, ITE.nPopupWndWidth + 2 * ITE.nDrawerOverhang - 1, 0);
      LineTo (hConstDC, ITE.nPopupWndWidth + 2 * ITE.nDrawerOverhang - 1, GetSystemMetrics (SM_CYSIZE) +
          GetSystemMetrics (SM_CYBORDER));

      SelectObject (hConstDC, hOldPen);
    }

  if (nTimerTick)
    {
      BitBlt (hConstDC,
              nTimerTick,
              nTimerTick,
              ITE.nPopupWndWidth + 2 * ITE.nDrawerOverhang,
              GetSystemMetrics (SM_CYSIZE) /* + GetSystemMetrics (SM_CYBORDER) */,
              hSaveNonClientDC,
              0,
              0,
              SRCCOPY);

      /* Define and paint the left edge and top surface region to give the appearance that the
          "drawer" which is sliding out of the caption bar is solid.


                                    |        +-------  Width = ITE.nPopupWndWidth + 2 * ITE.nDrawerOverhang
```

ICV14PRINT

```
                               |       |
                               |       |
                               A      \|/       B
          ----------------     +-----------------+  ------------ Y = 0
                               |\    top surface  \
                               | \                 \
     Left edge --------------> \------------------\C
                               F---|D               |
                                \ +                 |  <---- Height = GetSystemMetrics (SM_CYSIZE) +
                               | \|E                |                GetSystemMetrics (SM_CYBORDER)
                               |  ------------------+
                               |
                               |
                               |
                               |

                               X = 0

*****************************************************************************/

    /* Corner A */

    aptVertex[0].x = 0;
    aptVertex[0].y = 0;

    /* Corner B */

    aptVertex[1].x = ITE.nPopupWndWidth + 2 * ITE.nDrawerOverhang + 1;
    aptVertex[1].y = 0;

    /* Corner C */

    aptVertex[2].x = ITE.nPopupWndWidth + 2 * ITE.nDrawerOverhang - 1 + nTimerTick;
    aptVertex[2].y = nTimerTick;

    /* Corner D */

    aptVertex[3].x = nTimerTick;
    aptVertex[3].y = nTimerTick;

    /* Corner E */

    aptVertex[4].x = nTimerTick;
    aptVertex[4].y = GetSystemMetrics (SM_CYSIZE) /* + GetSystemMetrics (SM_CYBORDER) */ + nTimerTick;

    /* Corner F */

    aptVertex[5].x = 0;
    aptVertex[5].y = GetSystemMetrics (SM_CYSIZE) /* + GetSystemMetrics (SM_CYBORDER) */;

    hRgn      = CreatePolygonRgn (aptVertex, 6, WINDING);
    hBrush    = CreateSolidBrush (GetSysColor (ITE.fActive ? COLOR_ACTIVECAPTION : COLOR_INACTIVECAPTION));
    hOldBrush = SelectObject (hConstDC, hBrush);

    PaintRgn (hConstDC, hRgn);

    SelectObject (hConstDC, hOldBrush);
    DeleteObject (hRgn);
    DeleteObject (hBrush);

    SelectObject (hConstDC, hBlackPen);

    /* Draw the left rear vertical */

    MoveTo (hConstDC, 0, 0);
    LineTo (hConstDC, 0, GetSystemMetrics (SM_CYSIZE) + GetSystemMetrics (SM_CYBORDER));

    /* Draw front left vertical */

    MoveTo (hConstDC, nTimerTick, nTimerTick);
    LineTo (hConstDC, nTimerTick, nTimerTick + GetSystemMetrics (SM_CYSIZE) + GetSystemMetrics
        (SM_CYBORDER));

    /* Draw front right vertical */

    MoveTo (hConstDC, ITE.nPopupWndWidth + 2 * ITE.nDrawerOverhang - 1 + nTimerTick, nTimerTick);
    LineTo (hConstDC, ITE.nPopupWndWidth + 2 * ITE.nDrawerOverhang - 1 + nTimerTick, nTimerTick +
        GetSystemMetrics (SM_CYSIZE) + GetSystemMetrics (SM_CYBORDER));

    /* Draw front top horizontal */

    MoveTo (hConstDC, nTimerTick,          nTimerTick);
    LineTo (hConstDC, ITE.nPopupWndWidth + 2 * ITE.nDrawerOverhang - 1 + nTimerTick, nTimerTick);

    /* Draw front bottom horizontal */

    MoveTo (hConstDC, nTimerTick,          nTimerTick + GetSystemMetrics (SM_CYSIZE) /* + GetSystemMetrics
        (SM_CYBORDER) */);
    LineTo (hConstDC, ITE.nPopupWndWidth + 2 * ITE.nDrawerOverhang - 1 + nTimerTick, nTimerTick +
        GetSystemMetrics (SM_CYSIZE) /* + GetSystemMetrics (SM_CYBORDER) */);

    /* Draw upper left extrusion */

    MoveTo (hConstDC, 0,     0);
    LineTo (hConstDC, nTimerTick, nTimerTick);

    /* Draw lower left extrusion */

    MoveTo (hConstDC, 0,     GetSystemMetrics (SM_CYSIZE) /* + GetSystemMetrics (SM_CYBORDER) */);
    LineTo (hConstDC, nTimerTick, nTimerTick + GetSystemMetrics (SM_CYSIZE) /* + GetSystemMetrics
        (SM_CYBORDER) */);

      /* Draw upper right extrusion */

      MoveTo (hConstDC, ITE.nPopupWndWidth + 2 * ITE.nDrawerOverhang - 1,     0);
      LineTo (hConstDC, ITE.nPopupWndWidth + 2 * ITE.nDrawerOverhang - 1 + nTimerTick, nTimerTick);

      SelectObject (hConstDC, hOldPen);
    }

  GetWindowRect (ITE.hWnd, &rect);

  if (ITE.hPictPalette)
    {
      hpalOld  = SelectPalette (hWindowDC, ITE.hPictPalette, ITE.fBackgroundPalette);
      hpalOld2 = SelectPalette (hConstDC,  ITE.hPictPalette, ITE.fBackgroundPalette);
      RealizePalette (hWindowDC);  // <--- Causes WM_ERASEBKGND to be sent to PopupWndProc
    }

//DebugBreak ();

  BitBlt (hOutputDC ? hOutputDC : hWindowDC,
          ITE.nPopupWndPosSU + rect.left - ITE.nDrawerOverhang,
          nTop,
          ITE.nPopupWndWidth + 2 * ITE.nDrawerOverhang + nDrawerFrames,
          GetSystemMetrics (SM_CYSIZE) + GetSystemMetrics (SM_CYBORDER) + nDrawerFrames,
          hConstDC,
          0,
          0,
          SRCCOPY);

  if (ITE.hPictPalette)
    {
      SelectPalette (hWindowDC, hpalOld,  ITE.fBackgroundPalette);
      SelectPalette (hConstDC,  hpalOld2, ITE.fBackgroundPalette);
      RealizePalette (hWindowDC);
    }

  ReleaseDC (ITE.hWnd,      hWindowDC);

  SelectObject (hSaveNonClientDC, hOldSaveNonClientBitmap);
  DeleteDC     (hSaveNonClientDC);

  SelectObject (hConstDC, hOldConstBitmap);
  DeleteObject (hConstBitmap);
  DeleteDC     (hConstDC);

  return (nPictLines);
}
```

```
/* Copyright 1989-1994 FotoAttacher by Michael B. Mast, licensed
   to ProCentric Computer Service, Inc., all rights reserverd.
        Trade secret and patent pending. */

#include <windows.h>
#include "prochook.h"
#include "userobj.h"
#include <commdlg.h>
#include <dlgs.h>

/* Defines used by l_bitmap.h */

#define WIN31
#define FOR_DLL    // Must define this before includiing l_bitmap.h

#include <l_bitmap.h>
#include <l_error.h>

#include "fadll.h"

#include "resource.h"
#include <debug.h>

/* When defined, exit windows during initial panel display
   if space bar pressed.  Not for retail. */

#define EXITONSPACE

extern const HINSTANCE _hModule;
BOOL fBitBlocker;
BOOL fDebugLog;
BOOL fTimer;

void LoadAndDisplay (HWND, LPSTR);

LRESULT CALLBACK  DriverProc
  (
    DWORD   dwDriverIdentifier,
    HDRVR   hDriver,
    UINT    wMessage,
    LPARAM  lParam1,
    LPARAM  lParam2
)

{
  DWORD dwRes = 0L;
  char   szBuffer[50];

  switch (wMessage)
    {
      case DRV_LOAD:
        /* Sent when the driver is loaded. This is always   */
        /* the first message received by a driver.          */

        // Set current hook status to false
        //gbHook = FALSE;

        if (!(hLibModule = GetModuleHandle ("FADLL.DLL")))
          {
            MessageBox (NULL, "Unable to locate module FADLL.DLL.  Product not installed correctly", "FADLL",
                MB_ICONSTOP | MB_OK);
            dwRes = 0L;
            break;
          }

        switch (DialogBox (_hModule, "OPENDLG2", NULL, (DLGPROC) OpeningDlgProc))
          {
            case OPENDLG_DISABLE:
              dwRes = 0L;
              break;

            case OPENDLG_ENABLE:
              //LibIniti (fBitBlocker, fDebugLog);
              //LibIniti (fBitBlocker, TRUE);
              LibIniti (fBitBlocker, FALSE);
              dwRes = 1L;
              break;

            case OPENDLG_EXIT:
              ExitWindows (0, 0);
          }

        break;

      case DRV_FREE:
        /* Sent when the driver is about to be discarded.   */

        /* This is the last message a driver receives       */
        /* before it is freed.                              */

        // Remove Mouse Hook located in HOOK.C
        //if (gbHook)
        //  RemoveMouseHook();

        //ShutdownDriver ();

        dwRes = 1L;     /* Return value is ignored.         */
        break;

      case DRV_OPEN:
        /* Sent when the driver is opened.                    */

        dwRes = 1L;       /* Return 0L to fail.               */
                          /* This value is subsequently used  */
                          /* for dwDriverIdentifier.          */

        break;

      case DRV_CLOSE:
        /* Sent when the driver is closed. Drivers are        */
        /* unloaded when the open count reaches zero.         */

        dwRes = 1L;     /* Return 0L to fail.                 */
        break;

      case DRV_ENABLE:
        /* Sent when the driver is loaded or reloaded and     */
        /* when Windows is enabled. Hook or rehook            */
        /* interrupts and initialize hardware. Expect the     */
        /* driver to be in memory only between the enable     */
        /* and disable messages.                              */

        dwRes = 1L;     /* Return value is ignored.           */
        break;

      case DRV_DISABLE:
        /* Sent before the driver is freed or when Windows    */
        /* is disabled. Unhook interrupts and place           */
        /* peripherals in an inactive state.                  */

        dwRes = 1L;     /* Return value is ignored.           */
        break;

      case DRV_INSTALL:
        /* Sent when the driver is installed.                 */

        dwRes = DRVCNF_OK; /* Can also return DRV_CANCEL        */
                           /* and DRV_RESTART.                  */
        break;

      case DRV_REMOVE:
        /* Sent when the driver is removed.                   */


        dwRes = 1L;     /* Return value is ignored.           */
        break;

      case DRV_QUERYCONFIGURE:
        /* Sent to determine if the driver can be             */
        /* configured.                                        */

        dwRes = 0L;     /* Zero indicates configuration       */
                        /* NOT supported.                     */
        break;

      case DRV_CONFIGURE:
        /* Sent to display the custom-configuration           */
        /* dialog box for the driver.                         */

        dwRes = DRVCNF_OK; /* Can also return DRV_CANCEL        */
                           /* and DRV_RESTART.                  */
        break;

      default:
        /* Process any messages not explicitly trapped.       */

        return DefDriverProc (dwDriverIdentifier,
                              hDriver,
                              wMessage,
                              lParam1,
                              lParam2);
    }

  return dwRes;
}

BOOL __loadds WINAPI OpeningDlgProc
  (
    HWND      hDlg,
    unsigned iMessage,
    WORD      wParam,
    LONG      lParam
  )

{
  HRSRC   hResource;
  HGLOBAL hResourceData;
  LPSTR   lpResourceData;
  LPBITMAPPARMS lpBitmapParms;

  static int nTick;

#if 1
  MSG     msg;

  msg.hwnd      = hDlg;
  msg.message   = iMessage;
  msg.wParam    = wParam;
  msg.lParam    = lParam;

```

```
   DebugOutputMessage (&msg);
#endif

   switch (iMessage)
     {
       case WM_INITDIALOG:
         SetTimer (hDlg, 1, 2500, NULL);
         fTimer = TRUE;
         nTick = 0;
         PostMessage (hDlg, WM_USER, 0, 0L);
         break;

       case WM_USER:
       case WM_TIMER:
         switch (nTick)
           {
             case 0:
                                                     LoadAndDisplay (hDlg, "OPEN1");
               break;

             case 1:
                                                     LoadAndDisplay (hDlg, "OPEN2");
               break;

             case 2:
                                                     LoadAndDisplay (hDlg, "OPEN3");
               break;

             case 3:
                                                     LoadAndDisplay (hDlg, "OPEN4");
               break;

             case 4:
               KillTimer (hDlg, 1);
               fTimer = FALSE;
               EndDialog (hDlg, OPENDLG_ENABLE);
               break;
           }

         nTick++;
         break;

       /* Little known fact about WM_GETDLGCODE: the wParam field contains the
          key code of the key which caused the message to be sent.  */

       case WM_GETDLGCODE:
         switch (wParam)
           {
             case VK_ESCAPE:
               if (fTimer)
                 KillTimer (hDlg, 1);

               EndDialog (hDlg, OPENDLG_DISABLE);
               break;

#ifdef EXITONSPACE
             case VK_SPACE:
               if (fTimer)
                 KillTimer (hDlg, 1);

               EndDialog (hDlg, OPENDLG_EXIT);
               break;
#endif
           }

         break;

       case WM_COMMAND:
         switch (wParam)
           {
             case OPENDLG_ENABLE:
             case OPENDLG_DISABLE:
             case OPENDLG_EXIT:
               fBitBlocker = IsDlgButtonChecked (hDlg, OPENDLG_BBON);
               fDebugLog   = IsDlgButtonChecked (hDlg, OPENDLG_DBGON);

               EndDialog (hDlg, wParam);
               break;

             default:
               return FALSE;
           }

         break;

       default:
         return FALSE;
     }

   return TRUE;
}


void LoadAndDisplay
        (
                HWND  hWnd,
                LPSTR lpszDIBResource
        )

{
   HBITMAP  hBitmap;
   HDC      hDC, hCompatDC;
        RECT     rect;
        int      nWidth, nHeight;

        GetClientRect (hWnd, &rect);

        nWidth  = rect.right;
        nHeight = (2 * nWidth) / 5;

   hBitmap   = LoadBitmap (_hModule, lpszDIBResource);
   hDC       = GetDC (hWnd);
   hCompatDC = CreateCompatibleDC (hDC);

   SaveDC        (hCompatDC);
   SelectObject  (hCompatDC, hBitmap);
   StretchBlt    (hDC, 0, 0, nWidth, nHeight, hCompatDC, 0, 0, 500, 200, SRCCOPY);
   RestoreDC     (hCompatDC, -1);
   DeleteObject  (hBitmap);
   DeleteDC      (hCompatDC);
   ReleaseDC     (hWnd, hDC);
}
```

```
/* Copyright 1989-1994 FotoAttacher by Michael B. Mast, licensed
   to ProCentric Computer Service, Inc., all rights reserverd.
         Trade secret and patent pending. */

#ifdef __cplusplus
extern "C" {
#endif

#ifdef _FADLL
//#define MOUSEHOOK

/* Header signatutes for various resources */

#define BFT_ICON   0x4349   /* 'IC' */
#define BFT_BITMAP 0x4d42   /* 'BM' */
#define BFT_CURSOR 0x5450   /* 'PT' */

/* Caption signatures for all allocated structures. */

#define CAPTION_SIG          0x4150  /* 'PA' */
#define ITE_SIG              0x5449  /* 'IT' */
#define CALLWNDPROC_SIG      0x5743  /* 'CW' */
#define APPLICATION_SIG      0x5041  /* 'AP' */
#define LOADPARMS_SIG        0x504C  /* 'LP' */
#define BITMAPPARMS_SIG      0x5042  /* 'BP' */
#define DRAWDATA_SIG         0x4444  /* 'DD' */
#define DCHOOKS_SIG          0x4344  /* 'DC' */

/* Function IDs for InternalGetWindowDC */

#define FN_CREATECOMPATIBLEDC  0
#define FN_CREATEMETAFILE      -1 // ???????
#define FN_GETDC1              2
#define FN_GETDC2              3  // Same as NCCALCSIZE???
#define FN_GETWINDOWDC         1
#define FN_GETDCEX             -1 // ??????
#define FN_BEGINPAINT          3
#define FN_WM_NCPAINT          5

/* Flags for InternalGetWindowDC function 5 (GetWindowDC) */

#define IGWDC_CLIENT  0x0001
#define IGWDC_WINDOW  0x0080

//#define BUTTONUP   0
//#define BUTTONDOWN 1

/* Timer ID's for rolling popup up/down.  *NEVER* use zero
   as a timer ID!  It can cause the caption to flash instead
   of sending a message (but doesn't always). */

#define ROLLDOWNSEQ_DOWN 0x4000
#define ROLLDOWNSEQ_UP   0x4001
#define ROLLUPSEQ_DOWN   0x4002
#define ROLLUPSEQ_UP     0x4003

/* nDrawerFrames may NEVER exceed the value of DRAWERFRAMESMAX */

#define DRAWERFRAMESMAX 12

/* Macro to determine to round off the given value to the closest byte */

#define WIDTHBYTES(i) ((i + 31) / 32 * 4)

/* macro to determine if resource is a DIB */

#define ISDIB(bft) ((bft) == BFT_BITMAP)

/* flags for _lseek */

#define  SEEK_CUR 1
#define  SEEK_END 2
#define  SEEK_SET 0

#define ID_CAPTION     0
#define ID_EXITWINDOWS 1
#define ID_TEST        2

#define WM_ENTERMENULOOP  0x0211  /* Undocumented */
#endif

#define FA_OPENBITMAPFILE     (WM_USER + 4)
#define FA_UIUNHIDE           (WM_USER + 5)
#define FA_SCREENSAVECONFIG   (WM_USER + 6)

#define FA_SCREENSAVEACTIVE (WM_USER + 7)
/* wParam == TRUE  the screen save has been activated
                                     LOWORD (lParam) == hWnd
          == FALSE the screen save deactivated. */

/* FA_GETGALLERYLIST can be sent from the screen save
   to FOTOATT.EXE or from FOTOATT.EXE to the
   screen save.  The receiver allocates and
   populates an array of  Gallery structures (defined
   by schema) and returns the handle to the
   array in the low word of the return value. */

#define FA_GETGALLERYLIST      (WM_USER + 8)

/* FA_STOREGALLERYLIST is sent from the screensaver to
   FOTOATT.EXE to tell FOTOATT.EXE which galleries are
   to participate in the screen saver.  The wPara field
   contains the handle to the array of Gallery
   structure. */

#define FA_STOREGALLERYLIST    (WM_USER + 9)

/* This scructure is used to communicate requests and
   responses between both FADLL AND the FotoAttacher application.


   Field                 EXE->DLL  DLL->EXE
   ---------------------------------------
   hWnd                  No        Yes
   hDDPictBitmap         Yes       No
   hPictPalette          Yes       No
   nPopupWndWidth        Yes       Yes(1)
   nPopupWndHeight       Yes       Yes(1)
   nPopupWndPosSU        Yes(2)    Yes(2)
   szBuffer              No        Yes

   1.  The DLL sets these fields to zero if it wants the EXE to
       size the bitmap to the default size (which is determined
       by the EXE).  If the DLL wants a specific size, which is
       the case when a user sizes an already displayed photo,
       then the DLL sets these fields to the desired size.

   2.  The EXE simply echoes back whatever the DLL specifies in
       this field.  If the DLL sees a zero in this field, it
       positions the picture in the default location (determined
       by the DLL).  If not zero, the DLL places the image
       as the specified horizontal location.  The field is in
       screen units.

*************************************************************/


typedef struct _FABITMAPINFO
  {
    WORD       wFlags;
    HWND       hWnd;
    HWND       hWndPopup;
    HBITMAP    hDDPictBitmap;
    HPALETTE   hPictPalette;
    int        nPopupWndWidth;
    int        nPopupWndHeight;
    int        nPopupWndPosSU;
    int        nBitmapWidth;        /* Width on non scalled bitmat. */
    int        nBitmapHeight;       /* Height of non scalled bitmap. */
    char       szBuffer[128];
  } FABITMAPINFO;

typedef FABITMAPINFO FAR * LPFABITMAPINFO;

/* FABITMAPINFO wFlags */

#define FAB_INITIALLOAD    0x0001    /* Initial load of bitmap  */
#define FAB_REPLACE        0x0002    /* Replace with new bitmap */
#define FAB_RESIZE         0x0004    /* Resize existing bitmap  */

#define ROLLUP         0
#define ROLLDOWN       1

typedef struct _LIBINIT2PARMS
  {
    UINT                  unBitmapLoadedMessage;
    UINT                  unRollupMessage;
  } LIBINIT2PARMS;

typedef LIBINIT2PARMS FAR * LPLIBINIT2PARMS;

#ifdef _FADLL
typedef struct _DCHOOKS
  {
    WORD    wSig1;        /*  CAPTION_SIG */
    WORD    wSig2;        /*  DCHOOKS_SIG */
    HWND    hWnd;         /* InternalGetWindowDC parm 1 */
    HRGN    hRgn;         /* InternalGetWindowDC parm 2 */
    int     nFunctionID;  /* InternalGetWindowDC parm 3 */
    WORD    wFlags;       /* InternalGetWindowDC parm 4 */
    int     cx;
    int     cy;
    HDC     hDeviceDC;
    HDC     hCompatDC;
    HBITMAP hCompatBitmap;
    HBITMAP hOldCompatBitmap;
    HANDLE  hDCE;
  } DCHOOKS;

#endif

#define RECT_LTRB(x)  (x)->left, (x)->top, (x)->right, (x)->bottom

typedef struct _INSTANCE_TABLE_ENTRY
  {
    WORD     wSig1;  /*  CAPTION_SIG */
    WORD     wSig2;  /*  BITMAP_ITE_SIG */
             int      nITEntry;           /* Entry number.  Used for walking instance table.
                                             Future versions will be near pointer. */
    HWND     hWnd;
```

```
    HTASK   hTask;
    HDWP    hDwp;
    HWND    hwndPopup;
    HANDLE  hFABitmapInfo;        /* Handle to FABITMAPINFO structure */
//    char    szNextPictFile[128];
    char    szCurrentPictFile[128];
    BOOL    fIdleMouseEnabled;
    BOOL    fSystemPaletteChanged;
    BOOL    fBackgroundPalette;
    BOOL    fRollupInProgress;   /* TRUE during entire roll up process */
    BOOL    fDrawerVisible;       /* TRUE only after popup moved down to
                                     below the caption bar. */
    BOOL    fPhotoRolledUp;       /* TRUE only after photo has been rolled up
                                     FALSE if photo is rolled down */
    BOOL    fSnap;                /* TRUE if photo was snapped up */
    BOOL    fHook_WM_NCPAINT;
              BOOL    fHookInternalGetRelease;
    BOOL    fActive;              /* Is the window active? */
    BOOL    bModifyCaptionText;
              BOOL      fAppHasCaptionText;
    HANDLE  hPictPalette;         /* Pallete for the picture. */
    HBITMAP hDDPictBitmap;        /* Device dependent picture bitmap */
//    HBITMAP hDDMaskBitmap;        /* Device dependent mask bitmap */

    RECT    rectWindow;           /* Bounding area of the window. */
    RECT    rectCaption;          /* Bounding area of the caption bar */

    int     nMenuTop;             /* Top of menu bar */
    int     nCaptionLead;         /* Width of objects which preceed caption bar */
    int     nCaptionWidth;        /* Width of caption bar */
    int     nCaptionFollow;       /* Width of objects which follow caption bar */

    int     nPopupWndPosSU;       /* Position of popup window in screen units. */
    int     nPopupWndWidth;
    int     nPopupWndHeight;
    int     nBitmapWidth;         /* Width on non scalled bitmat. */
    int     nBitmapHeight;        /* Height of non scalled bitmap. */

    /* Defining fields to support popup window rollup here instead of as
       static fields within the bitmap subclass proc allows the user to
       start rolling up more than one window at the same time. */

    int     nTimePerTick;
    int     nDrawerOverhang;
    int     nScanLinesPerTick;
    int     nDrawerTimerTick;
    int     nRollupTimerTick;
    int     nRollupTicks;
    HBITMAP hSaveNonClientBitmap;

    FARPROC lpfnOldClassProc;
  } INSTANCE_TABLE_ENTRY;

typedef INSTANCE_TABLE_ENTRY FAR * LPINSTANCE_TABLE_ENTRY;

#ifdef _FADLL
typedef struct _CALLWNDPROC
  {
    WORD     wSig1;  /*  CAPTION_SIG */
    WORD     wSig2;  /*  CALLWNDPROC_SIG */
    WORD     hlParam;
    WORD     llParam;
    WORD     wParam;
    WORD     wMsg;
    WORD     hWnd;
  } CALLWNDPROC;

typedef CALLWNDPROC FAR *LPCALLWNDPROC;

//typedef struct _LOADPARMS
//  {
//    WORD     wSig1;  /*  CAPTION_SIG */
//    WORD     wSig2;  /*  LOADPARMS_SIG */
//    WORD     segEnv;
//    LPSTR    lpszCmdLine;
//    LPWORD   lpwShow;
//    LPWORD   lpwReserved;
//  } LOADPARMS;
//
//typedef LOADPARMS FAR * LPLOADPARMS;

/* wBitmapFlags */

#define BITMAP_FILE 0x0001  /* Bitmap is a file */
#define BITMAP_RSRC 0x0002  /* Bitmap is a resource */

typedef struct _BITMAPPARMS
  {
    WORD     wSig1;  /*  CAPTION_SIG */
    WORD     wSig2;  /*  BITMAPPARMS_SIG */
    char     szBitmapName[13];
    WORD     wBitmapFlags;
  } BITMAPPARMS;

typedef BITMAPPARMS FAR * LPBITMAPPARMS;

//typedef struct _DRAWDATA
//  {
//    WORD               wSig1;  /*  CAPTION_SIG */
//    WORD               wSig2;  /*  DRAWDATA_SIG */
//    LPITEM           lpItem;
//    unsigned short   xTab;
//    HMENU            hMenuPopup;
//  } DRAWDATA;
//
//typedef DRAWDATA FAR *LPDRAWDATA;

/***************************************************************************
*                                                                         *
*                           FILE OPEN STRUCTURE                           *
*                                                                         *
***************************************************************************/

//typedef struct tagFOCHUNK
//    {
//        OPENFILENAME  of;
//        char          szFile[MAXFILENAMELEN];
//        char          szFileTitle[MAXFILETITLELEN];
//    }
//FOCHUNK;
//
//typedef FOCHUNK FAR *LPFOCHUNK;
//typedef FOCHUNK FAR *LPFSCHUNK;

typedef WORD (CALLBACK* FARHOOK)(HWND,UINT,WPARAM, LPARAM);

BOOL IsMenuHeap(WORD wSel);
BOOL ContainsLocalHeap(WORD seg);
void DrawMenuItem (DRAWITEMSTRUCT FAR *, COLORREF, COLORREF, HBRUSH);
void DrawTaskItem (DRAWITEMSTRUCT FAR *, COLORREF, COLORREF, HBRUSH);

#define REGISTERED
#define MAXINSTANCES    40
#define MAKEP(s,o) ((void far *) (((DWORD) (s) << 16) + (WORD) (o)))
#define HMODULE_FROM_HTASK(hTask) (* (WORD far *) MAKEP (hTask, 0x1E))
#define ACTIVEPALETTE(pBitmap) (((pBITMAPHANDLE) pBitmap)->Flags.FixedPalette ? ((pBITMAPHANDLE)
      pBitmap)->hFixedPalette : ((pBITMAPHANDLE) pBitmap)->hPalette)
#define ISPOPUP(w,p) (IsWindow(p) && GetParent (p) != w)
#define ISCHILD(w,p) (IsWindow(p) && GetParent (p) == w)

/* Define a "shorthand" macro for the current Instance Table Entry */

#define ITE lpInstanceTable[nInstanceTable[x]
#if BITBLOCKER
int     __loadds WINAPI    BitBlockerCallback          (int, HWND FAR *);
#endif

BOOL    __loadds WINAPI    OpeningDlgProc              (HWND, unsigned, WORD, LONG);
void                       CalcSize                    (int, LPRECT);
long  __loadds WINAPI      SubClassProc                (HWND, unsigned, WORD, LONG);
void                       ChildToPopup                (HWND, HWND);
long __loadds WINAPI       DummyWndProc                (HWND, UINT, WPARAM, LPARAM);
int __loadds WINAPI        ExcludeVisRect              (HDC, int, int, int, int);   // Undocumented exported
      Windows functon (documented
                                                                      //   (incorrectly in Schulman)
void                       FreePopupObjects            (int);
HRGN  __loadds WINAPI      GetClipRgn                  (HDC);  // Undocumented exported Windows function
WORD __loadds WINAPI       GetTaskDS                   (VOID);  //Undocumented exported Windows function
DWORD __loadds WINAPI      GetDCHook                   (HDC, FARPROC FAR *);  // Undocumented exported Windows
      funciton
WORD                       GetPrivateProfileHex                  (LPSTR, LPSTR, WORD, LPSTR);
void                       HackOutMDIClientName        (LPSTR);
HRGN  __loadds WINAPI      InquireVisRgn               (HDC);  // Undocumented exported Windows function
void  __loadds WINAPI      LibInit1                    (BOOL, BOOL);
HDWP __loadds WINAPI       NewBeginDeferWindowPos      (int);
BOOL __loadds WINAPI       NewBitBlt                   (HDC, int, int, int, int, HDC, int, int, DWORD);
HWND __loadds WINAPI       NewCreateWindow                                 (LPCSTR, LPCSTR, DWORD,
      int, int, int, int, HWND, HMENU, HINSTANCE, LPVOID);
HWND __loadds WINAPI       NewCreateWindowEx                           (DWORD, LPCSTR, LPCSTR,
      DWORD, int, int, int, int, HWND, HMENU, HINSTANCE, LPVOID);
HDWP __loadds WINAPI       NewDeferWindowPos           (HDWP, HWND, HWND, int, int, int, int, UINT);
HDC  __loadds WINAPI       NewInternalGetWindowDC      (HWND, HRGN, int, WORD);  // Undocumented internal (not
      exported) Windows function
int  __loadds WINAPI       NewInternalReleaseDC        (HDC, WORD);                 // Undocumented internal (not
      exported) Windows function
HDC  __loadds WINAPI       DebugInternalGetWindowDC    (HWND, HRGN, int, WORD);  // Undocumented internal (not
      exported) Windows function
int  __loadds WINAPI       DebugInternalReleaseDC      (HDC, WORD);                 // Undocumented internal (not
      exported) Windows function
HGDIOBJ __loadds WINAPI    DebugSelectObject           (HDC, HGDIOBJ);               // Undocumented internal
      (not exported) Windows function
void __loadds WINAPI       NewCascadeChildWindows      (HWND, WORD);
void __loadds WINAPI       NewTileChildWindows         (HWND, WORD);
HANDLE                     OpenDIB                     (LPSTR);
void                       PopupToChild                (HWND, HWND);
long __loadds WINAPI       PopupWndProc                (HWND, UINT, WPARAM, LPARAM);
void                       ReleaseCompatibleDC         (int);
long __loadds WINAPI       ResizeWndProc               (HWND, UINT, WPARAM, LPARAM);
int __loadds WINAPI        SelectVisRgn                (HDC, HRGN);  // Undocumented exported Windows function
BOOL __loadds WINAPI       SetDCHook                   (HDC, FARPROC, DWORD); //Undocumented exported Windows
      function
void  __loadds WINAPI      SetTimeDate                 (LPSTR);
int                        ShowDrawer                  (HDC, int);
void  __loadds WINAPI      SwitchToThisWindow          (HWND, BOOL);  // Undocumented exported Windows function
void __loadds WINAPI       CascadeChildWindows         (HWND, WORD);  // Undocumented exported Windows function
void __loadds WINAPI       TileChildWindows            (HWND, WORD);  // Undocumented exported Windows function
void                       UnhookApplication           (BOOL, int);
BOOL                       UnhookedBitBlt              (HDC, int, int, int, int, HDC, int, int, DWORD);
void  __loadds WINAPI      UpdateInstanceTable         (HWND);
void                                                                StartServerSession
```

```
        (int, HWND, LPSTR);
BOOL                         WritePrivateProfileHex       (LPSTR, LPSTR, WORD, LPSTR);
BOOL                         WritePrivateProfileInt       (LPSTR, LPSTR, int, LPSTR);

#ifdef MOUSEHOOK
LRESULT __loadds CALLBACK MouseHook                      (int, WORD, LONG) ;
#endif

//#define config                         100
//#define uninstall                      200
#endif

void WINAPI UpdateCaptions (void);
void WINAPI EnablePopupRButton (void);
VOID WINAPI LibInit2 (HWND, LPLIBINIT2PARMS);
HWND WINAPI GetFotoAttWnd(void);
BOOL WINAPI ITEFirst  (LPINSTANCE_TABLE_ENTRY);
BOOL WINAPI ITENext   (LPINSTANCE_TABLE_ENTRY);

#ifdef _FADLL
extern LPINSTANCE_TABLE_ENTRY lpInstanceTable;
extern int                    nInstanceTableEntries;
extern HANDLE                 hLibInstance;
extern HANDLE                 hLibModule;
extern HANDLE                 hAppInstance;
extern UINT                   unRollupMessage;
extern UINT                   unBitmapLoadedMessage;
extern UINT                   unCreateDrawersMessage;
extern WORD                   wDefUserHeap;
extern HWND                   hDummyWnd;
extern HWND                   hWndServer;
extern int                    nDrawerFrames;
extern NPHOOKCHILD            npHookBitBlt;
extern FARPROC                lpfnOldFrameWndProc;
extern LPSTR                  lpszResizeClassName;
extern int                    nResizeHandleSize;
extern int                    nResizeFrameInset;
#endif

#ifdef __cplusplus
}
#endif
```

I claim:

1. Apparatus for associating an image display area with an application display area, said apparatus comprising:

processing means providing a windowed operating environment;

a display coupled to said processing means;

at least one application program running in said windowed operating environment, said windowed operating environment providing an application display area on said display for displaying output of said at least one application program to a user;

attaching means present in said windowed operating environment, said attaching means comprising:

hook means by which said attaching means is informed when said application display area associated with said at least one application program is created;

image attachment means for displaying an image display area on said display such that said image display area is displayed at a first location with respect to said application display area;

display area movement detection means by means of which said attaching means detects display area movement functions associated with said application display area, said display area movement detection means determining a response of said image attachment means to said display area movement functions.

2. The apparatus of claim 1 wherein said display area movement functions comprise positioning functions.

3. The apparatus of claim 1 wherein said display area movement functions comprise sizing functions.

4. The apparatus of claim 1 wherein said display area movement functions comprise functions for hiding visible display areas and making hidden display areas visible.

5. The apparatus of claim 1 wherein said hook means further comprises subclassing means by means of which messages sent to a subclassed application program are received by said subclassing means first.

6. The apparatus of claim 1 further comprising an attachment application running in said windowed operating environment, said attachment application providing an interface for said user to select an object to be displayed in said image display area associated with said application display area, said object being selected from a plurality of displayable objects.

7. The apparatus of claim 6 wherein said displayable objects comprise scanned photographs.

8. The apparatus of claim 6 wherein said displayable objects comprise graphics files.

9. The apparatus of claim 6 wherein said displayable objects comprise video files.

10. The apparatus of claim 1 wherein said image attachment means provide an image attachment drawer from which said image display area is visibly produced.

11. The apparatus of claim 10 further comprising a timer, said image attachment means responsive to timer messages for displaying said image attachment drawer.

12. The apparatus of claim 1 wherein said attachment means provides at least one image display area for each of a plurality of application display areas associated with a plurality of distinct application programs.

13. The apparatus of claim 1 wherein said first location is referenced to a caption bar in said application display area.

14. A method for associating an image display area with an application display area in a computer system, said computer system comprising at least one application program and image attachment means operating within an operating environment, said method comprising the steps of:

detecting the creation of an application display area associated with an application program;

creating an image display area at a first location on said application display area;

displaying an image file in said image display area without interfering to any significant extent with the operation of said application program.

15. The method of claim 14 wherein said step of detecting the creation of said application display area is performed via hooks in said operating environment.

16. The method of claim 14 further comprising the step of subclassing said application program such that messages sent to a subclassed application program are intercepted by said image attachment means and processed by a subclass procedure.

17. The method of claim 16 wherein said subclass procedure comprises the steps of:

processing said message in said image attachment means if said message is of a message type of interest to said image attachment means;

passing said message to said application program if said message is not of interest to said image attachment means.

18. The method of claim 14 further comprising the step of operating an attachment application providing a user interface to select image files to be displayed in said image display area.

19. The method of claim 18 wherein a plurality of image files are selected to form an image gallery, said image gallery being displayed according to the steps of:

loading a first image file from said image gallery for display in said image display area during a first timed interval;

loading a second image file from said image gallery for display in said image display area during a second timed interval.

20. The method of claim 14 wherein said step of creating said image display area comprises opening a window in a windowed operating environment.

21. The method of claim 14 further comprising the step of moving said image display area within a region of said application display area in response to user input.

22. The method of claim 14 further comprising the step of hiding said image display area in response to user input.

23. The method of claim 22 further comprising the step of making a hidden image display area visible in response to user input.

24. The method of claim 14 further comprising the step of detecting display area movement functions involving said application display area.

25. The method of claim 24 further comprising the step of hiding said image display area if said application display area is not large enough to accommodate said image display area.

26. The method of claim 25 further comprising the step of making said image display area visible if said application display area was previously too small to accommodate said image display area, but is resized to dimensions that will accommodate said image display area.

27. The method of claim 24 further comprising the step of hiding said image display area if said application display area is about to be hidden.

28. The method of claim 27 further comprising the step of making said image display area visible if said application display area is about to become visible.

29. The method of claim 24 further comprising the step of moving said image display area along with said application display area when a movement operation is detected.

30. The method of claim 14 further comprising the step of generating an image display drawer from which said image display area rolls down to become visible and into which said image display area rolls up to become hidden.

31. The method of claim 14 wherein said first location is referenced to a caption bar in said application display area.

32. On a display in a computer system, a method for displaying an image, said method comprising the steps of:

forming a front surface of an image drawer by distinguishing a first area on said display at a first location;

starting a timer to provide timer messages at set intervals;

in response to said timer messages, displaying incremental translations of said front surface until a target position is reached, said display of incremental translations providing an appearance of a drawer opening out of said display;

beginning with a first edge of said image display area aligned with a corresponding first edge of said front surface, in response to said timer messages, displaying incremental translations of said image display area in a direction such that said first edge of said image display area appears to move away from said front surface, a portion of said image display area being made visible, said portion comprising a region between said first edge of said image display area and said first edge of said front surface, said translations terminating when said image display area is substantially revealed;

in response to said timer messages, displaying incremental translations of said front surface until said front surface is again aligned in said first location.

33. The method of claim 32 further comprising the step of displaying incremental translations of said image display area in response to said timer messages such that said image drawer is concealed.

34. The method of claim 32 wherein said first location is associated with a caption bar of an application display area.

35. The method of claim 32 wherein said first area is distinguished by filling said first area with a color differing from that of bordering areas of said display.

36. The method of claim 32 wherein said translations of said front surface are directed in a substantially diagonal direction to provide an appearance of depth.

37. The method of claim 32 wherein said first edge is a bottom edge, said image display area appearing to roll down from said image drawer.

38. A method for removing an image display area from a display in a computer system, said method comprising the steps of:

forming a front surface of an image drawer by distinguishing a first area on said display at a first location, said image display area aligned with a border of said image drawer;

starting a timer to provide timer messages at set intervals;

in response to said timer messages, displaying incremental translations of said front surface until a target position is reached, said display of incremental translations providing an appearance of a drawer opening out of said display;

in response to said timer messages, displaying incremental translations of said image display area in a direction such that a first edge of said image display area farthest from said image drawer appears to move toward said front surface, portions of said image display area becoming hidden as said portions are made to overlap said front surface, said translations terminating when said image display area is substantially hidden;

in response to said timer messages, displaying incremental translations of said front surface until said front surface is again aligned in said first location.

39. The method of claim 38 wherein if said image display area initially conceals said front surface, said method further comprising the step of displaying incremental translations of said image display area in response to said timer messages such that said image drawer is revealed.

40. The method of claim 38 wherein said first location is associated with a caption bar of an application display area.

41. The method of claim 38 wherein said first area is distinguished by filling said first area with a color differing from that of bordering areas of said display.

42. The method of claim 38 wherein said translations of said front surface are directed in a substantially diagonal direction to provide an appearance of depth.

43. The method of claim 38 wherein said first edge is a bottom edge, said image display area appearing to roll up into said image drawer.

* * * * *